US006711944B2

(12) United States Patent
Maruta et al.

(10) Patent No.: US 6,711,944 B2
(45) Date of Patent: Mar. 30, 2004

(54) METHOD OF TESTING ASSEMBLED INTERNAL COMBUSTION ENGINE

(75) Inventors: Naoyuki Maruta, Toyota (JP); Nobuaki Suzuki, Toyohashi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/244,387

(22) Filed: Sep. 17, 2002

(65) Prior Publication Data

US 2003/0019283 A1 Jan. 30, 2003

Related U.S. Application Data

(62) Division of application No. 09/214,936, filed as application No. PCT/JP97/02463 on Jul. 15, 1997.

(30) Foreign Application Priority Data

Jul. 19, 1996 (JP) .......... 8-190858
Nov. 5, 1996 (JP) .......... 8-292553
Nov. 21, 1996 (JP) .......... 8-310870

(51) Int. Cl.$^{7}$ .......... G01M 15/00
(52) U.S. Cl. .......... 73/116
(58) Field of Search .......... 73/116, 117.2, 73/117.3, 118.1, 118.2, 119 R

(56) References Cited

U.S. PATENT DOCUMENTS

| | | | |
|---|---|---|---|
| 3,415,114 | A | 12/1968 | Crampton |
| 4,331,029 | A | 5/1982 | Wilson |
| 4,370,884 | A | 2/1983 | Woss et al. |
| 4,424,709 | A | 1/1984 | Meier, Jr. et al. |
| 4,448,063 | A | 5/1984 | Mudge et al. |
| 4,483,185 | A | 11/1984 | Kunzfeld |
| 4,633,707 | A | 1/1987 | Haddox |
| 4,730,484 | A | 3/1988 | Olschefski |
| 5,355,713 | A | 10/1994 | Scourtes et al. |
| 5,417,109 | A | 5/1995 | Scourtes |
| 5,515,712 | A | 5/1996 | Yunick |
| 5,780,730 | A | 7/1998 | Scourtes et al. |
| 5,821,412 | A | 10/1998 | Bryant et al. |

FOREIGN PATENT DOCUMENTS

| | | |
|---|---|---|
| CA | 1 165 442 | 4/1984 |
| DE | 41 30 846 | 3/1993 |
| GB | 1167292 | 10/1969 |
| GB | 2 021 783 | 12/1979 |
| JP | 58-47147 | 9/1956 |
| JP | 61-182548 | 8/1986 |
| JP | 63-105841 | 7/1988 |
| JP | 1-125130 | 8/1989 |
| JP | 7-146216 | 6/1995 |
| JP | 8-184531 | 7/1996 |
| WO | WO 96/01986 | 1/1996 |

*Primary Examiner*—Eric S. McCall
(74) *Attorney, Agent, or Firm*—Finnegan, Henderson, Farabow, Garrett & Dunner, L.L.P.

(57) ABSTRACT

A method of testing the assembled state of an internal combustion engine and quickly and accurately judging whether there is at least one fault with the assembling of the engine. While an exhaust-valve side space is closed and a crank shaft is rotated at a constant speed, the pressure in the exhaust-valve side space and the pressure in a surge tank are detected by pressure sensors, respectively. The assembled state of an engine is tested based on the predetermined conditions of the detected two pressures. Those predetermined conditions may be the crank-shaft angles when the two pressures take respective maximal values, the crank-shaft angles when the two pressures change from their constant states to their increasing or decreasing states, etc. Based on those values, incorrect phases of crank and cam pulleys, incorrect clearances of intake and exhaust valves, missing of a compression ring, etc. can be identified.

13 Claims, 76 Drawing Sheets

FIG. 24

| | | | α | | β | | Γ | | Σ | | Φ | | Λ | | Ψ | |
|---|---|---|---|---|---|---|---|---|---|---|---|---|---|---|---|---|
| | | BANKS | LEFT | RIGHT | LEFT | RIGHT | LEFT | RIGHT | LEFT | RIGHT | LEFT | RIGHT | LEFT | RIGHT | LEFT | RIGHT |
| CRANK PULLEY 20 | | ONE-TOOTH FAST | 17 | 17 | 0 | 0 | 15 | 15 | 15 | 15 | 15 | 15 | 14 | 14 | 15 | 15 |
| | | ONE-TOOTH SLOW | −17 | −17 | 0 | 0 | −15 | −15 | −15 | −15 | −15 | −15 | −14 | −14 | −15 | −15 |
| CAM PULLEYS | LEFT 24 | ONE-TOOTH FAST | −17 | 0 | 0 | 0 | −15 | 0 | −15 | 0 | −15 | 0 | −14 | 0 | −15 | 0 |
| | | ONE-TOOTH SLOW | 17 | 0 | 0 | 0 | 15 | 0 | 15 | 0 | 15 | 0 | 14 | 0 | 15 | 0 |
| | RIGHT 26 | ONE-TOOTH FAST | 0 | −17 | 0 | 0 | 0 | −15 | 0 | −15 | 0 | −15 | 0 | −14 | 0 | −15 |
| | | ONE-TOOTH SLOW | 0 | 17 | 0 | 0 | 0 | 15 | 0 | 15 | 0 | 15 | 0 | 14 | 0 | 15 |
| DRIVEN GEARS | LEFT 40 | ONE-TOOTH FAST | −42 | 0 | −10 | 0 | −18 | 0 | −8.4 | 0 | 0 | 0 | −17 | 0 | −18 | 0 |
| | | ONE-TOOTH SLOW | 42 | 0 | 36 | 0 | 18 | 0 | 0 | 0 | 0 | 0 | 17 | 0 | 18 | 0 |
| | RIGHT 42 | ONE-TOOTH FAST | 0 | −42 | 0 | −10 | 0 | −18 | 0 | −8.4 | 0 | 0 | 0 | −17 | 0 | −18 |
| | | ONE-TOOTH SLOW | 0 | 42 | 0 | 36 | 0 | 18 | 0 | 0 | 0 | 0 | 0 | 17 | 0 | 18 |
| INTAKE-VALVE CLEARANCE | | SMALL | −47 | | −16 | | −6.4 | | 0 | | 0 | | −6 | | −6.4 | |
| | | LARGE | 18 | | 20 | | 5.4 | | 0 | | 0 | | 5 | | 5.4 | |
| EXHAUST-VALVE CLEARANCE | | SMALL | −8 | | −10 | | 0 | | 6.4 | | −6.4 | | 0 | | 0 | |
| | | LARGE | 12 | | 14 | | 0 | | 0 | | 0 | | 0 | | 0 | |
| COMPRESSION-RING MISSING | | | −10 | | −1 | | 0 | | 0 | | 0 | | 0 | | 0 | |

| | | OK (200) | NG (202) | |
|---|---|---|---|---|
| | | | FAST | SLOW |
| CRANK PULLEY 20 | | | 204 | 206 |
| CAM PULLEYS | LEFT 24 | | 208 | 210 |
| | RIGHT 26 | | 212 | 214 |
| DRIVEN GEARS | LEFT 40 | | 216 | 218 |
| | RIGHT 42 | | 220 | 222 |

| PISTONS No. | | # 1 | # 2 | # 3 | # 4 | # 5 | # 6 | |
|---|---|---|---|---|---|---|---|---|
| INTAKE-VALVE CLEARANCE | SMALL | | | | | | | 224 |
| | LARGE | | | | | | | 226 |
| EXHAUST-VALVE CLEARANCE | SMALL | | | | | | | 228 |
| | LARGE | | | | | | | 230 |
| COMPRESSION-RING MISSING | | | | | | | | 232 |

FIG. 28

| | 7 | 6 | 5 | 4 | 3 | 2 | 1 | 0 |
|---|---|---|---|---|---|---|---|---|
| $flag_{drvn}$ | ERROR | — | — | — | RIGHT BANK SLOW | RIGHT BANK FAST | LEFT BANK SLOW | LEFT BANK FAST |
| $flag_{cam}$ | ERROR | — | — | — | RIGHT BANK SLOW | RIGHT BANK FAST | LEFT BANK SLOW | LEFT BANK FAST |
| $flag_{crnk}$ | ERROR | — | — | — | — | — | SLOW | FAST |
| $flag_{ins}$ | ERROR | — | # 6 | # 5 | # 4 | # 3 | # 2 | # 1 |
| $flag_{inl}$ | ERROR | — | # 6 | # 5 | # 4 | # 3 | # 2 | # 1 |
| $flag_{exs}$ | ERROR | — | # 6 | # 5 | # 4 | # 3 | # 2 | # 1 |
| $flag_{exl}$ | ERROR | — | # 6 | # 5 | # 4 | # 3 | # 2 | # 1 |
| $flag_{ring}$ | ERROR | — | # 6 | # 5 | # 4 | # 3 | # 2 | # 1 |

FIG. 47

| | CAM PULLEY 24 | | DRIVEN GEAR 40 | |
|---|---|---|---|---|
| | FAST (SUFFIX 1) | SLOW (SUFFIX 2) | FAST (SUFFIX 1) | SLOW (SUFFIX 2) |
| Γ | −15 | 15 | −18 | 18 |
| Σ | −15 | 15 | −8.4 | 0 |
| α | −9.66 | 9.66 | −12.1 | 22.7 |
| β | 0 | 0 | −3.3 | 10.6 |

FIG. 50

| | | | α | | β | | Γ | | Σ | | Φ | | Λ | | Ψ | |
|---|---|---|---|---|---|---|---|---|---|---|---|---|---|---|---|---|
| | | BANKS | LEFT | RIGHT | LEFT | RIGHT | LEFT | RIGHT | LEFT | RIGHT | LEFT | RIGHT | LEFT | RIGHT | LEFT | RIGHT |
| CRANK PULLEY 20 | | ONE-TOOTH FAST | 17 | 17 | 0 | 0 | 15 | 15 | 15 | 15 | 15 | 15 | 14 | 14 | 15 | 15 |
| | | ONE-TOOTH SLOW | -17 | -17 | 0 | 0 | -15 | -15 | -15 | -15 | -15 | -15 | -14 | -14 | -15 | -15 |
| CAM PULLEYS | LEFT 24 | ONE-TOOTH FAST | -17 | 0 | 0 | 0 | -15 | 0 | -15 | 0 | -15 | 0 | -14 | 0 | -15 | 0 |
| | | ONE-TOOTH SLOW | 17 | 0 | 0 | 0 | 15 | 0 | 15 | 0 | 15 | 0 | 14 | 0 | 15 | 0 |
| | RIGHT 26 | ONE-TOOTH FAST | 0 | -17 | 0 | 0 | 0 | -15 | 0 | -15 | 0 | -15 | 0 | -14 | 0 | -15 |
| | | ONE-TOOTH SLOW | 0 | 17 | 0 | 0 | 0 | 15 | 0 | 15 | 0 | 15 | 0 | 14 | 0 | 15 |
| DRIVEN GEARS | LEFT 40 | ONE-TOOTH FAST | -42 | 0 | -10 | 0 | -18 | 0 | -8.4 | 0 | 0 | 0 | -17 | 0 | -18 | 0 |
| | | ONE-TOOTH SLOW | 42 | 0 | 36 | 0 | 18 | 0 | 0 | 0 | 0 | 0 | 17 | 0 | 18 | 0 |
| | RIGHT 42 | ONE-TOOTH FAST | 0 | -42 | 0 | -10 | 0 | -18 | 0 | -8.4 | 0 | 0 | 0 | -17 | 0 | -18 |
| | | ONE-TOOTH SLOW | 0 | 42 | 0 | 36 | 0 | 18 | 0 | 0 | 0 | 0 | 0 | 17 | 0 | 18 |
| FOREIGN-MATTER BITING | | INTAKE VALVE | -79 | | -9 | | -26 | | -18 | | 0 | | —— | | —— | |
| | | EXHAUST VALVE | 0 | | -9~110 | | 0 | | 0 | | 0 | | —— | | —— | |
| INTAKE-VALVE CLEARANCE | | SMALL | -47 | | -16 | | -6.4 | | 0 | | 0 | | -6 | | -6.4 | |
| | | LARGE | 18 | | 20 | | 5.4 | | 0 | | 0 | | 5 | | 5.4 | |
| EXHAUST-VALVE CLEARANCE | | SMALL | -8 | | -10 | | 0 | | 6.4 | | -6.4 | | 0 | | 0 | |
| | | LARGE | 12 | | 14 | | 0 | | 0 | | 0 | | 0 | | 0 | |
| COMPRESSION-RING MISSING | | | -10 | | -1 | | 0 | | 0 | | 0 | | 0 | | 0 | |

| | | | | | | | | |
|---|---|---|---|---|---|---|---|---|
| OK (200) | | NG (202) | | | | | | |
| | | FAST | | | SLOW | | | |
| CRANK PULLEY 20 | | 204 | | | 206 | | | |
| CAM PULLEYS | LEFT 24 | 208 | | | 210 | | | |
| | RIGHT 26 | 212 | | | 214 | | | |
| DRIVEN GEARS | LEFT 40 | 216 | | | 218 | | | |
| | RIGHT 42 | 220 | | | 222 | | | |
| PISTONS No. | | #1 | #2 | #3 | #4 | #5 | #6 | |
| INTAKE-VALVE FOREIGN-MATTER BITING | | | | | | | | 332 |
| EXHAUST-VALVE FOREIGN-MATTER BITING | | | | | | | | 334 |
| INTAKE-VALVE CLEARANCE | SMALL | | | | | | | 224 |
| | LARGE | | | | | | | 226 |
| EXHAUST-VALVE CLEARANCE | SMALL | | | | | | | 228 |
| | LARGE | | | | | | | 230 |
| COMPRESSION-RING MISSING | | | | | | | | 232 |

FIG. 54

| | 7 | 6 | 5 | 4 | 3 | 2 | 1 | 0 |
|---|---|---|---|---|---|---|---|---|
| flag drvn | ERROR | — | — | — | RIGHT BANK SLOW | RIGHT BANK FAST | LEFT BANK SLOW | LEFT BANK FAST |
| flag cam | ERROR | — | — | — | RIGHT BANK SLOW | RIGHT BANK FAST | LEFT BANK SLOW | LEFT BANK FAST |
| flag crnk | ERROR | — | — | — | — | — | SLOW | FAST |
| flag ina | ERROR | — | #6 | #5 | #4 | #3 | #2 | #1 |
| flag exa | ERROR | — | #6 | #5 | #4 | #3 | #2 | #1 |
| flag ins | ERROR | — | #6 | #5 | #4 | #3 | #2 | #1 |
| flag inl | ERROR | — | #6 | #5 | #4 | #3 | #2 | #1 |
| flag exs | ERROR | — | #6 | #5 | #4 | #3 | #2 | #1 |
| flag exl | ERROR | — | #6 | #5 | #4 | #3 | #2 | #1 |
| flag ring | ERROR | — | #6 | #5 | #4 | #3 | #2 | #1 |

FIG. 69

| | 7 | 6 | 5 | 4 | 3 | 2 | 1 | 0 |
|---|---|---|---|---|---|---|---|---|
| $flag_{drvn}$ | ERROR 1 | ERROR 2 | — | — | RIGHT BANK SLOW | RIGHT BANK FAST | LEFT BANK SLOW | LEFT BANK FAST |

| | 7 | 6 | 5 | 4 | 3 | 2 | 1 | 0 |
|---|---|---|---|---|---|---|---|---|
| $flag_{cam}$ | ERROR 1 | ERROR 2 | — | — | RIGHT BANK SLOW | RIGHT BANK FAST | LEFT BANK SLOW | LEFT BANK FAST |

| | 7 | 6 | 5 | 4 | 3 | 2 | 1 | 0 |
|---|---|---|---|---|---|---|---|---|
| $flag_{crnk}$ | ERROR 1 | ERROR 2 | — | — | — | — | SLOW | FAST |

| | 7 | 6 | 5 | 4 | 3 | 2 | 1 | 0 |
|---|---|---|---|---|---|---|---|---|
| $flag_{ins}$ | ERROR 1 | ERROR 2 | # 6 | # 5 | # 4 | # 3 | # 2 | # 1 |

| | 7 | 6 | 5 | 4 | 3 | 2 | 1 | 0 |
|---|---|---|---|---|---|---|---|---|
| $flag_{inl}$ | ERROR 1 | ERROR 2 | # 6 | # 5 | # 4 | # 3 | # 2 | # 1 |

| | 7 | 6 | 5 | 4 | 3 | 2 | 1 | 0 |
|---|---|---|---|---|---|---|---|---|
| $flag_{exs}$ | ERROR 1 | ERROR 2 | # 6 | # 5 | # 4 | # 3 | # 2 | # 1 |

| | 7 | 6 | 5 | 4 | 3 | 2 | 1 | 0 |
|---|---|---|---|---|---|---|---|---|
| $flag_{exl}$ | ERROR 1 | ERROR 2 | # 6 | # 5 | # 4 | # 3 | # 2 | # 1 |

| | 7 | 6 | 5 | 4 | 3 | 2 | 1 | 0 |
|---|---|---|---|---|---|---|---|---|
| $flag_{ring}$ | ERROR 1 | ERROR 2 | # 6 | # 5 | # 4 | # 3 | # 2 | # 1 |

FIG. 79

| | | BANKS | $\delta P_{EXmax}$ LEFT | $\delta P_{EXmax}$ RIGHT | $\delta P_{EXconst}$ LEFT | $\delta P_{EXconst}$ RIGHT | $\delta\Gamma$ LEFT | $\delta\Gamma$ RIGHT | $\delta\Sigma$ LEFT | $\delta\Sigma$ RIGHT | $\delta\Phi$ LEFT | $\delta\Phi$ RIGHT | $\delta\Lambda$ LEFT | $\delta\Lambda$ RIGHT | $\delta\Psi$ LEFT | $\delta\Psi$ RIGHT | $\delta(\Gamma-\Phi)$ LEFT | $\delta(\Gamma-\Phi)$ RIGHT |
|---|---|---|---|---|---|---|---|---|---|---|---|---|---|---|---|---|---|---|
| CAM PULLEY | LEFT 24 | ONE-TOOTH FAST | 17 | -17 | 0 | 0 | 15 | -15 | 15 | -15 | 15 | -15 | 14 | -14 | 15 | -15 | 0 | 0 |
| | | ONE-TOOTH SLOW | -17 | 17 | 0 | 0 | -15 | 15 | -15 | 15 | -15 | 15 | -14 | 14 | -15 | 15 | 0 | 0 |
| | RIGHT 26 | ONE-TOOTH FAST | -17 | 17 | 0 | 0 | -15 | 15 | -15 | 15 | -15 | 15 | -14 | 14 | -15 | 15 | 0 | 0 |
| | | ONE-TOOTH SLOW | 17 | -17 | 0 | 0 | 15 | -15 | 15 | -15 | 15 | -15 | 14 | -14 | 15 | -15 | 0 | 0 |
| DRIVEN GEAR | LEFT 40 | ONE-TOOTH FAST | 42 | -42 | 10 | -10 | 18 | -18 | 8.4 | -8.4 | 0 | 0 | 17 | -17 | 18 | -18 | -18 | 18 |
| | | ONE-TOOTH SLOW | -42 | 42 | -36 | 36 | -18 | 18 | 0 | 0 | 0 | 0 | -17 | 17 | -18 | 18 | 18 | -18 |
| | RIGHT 42 | ONE-TOOTH FAST | -42 | 42 | -10 | 10 | -18 | 18 | -8.4 | 8.4 | 0 | 0 | -17 | 17 | -18 | 18 | 18 | -18 |
| | | ONE-TOOTH SLOW | 42 | -42 | 36 | -36 | 18 | -18 | 0 | 0 | 0 | 0 | 17 | -17 | 18 | -18 | -18 | 18 |

FIG. 80

| | | $\delta P_{EXmax\,i}$ | $\delta P_{EXconst\,i}$ | $\delta\Gamma i$ | $\delta\Sigma i$ | $\delta\Phi i$ | $\delta\Lambda i$ | $\delta\Psi i$ | $\delta(\Gamma-\Phi)i$ |
|---|---|---|---|---|---|---|---|---|---|
| INTAKE-VALVE CLEARANCE | SMALL | 47 | 16 | 6.4 (POSITIVE) | 0 (ABOUT ZERO) | 0 (ABOUT ZERO) | 6 (POSITIVE) | 6.4 (POSITIVE) | -6.4 (NEGATIVE) |
| | LARGE | -18 | -20 | -5.4 (NEGATIVE) | 0 (ABOUT ZERO) | 0 (ABOUT ZERO) | -5 (NEGATIVE) | -5.4 (NEGATIVE) | 5.4 (POSITIVE) |
| EXHAUST-VALVE CLEARANCE | SMALL | 8 | 10 | 0 (ABOUT ZERO) | -6.4 (NEGATIVE) | 6.4 (POSITIVE) | 0 (ABOUT ZERO) | 0 (ABOUT ZERO) | 6.4 (POSITIVE) |
| | LARGE | -12 (NEGATIVE) | -14 | 0 (ABOUT ZERO) | 0 (ABOUT ZERO) | 0 (ABOUT ZERO) | 0 (ABOUT ZERO) | 0 (ABOUT ZERO) | 0 (ABOUT ZERO) |
| COMPRESSION-RING MISSING | | 10 (POSITIVE) | 1 | 0 (ABOUT ZERO) | 0 (ABOUT ZERO) | 0 (ABOUT ZERO) | 0 (ABOUT ZERO) | 0 (ABOUT ZERO) | 0 (ABOUT ZERO) |

METHOD OF TESTING ASSEMBLED INTERNAL COMBUSTION ENGINE

This is a division of application Ser. No. 09/214,936, filed Jan. 15, 1999, which is based on PCT/JP97/02463, filed Jul. 15, 1997, all of which are incorporated herein by reference.

TECHNICAL FIELD

The present invention relates to a method of checking or testing the assembled state of an internal combustion engine.

BACKGROUND ART

When the assembling of an internal combustion engine (hereinafter, referred to as the "engine") finishes, it is necessary to judge whether there is a fault with the assembling of the engine, such as missing of any part of the engine, or asynchronism of respective operations of two or more parts of the same. If the engine has a fault, it cannot perform as designed. One example of the assembled engine testing method is disclosed in U.S. Pat. No. 5,355,713. In the disclosed method, an assembled engine is rotated in a "cool" state in which no fuel is fired, a pressure waveform is obtained from an exhaust-valve or intake-valve side space of the engine, and the obtained pressure waveform is compared with a reference pressure waveform which is obtained in advance from a normal engine. Thus, whether or not there is a fault with the assembling of the engine is judged. The U.S. patent discloses the technique of comparing a characteristic of the obtained waveform with a corresponding characteristic of the reference waveform. The characteristic may be the amplitude of at least one of a (positive) pressure pulse and a vacuum (negative pressure) pulse contained in each pressure waveform. In addition, the U.S. patent discloses the technique of judging that an assembled engine has a fault if the pressure in the exhaust-valve side space of the engine (hereinafter, referred to as the "exhaust pressure") does not exceed a reference value at a predetermined angular phase of a crank shaft of the engine (hereinafter, referred to as the "crank-shaft (CS) angle") where the exhaust pressure would exceed the reference value if the engine were normal. That is, the engine testing method disclosed in the U.S. patent consists in comparing a measured characteristic value of exhaust or intake pressure of an assembled engine, such as maximal or minimal value or a value corresponding to a particular CS angle, with a reference value obtained from a normal engine.

The U.S. patent teaches finding a fault with an assembled engine based on a pressure waveform obtained from either one of the exhaust-valve or intake-valve side space of the engine. However, it fails to teach finding a fault based on respective pressure waveforms obtained from the exhaust-valve and intake-valve side spaces of the engine. In addition, if the disclosed method finds a fault, it ends. Therefore, if an assembled engine has different sorts of faults, the method cannot find those faults.

DISCLOSURE OF INVENTION

It is therefore an object of the present invention to provide an assembled engine testing method which is different from that disclosed in the above-identified U.S. patent.

According to a first aspect of the present invention, there is provided a method of testing an assembled internal combustion engine having an intake valve and an exhaust valve, being characterized by rotating the assembled engine, measuring a timing of occurrence of at least one predetermined condition of a pressure in at least one of an external intake-valve side space which communicates with the intake valve and an external exhaust-valve side space which communicates with the exhaust valve, and judging, based on the measured timing, whether there is at least one fault with the assembling of the engine.

In the testing method in accordance with the first aspect of the invention, the timing of occurrence of the at least one predetermined condition of the pressure in the intake-valve side space or the external exhaust-valve side space (hereinafter, referred to as "the intake pressure" or the "exhaust pressure") changes depending upon the changing pressure in a cylinder (hereinafter, referred to as the "cylinder pressure") in which a piston reciprocates linearly and the opening and closing timings of the intake and exhaust valves. The cylinder pressure increases as the piston moves up toward its top dead position, and decreases as the piston moves down toward its bottom dead position. In the reciprocating engine, after the intake and exhaust valves close, first, the exhaust valve starts opening and subsequently the intake valve starts opening. After the exhaust valve closes, the intake valve closes. During each cycle, if, e.g., the timing of commencement of opening of the intake valve is earlier (i.e., corresponds to a smaller CS angle) than a reference timing obtained from a normal engine, the exhaust pressure takes a maximal value smaller than a reference value obtained from the normal engine and takes a less time to reach the maximal value. To the contrary, if the timing of commencement of opening of the intake valve is later (i.e., corresponds to a larger CS angle) than the reference timing obtained from the normal engine, the exhaust pressure takes a maximal value greater than the reference value and takes a more time to reach the maximal value. Therefore, if, e.g., the timing when the exhaust pressure takes a maximal value is known, the relationship between the opening and closing timings of the intake valve and the CS angle is known. Thus, it can be judged that the assembled engine has the assembling fault of an incorrect phase difference between a crank shaft and a cam shaft. In addition, if, e.g., the opening and closing timings of the exhaust valve change relative to the CS angle, the change influences the intake pressure. Thus, the fault of incorrect phase difference between the crank and cam shafts can be identified based on the timing of occurrence of at least one predetermined condition of the intake pressure. In this way, it is possible to judge whether there is at least one fault with an assembled engine, based on the timing of occurrence of one or more predetermined conditions of the intake pressure and/or the exhaust pressure, without having to take the engine apart. The present testing method does not exclude finding an assembling fault by taking into account an intake or exhaust pressure value corresponding to the predetermined condition. For example, an exhaust pressure value at the timing when the exhaust valve starts opening, a maximal value of the exhaust pressure, etc. may be taken into account. The assembled engine may be rotated in a "hot" state, i.e., by firing of fuel therein, or in a "cool" state, i.e., by being connected to a separate rotating device and compulsorily rotated by the device. Generally, the "cool" test is easier than the "hot" test. In the hot test, it is cumbersome to supply fuel to the engine and treat the exhaust gas emitted therefrom. In addition, in the "hot" test, the pressure signals obtained from the intake-side and exhaust-side spaces contain more noise. The "cool" test is free from those problems, and accordingly can be carried out more easily.

According to a preferred feature of the first aspect of the invention, the judging step comprises comparing the measured timing with a reference timing and judging, based on the comparison result, whether there is at least one fault with the assembling of the engine. The reference timing may be a timing which is actually measured from a normal engine having no assembling fault, or may be a timing which is prescribed by a designer. An incorrect phase of a crank shaft may be caused by an incorrect relative phase between the crank shaft and a crank pulley due to inappropriate attachment of the pulley to the shaft, an incorrect relative phase between the crank pulley and a timing belt or chain due to inappropriate engagement thereof, etc. An incorrect phase of a cam shaft may be caused by an incorrect relative phase between the cam shaft and a cam pulley due to inappropriate attachment of the cam pulley to the cam shaft, an incorrect relative phase between the cam pulley and a timing belt or chain due to inappropriate engagement thereof, etc. As will be described later on the preferred embodiments, the incorrect phase of the cam shaft may also be caused by an incorrect relative phase between a drive gear attached to one of an intake cam shaft for operating the intake valves and an exhaust cam shaft for operating the exhaust valves, and a driven gear attached to the other cam shaft. The timing of occurrence of the predetermined condition of the exhaust or intake pressure discontinuously changes due to the presence of each of the above faults, because the amount of deviation of the incorrect phase of the crank pulley, etc. from its correct phase stepwise changes. Similarly, the timing of occurrence of the predetermined condition discontinuously changes due to missing of a compression ring. Therefore, the reference timing with which the measured timing is compared may be a timing of occurrence of the predetermined condition which is measured from one or more normal engines each having no assembling fault. Therefore, if the difference between the measured timing and the reference timing falls in a reference range, the assembled engine may be judged as normal, i.e., having no assembling fault. On the other hand, the timing of occurrence of the predetermined condition continuously changes due to the presence of an incorrect intake-valve or exhaust-valve clearance. Therefore, if the clearance of an intake or exhaust valve falls in a reference range, the valve may be judged as normal. In the last case, the reference value with which the measured value is compared corresponds to every value within the reference range. In any case, the reference value is used as a criterion for distinguishing an engine having at least one fault from an engine having no fault. Therefore, whether there is at least one fault with an assembled engine can be judged quickly and easily by comparing the measured timing of occurrence of the predetermined condition, with the reference timing.

According to another feature of the first aspect of the invention, the measuring step comprises measuring at least one of a first timing when the exhaust pressure in the exhaust-valve side space takes a maximal value; a second timing when the exhaust pressure changes from a first decreasing state to a constant state in which the exhaust pressure does not change as time elapses; a third timing when the exhaust pressure changes from the constant state to a second decreasing state; a fourth timing when the intake pressure in the intake-valve side space takes a maximal value; and a fifth timing when the intake pressure changes from a constant state in which the intake pressure does not change as time elapses, to an increasing state. The first to fifth timings are very reliable for finding at least one assembling fault, because at each of those timings the exhaust or intake pressure significantly changes. Therefore, each of those timings can be measured with high accuracy, and one or more faults can be found with high reliability.

According to another feature of the first aspect of the invention, the judging step comprises identifying at least one fault with the assembling of the engine based on at least one of a positive or negative sign and an absolute value of a difference between at least one measured timing out of the first to fifth timings and a corresponding one of a first, a second, a third, a fourth, and a fifth reference timing.

According to another feature of the first aspect of the invention, the judging step comprises identifying at least one fault with the assembling of the engine based on a combination of a plurality of measured timings out of the first to fifth timings each of which measured timings is different from a corresponding one of a first, a second, a third, a fourth, and a fifth reference timing.

According to another feature of the first aspect of the invention, the at least one fault comprises at least one of an incorrect clearance of the intake valve; an incorrect clearance of the exhaust valve; an incorrect relative phase between a crank shaft and a cam shaft; and a missing of a compression ring. The four assembling faults occur most frequently. As will be described later by reference to the preferred embodiments of the invention, it is possible to identify at least two faults out of those four faults, based on the measured timing of at least one predetermined condition of the intake pressure and/or the exhaust pressure. Since those faults actually occur frequently in assembly lines, it is very efficient to be able to find one or more of those faults without having to take the engine apart.

According to another feature of the first aspect of the invention, the incorrect relative phase between the crank shaft and the cam shaft comprises at least one of an incorrect relative phase between the crank shaft and a crank pulley; an incorrect relative phase between a cam pulley and the cam shaft; and an incorrect relative phase between a drive gear and a driven gear.

According to another feature of the first aspect of the invention, the testing method further comprises the step of closing at least one of an exhaust-valve side passage which connects between the exhaust valve and an exhaust manifold and an intake-valve side passage which connects between the intake valve and an intake manifold, wherein the at least one of the external exhaust-valve side space and the external intake-valve side space comprises at least one of an exhaust-valve side portion of the closed exhaust-valve side passage and an intake-valve side portion of the closed intake-valve side passage. In this case, the reliability of the engine testing method is improved. It is possible to measure the exhaust or intake pressure without having to close the exhaust-valve side passage which connects between the exhaust valve and the exhaust manifold, or the intake-valve side passage which connects between the intake valve and the intake manifold. However, in the case where the exhaust-valve side passage and/or intake-valve side passage are/is closed, it is possible to detect accurately a change of the exhaust or intake pressure which results from the presence of one or more assembling faults, and accurately measure the timing of occurrence of at least one predetermined condition of the exhaust or intake pressure. Thus, the present testing method enjoys an improved reliability. In this case, it is preferred to carry out the testing method before the exhaust manifold and/or the intake manifold are/is attached to the engine.

According to another feature of the first aspect of the invention, the at least one of the external intake-valve side space and the external exhaust-valve side space comprises the exhaust-valve side space which comprises an exhaust-valve room and an exhaust manifold whose outlet is closed.

In each cycle of operation of an engine having a plurality of cylinders, the opening and closing of the exhaust valve or valves of each of the cylinders sequentially occur at a regular interval of timing. As will be described later in the preferred embodiments, if the pressure in a single space provided by the exhaust-valve room and an inner space of the exhaust manifold is detected, then it can be judged whether there is at least one fault with each cylinder of the engine. Since in this case the testing method can be carried out after the exhaust manifold has been assembled, the exhaust pressure of each cylinder can be detected more easily.

According to another feature of the first aspect of the invention, the at least one of the external intake-valve side space and the external exhaust-valve side space comprises an internal space of a surge tank. In each cycle of operation of an engine having a plurality of cylinders, the opening and closing of the intake valve or valves of each of the cylinders sequentially occur at a regular interval of timing, like the opening and closing of the exhaust valve or valves of each cylinder. As will be described later on the preferred embodiments, if the pressure in the inner space of the surge tank is detected, then it can be judged whether there is at least one fault with each cylinder of the engine. Since in this case the testing method can be carried out after the intake manifold and the surge tank have been assembled and the number of pressure sensors employed can be minimized, the intake pressure of each cylinder can be detected very easily.

According to another feature of the first aspect of the invention, the judging step comprises identifying at least two faults out of a plurality of faults of the engine which result from the assembling thereof. In the case where a plurality of assembling faults occur to a single engine, the testing method in accordance with the first aspect of the invention may identify only the presence of one or more faults out of the plurality of faults. Otherwise, if it identifies of what kind is one fault found, then the test may be over with the identified fault being displayed. In contrast, in the testing method in accordance with the present feature, at least two faults are simultaneously identified. In the case where only the presence of one or more faults is identified, an operator must take the engine apart and identify the fault or faults. In the case where the engine test is terminated when a fault is identified, the operator must correct the fault displayed and again carry out the same test on the engine for identifying another possible fault and correcting the second fault. In either case, it takes a long time to remove the fault or faults from the engine. In contrast, if at least two faults out of the plurality of faults with the engine can be simultaneously identified, those identified faults can be simultaneously removed. If all the faults with the engine can be simultaneously identified, all those faults can be simultaneously removed. The last case is ideal. However, it is not essentially required that all the faults with the engine be simultaneously identified. It is sufficiently efficient to identify simultaneously at least two faults out of the plurality of faults with the engine. In addition, if the total number of faults which the engine may have with any possibility can be limited or reduced to a smaller one based on the measured timing, the time needed to identify the fault or faults with the engine can be accordingly reduced.

According to another feature of the first aspect of the invention, the at least one predetermined condition of the pressure can occur at a plurality of timings corresponding to a plurality of faults which can result from the assembling of the engine, and wherein the judging step comprises identifying at least one of the plurality of faults, based on at least one of (a) an amount of deviation of the measured timing of the at least one predetermined condition from a reference timing and (b) a combination of at least two predetermined conditions whose measured timings are deviated from at least two reference timings, respectively.

According to another feature of the first aspect of the invention, the testing method further comprising the step of deciding, when a measured timing of each of at least two predetermined conditions of the pressure is equal to a reference timing, that there is no fault with the assembling of the engine, and omitting carrying out the judging step. In this case, the judging step is prevented from being carried out uselessly.

According to another feature of the first aspect of the invention, the plurality of timings comprise at least one timing which corresponds to each of at least two faults of the plurality of faults, and wherein the identifying step comprises utilizing one of the plurality of timings which corresponds to a smallest number of faults, prior to the other timings. In the case where a plurality of faults can simultaneously occur to a single engine, the present testing method can easily identify at least one fault out of the plurality of faults. If the measured timing of occurrence of a certain predetermined condition is judged as being different from the reference timing by, e.g., being compared with one of the plurality of timings which corresponds to the smallest number of faults (e.g., one), the smallest number of faults can be identified easily. The thus identified fault or faults can be utilized for identifying another or other remaining fault or faults.

According to another feature of the first aspect of the invention, the identifying step comprises utilizing one of the plurality of timings which corresponds to at least one fault the identification of which is most easily confirmed by an an operator, prior to the other timings. If the correctness of identification of at least one fault can be confirmed by an operator, then it can be utilized for identifying another or other remaining fault or faults. The easier the confirmation is, the easier the employment of this identifying manner is.

According to another feature of the first aspect of the invention, the identifying step comprises utilizing one of the plurality of timings which corresponds to at least one fault which is most easily corrected by an operator, prior to the other timings. In the case where a plurality of faults occur to a single engine, if at least one fault out of the plurality of faults is identified and corrected, one or more remaining faults can be identified more easily, or one or more faults which have been judged as being not identifiable turn to be identifiable.

According to another feature of the first aspect of the invention, the rotating step comprises rotating, using an independent rotating device, a crank shaft of the assembled engine and thereby reciprocating a piston of the engine in a cylinder of the engine, while the at least one of the intake-valve side and exhaust-valve side spaces is isolated from an atmosphere, and wherein the judging step comprises judging whether there is at least one fault with an assembled state of the engine, based on at least one of (a) a pressure in the one of the intake-valve side and exhaust-valve side spaces which is measured while a corresponding one of the intake and exhaust valves is closed and (b) at least one of a starting and an ending timing of a closed state of one of the intake and exhaust valves which corresponds to the one of the intake-valve side and exhaust-valve side spaces.

According to another feature of the first aspect of the invention, the rotating step comprises rotating, using an independent rotating device, a crank shaft of the assembled engine and thereby reciprocating a piston of the engine in a cylinder of the engine, while the at least one of the intake-valve side and exhaust-valve side spaces is isolated from an atmosphere, and wherein the judging step comprises judging whether there is at least one fault with an assembled state of the engine, based on at least one of (a) a pressure in the one of the intake-valve side and exhaust-valve side spaces which is measured while a corresponding one of the intake and exhaust valves is closed and (b) at least one of a starting and an ending timing of a closed state of one of the intake and exhaust valves which corresponds to the one of the intake-valve side and exhaust-valve side spaces.

According to another feature of the first aspect of the invention, the assembled engine includes a plurality of cylinders each of which has an intake valve and an exhaust valve, wherein the measuring step comprises measuring, for each of at least two cylinders of the plurality of cylinders, at least one of (a) a value of a pressure in at least one of an external intake-valve side space which communicates with the intake valve corresponding to the each cylinder and an external exhaust-valve side space which communicates with the exhaust valve corresponding to the each cylinder, when the pressure satisfies the at least one predetermined condition, and (b) a timing at which the pressure satisfies the at least one predetermined condition, wherein the method further comprises a step of comparing the at least one of the value and the timing of a first one of the at least two cylinders with the at least one of the value and the timing of a second one of the at least two cylinders, and wherein the judging step comprises judging that there is at least one fault with the assembling of the engine, when the at least one of the value and the timing of the first cylinder is not equal to the at least one of the value and the timing of the second cylinder.

According to a second aspect of the present invention, there is provided a method of testing an engine including a cylinder, a piston, a crank shaft, an intake valve and an exhaust valve, characterized by rotating, using an independent rotating device, the crank shaft and thereby reciprocating the piston in the cylinder, while at least one of an external intake-valve side space which communicates with the intake valve and an external exhaust-valve side space which communicates with the exhaust valve is isolated from an atmosphere, and evaluating a state of the engine based on at least one of (a) a pressure in the one of the intake-valve side and exhaust-valve side spaces which is measured while a corresponding one of the intake and exhaust valves is closed and (b) at least one of a starting and an ending timing of a closed state of one of the intake and exhaust valves which corresponds to the one of the intake-valve side and exhaust-valve side spaces.

The engine testing method in accordance with the second aspect of the invention may be carried out on an engine which is provided with an ignition plug. In this case, the method can be carried out without having to remove the ignition plug from the engine. If the method is performed with the intake and exhaust valves being closed, the inner space of the cylinder is isolated from not only the intake-valve side and exhaust-valve side spaces but the atmosphere. In the case where the method is performed with the intake-valve side space being isolated from the atmosphere, the intake-valve side space is completely isolated if the intake valve or valves is or are completely closed, so that the pressure in the intake-valve side space becomes constant irrespective of the reciprocation of the piston. Similarly, in the case where the method is performed with the exhaust-valve side space being isolated from the atmosphere, the exhaust-valve side space is completely isolated if the exhaust valve or valves is or are completely closed, so that the pressure in the exhaust-valve side space becomes constant irrespective of the reciprocation of the piston. Since it is easy to detect the constant-pressure state of the intake-valve side or exhaust-valve side space, it is also easy to find one or more faults with the engine based on the detection result. For example, it is easy to find the fault of incomplete valve closing, that is, the fault that an intake or exhaust valve does not completely close because, e.g., a foreign matter bites into the space between the intake or exhaust valve and a corresponding valve seat. If the incomplete valve closing or the foreign-matter biting occurs, the pressure of the intake-valve side space ("the intake pressure") or the pressure of the exhaust-valve side space ("the exhaust pressure") which would be constant if the engine would be normal changes as the pressure of the inner space of the cylinder ("the cylinder pressure") changes with the rotation of the crank shaft. Therefore, if a change of the intake or exhaust pressure is detected at a timing when the intake or exhaust pressure should be constant, it can be judged that the engine being tested has the fault of incomplete valve closing. In addition, since it is easy to detect the constant state of the intake or exhaust pressure, it is also easy to detect the starting and ending timings of the constant state of the intake or exhaust pressure. Since the starting and ending timings correspond to the opening and closing timings of the intake or exhaust valve, it is easy to determine the opening and closing timings, indirectly based on the starting and ending timings. However, the opening and closing timings of the intake or exhaust valve may be determined directly by using an exclusive valve-position sensor or sensors. Moreover, the intake or exhaust pressure is naturally raised when the piston reciprocates in the cylinder and the pressurized air in the inner space of the cylinder is supplied to the intake-valve side or exhaust-valve side space. Thus, the present method does not need an exclusive pressure source for changing the intake or exhaust pressure. The present method may be carried out on an engine just after the engine has been assembled from various parts in a factory, or when the engine is overhauled after some use.

According to a first preferred feature of the second aspect of the invention, the one of the intake-valve and exhaust-valve side spaces comprises the exhaust-valve side space, and the evaluating step comprises evaluating the state of the engine based on the pressure in the exhaust-valve side space which is measured while the exhaust valve should have been closed.

According to a second preferred feature of the second aspect of the invention, the evaluating step comprises judging that the exhaust valve has incompletely been closed, when the pressure in the exhaust-valve side space changes while the exhaust valve should have been closed.

According to a third preferred feature of the second aspect of the invention, the judging step comprises judging that the exhaust valve has incompletely been closed, when the pressure in the exhaust-valve side space measured while the exhaust valve should have been closed is higher than a first reference value.

According to a fourth preferred feature of the second aspect of the invention, or according to any one of the above-indicated first to third preferred features, the one of the intake-valve and exhaust-valve side spaces comprises the exhaust-valve side space, and the evaluating step comprises judging that the intake valve has incompletely been closed, when the pressure in the exhaust-valve side space measured while the exhaust valve is open is lower than a second reference value. In the case where the exhaust pressure is measured in the manner in which the exhaust-valve side space is isolated from the atmosphere and the intake-valve side space is communicated with the atmosphere, both the cylinder pressure and the exhaust pressure are raised as the piston is moved up with the exhaust valve being opened and the intake valve being closed, because air is compressed in both the inner space of the cylinder and the exhaust-valve side space. However, if the intake valve has not completely closed, the air in the inner space of the cylinder partly flows into the atmosphere via the intake valve, so that the exhaust pressure takes a maximum value lower than that taken when the intake valve is normal. Thus, the present method can identify the fault of incomplete intake-valve closing.

According to a fifth preferred feature of the second aspect of the invention, or according to any one of the above-indicated first to fourth preferred features, the evaluating step comprises a state-change-timing depending evaluating step for evaluating the state of the engine based on the at least one of the starting and ending timings of the closed state of the one of the intake and exhaust valves which corresponds to the one of the intake-valve side and exhaust-valve side spaces which is isolated from the atmosphere, the at least one of the starting and ending timings of the closed state of the one valve comprising at least one of a first state-change timing when the pressure in the one space changes from a changing state to a constant state and a second state-change timing when the pressure in the one space changes from the constant state to the changing state.

According to a sixth preferred feature of the second aspect of the invention, the state-change-timing depending evaluating step comprises evaluating the state of the engine based on an interval between the first and second state-change timings. The occurrence or presence of one sort of fault may change or move both the first and second state-change timings in the same direction along the axis of time, and the presence of another sort of fault may move the first and second state-change timings in the opposite directions. Therefore, one or more faults may be identified based on the interval between the first and second state-change timings. In addition, since this interval depends on all the faults that influence at least one of the first and second state-change timings, it is possible to identify, based on the single amount (i.e., the interval), a fault which influences both of the two timings.

According to a seventh preferred feature of the second aspect of the invention, or according to any one of the above-indicated first to sixth preferred features, the rotating step comprises an opposite-direction rotating step for rotating, using the independent rotating device, the crank shaft of the engine in an opposite direction opposite to a normal direction in which the crank shaft is rotated when the engine is actually operated by firing. In the case where the engine is rotated by the independent rotating device, the engine can be easily rotated in the opposite direction, so that information can be obtained which cannot be obtained when the engine is rotated in the normal direction. Thus, one or more bad states of the engine which cannot be identified based on only the information obtained when the engine is rotated in the normal direction, can be identified based on the information obtained when the engine is rotated in the opposite direction. In addition, the reliability of evaluation of one or more bad states of the engine can be improved based on the information obtained when the engine is rotated in the opposite direction. The opposite-direction rotating step may be carried out independent of the first or second aspect of the invention. In the last case, too, the step provides the same advantages.

According to an eighth preferred feature of the second aspect of the invention, the opposite-direction rotating step comprises rotating the crank shaft of the engine in the opposite direction while the intake-valve side space is isolated from the atmosphere. This opposite-direction rotating step is symmetrical with the normal-direction rotating step in which the exhaust-valve side space is isolated from the atmosphere and the engine is rotated in the normal direction. Accordingly, for example, the order of opening of the intake and exhaust valves is reversed. Thus, very important information can be obtained.

According to a ninth preferred feature of the second aspect of the invention, or according to any one of the above-indicated first to eighth preferred features, the rotating step comprises a normal-direction rotating step for rotating, using the independent rotating device, the crank shaft of the engine in a normal direction in which the crank shaft is rotated when the engine is actually operated by firing.

According to a tenth preferred feature of the second aspect of the invention, the normal direction rotating step comprises rotating the crank shaft of the engine in the normal direction while the exhaust-valve side space is isolated from the atmosphere. In this engine testing method, various sorts of useful information can be obtained, and one or more bad states of the engine can be identified based on the information.

According to an eleventh preferred feature of the second aspect of the invention, or according to any one of the above-indicated first to tenth preferred features, the testing method further comprising the step of isolating, using a valve which is selectively opened and closed, the at least one of the intake-valve side and exhaust-valve side spaces from the atmosphere. In this case, the intake-valve side and/or exhaust-valve side spaces are easily isolated from the atmosphere, by closing one or-more valves provided for the space or spaces. Therefore, the efficiency of the engine tests is improved.

According to a third aspect of the present invention, there is provided a method of testing an assembled internal combustion engine including a plurality of cylinders each of which has an intake valve and an exhaust valve, characterized by rotating the assembled engine, measuring, for each of at least two cylinders of the plurality of cylinders, at lest one of (a) a value of a pressure in at least one of an external intake-valve side space which communicates with the intake valve corresponding to the each cylinder and an external exhaust-valve side space which communicates with the exhaust valve corresponding to the each cylinder, when the pressure satisfies a predetermined condition, and (b) a timing at which the pressure satisfies the predetermined condition, comparing the at least one of the value and the timing of a first one of the at least two cylinders with the at least one of the value and the timing of a second one of the at least two cylinders, and judging that there is at least one fault with the assembling of the engine, when the at least one of the value and the timing of the first cylinder is not equal to the at least one of the value and the timing of the second cylinder.

In the testing method in accordance with the third aspect of the invention, the timing at which the pressure in the intake-valve side space or the external exhaust-valve side space (hereinafter, referred to as "the intake pressure" or the "exhaust pressure") satisfies the predetermined condition changes depending upon the changing pressure in a cylinder (hereinafter, referred to as the "cylinder pressure") in which a piston reciprocates linearly and the opening and closing timings of the intake and exhaust valves. The cylinder pressure increases as the piston moves up toward its top dead position, and decreases as the piston moves down toward its bottom dead position. In the reciprocating engine, after the intake and exhaust valves close, first, the exhaust valve starts opening and subsequently the intake valve starts opening. After the exhaust valve closes, the intake valve closes. During each cycle, if, e.g., the timing of commencement of opening of the intake valve is earlier (i.e., corresponds to a smaller CS angle) than a reference timing obtained from a normal engine, the exhaust pressure takes a maximal value smaller than a reference value obtained from the normal engine and takes a less time to reach the maximal value. To the contrary, if the timing of commencement of opening of the intake valve is later (i.e., corresponds to a larger CS angle) than the reference timing obtained from the normal engine, the exhaust pressure takes a maximal value greater than the reference value and takes a more time to reach the maximal value. Therefore, if, e.g., the timing when the exhaust pressure takes a maximal value is known, the relationship between the opening and closing timings of the intake valve and the CS angle is known. Thus, it can be judged that the assembled engine has the assembling fault of an incorrect phase difference between a crank shaft and a cam shaft. In addition, if, e.g., the opening and closing timings of the exhaust valve change relative to the CS angle, the change influences the intake pressure. Thus, the fault of incorrect phase difference between the crank and cam shafts can be identified based on the timing of occurrence of at least one predetermined condition of the intake pressure. In this way, it is possible to judge, without having to take the engine apart, whether there is at least one fault with the assembled engine, based on at least one of the value of the intake and/or exhaust pressure when the pressure satisfies the predetermined condition, and the timing at which the pressure satisfies the predetermined condition. In the present engine testing method, one or more assembling faults of the engine is or are found by measuring, for at least two cylinders, at least one of a value of the pressure when the pressure satisfies the predetermined condition and a timing at which the pressure satisfies the predetermined condition, and comparing the pressure value and/or timing obtained for one cylinder with the pressure value and/or timing obtained for another or the other cylinder. For example, there are some cases where the pressure value obtained for an abnormal cylinder having an assembling fault is different from that obtained for a normal cylinder. If the difference is detected, it can be judged that one of those two or more cylinders has an assembling fault. If this comparison is made among more cylinders, more information about the assembled state of the engine can be obtained. Thus, one or more cylinders having an assembling fault can be specified with higher accuracy. Since in this method it is not necessary to determine CS angles corresponding to the pressure values and/or timings obtained for the cylinders, an apparatus for carrying out the method can enjoy a simpler construction. As far as the present invention is concerned, the term "comparing" encompasses judging whether there is a significant difference between the combination of respective values of a plurality of parameters obtained for one cylinder and that obtained for another cylinder and, in the last case, the term "equal" means that all the respective values of the combination for the first cylinder are equal to those of the combination for the second cylinder. The present method does not exclude finding an assembling fault by comparing a value of the intake or exhaust pressure when the pressure satisfies the predetermined condition with respect to each cylinder, with a reference value obtained from one or more normal engines. For example, the maximal value of the exhaust pressure obtained from each cylinder may be compared with a reference maximal value obtained from normal engines. The assembled engine may be rotated in a "hot" state, i.e., by firing of fuel therein, or in a "cool" state, i.e., by being connected to a separate rotating device and compulsorily rotated by the device. Generally, the "cool" test is easier than the "hot" test. In the hot test, it is cumbersome to supply fuel to the engine and treat the exhaust gas emitted therefrom. In addition, in the "hot" test, the pressure signals obtained from the intake-side and exhaust-side spaces contain more noise. The "cool" test is free from those problems, and accordingly can be carried out more easily.

According to a first preferred feature of the third aspect of the invention, the assembled engine includes a first bank having at least one cylinder, and a second bank having at least one cylinder, wherein the comparing step comprises comparing the at least one of the value and the timing of the at least one cylinder of the first bank with the at least one of the value and the timing of the at least one cylinder of the second bank. For example, if a fault occurs to the phase of the cam shaft of one of two banks of a V-type engine, the pressure value and/or timing obtained for a cylinder of the one bank corresponding to the cam shaft having the fault is different from the pressure value and/or timing obtained for a cylinder of the other bank corresponding to the cam shaft having no fault. The present method can find at least one fault which can occur to each one of the two banks independent of the other bank.

According to a second preferred feature of the third aspect of the invention, or the above-indicated first preferred feature, the comparing step comprises comparing the at least one of the value and the timing of each of the at least two cylinders with at least one of an average of the respective values of the at least two cylinders and an average of the respective timings of the at least two cylinders. The pressure value or the timing obtained for each cylinder may change by various amounts, including a very small or large one, corresponding to various sorts of assembling faults. Those changes may include not only changes corresponding to faults but also changes resulting from measurement errors. It is preferable to remove the latter changes. The present engine testing method can reduce the influences of the latter changes, thereby finding at least one fault with improved accuracy.

According to a third preferred feature of the third aspect of the invention, or the above-indicated first or second preferred feature, the comparing step comprises dividing the at least two cylinders into at least two groups including a first group including at least one cylinder and a second group including at least one cylinder the at least one of the value and the timing of which significantly differs from the at least one of the value and the tiring of the at least one cylinder of the first group, and comparing the at least one of the value and the timing of the at least one cylinder of the first group with the at least one of the value and the timing of the at least one cylinder of the second group. The present engine testing method enjoys the same advantage as that of the method according to the second preferred feature of the invention.

According to a fourth preferred feature of the third aspect of the invention, or any of the above-indicated first to third preferred features, the measuring step comprises measuring, for every one of the plurality of cylinders, a timing at which the pressure satisfies the predetermined condition, and the comparing step comprises comparing a time interval between respective times when the respective pressures of a first pair of successively firing cylinders of the plurality of cylinders satisfy the predetermined condition, with a time interval between respective times when the respective pressures of a second pair of successively firing cylinders of the plurality of cylinders satisfy the predetermined condition. As will be described in connection with the preferred embodiments of the invention, one or more faults which occur at a very high frequency can be easily detected by the simple method in which a time interval between respective times when the respective pressures of a first pair of successively firing cylinders satisfy the predetermined condition, with a time interval between respective times when the respective pressures of a second pair of successively firing cylinders satisfy the predetermined condition. Those faults include faults with the respective clearances of the intake and exhaust valves. In the case where the engine being tested includes two banks, those faults additionally include faults with the respective cam pulleys and respective driven gears of the two banks.

According to a fifth preferred feature of the third aspect of the invention, or any of the above-indicated first to fourth preferred features, the measuring step comprises measuring, for every one of the plurality of cylinders, at least one of (a) a value of the pressure when the pressure satisfies the predetermined condition and (b) a timing at which the pressure satisfies the predetermined condition.

According to a sixth preferred feature of the third aspect of the invention, or any of the above-indicated first to fifth preferred features, the comparing step comprises dividing the at least two cylinders into at least two groups including a first group including at least two cylinders and a second group including at least two cylinders the at least one of the value and the timing of each one of which significantly approximates to the at least one of the value and the timing of the other or another cylinder of the at least two cylinders of the second group and significantly differs from the at least one of the value and the timing of each of the at least two cylinders of the first group, and comparing the at least one of the value and the timing of each of the at least two cylinders of each of the first and second groups with the at least one of the value and the timing of the other or another cylinder of the at least two cylinders of the each group.

According to a seventh preferred feature of the third aspect of the invention, or any of the above-indicated first to sixth preferred features, the measuring step comprises measuring, for every one of the plurality of cylinders, a value of the pressure when the pressure satisfies the predetermined condition, and the comparing step comprises comparing the respective values of every pair of successively firing cylinders of the plurality of cylinders, with each other.

According to an eighth preferred feature of the third aspect of the invention, or any of the above-indicated first to seventh preferred features, the predetermined condition comprises at least one of a first condition that the exhaust pressure in the exhaust-valve side space takes a maximal value; a second condition that the exhaust pressure is in a constant state in which the exhaust pressure takes a constant value as timing elapses; a third condition that the exhaust pressure changes from the constant state to a decreasing state; a fourth condition that the intake pressure in the intake-valve side space takes a maximal value; and a fifth condition that the intake pressure changes from a constant state in which the intake pressure takes a constant value as timing elapses, to an increasing state.

According to a ninth preferred feature of the third aspect of the invention, the value of the pressure when the pressure satisfies the predetermined condition comprises at least one of the maximal value and the constant value.

According to a tenth preferred feature of the third aspect of the invention, or the above-indicated eighth preferred feature, the timing at which the pressure satisfies the predetermined condition comprises at least one of a timing at which the first condition occurs; a timing at which the second condition starts; a timing at which the third condition occurs; a timing at which the fourth condition occurs; a timing at which the fifth condition occurs.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which

FIG. 24 is a table showing respective actual values of an exhaust-pressure maximal-value difference, α, an exhaust-pressure constant-value difference, β, an exhaust-pressure maximal-value-angle difference, Γ, an exhaust-pressure constant-start-angle difference, Σ, an exhaust-pressure decrease-start-angle difference, Φ, an intake-pressure maximal-value-angle difference, Λ, and an intake-pressure increase-start-angle difference, Ψ, which are obtained in the case where each one of assembling faults occurs independent of the other faults;

FIG. 26 is a front elevation view of a display device of the apparatus of FIG. 4;

FIG. 28 is a view illustrating the respective bits of each of eight fault flags which are provided in a RAM (random access memory) of the fault finder of the apparatus of FIG. 4;

FIG. 47 is a table showing respective actual values of an exhaust-pressure maximal-value-angle difference Γ, an exhaust-pressure constant-start-angle difference Σ, an exhaust-pressure maximal-value difference α, and an exhaust-pressure constant-value difference β, which are obtained in the case where each one of the cam-pulley one-tooth fast and slow states and the driven-gear one-tooth fast and slow states occurs independent of the other faults;

FIG. 50 is a table showing respective actual values of an exhaust-pressure maximal-value difference α, an exhaust-pressure constant-value difference β, an exhaust-pressure maximal-value-angle difference Γ, an exhaust-pressure constant-start-angle difference Σ, an exhaust-pressure decrease-start-angle difference Φ, an intake-pressure maximal-value-angle difference Λ, and an intake-pressure increase-start-angle difference Ψ which are obtained in the case where each one of faults including the intake-valve or exhaust-valve foreign-matter biting occurs independent of the other faults;

FIG. 52 is a front elevation view of a display device of the testing apparatus;

FIG. 54 is a view illustrating the respective bits of each of ten fault flags which are provided in a RAM of the fault finder of the testing apparatus;

FIG. 69 is a view illustrating the respective bits of each of eight fault flags which are provided in a RAM of the fault finder of the testing apparatus;

FIG. 79 is a table showing respective actual values of an exhaust-pressure maximal-value finite difference, $\delta_{PEXmax}$, an exhaust-pressure constant-value infinite difference, $\delta_{PEXconst}$, an exhaust-pressure maximal-value-angle infinite relative difference, $\delta\Gamma$, an exhaust-pressure constant-start-angle infinite relative difference, $\delta\Sigma$, an exhaust-pressure decrease-start-angle infinite relative difference, $\delta\Phi$, an intake-pressure maximal-value-angle infinite relative difference, $\delta\Lambda$, and an intake-pressure increase-start-angle infinite relative difference, $\delta\Psi$, which are obtained in the case where each one of the faults with the cam pulleys and the driven gears occurs independent of the other faults;

FIG. 80 is a table showing respective actual values of exhaust-pressure maximal-value finite difference $\delta_{PEXmax}$, exhaust-pressure constant-value infinite difference $\delta_{PEXconst}$, exhaust-pressure maximal-value-angle infinite relative difference $\delta\Gamma$, exhaust-pressure constant-start-angle infinite relative difference $\delta\Sigma$, exhaust-pressure decrease-start-angle infinite relative difference $\delta\Phi$, intake-pressure maximal-value-angle infinite relative difference $\delta\Lambda$, and intake-pressure increase-start-angle infinite relative difference $\delta\Psi$ which are obtained in the case where each one of the faults with the intake-valve clearance, the exhaust-valve clearance, and the compression ring occurs independent of the other faults.

BEST MODE FOR CARRYING OUT THE INVENTION

There will be described an assembled engine testing method in accordance with the present invention, together with an assembled engine testing apparatus which is preferably employed for carrying out the testing method.

Figure 1:
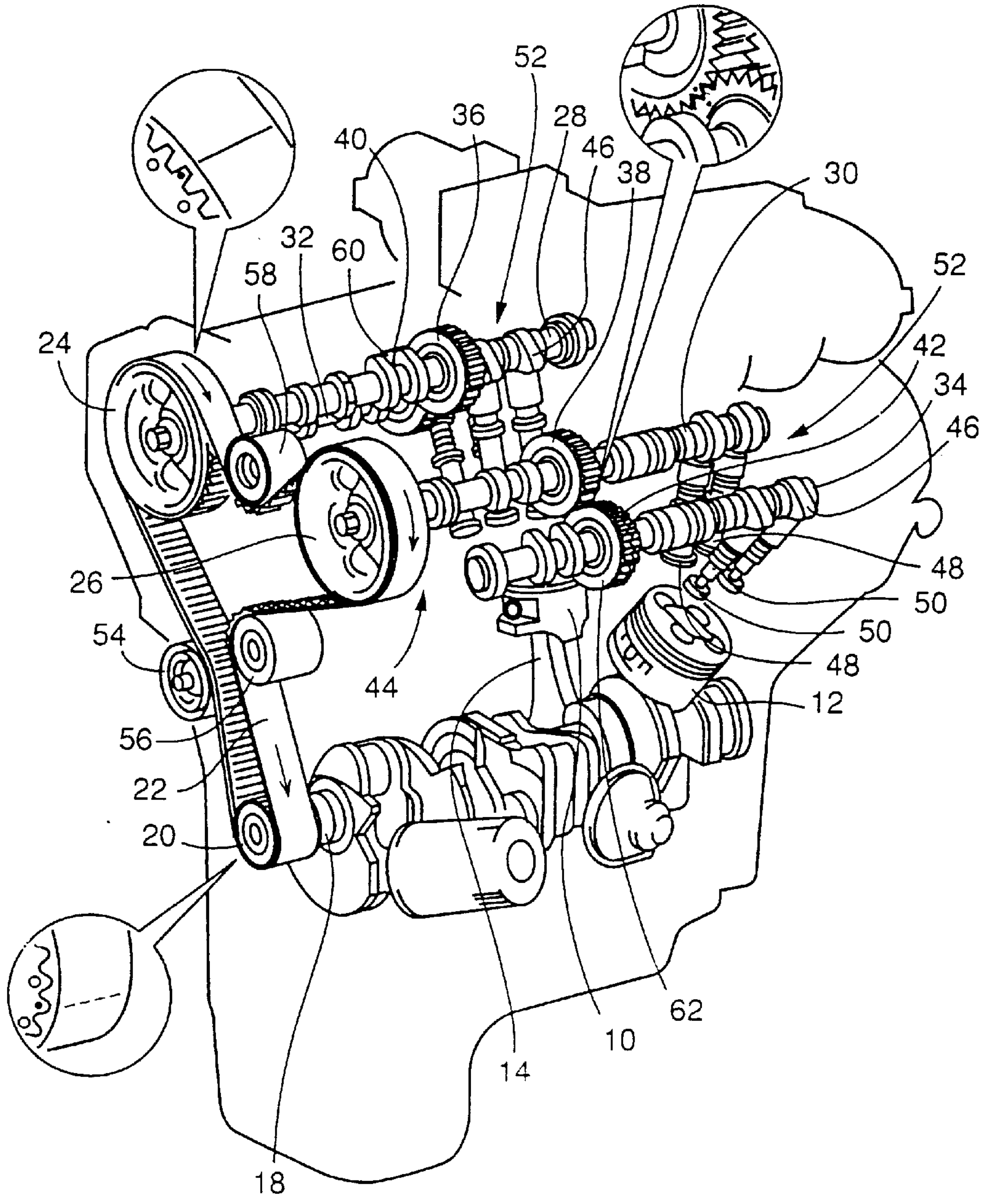
FIG. 1 is a perspective view of a pertinent portion of an internal construction of a V6 gasoline engine which is tested by an engine testing method as a first embodiment of the present invention.

FIG. 1 is a perspective view of a pertinent portion of a V-type 6-cylinder DOHC (double over head cam) gasoline engine as an internal combustion engine. The engine includes pistons 10, 12 each of which reciprocates in a corresponding cylinder (not shown). The piston 10 represents three pistons of the left bank (i.e., first bank) of the V6 engine, and the piston 12 represents three pistons of the right bank (i.e., second bank) of the same. The reciprocation of each piston 10, 12 is converted into rotation of a crank shaft 18 via a corresponding connecting rod 14, and the rotation of the crank shaft 18 is output as the power of the engine. The engine has a dynamic valve system 52 including exhaust valves 48 and intake valves 50 each of which is operated in synchronism with the rotation of the crank shaft 18.

The V6 engine has a cam shaft rotating mechanism 44 including a crank pulley 20 fixed to the crank shaft 18, a timing (cog) belt 22, a left and a right cam pulley 24, 26, two exhaust cam shafts 28, 30 to which the two cam pulleys 24, 26 are fixed, respectively, two intake cam shafts 32, 34, two drive gears 36, 38 fixed to the two exhaust cam shafts 28, 30, respectively, and two driven gears 40, 42 fixed to the two intake cam shafts 32, 34, respectively. The dynamic valve system 52 includes a plurality of cams 46 provided on each of the cam shafts 28, 30, 32, 34. When the cam shafts are rotated, those cams 46 open and close the corresponding exhaust and intake valves 48, 50, respectively.

When the crank shaft 18 is rotated, the exhaust and intake valves 48, 50 are operated via the crank pulley 20, the timing belt 22, the cam pulleys 24, 26, the cam shafts 28, 30, 32, 34, and the cams 46. Therefore, if the timing belt 22 loosens, the opening and closing timings of each valve 48, 50 will change. This problem is prevented by the provision of a belt idler 54 including an auto-tensioner (not shown) and additional belt idlers 56, 58 which do not include any auto-tensioners. Those belt idlers 54, 56, 58 are effective in increasing the number of meshed teeth of each of the timing belt 22, the crank pulley 20, and the cam pulleys 24, 26. The two driven gears 40, 42 are associated with two "scissors" gears 60, 62, respectively, in such a manner that the two scissors gears 60, 62 are rotatable relative to the two intake cam shafts 32, 34, respectively. Each scissors gear 60, 62 is biased by a spring member (not shown) in a direction in which the scissors gear 60, 62 is rotated relative to the corresponding driven gear 40, 42 and the corresponding intake cam shaft 32, 34. Thus, the backlash between the drive and driven gears 36, 38, 40, 42 is effectively prevented and the generation of noise from the engine is effectively reduced.

The opening and closing timings of each of the exhaust and intake valves 48, 50 should accurately correspond to particular angular phases of the crank shaft 18, respectively.

Since the V6 engine which is to be tested in the present embodiment is a four-cycle gasoline engine, the ratio of the number of teeth of the crank pulley 20 to that of each cam pulley 24, 26 is 1 to 2. More specifically, the number of teeth of the crank pulley is 24, and that of each cam pulley is 48. The ratio of the number of teeth of each drive gear 36, 38 to that of each driven gear 40, 42 is 1 to 1. The number of teeth of each gear is 40.

When the engine is assembled from a number of elements or parts, it is essentially required that the opening and closing timings of each of the exhaust and intake valves 48, 50 accurately correspond to predetermined angular phases of the crank shaft 18, respectively. To this end, phase-adjusting marks, "•", "--" and "-", are provided on the crank pulley 20, the cam pulleys 24, 26, and the timing belt 22, as illustrated in enlarged partial views of FIG. 1, and those parts 20, 22, 24, 26 are assembled such that those marks are aligned with each other. The drive and driven gears 36, 38, 40, 42 are likewise meshed with each other. However, if the phase adjusting step is not appropriately performed, each valve 48, 50 cannot accurately open or close at the predetermined angular phases of the crank shaft 18. For example, if, as illustrated in an enlarged partial view of FIG. 2, the crank pulley 20 is "faster" by one tooth than the timing belt 22, the opening and closing timings of each valve 48, 50 are "slower" by 15 degrees (=360 (degrees)/24) in terms of the angular phase of the crank shaft 18 than the respective positions of the corresponding piston in the corresponding cylinder (not shown).

Figure 2:
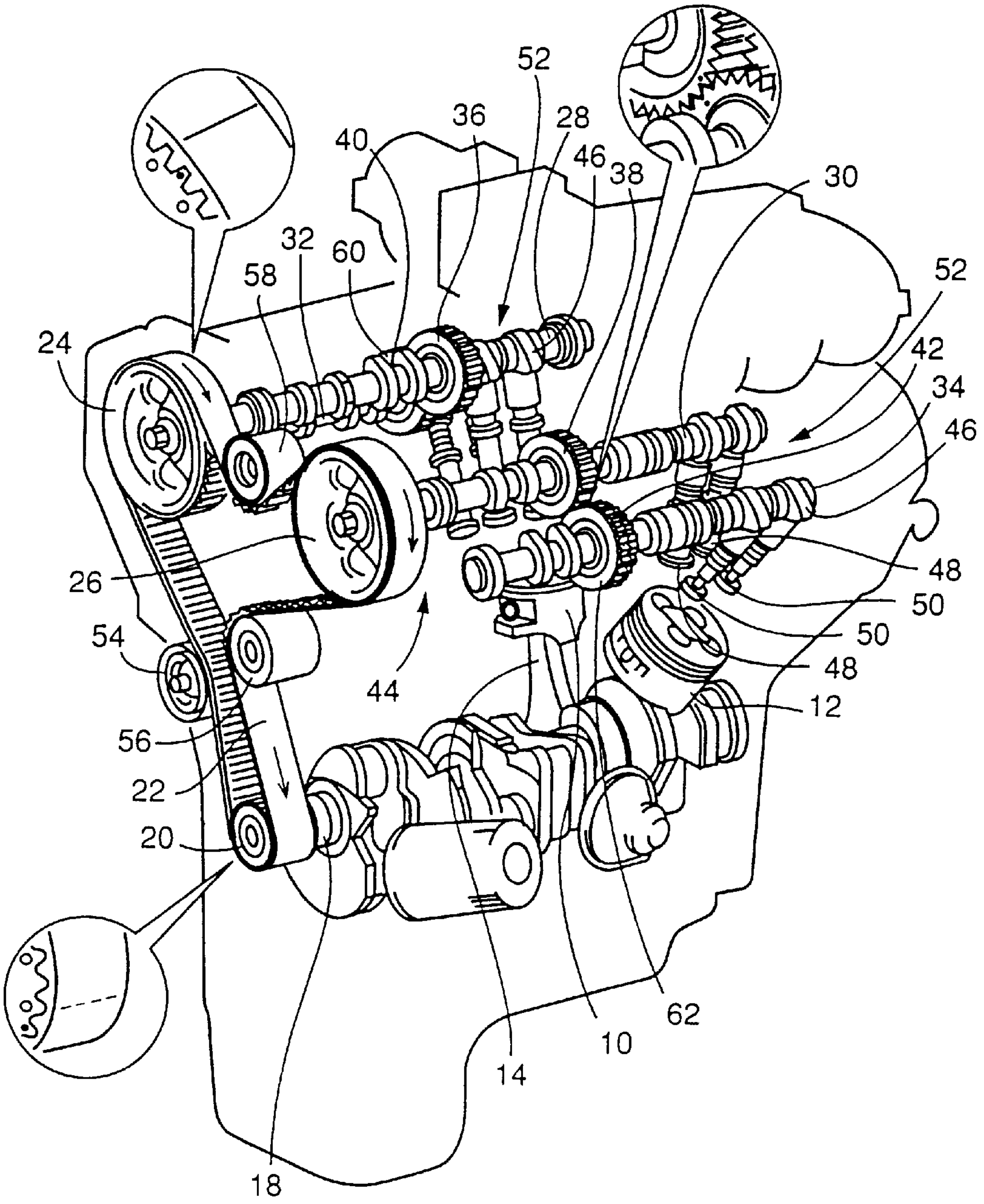
FIG. 2 is a perspective view of the V6 engine of FIG. 1 which has faults with a crank pulley and a cam pulley.

In addition, if, as illustrated in another enlarged view of FIG. 2, the left cam pulley 24 is faster by one tooth than the timing belt 22, the opening and closing timings of each valve 48, 50 of the left bank are faster by 7.5 degrees (=360 (degrees)/48) in terms of the angular phase of the left exhaust cam shaft 28 than the respective positions of the corresponding piston in the corresponding cylinder. Moreover, if, as illustrated in yet another enlarged view of FIG. 2, the right driven gear 42 is faster by one tooth than the drive gear 38, the opening and closing timings of each valve 48, 50 of the right bank are faster by 9 degrees (=360 (degrees)/40) in terms of the angular phase of the right intake cam shaft 34 than the respective positions of the corresponding piston in the corresponding cylinder. The crank pulley 20 may be slower by one tooth than the timing belt 22, the left or right cam pulley 24, 26 may be slower by one tooth than the timing belt 22, and the left or right driven gear 40, 42 may be slower by one tooth than the left or right drive gear 36, 38. In rare cases, the crank pulley 20 may be faster or slower by more than one tooth than the timing belt 22, the left or right cam pulley 24, 26 may be faster or slower by more than one tooth than the timing belt 22, and the left or right driven gear 40, 42 may be faster or slower by more than one tooth than the left or right drive gear 36, 38. Though the principle of the present invention is applicable to various cases where one element is faster or slower by more than one tooth than another element, it is assumed in the following description that one element is faster or slower by just one tooth than another element, for the purpose of easier understanding of the present invention.

The crank shaft 18 and the crank pulley 20 are designed such that the two elements 18, 20 can be connected to each other with no angular error relative to each other. Therefore, even if the crank pulley 20 may be faster or slower than the timing belt 22, there is no angular error between the two elements 18, 20. This is also the case with the relationship between each exhaust cam shaft 28, 30 and the corresponding cam pulley 24, 26, and the relationship between each intake cam shaft 32, 34 and the corresponding driven gear 40, 42.

The engine cannot exhibit its prescribed performance unless the opening and closing timings of each of the exhaust and intake valves 48, 50 accurately correspond to prescribed angular phases of the crank shaft 18. Hence, the cam shaft rotating mechanism 44 is assembled using the above-described phase-adjusting marks. In addition, it is essentially required that the opening and closing timings of each of the exhaust valves 48 accurately correspond to prescribed angular phases of the corresponding exhaust cam shaft 28, 30 of the dynamic valve system 52 and the opening and closing timings of each of the intake valves 50 accurately correspond to prescribed angular phases of the corresponding intake cam shaft 32, 34 of the same 52. To this end, a "clearance" of each valve 48, 50 must be accurate or correct. The clearance of each valve 48, 50 is defined as the maximum distance between a shim 72 fixed to a lifter 70 of the valve and the corresponding cam 46. This valve clearance is influenced by the thickness of the shim 72, or the thickness of a seat member 74 fixed to the cylinder head 76, as can be seen from FIG. 3. Therefore, if one or both of those parameters is or are incorrect, an incorrect valve clearance will result. If the clearance of each valve 48, 50 is too large, the opening timing of the valve delays and the closing timing of the same advances; and on the other hand, if too small, vice versa, that is, the opening timing of each valve 48, 50 advances and the closing timing of the same delays.

There will be described the assembled engine testing apparatus for finding the fast or slow state of the crank pulley 20, the fast or slow state of each cam pulley 24, 26, the fast or slow state of each driven gear 40, 42, the large or small clearance of each valve 48, 50, and the missing of a compression ring 144 (136, 138, FIG. 4).

Figure 4:
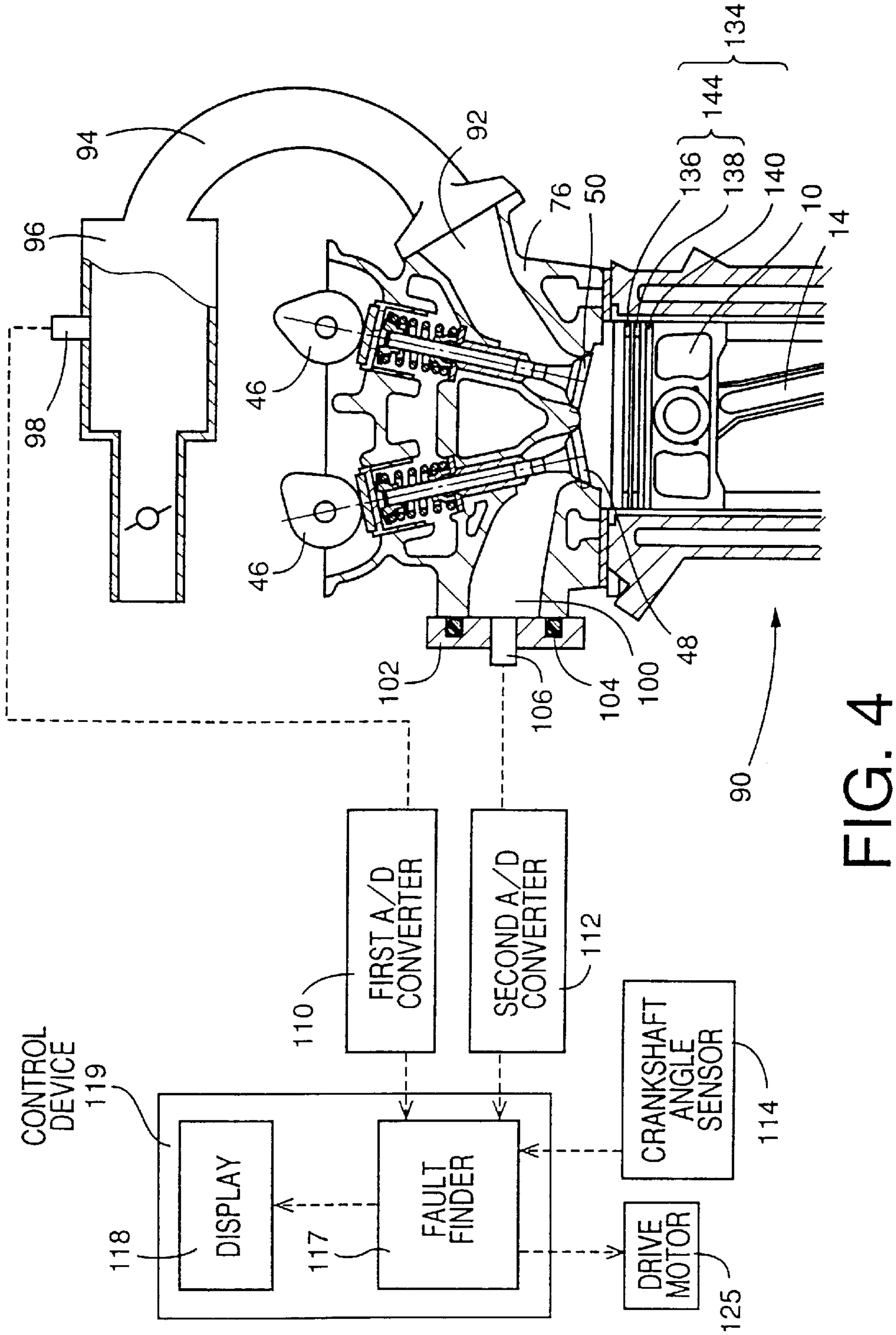
FIG. 4 is a diagrammatic view of an essential portion of an engine testing apparatus which carries out the engine testing method as the first embodiment of the invention.

FIG. 4 is a diagrammatic view of the engine testing apparatus. An internal combustion engine 90 (only the left bank thereof is shown for simplification) which is to be tested by the testing apparatus includes six cylinder heads 76 of the left and right banks, two intake manifolds 94, and a single surge tank 96. The two intake manifolds 94 are provided in the left and right banks, respectively, and each intake manifold 94 communicates with respective intake ports 92 of the three cylinders (or three cylinder heads 76) of the corresponding bank. The surge tank 96 communicates with the two intake manifolds 94. The testing apparatus includes a single first pressure sensor 98 common to all the cylinders, six cover members 102, six O rings 104, six second pressure sensors 106, a single first analog to digital (A/D) converter 110, and six second A/D converters 112, a crank-shaft angle sensor 114, and a control device 119. The first pressure sensor 98 measures a pressure in the surge tank 96. Each cover member 102 is attached to an exhaust port 100 of the corresponding cylinder (or cylinder head 76) so as to close the inner space of the port 100 and isolate the same from the ambient air. Each O ring 104 is employed to improve the airtightness between the corresponding cover member 102 and the corresponding exhaust port 100. Each second pressure sensor 106 measures a pressure in the exhaust port 100 of the corresponding cylinder. The first A/D converter 110 includes an amplifier for amplifying an output signal of the first sensor 98, and each second A/D converter 112 includes an amplifier for amplifying an output signal of the corresponding second sensor 106. The crank-shaft angle sensor 114 measures an angular phase of the crank shaft 18.

The control device 119 includes a microcomputer (not shown) which includes a central processing unit (CPU), a read only memory (ROM), and a random access memory (RAM) and which functions as a fault finder 117 for finding a fault with the assembling of the engine 90, based on the respective output signals supplied from the pressure sensors 98, 106 via the A/D converters 110, 112, and supplied from the crank-shaft angle sensor 114. The control device 119 additionally includes a display 118 for displaying the result of operation of the fault finder 117. The respective inner spaces of the intake ports 92, the intake manifolds 94, and the surge tank 96 cooperate with one another to provide an external intake-valve side space which communicates with the intake valves 50; and each of the respective inner spaces of the exhaust ports 100 provides an external exhaust-valve side space which communicates with the corresponding pair of intake valves 50. Each exhaust-valve side space is defined by closing an outlet of the exhaust port 100 from the cylinder head 76 of the corresponding cylinder. The intake-valve side space is not closed in the present embodiment. However, it may be closed. Otherwise, the intake-valve side space may be defined by the inner space of each intake port 92 only, or the respective inner spaces of the intake ports 92 and the intake manifolds 94. In the first case, six first pressure sensors 98 whose number is equal to that of the cylinders are needed; and in the second case, two first pressure sensors 98 whose number is equal to that of the intake manifolds 94 are needed.

Figure 5:
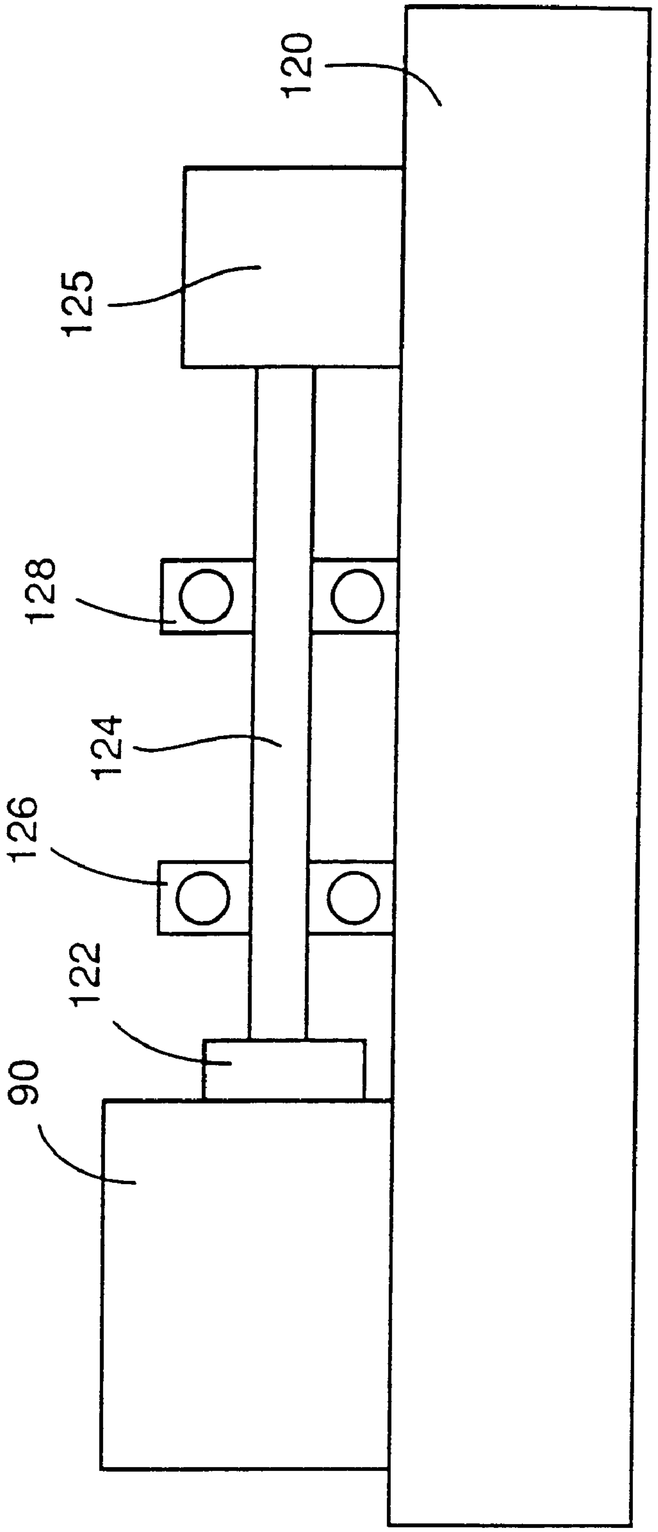
FIG. 5 is a front elevation view of the engine testing apparatus of FIG. 4.

As shown in FIG. 5, the engine 90 to be tested is fixed on a base 120, and is accurately rotated at a constant speed by a drive motor 125 to which the crank shaft 18 of the engine 90 is connected via a coupling 122 and a drive shaft 124. The drive shaft 124 is supported by bearings 126, 128 fixed to the base 120. When the drive motor 125 is rotated under control of the control device 119, the engine 90 is rotated in a "cool" state, and the pressure sensors 98, 106 supply their output signals to the control device 119, so that the fault finder 117 may find a fault with the assembling of the engine 90.

Figure 6:
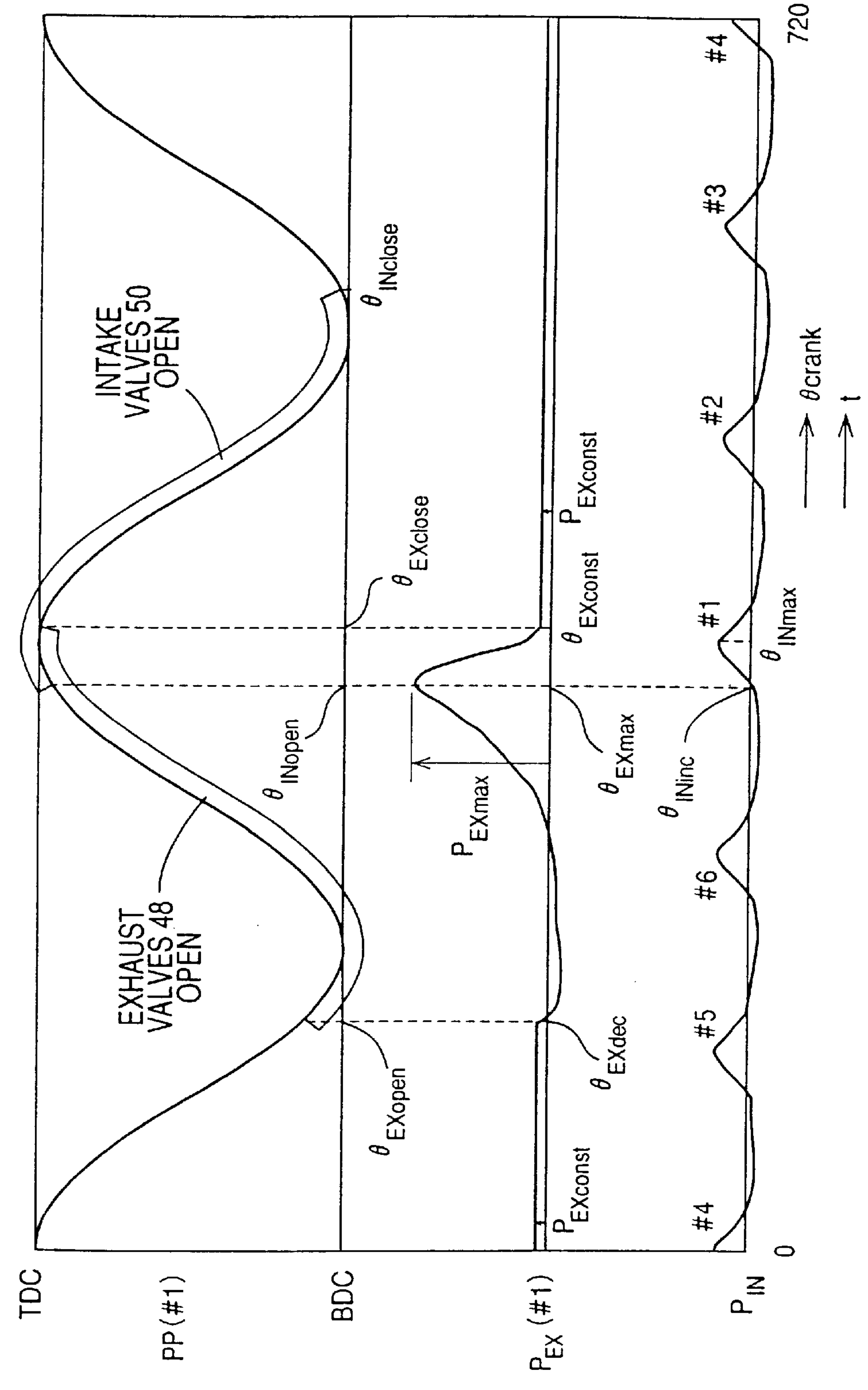
FIG. 6 is a graph showing the relationship, obtained by the apparatus of FIG. 4, between the change of position, PP, of the piston, and the respective changes of the exhaust and intake pressures, $P_{EX}$, $P_{IN}$, of a cylinder of a normal engine, and the phase or angle, $\Theta_{crank}$, of a crank shaft of the engine.

When the engine 90 is rotated by the drive motor 125, each valve 48, 50 opens and closes as the angular phase of the crank shaft 18 changes. When the rotation speed of the motor 125 becomes constant and accordingly the respective pressures in the six cylinders regularly cyclically change, the respective outputs of the first and second pressure sensors 98, 106 change as shown in the graph of FIG. 6, if the engine 90 has no assembling fault or defect. FIG. 6 shows the change of position, PP, of the piston 10 in the corresponding cylinder (indicated at #1 in the graph), the change of exhaust pressure, $P_{EX}$, corresponding to the piston or cylinder #1 detected by the corresponding second pressure sensor 106, and the change of intake pressure, $P_{IN}$, which is common to all the six cylinders #1 to #6 and is detected by the first sensor 98. The engine 90 is a V6 engine, and has the three cylinders #1, #3, #5 in the left bank thereof and has the three cylinders #2, #4, #6 in the right bank thereof. The cylinder #2 is associated with the piston 12. When the V6 engine 90 automatically rotates in a "hot" state because of explosion or combustion in the six cylinders #1 to #6, the combustion sequentially occurs in the cylinders #1 to #6, for example, in the order of description.

First, the change of the exhaust pressure $P_{EX}$ (#1) will be described below. When the crank-shaft angle, $\Theta_{crank}$, detected by the angle sensor 114 takes an angle, $\Theta_{EXopen}$, as the crank shaft 18 is rotated by the motor 125, the exhaust valve 48 associated with the cylinder #1 starts opening. At this time, the piston 10 is moving toward its bottom dead center or position, BDC, and the air in the exhaust port 100 starts entering the cylinder #1. Accordingly the exhaust pressure $P_{EX}$ changes from a constant state in which the exhaust pressure takes a constant value, $P_{EXconst}$, to a decreasing state. The crank shaft angle $\Theta_{crank}=\Theta_{EXopen}$ will be referred to as the exhaust-pressure decrease-start angle, $\Theta_{EXdec}$. After the piston 10 passes through its bottom dead position BDC and is back to the same position as the position at the timing at which the valve 48 started opening, the air in the cylinder #1 and the exhaust port 100 is compressed and accordingly the exhaust pressure $P_{EX}$ starts increasing. The exhaust pressure $P_{EX}$ takes a maximal value, $P_{EXmax}$, when the angle $\Theta_{crank}$ takes an angle, $\Theta_{INopen}$, and the intake valve 50 starts opening. The angle $\Theta_{crank}=\Theta_{INopen}$ will be referred to as the exhaust-pressure maximal-value angle, $\Theta_{EXmax}$. Subsequently, after the intake valve 50 opens, the exhaust pressure $P_{EX}$ quickly decreases and then becomes constant when the angle $\Theta_{crank}$ takes an angle, $\Theta_{EXclose}$, and the exhaust valve 48 closes. The angle $\Theta_{crank}='_{EXclose}$ will be referred to as the exhaust-pressure constant-start angle, $\Theta_{EXconst}$. While the exhaust valve 48 closes, the exhaust pressure $P_{EX}$ takes the constant value $P_{EXconst}$. Then, when the angle $\Theta_{crank}$ takes an angle, $\Theta_{INclose}$, the intake valve 50 closes. In the following description, it is assumed that a maximal exhaust pressure value $P_{EXmax}$ measured from a normal engine with no assembling fault is equal to 100. The exhaust and intake pressure values $P_{EX}$, $P_{IN}$ will be expressed in terms of values relative to the maximal value $P_{EXmax}=100$. For example, a constant exhaust pressure value $P_{EXconst}$ measured from a normal engine is about 10. The rotation speed of the drive motor 125 may be selected at any desirable constant value, or may be changed to two or more values, as needed, in a single test.

The six exhaust pressures $P_{EX}$ are measured from the six cylinders #1 to #6, respectively, independently of one another. The single intake pressure $P_{IN}$ is measured commonly to all the cylinders #1 to #6. FIG. 6 shows six changes of the intake pressure $P_{IN}$ which correspond to the respective opening and closing of the six pairs of intake valves 50 of the six cylinders #1 to #6. Those six changes sequentially occur at a regular interval of angle in each cycle (one cycle=720 degrees) of the crank-shaft angle $\Theta_{crank}$. Hereinafter, there will be described the change of the intake pressure $P_{IN}$ which corresponds to the opening and closing of the pair of intake valves 50 of the cylinder #1 as a representative of all the cylinders #1 to #6.

When the crank-shaft ("CS") angle $\Theta_{crank}$ takes the angle $\Theta_{INopen}$, the intake valves 50 start opening. Hence, the compressed air in the first cylinder #1 and the exhaust port 100 flows into the intake manifold 94, so that the pressure in the manifold 94 starts increasing. Although at this time the air in the manifold 94 is being sucked into the sixth cylinder #6, the amount of flow of air from the manifold 94 into the cylinder #6 is smaller than the amount of flow of air from the cylinder #1 and the exhaust port 100 into the manifold 94, the pressure in the manifold 94 starts increasing. The angle $\Theta_{crank}=\Theta_{INopen}$ will be referred to as the intake-pressure increase-start angle, $\Theta_{INinc}$. When the piston of the cylinder #1 takes a position PP near an upper dead position, TDC, the amount of flow of air from the cylinder #1 and the exhaust port 100 into the manifold 94 which is decreasing because the pressure in the cylinder #1 and the exhaust port 100 is decreasing and the respective clearances of the pair of exhaust valves 48 are decreasing is just balanced by the amount of flow of air from the manifold 94 into the cylinder #6. Subsequently, the former amount becomes smaller than the latter amount. Thus, the intake pressure $P_{IN}$ takes a maximal value. The CS angle $\Theta_{crank}$ at that timing will be referred to as the intake-pressure maximal-pressure angle, $\Theta_{INmax}$. After the position PP of the piston of the cylinder #1 takes the upper dead position TDC, the volume of the cylinder #1 starts increasing. This contributes to decreasing the intake pressure $P_{IN}$. FIG. 6 shows that the intake pressure $P_{IN}$ contains six changes each of which occurs in the above-described manner at a regular interval of angle $\Theta_{crank}$, 120 degrees.

Figure 7:
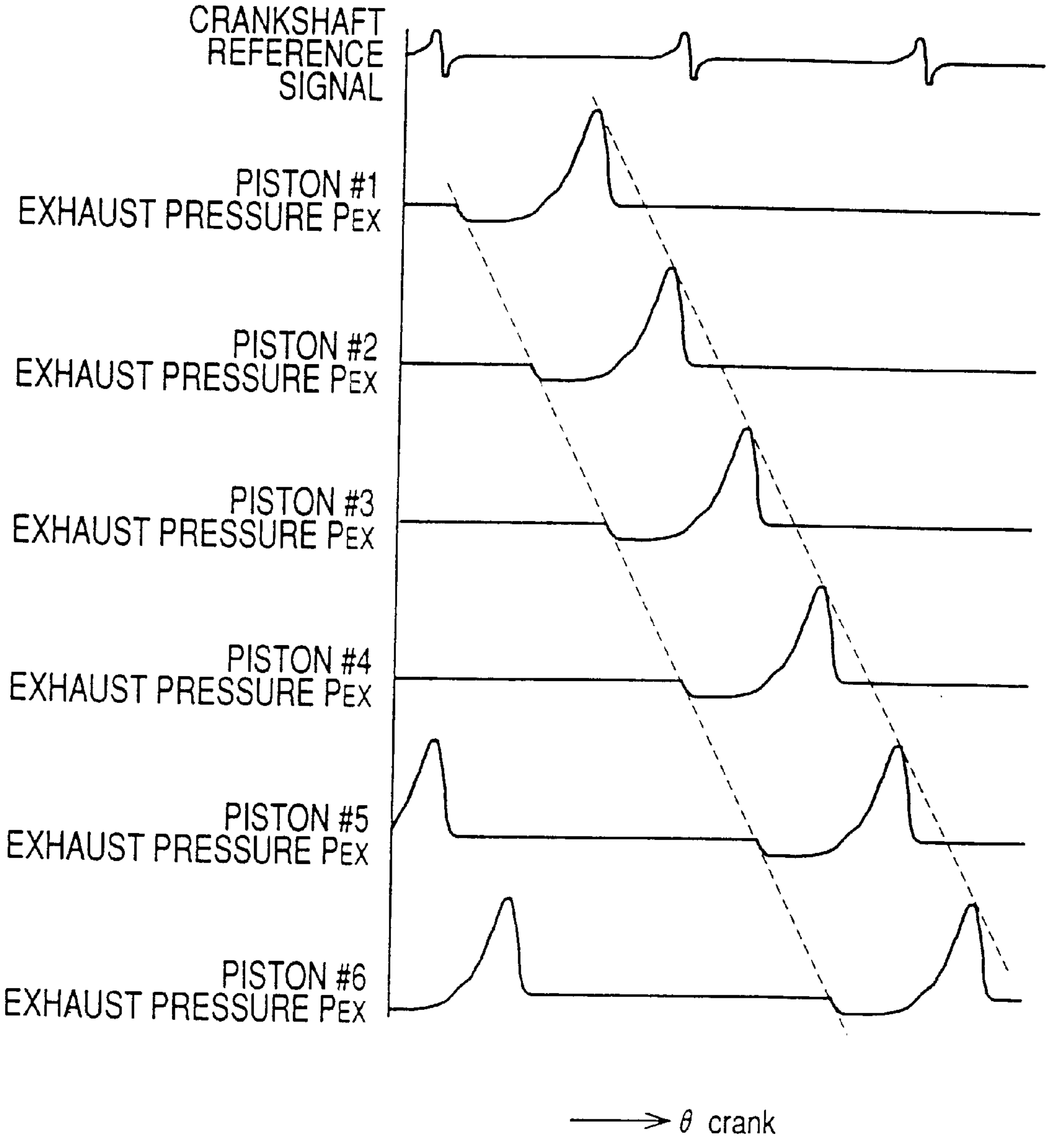
FIG. 7 is a graph showing the relationship, obtained by the apparatus of FIG. 4, between the change of a crank-shaft reference signal obtained from the crank shaft of the normal engine and the respective changes of exhaust pressures $P_{EX}$ obtained from all the cylinders of the engine, and the crank-shaft angle $\Theta_{crank}$.

In the case where the engine 90 is a normal one, that is, a normally assembled one, the six exhaust-pressure signals $P_{EX}$ provided by the six second pressure sensors 106 and a crankshaft ("CS") reference signal provided by the CS angle sensor 114 change with respect to the CS angle $\Theta_{crank}$ as shown in the graph of FIG. 7. The CS reference signal is a pulse signal containing two pulses per cycle, i.e., per 720 degrees of angle $\Theta_{crank}$. In the present embodiment, the CS angle sensor 114 includes a passing member provided at a position on the outer circumferential surface of a timing roller (not shown) which is provided integrally with the crank pulley 20, and a pick-up device such as an electromagnetic pick-up which detects a timing at which the passing member passes therethrough. However, it is not essential that the present engine testing method employ the sensor 114 of that sort. Recently, almost all engines are provided with such sensors which correspond to the sensor 114, though those sensors may be disposed at different positions. When the present method is carried out on engines which have no such sensors, a reflection-type photoelectric switch or a proximity switch may be employed to detect an angular phase of the crank pulley 20 or the crank shaft 18 which is rotating. The six exhaust pressure signals $P_{EX}$ change in substantially the same manner though those changes occur at a regular interval of angle $\Theta_{crank}$, 120 degrees. When the engine 90 shows the signals as shown in FIG. 7, the engine 90 is a normal one, that is, has no fast or slow crank pulley, no fast or slow cam pulley, no fast or slow driven gear, no larger or smaller valve clearance, or no compression-ring missing. The fault finder 117 successively measures the time interval between each pair of successive pulses of the CS reference signal supplied from the CS angle sensor 114, and identifies that the rotation speed of the engine 90 has become steady or constant when the measured time intervals become substantially constant. Then, the fault finder 117 reads in respective pressure signals provided by the pressure sensors 98,106 via the ND converters 110,112, at a very small regular interval of time, and analyses respective changes of those pressure signals with respect to pressure and time. Consequently the fault finder 117 has the function of identifying predetermined conditions of the exhaust pressures $P_{EX}$ and the intake pressure $P_{IN}$, such as the exhaust-pressure constant value $P_{EXconst}$, the start of decreasing of the exhaust pressure $P_{EX}$, the exhaust-pressure maximal value $P_{EXmax}$, the start of the exhaust-pressure constant value $P_{EXconst}$, the start of increasing of the intake pressure $P_{IN}$, the intake-pressure maximal value $P_{INmax}$, etc., and has the function of determining the respective timings of occurrence of those predetermined conditions. In addition, based on the relationship between the CS reference signal and the CS angle $\theta_{crank}$ that twice the time interval between two pulses of the reference signal is equal to 720 degrees of the angle $\theta_{crank}$, the fault finder 117 determines the exhaust-pressure decrease-start angle $\theta_{Exdec}$, the exhaust-pressure maximal-value angle $\theta_{EXmax}$, the exhaust-pressure constant-start angle $\theta_{EXconst}$, the intake-pressure increase-start angle $\theta_{INinc}$, the intake-pressure maximal-value angle $\theta_{INmax}$, etc. Since those functions of the fault finder 117 are well known as waveform analysis techniques in the art, and since the details of those functions are not essential for understanding the present invention, no further description is provided.

Next, there will be described the change of the exhaust pressures $P_{EX}$ or the intake pressure $P_{IN}$ in the case where each of various faults occurs to the engine. In the following description, the symbol (prime) "'" is added when reference is made to each of values of the pressures $P_{EX}$, $P_{IN}$ and the CS angle $\Theta_{crank}$ obtained when the engine has a fault, so as to be distinguishable from those obtained when the engine is normal.

First, the faults with the clearance of the intake valve 50 will be described below.

Figure 8:
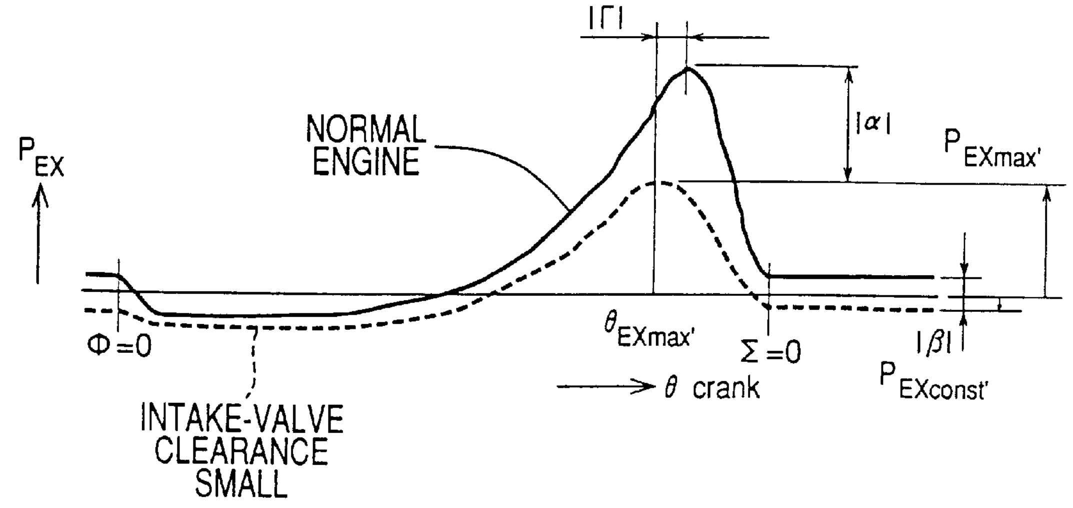
FIG. 8 is a graph showing the relationship, obtained by the apparatus of FIG. 4, between the change of an exhaust pressure $P_{EX}$ obtained from the normal engine and the change of an exhaust pressure $P_{EX}$ obtained from an engine having the fault of small intake-valve clearance, and the crank-shaft angle $\Theta_{crank}$.

FIG. 8 shows a graph representing the change of the exhaust pressure $P_{EX}$ of each cylinder, indicated at solid line, when each of the two intake valves 50 of the cylinder has a correct clearance, and the change of the exhaust pressure $P_{EX}$, indicated at broken line, when one of the two intake valves 50 has a correct clearance but the other's clearance is too small. In the case where the intake-valve clearance is small, the intake valve 50 starts opening too early, and accordingly the fault finder 117 identifies an exhaust-pressure maximal-value angle $\Theta_{EXmax}$, which is smaller than the normal or reference angle $\Theta_{EXmax}$. The difference between the two angles $\Theta_{EXmaxa}'$, $\Theta_{EXmax}$ will be referred to as the exhaust-pressure maximal-value angle difference, $\Gamma(=\Theta_{EXmax}'-\Theta_{EXmax})$. When the intake-valve clearance is smaller than the correct value, the difference $\Gamma$ takes a negative value.

The smaller the intake-valve clearance is than the correct value, the smaller the difference $\Gamma$ is. Since the intake valve 50 starts opening earlier when the valve clearance is smaller than the correct value, the pressure of the air compressed by the piston in the cylinder is lower than a normal pressure, and accordingly the fault finder 117 identifies an exhaust-pressure maximal value $P_{EXmax}'$ which is smaller by the absolute value of a difference, $\alpha$, than the normal or reference value $P_{EXmax}$. In addition, since the exhaust-pressure maximal value $P_{EXmax}'$ is smaller and simultaneously the time duration after one of the two intake valves 50 opens and before the exhaust valve 48 closes is longer, the finder 117 identifies an exhaust-pressure constant value $P_{EXconst}'$ which is smaller by the absolute value of a difference, $\beta$, than the normal or reference value $P_{EXconst}$. In the example shown in FIG. 8, as the piston moves in the cylinder and the volume of the cylinder increases, the air in the intake manifold 94 is sucked into the cylinder. Accordingly, the exhaust-pressure constant value $P_{EXconst}'$ takes a negative value. The smaller the intake-valve clearance is, the smaller the differences $\alpha$, $\beta$ are like the difference $\Gamma$. Hereinafter, the difference $\alpha(=P_{EXmax}'-P_{EXmax})$ will be referred to as the exhaust-pressure maximal-value difference, and the difference $\beta(=P_{EXconst}'-P_{EXconst})$ will be referred to as the exhaust-pressure constant-value difference. Since the differences $\alpha$, $\beta$, $\Gamma$ can take positive and negative values, the absolute values of those differences will be used in the following description for the purpose of easier understanding, so long as circumferences allow. This applies to other angle differences which will be described later.

Figure 9:
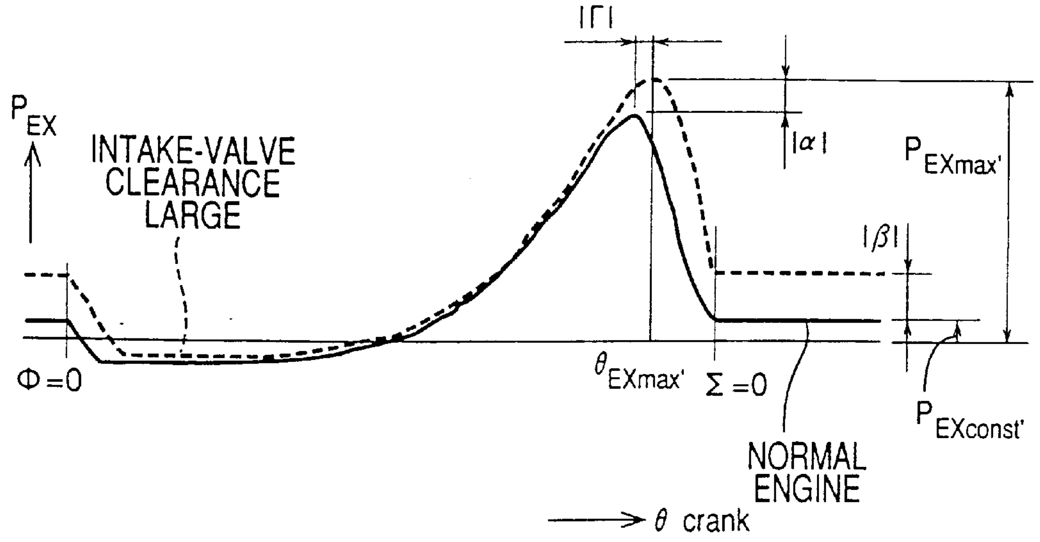
FIG. 9 is a graph showing the relationship, obtained by the apparatus of FIG. 4, between the change of an exhaust pressure $P_{EX}$ obtained from the normal engine and the change of an exhaust pressure $P_{EX}$ obtained from an engine having the fault of large intake-valve clearance, and the crank-shaft angle $\Theta_{crank}$.

FIG. 9 shows a graph representing the change of the exhaust pressure $P_{EX}$ of each cylinder, indicated at solid line, when each of the two intake valves 50 of the cylinder has a correct clearance, and the change of the exhaust pressure $P_{EX}$, indicated at broken line, when one of the two intake valves 50 has a correct clearance but the other's clearance is too large. In the case where the intake-valve clearance is large, the intake valve 50 starts opening later. Accordingly the fault finder 117 identifies an exhaust-pressure maximal-value angle $\Theta_{EXmax}'$ which is larger than the normal or reference angle $\Theta_{EXmax}$ by the absolute value of a difference $\Gamma$. In addition, since the pressure of the air compressed by the piston in the cylinder is higher than the normal pressure, the fault finder 117 identifies an exhaust-pressure maximal value $P_{EXmax}'$ which is greater by the absolute value of a difference $\alpha$ than the reference value $P_{EXmax}$. In addition, since the exhaust-pressure maximal value $P_{EXmax}'$ is greater and simultaneously the time duration after one of the two intake valves 50 opens and before the exhaust valve 48 closes is shorter, the finder 117 identifies an exhaust-pressure constant value $P_{EXconst}'$ which is greater by the absolute value of a difference $\beta$ than the reference value $P_{EXconst}$.

Figure 10:
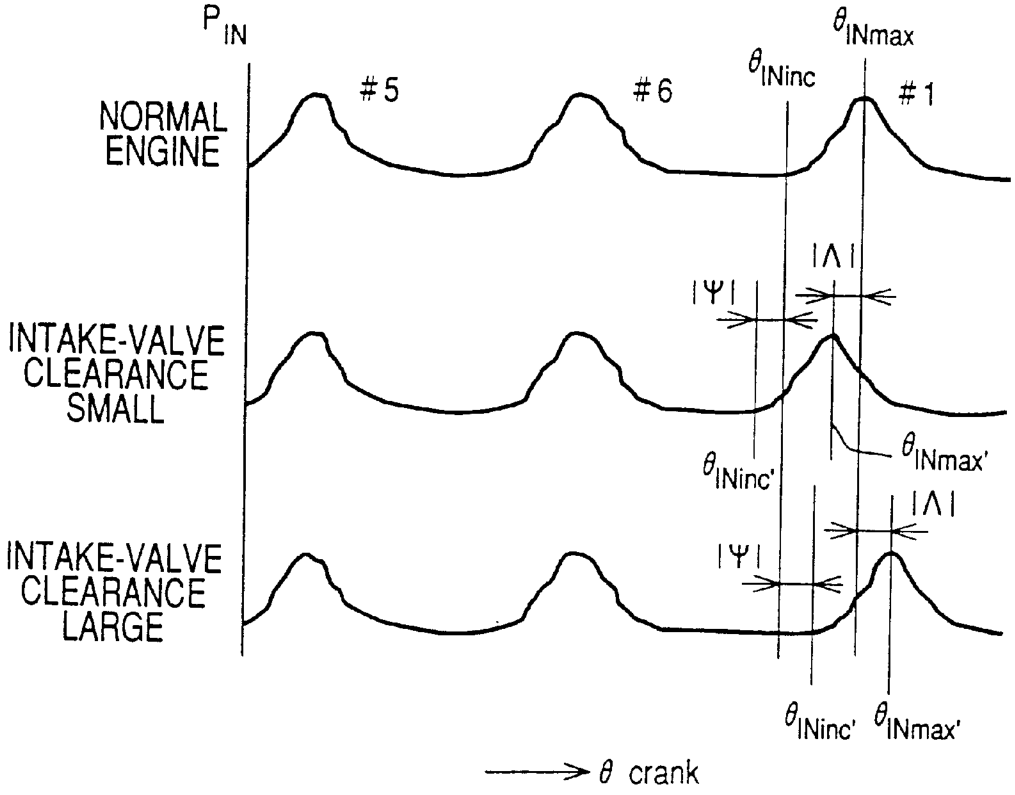
FIG. 10 is a graph showing the relationship, obtained by the apparatus of FIG. 4, between the change of an intake pressure $P_{IN}$ obtained from the normal engine, the change of an intake pressure $P_{IN}$ obtained from an engine having the fault of small intake-valve clearance, and the change of an intake pressure $P_{IN}$ obtained from an engine having the fault of large intake-valve clearance, and the crank-shaft angle $\Theta_{crank}$.

FIG. 10 shows a graph representing the change of the intake pressure $P_{IN}$ when each of the two intake valves 50 of each cylinder has a correct clearance, the change of the intake pressure $P_{IN}$ when one of the two intake valves 50 has a correct clearance but the other's clearance is too small (hereinafter, abbreviated to "when the intake-valve clearance is small"), and the change of the intake pressure $P_{IN}$ when one of the two intake valves 50 has a correct clearance but the other's clearance is too large (hereinafter, abbreviated to "when the intake-valve clearance is large"). Since the timing of opening of one of the two intake valves 50 of the cylinder #1 changes, the finder 117 identifies an intake-pressure maximal-value angle $\Theta_{INmax}'$ which differs by a difference, $\Lambda$, from the reference value $\Theta_{INmax}$. The difference $\Lambda(=e_{INmax}40 - \Theta_{INmax})$ will be referred to as the intake-pressure maximal-value-angle difference. In addition, the finder 117 identifies an intake-pressure increase-start angle $\Theta_{INinc}$, which differs by a difference, $\Psi$, from the reference value $\Theta_{INinc}$, like the difference $\Lambda$. The difference $\Psi$ $(=\Theta_{INinc}'-\Theta_{INinc})$ will be referred to as the intake-pressure increase-start-angle difference. The smaller or the larger the intake-valve clearance is, the smaller or the larger the differences $\Lambda$, $\Psi$ are like the differences $\Gamma$, $\alpha$, $\beta$.

Next, there will be described the faults with the clearance of the exhaust valve 48.

Figure 11:
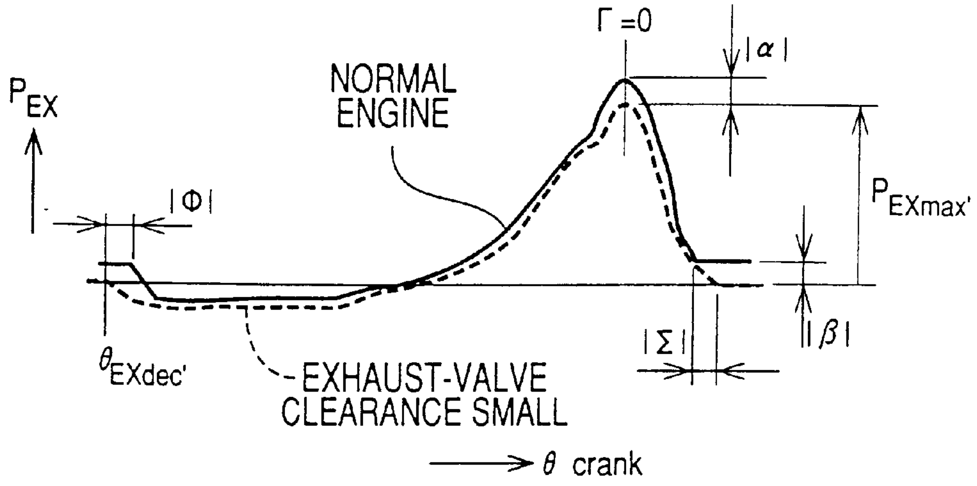
FIG. 11 is a graph showing the relationship, obtained by the apparatus of FIG. 4, between the change of an exhaust pressure $P_{EX}$ obtained from the normal engine and the change of an exhaust pressure $P_{EX}$ obtained from an engine having the fault of small exhaust-valve clearance, and the crank-shaft angle $\Theta_{crank}$.

FIG. 11 shows a graph representing the change of the exhaust pressure $P_{EX}$ of each cylinder, indicated at solid line, when each of the two exhaust valves 48 of the cylinder has a correct clearance, and the change of the exhaust pressure $P_{EX}$, indicated at broken line, when one of the two exhaust valves 48 has a correct clearance but the other's clearance is too small (hereinafter, abbreviated to "when the exhaust-valve clearance is small). When the exhaust-valve clearance is small, the other exhaust valve 48 starts opening earlier. Accordingly the fault finder 117 identifies an exhaust-pressure decrease-start angle $\Theta_{EXdec}'$ which is smaller by a difference, $\Phi$, than the reference angle $\Theta_{EXdec}$. The difference $\Phi(=\Theta_{EXdec}'-\Theta_{EXdec})$ will be referred to as the exhaust-pressure decrease-start-angle difference. In addition, the fault finder 117 identifies an exhaust-pressure constant-start angle $\Theta_{EXconst}'$ which is greater by a difference, $\Sigma$, than the reference value $\Theta_{EXconst}$. The difference $\Sigma(=\Theta_{EXconst}'-\Theta_{EXconst})$ will be referred to as the exhaust-pressure constant-start-angle difference. The two differences $\Phi$, $\Sigma$ are substantially equal to each other. Since the exhaust valve 48 closes later, the finder 117 identifies an exhaust-pressure constant value $P_{EXconst}'$ which is smaller by the absolute value of a difference $\beta$ than the reference value $P_{EXconst}$. In addition, since the amount of air supplied to the exhaust port 100 is smaller, the finder 117 identifies an exhaust-pressure maximal value $P_{EXmax}'$ which is smaller by the absolute value of a difference $\alpha$ than the reference value $P_{EXmax}$.

Figure 12:
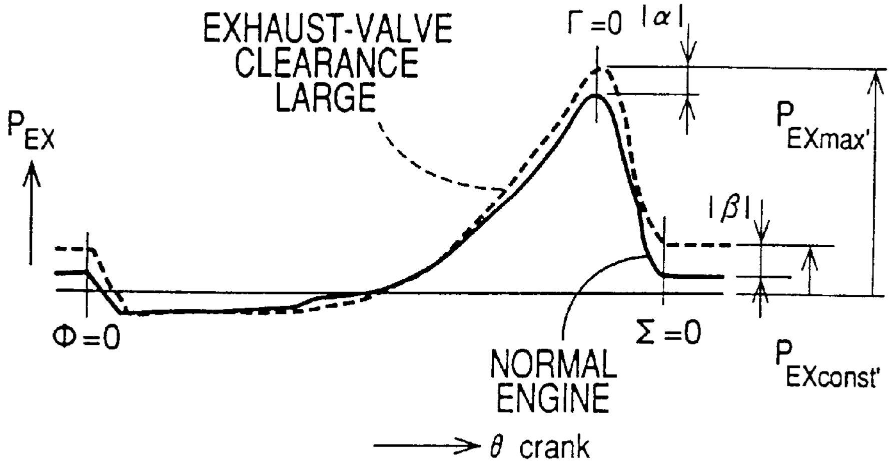
FIG. 12 is a graph showing the relationship, obtained by the apparatus of FIG. 4, between the change of an exhaust pressure $P_{EX}$ obtained from the normal engine and the change of an exhaust pressure $P_{EX}$ obtained from an engine having the fault of large exhaust-valve clearance, and the crank-shaft angle $\Theta_{crank}$.

FIG. 12 shows a graph representing the change of the exhaust pressure $P_{EX}$ of each cylinder, indicated at solid line, when each of the two exhaust valves 48 of the cylinder has a correct clearance, and the change of the exhaust pressure $P_{EX}$, indicated at broken line, when one of the two exhaust valves 48 has a correct clearance but the other's clearance is too large (hereinafter, abbreviated to "when the exhaust-valve clearance is large"). When the exhaust-valve clearance is large, the other exhaust valve 48 opens later and closes earlier. However, the one exhaust valve 48 opens and closes normally. Accordingly the fault finder 117 identifies exhaust-pressure decrease-start, maximal-value, and constant-start angles $\Theta_{EXdec}'$, $\Theta_{EXmax}'$, $\Theta_{EXconst}'$ which are substantially the same as the reference values $\Theta_{EXdec}$, $\Theta_{EXmax}$, $\Theta_{EXconst}$, respectively. However, since the exhaust valve 48 whose clearance)is large closes earlier, the finder 117 identifies an exhaust-pressure constant value $P_{EXconst}$, which is greater by a difference $\beta$ than the reference value $P_{EXconst}$. In addition, since the amount of air supplied to the exhaust port 100 is larger, the finder 117 identifies an exhaust-pressure maximal value $P_{EXmax}'$ which is greater by a difference $\alpha$ than the reference value $P_{EXmax}$. The faults with the exhaust-valve clearance do not substantially influence the intake-pressure increase-start angle $\Theta_{INinc}$ or the intake-pressure maximal-value angle $\Theta_{INmax}$.

Next, there will be described the missing of the compression ring 144.

As shown in FIG. 4, the piston of each cylinder has a piston ring 134 which includes a top ring 136, a second ring 138, and an oil ring 140. The top ring 136 and the second ring 138 cooperate with each other to provide the compression ring 144 which maintains the air tightness between the piston and the cylinder and thereby maintains the performance of the engine 90. If at least one of the top ring 136 and the second ring 138 is missing, the function of the compression ring 144 to maintain the air tightness between the piston and the air cylinder lowers. Then, the fault finder 117 identifies that the absolute value of an exhaust-pressure maximal value $P_{EXmax}'$ is smaller than that of the reference value $P_{EXmax}$, and identifies exhaust-pressure maximal-value and constant-start angles $\Theta_{EXmax}'$, $\Theta_{EXconst}'$ which are substantially the same as the reference values $\Theta_{EXmax}$, $\Theta_{EXconst}$, respectively.

Figure 13:
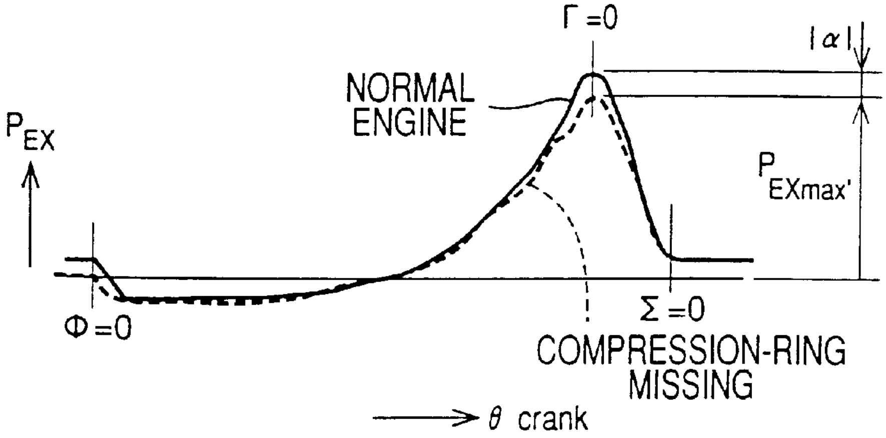
FIG. 13 is a graph showing the relationship, obtained by the apparatus of FIG. 4, between the change of an exhaust pressure $P_{EX}$ obtained from the normal engine and the change of an exhaust pressure $P_{EX}$ obtained from an engine having the fault of compression-ring missing, and the crank-shaft angle $\Theta_{crank}$.

FIG. 13 shows a graph representing the change of the exhaust pressure $P_{EX}$ of each cylinder when both of the two rings 136, 138 are normally set on the piston, and the change of the exhaust pressure $P_{EX}$ when either one of the two rings 136, 138 is missing (hereinafter, abbreviated to "when the compression-ring missing occurs"). When the compression-ring missing occurs, the finder 117 identifies an exhaust-pressure maximal value $P_{EXmax}'$ which is smaller by the absolute value of a difference $\alpha$ than the reference value $P_{EXmax}$. When both of the two rings 136, 138 are missing, the finder 117 may find the missing by identifying a still smaller exhaust-pressure maximal value $P_{EXmax}'$. However, when the missing of either one of the two rings 136, 138 is found, the engine 90 is taken apart and then re-assembled. Thus, the finder 117 need not find the missing of both of the two rings 136, 138.

Next, there will be described the fast or slow state of the cam pulley 24, 26 and the fast or slow state of the crank pulley 20.

Figure 14:
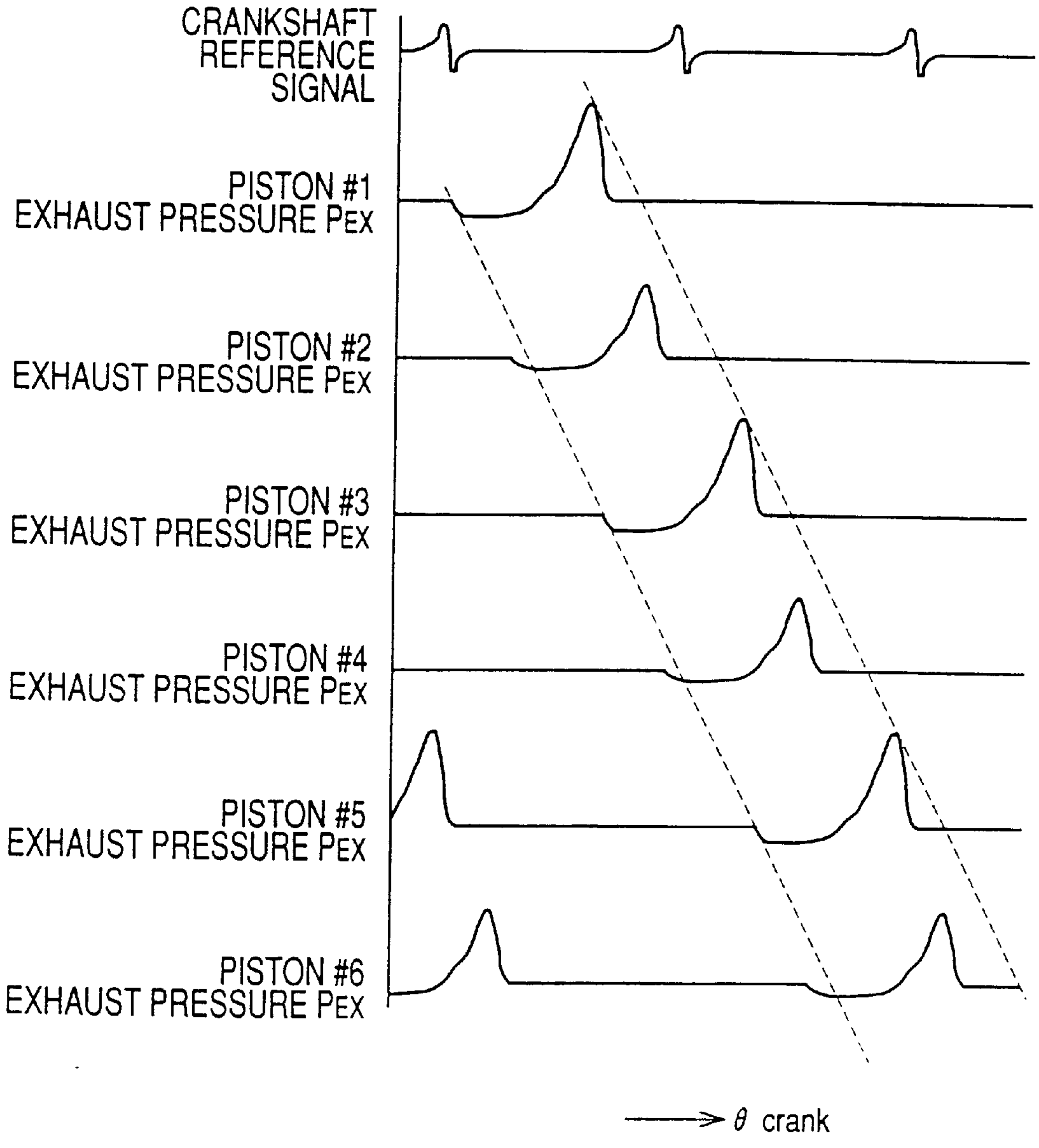
FIG. 14 is a graph showing the relationship, obtained by the apparatus of FIG. 4, between the change of crank-shaft reference signal obtained from the normal crank shaft of an engine and the respective changes of exhaust pressures $P_{EX}$ obtained from all the cylinders of the engine having the fault of cam-pulley one-tooth fast state, and the crank-shaft angle $\Theta_{crank}$.
Figure 15:
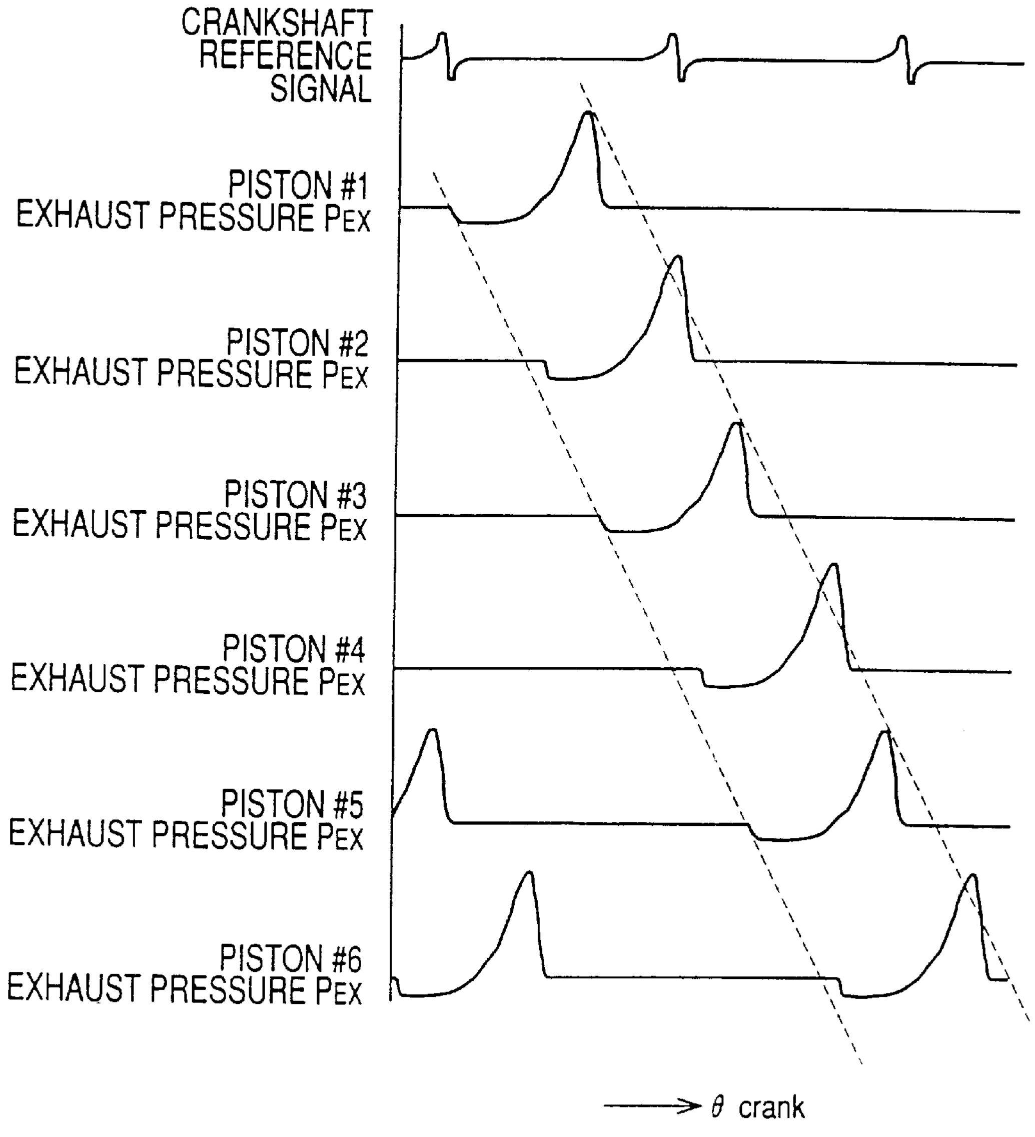
FIG. 15 is a graph showing the relationship, obtained by the apparatus of FIG. 4, between the change of crank-shaft reference signal obtained from the normal crank shaft of an engine and the respective changes of exhaust pressures $P_{EX}$ obtained from all the cylinders of the engine having the fault of cam-pulley one-tooth slow state, and the crank-shaft angle $\Theta_{crank}$.

FIG. 14 shows respective changes of the six exhaust pressures $P_{EX}$ corresponding to the six pistons or cylinders #1 to #6 when one 26 of the cam pulleys 24, 26 is faster by one tooth than the normal, other cam pulley 24, and FIG. 15 shows respective changes of the six exhaust pressures $P_{EX}$ corresponding to the six cylinders #1 to #6 when one 26 of the cam pulleys 24, 26 is slower by one tooth than the normal, other cam pulley 24. In those cases, the finder 117 identifies that respective exhaust-pressure decrease-start, maximal-value, and constant-start angles $\Theta_{EXdec}'$, $\Theta_{EXmax}'$, $\Theta_{EXconst}'$ of the even-numbered cylinders #2, #4, #6 are different from the reference values $\Theta_{EXdec}$, $\Theta_{EXmax}$, $\Theta_{EXconst}$, respectively. As can be understood from this, when only one of the respective cam pulleys 24, 26 of the left and right banks is fast or slow, all the angles $\Theta_{EXdec}'$, etc. of the odd- or even-numbered cylinders #1, #3, #5, or #2, #4, #6 differ from the reference values $\Theta_{EXdec}$, $\Theta_{EXmax}$, $\Theta_{EXconst}$, respectively.

When the crank pulley 20 is fast or slow, the finder 117 identifies that respective exhaust-pressure decrease-start, maximal-value, and constant-start angles $\Theta_{EXdec}'$, $\Theta_{EXmax}'$, $\Theta_{EXconst}'$ of all the cylinders #1 to #6 are different from the reference values $\Theta_{EXdec}$, $\Theta_{EXmax}$, $\Theta_{EXconst}$, respectively, like when both of the two cam pulleys 24, 26 are slow or fast. That is, when the crank pulley 20 is fast, the angles $\Theta_{EXdec}'$, etc. differ from the reference values $\Theta_{EXdec}$, etc., like when both of the two cam pulleys 24, 26 of the two banks are slow, and vice versa. More specifically, when the crank pulley 20 is slow by one tooth, all the exhaust pressures $P_{EX}$ corresponding to the cylinders #1 to #6 change like those of the even-numbered cylinders #2, #4, #6 shown in FIG. 14 and, when the crank pulley 20 is fast by one tooth, all the exhaust pressures $P_{EX}$ corresponding to the cylinders #1 to #6 change like those of the even-numbered cylinders #2, #4, #6 shown in FIG. 15.

Figure 16:
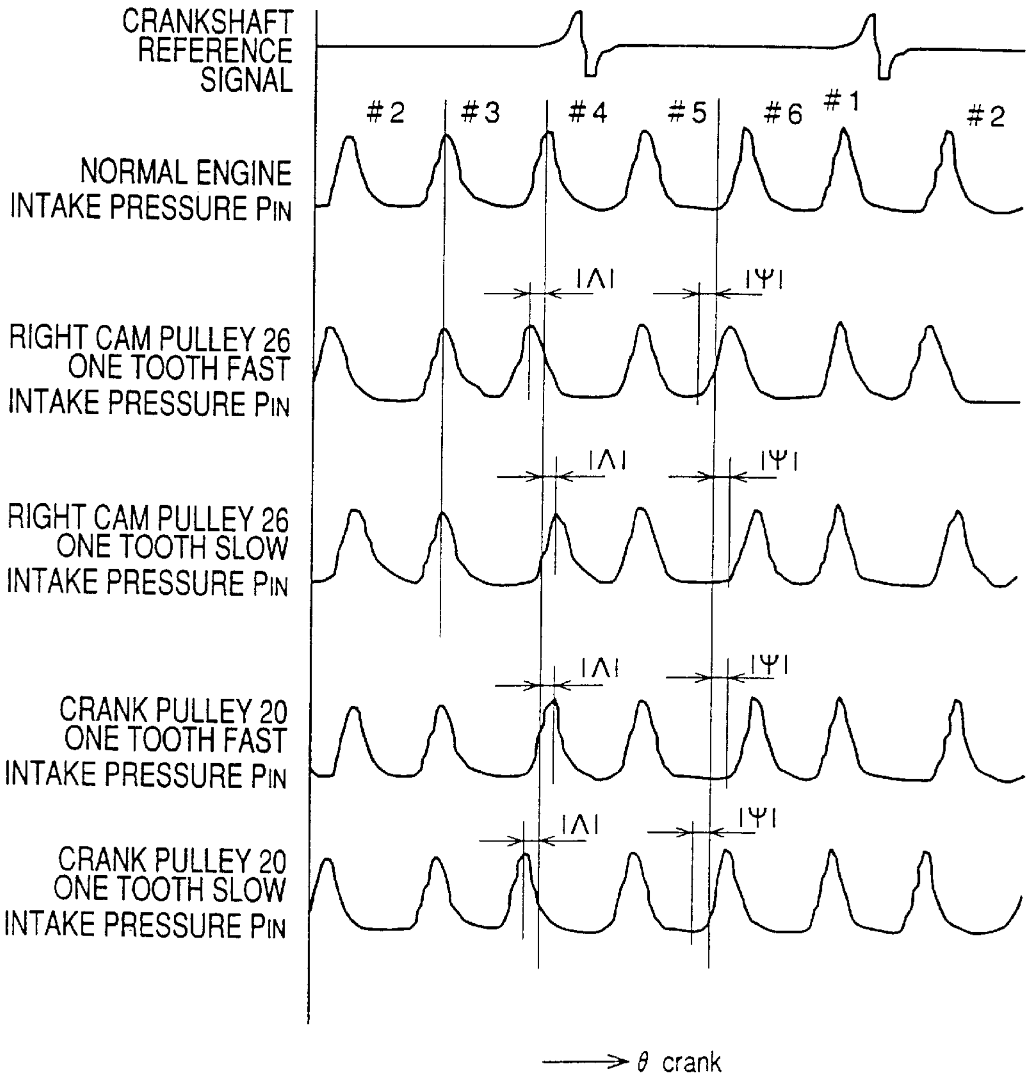
FIG. 16 is a graph showing the relationship, obtained by the apparatus of FIG. 4, between the change of crank-shaft reference signal obtained from the normal crank shaft of an engine, the change of intake pressure $P_{IN}$ obtained from the normal engine, the change of intake pressure $P_{IN}$ obtained from an engine having the fault of right-cam-pulley one-tooth fast state, the change of intake pressure $P_{IN}$ obtained from an engine having the fault of right-cam-pulley one-tooth slow state, the change of intake pressure $P_{IN}$ obtained from an engine having the fault of crank-pulley one-tooth fast state, and the change of intake pressure $P_{IN}$ obtained from an engine having the fault of crank-pulley one-tooth slow state, and the crank-shaft angle $\Theta_{crank}$.

FIG. 16 shows the change of the intake pressure $P_{IN}$ when the right cam pulley 26 is fast by one tooth, the change of the intake pressure $P_{IN}$ when the right cam pulley 26 is slow by one tooth, the change of the intake pressure $P_{IN}$ when the crank pulley 20 is fast by one tooth, and the change of the intake pressure $P_{IN}$ when the crank pulley 20 is slow by one tooth. When the right cam pulley 26 is fast or slow by one tooth, the respective changes of the intake pressure $P_{IN}$ which represent the respective opening and closing of the even-numbered cylinders #2, #4, #6 occur at different angles than the reference angles. On the other hand, when the crank pulley 20 is fast or slow, the respective changes of the intake pressure $P_{IN}$ which represent the respective opening and closing of all the cylinders #1 to #6 occur at different angles than the reference angles.

Figure 17:
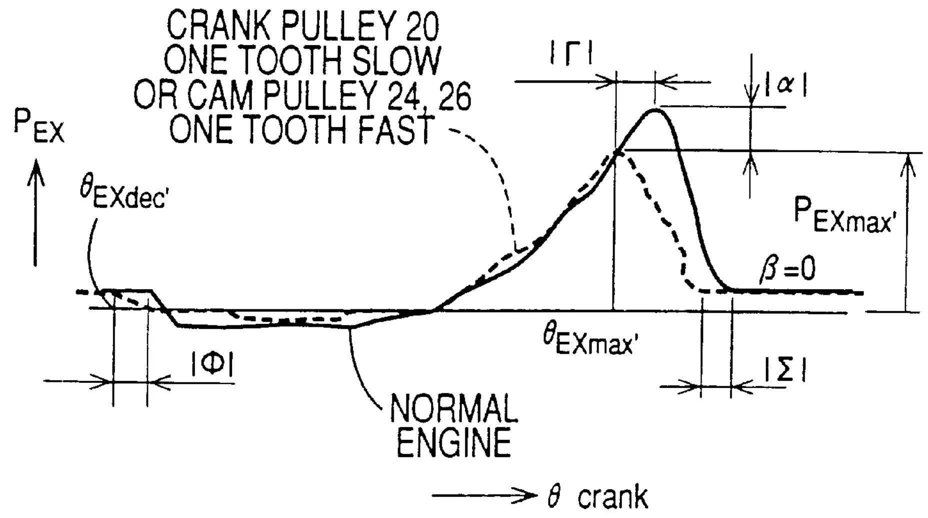
FIG. 17 is a graph showing the change of exhaust pressure $P_{EX}$ obtained from the normal engine and the change of exhaust pressure $P_{EX}$ obtained from an engine having the fault of crank-pulley one-tooth slow state or cam-pulley one-tooth fast state, with respect to the crank-shaft angle $\Theta_{crank}$.

FIG. 17 shows the change of the exhaust pressure $P_{EX}$ of each cylinder when the crank pulley 20 is slow by one tooth, or the change of the exhaust pressure $P_{EX}$ of one cylinder when one of the cam pulleys 24, 26 which corresponds to the one cylinder is fast by one tooth. In this case, the fault finder 117 identifies exhaust-pressure decrease-start, maximal-value, and constant-start angles $\Theta_{EXdec}'$, $\Theta_{Exmax}'$, $\Theta_{EXconst}'$ which are smaller by differences Φ, Γ, Σ than the reference values $\Theta_{EXdec}$, $\Theta_{EXmax}$, $\Theta_{EXconst}$, respectively, and that those differences Φ, Γ, Σ are substantially equal to one another. The intake valves 50 start opening earlier, that is, as shown in FIG. 6, start opening when the piston is nearer to the bottom dead position BDC. Thus, the finder 117 identifies the exhaust-pressure maximal value $P_{EXmax}'$ which is smaller by the absolute value of a difference α than the reference value $P_{EXmax}$. However, the finder 117 identifies the exhaust-pressure constant value $P_{EXconst}'$ which is substantially the same as the reference value $P_{EXconst}$.

In the case where the cam pulley 24, 26 is fast by one tooth, the differences Φ, Γ, Σ are equal to a negative angle corresponding to one tooth of the cam pulley 24, 26, that is, −7.5 degrees (=−360 (degrees)/48 (teeth)) in terms of rotation angle of the cam pulley 24, 26. This angle corresponds to 15 degrees in terms of rotation angle of the crank pulley 20. Meanwhile, in the case where the crank pulley 20 is slow by one tooth, the differences Φ, Γ, Σ are equal to a negative angle corresponding to one tooth of the crank pulley 20, that is, −15 degrees (=−360 (degrees)/24 (teeth)) in terms of rotation angle of the crank pulley 20. As far as the cylinders #2, #4, #6 of the right bank are concerned, the exhaust pressures $P_{EX}$ change in the same manner both when the right cam pulley 26 is fast by one tooth and when the crank pulley 20 is slow by one tooth. Therefore, the finder 117 identifies that the exhaust pressures $P_{EX}$ corresponding to the three cylinders #2, #4, #6 of the right bank take substantially the same maximal value $P_{EXmax}'$ and the same maximal-value angle difference Γ in both the above-indicated two cases.

Figure 18:
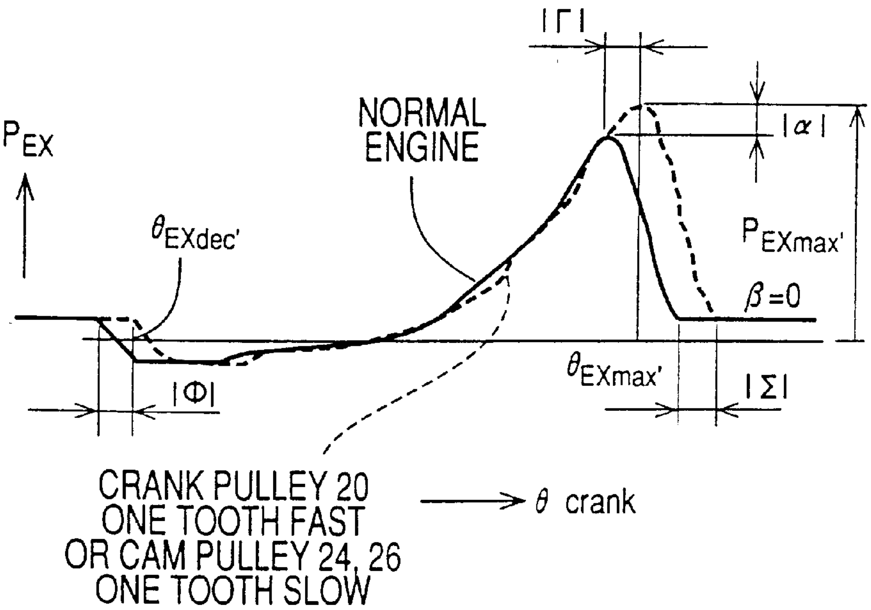
FIG. 18 is a graph showing the change of exhaust pressure $P_{EX}$ obtained from the normal engine and the change of exhaust pressure $P_{EX}$ obtained from an engine having the fault of crank-pulley one-tooth fast state or cam-pulley one-tooth slow state, with respect to the crank-shaft angle $\Theta_{crank}$.

FIG. 18 shows the change of the exhaust pressure $P_{EX}$ of each of the six cylinders #1 to #6 when the crank pulley 20 is one tooth fast, and the change of the exhaust pressure $P_{EX}$ of each of the three cylinders corresponding to one of the cam pulleys 24, 26 which is one tooth slow. In this case, the fault finder 117 identifies exhaust-pressure decrease-start, maximal-value, and constant-start angles $\Theta_{EXdec}$40, $\Theta_{EXmax}'$, $\Theta_{EXconst}'$ which are greater by the absolute values of differences Φ, Γ, Σ than the reference values $\Theta_{EXdec}$, $\Theta_{EXmax}$, $\Theta_{EXconst}$, respectively, and that those differences Φ, Γ, Σ are substantially equal to one another.

The intake valves 50 of the cylinders start opening later than in normal cases. As shown in FIG. 6, the intake valves 50 start opening when the pistons are nearer to their top dead positions TDC. Thus, the finder 117 identifies an exhaust-pressure maximal value $P_{EXmax}'$ which is greater by the absolute value of a difference α than the reference value $P_{EXmax}$. However, the finder 117 identifies an exhaust-pressure constant value $P_{EXconst}'$ which is substantially the same as the reference value $P_{EXconst}$.

When the crank pulley 20 is one tooth fast or when one of the cam pulleys 24, 26 is one tooth slow, the differences Φ, Γ, Σ are equal to a positive angle corresponding to one tooth of the cam pulleys 24, 26, that is, 7.5 degrees (=360 (degrees)/48 (teeth)) in terms of rotation angle of the cam pulley 24, 26, that is, 15 degrees (=360 (degrees)/24 (teeth)) in terms of rotation angle of the crank pulley 20. As far as the cylinders #2, #4, #6 of the right bank are concerned, the exhaust pressures $P_{EX}$ change in the same manner both when the right cam pulley 26 is one tooth slow and when the crank pulley 20 is one tooth fast. Therefore, the finder 117 identifies that the respective exhaust pressures $P_{EX}$ of the three cylinders #2, #4, #6 of the right bank take substantially the same maximal value $P_{EXmax}'$ and maximal-value angle difference Γ in both the above-indicated two cases.

Next, there will be described the case where one of the driven gears 40, 42 is fast or slow.

Figure 19:
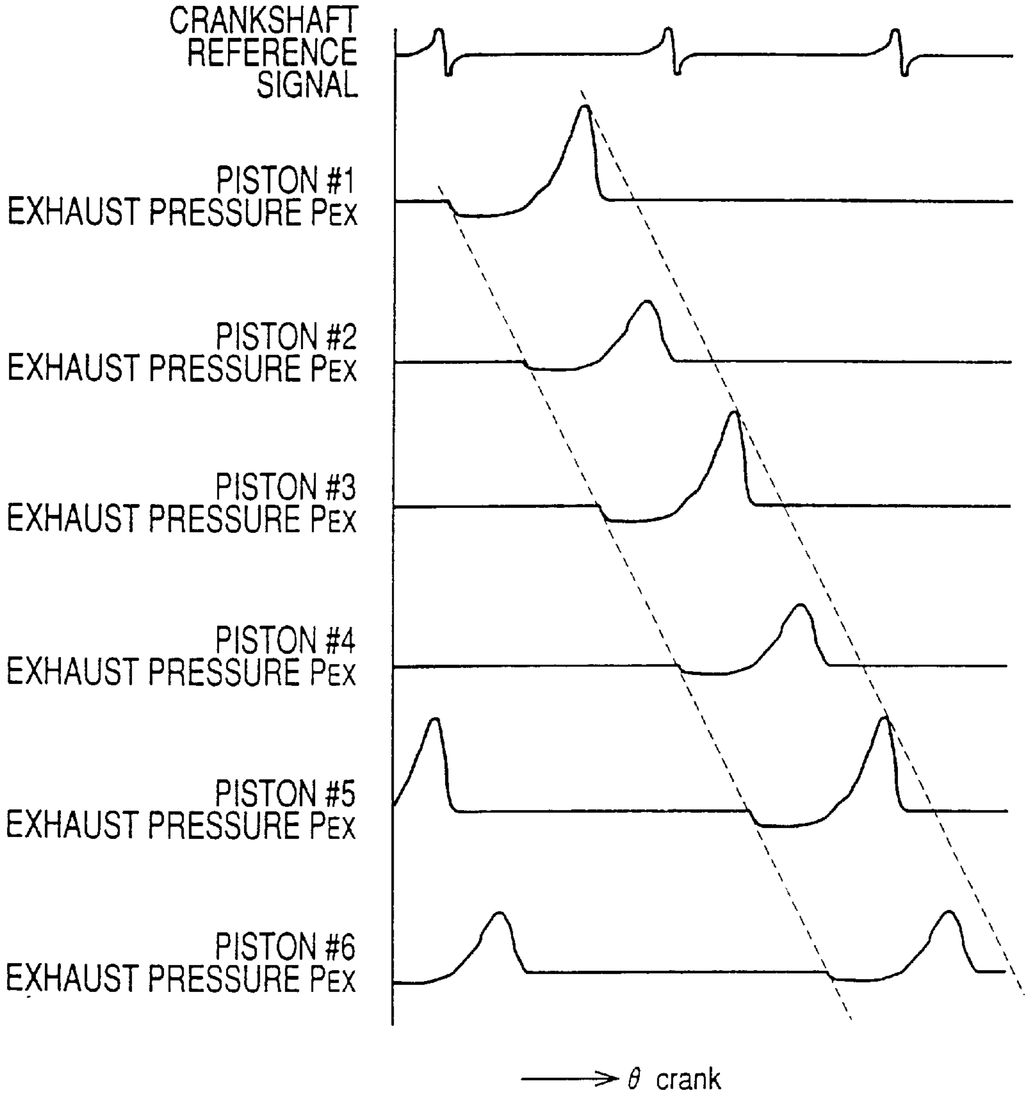
FIG. 19 is a graph showing the change of crank-shaft reference signal obtained from the normal crank shaft of an engine and the respective changes of exhaust pressures $P_{EX}$ obtained from all the cylinders of the engine having the fault of driven-gear one-tooth fast state, with respect to the crank-shaft angle $\Theta_{crank}$.
Figure 20:
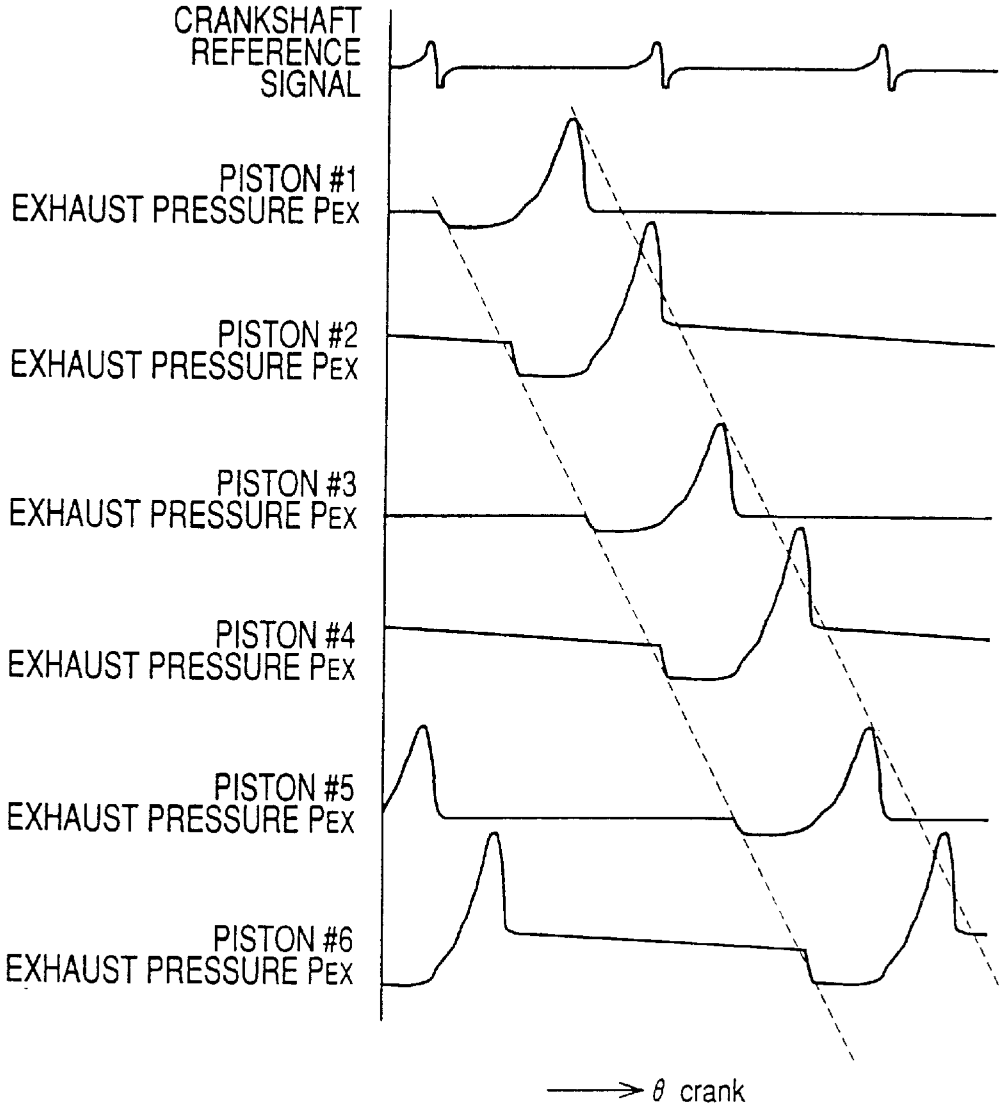
FIG. 20 is a graph showing the change of crank-shaft reference signal obtained from the normal crank shaft of an engine and the respective changes of exhaust pressures $P_{EX}$ obtained from all the cylinders of the engine having the fault of driven-gear one-tooth slow state, with respect to the crank-shaft angle $\Theta_{crank}$.

FIG. 19 is a graph showing the CS reference signal and the respective changes of the six exhaust pressures $P_{EX}$ when the right driven gear 42 is one tooth fast, and FIG. 20 is a graph showing the CS reference signal and the respective changes of the six exhaust pressures $P_{EX}$ when the right driven gear 42 is one tooth slow. As is apparent from those graphs, the changes of the exhaust pressures $P_{EX}$ of the three cylinders of the right bank differ from those obtained from a normal engine. Further detailed description will be made later.

Figure 21:
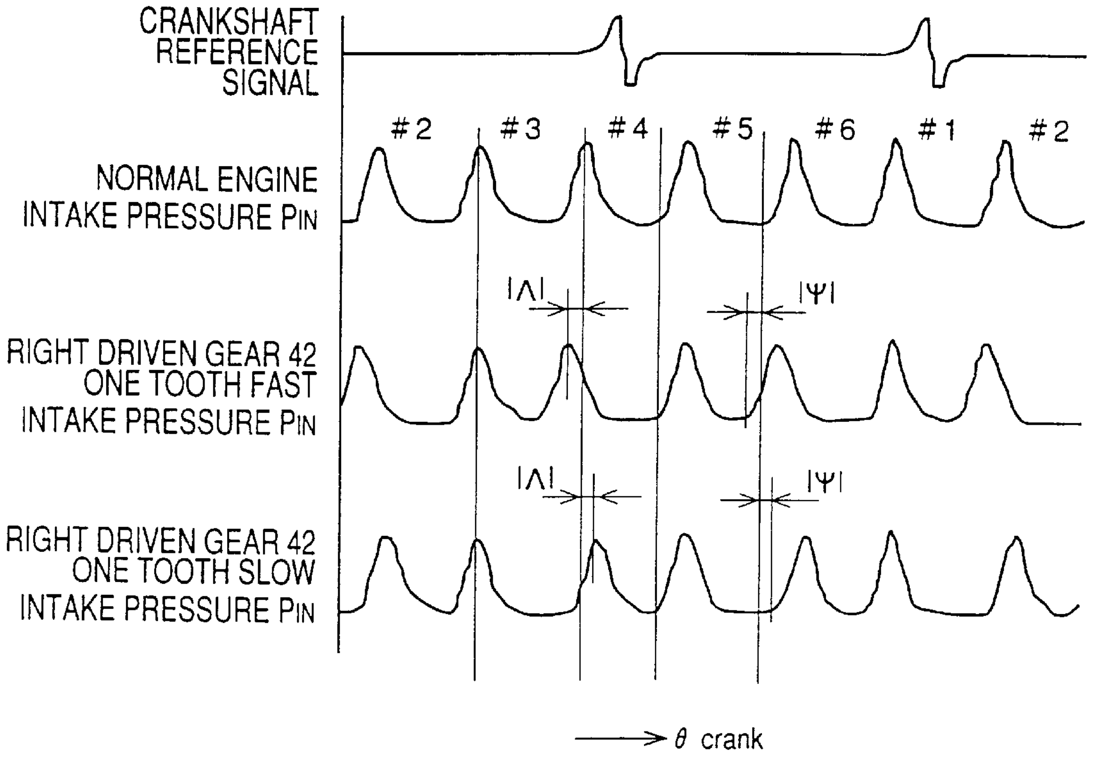
FIG. 21 is a graph showing the change of crank-shaft reference signal obtained from the normal crank shaft of an engine, the change of intake pressure $P_{IN}$ obtained from the normal engine, the change of intake pressure $P_{IN}$ obtained from an engine having the fault of right-driven-gear one-tooth fast state, and the change of intake pressure $P_{IN}$ obtained from an engine having the fault of right-driven-gear one-tooth slow state, with respect to the crank-shaft angle $\Theta_{crank}$.

FIG. 21 is a graph showing the change of the intake pressure $P_{IN}$ when the right driven gear 42 is one tooth fast or slow. As is apparent from the graph, when the right driven gear 42 is one tooth fast, the finder 117 identifies that respective intake-pressure maximal-value and increase-start angles $\Theta_{INmax}'$, $\Theta_{INinc}'$ of the even-numbered cylinders #2, #4, #6 are smaller than the reference values $\Theta_{INmax}$, $\Theta_{INinc}$, respectively. Contrarily, when the right driven gear 42 is one tooth slow, the finder 117 identifies that respective intake-pressure maximal-value angles $\Theta_{INmax}'$ of the even-numbered cylinders #2, #4, #6 are greater than the reference value $\Theta_{INmax}$. On the other hand, when the left driven gear 40 is one tooth fast or slow, the finder 117 identifies that the respective changes of the intake pressure $P_{IN}$ which correspond to the odd-numbered cylinders #1, #3, #5 differ from those obtained from a normal engine.

Figure 22:
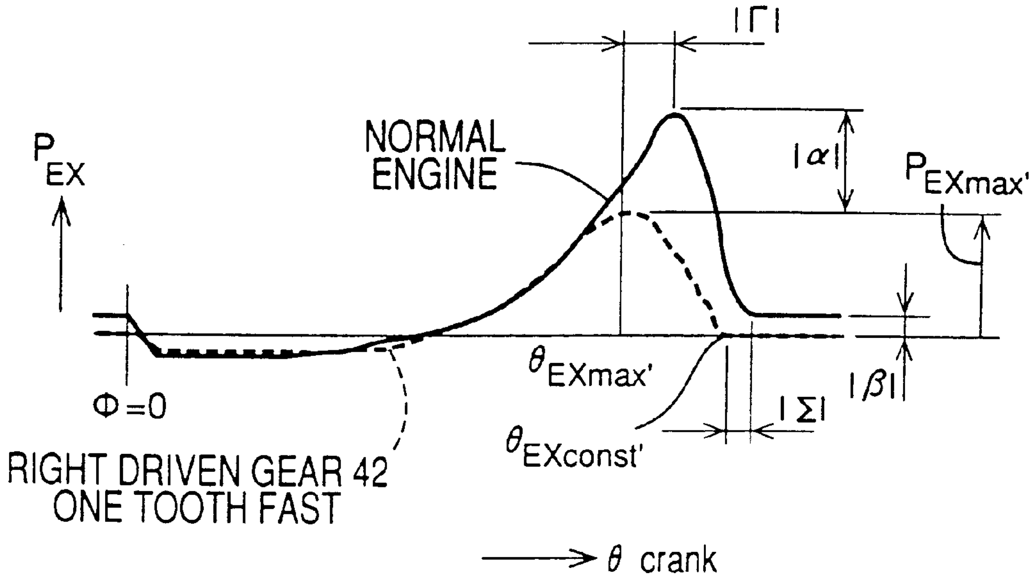
FIG. 22 is a graph showing the change of exhaust pressure $P_{EX}$ obtained from the normal engine and the change of exhaust pressure $P_{EX}$ obtained from an engine having the fault of driven-gear one-tooth fast state, with respect to the crank-shaft angle $\Theta_{crank}$.

FIG. 22 is a graph showing the change of the exhaust pressure $P_{EX}$ of each of the six cylinders when the engine 90 has no fault, and the change of the exhaust pressure $P_{EX}$ of each of the three cylinders of the right bank when the right driven gear 42 is one tooth fast. The driven gear 42 defines the timing at which the intake valves 50 of the right bank open and close. Since the gear 42 is one tooth fast, the finder 117 identifies an exhaust-pressure maximal-value angle $\Theta_{EXmax}'$ which is smaller than the reference value $\Theta_{EXmax}$ by an angle corresponding to one tooth of the gear 42. Since in the present embodiment the number of teeth of the gears 40, 42 is forty, the angle is 9 degrees (=360 (degrees)/40 (teeth)) in terms of rotation angle of the gear 42. This angle corresponds to 18 degrees in terms of rotation angle of the crank pulley 20. The finder 117 identifies that respective exhaust-pressure maximal and constant values $P_{EXmax}'$, $P_{EXconst}'$ of the even-numbered cylinders #2, #4, #6 are smaller by the absolute values of differences α, β than the reference values $P_{EXmax}$, $P_{EXconst}$, respectively. In addition, the finder 117 finds respective exhaust-pressure constant-start angles $\Theta_{EXconst}'$ which are smaller by a difference Γ than the reference value $\Theta_{EXconst}$. In a normal engine, the angles $\Theta_{EXconst}$ correspond to the closing of the exhaust valves 48. However, when the driven gear 42 is one tooth fast, the exhaust-pressure maximal-value angles $\Theta_{EXmax}'$ are smaller than the reference value $\Theta_{EXmax}$, and accordingly the exhaust pressures $P_{EX}$ become equilibrium with the respective pressures in the cylinders before the exhaust valves 48 close.

Figure 23:
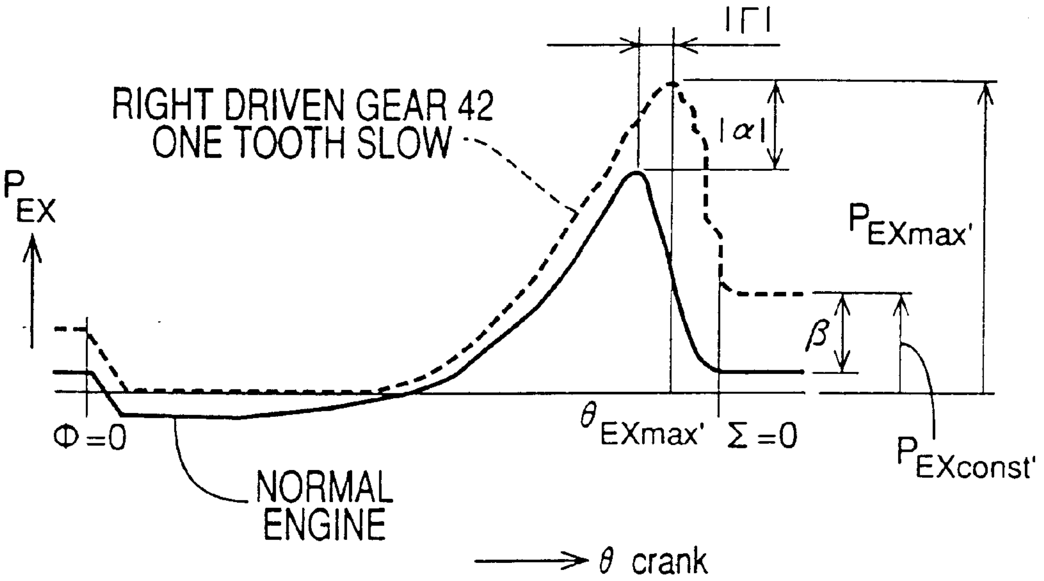
FIG. 23 is a graph showing the change of exhaust pressure $P_{EX}$ obtained from the normal engine and the change of exhaust pressure $P_{EX}$ obtained from an engine having the fault of driven-gear one-tooth slow state, with respect to the crank-shaft angle $\Theta_{crank}$.

FIG. 23 is a graph showing the change of the exhaust pressure $P_{EX}$ of each of the six cylinders when the engine 90 has no fault, and the change of the exhaust pressure $P_{EX}$ of each of the three cylinders of the right bank when the right driven gear 42 is one tooth slow. In this case, contrary to the graph of FIG. 22, the finder 117 identifies an exhaust-pressure maximal-value angle $\Theta_{EXmax}'$ which is greater by a difference Γ than the reference value $\Theta_{EXmax}$. On the other hand, the finder 117 identifies an exhaust-pressure constant-start angle $\Theta_{EXconst}'$ which is substantially the same as the reference value $\Theta_{EXconst}$, that is, identifies that the exhaust-pressure constant-start-angle difference Σ is zero. Since the exhaust-pressure maximal-value angles $\Theta_{EXmax}'$ are greater than the reference value $\Theta_{EXmax}$, the finder 117 identifies that respective exhaust-pressure maximal and constant values $P_{EXmax}$40, $P_{EXconst}'$ of the even-numbered cylinders #2, #4, #6 are greater by the absolute values of differences α, β than the reference values $P_{EXmax}$, $P_{EXconst}$, respectively.

FIG. 24 is a table showing respective actual values of the exhaust-pressure maximal-value difference α, the exhaust-pressure constant-value difference β, the exhaust-pressure maximal-value-angle difference Γ, the exhaust-pressure constant-start-angle difference Σ, etc. Those actual values are obtained in the case where just one fault occurs to the engine 90 and two or more faults do not simultaneously occur to the same 90. The pressure difference values indicated in the table of FIG. 24 are values relative to the normal or reference exhaust-pressure maximal value $P_{EXmax}$=100, and the angle difference values indicated in the table are values relative to the CS reference signal output from the CS angle sensor 114. When the crank pulley 20 is one tooth fast or slow, the values obtained from the right bank are the same as those obtained from the left bank. However, when one of the cam pulleys 24, 26 or one of the driven gears 40, 42 is one tooth fast or slow, only the values obtained from one of the two banks which corresponds to the fast or slow cam pulley or the fast or slow driven gear differ from those obtained from the normal bank. Although it is very rare, it is possible that both of the two cam pulleys 24, 26 be fast or slow or that both of the two driven gears 40, 42 be fast or slow. The values obtained when the intake-valve or exhaust-valve clearance is small or large continuously change, since the clearance continuously changes. The table of FIG. 24 just exemplifies such actual values which enable the fault finder 117 to identify the small or large intake-valve or exhaust-valve clearance.

Figure 25:
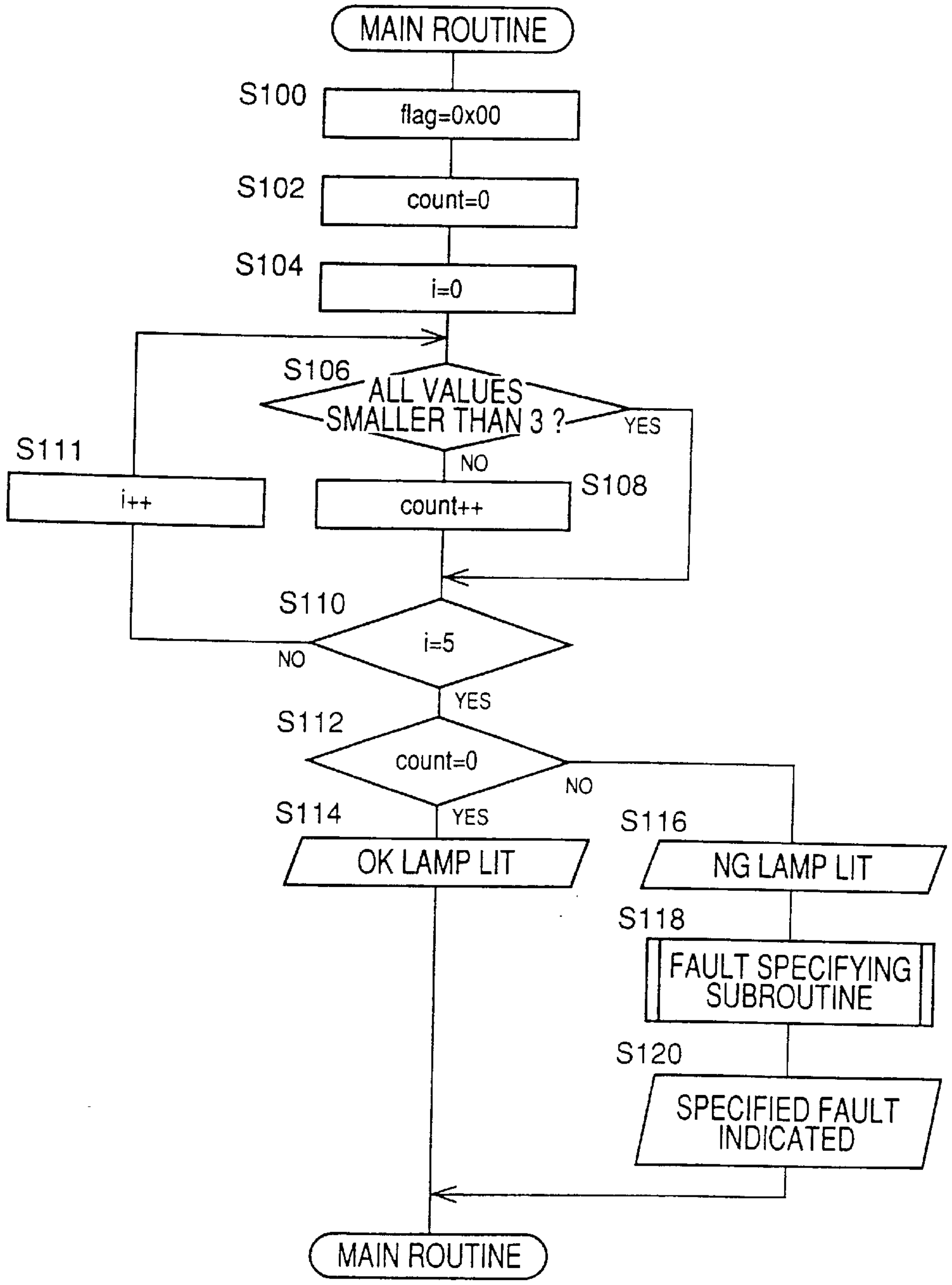
FIG. 25 is a flow chart representing the main routine of an engine testing program which is pre-stored in a ROM (read only memory) of a fault finder of the apparatus of FIG. 4.

FIG. 25 is a flow chart representing the main routine of the assembled engine testing program which is stored in the ROM of the fault finder 117 and which is carried out by the CPU and the RAM of the finder 117. According to the main routine, the fault finder 117 identifies the presence or absence of an assembling fault of the engine 90, based on the respective exhaust-pressure maximal values corresponding to the six pistons or cylinders #1 to #6. If the engine 90 has no fault, the finder 117 commands the display 118 (FIG. 26) to indicate that the engine 90 has passed the test. On the other hand, if a fault is found, the finder 117 identifies or specifies what is the fault and commands the display 118 to indicate that the engine 90 has not passed the test and the place where the fault has occurred.

First, at Step S100, the fault finder 117 or the CPU thereof initializes a flag variable, ‘flag’, to flag=0×00 (i.e., 00000000) and, at Step S102, it initializes a variable, ‘count’, to count=0. At Step S104, the CPU initializes a variable, ‘i’, to i=0 corresponding to the first piston #1. The number greater by one than the variable ‘i’ is equal to the number of the current piston. Subsequently, at Step S106, the CPU judges whether all the respective absolute values of the exhaust-pressure maximal-value difference α[i], the exhaust-pressure constant-value difference β[i], the exhaust-pressure maximal-value-angle difference Γ[i], the exhaust-pressure constant-start-angle difference Σ[i], the exhaust-pressure decrease-start-angle difference Φ[i], the intake-pressure maximal-value-angle difference Λ[i], and the intake-pressure increase-start-angle difference Ψ[i] which are measured from the piston #i+1 are smaller than 3. If a negative judgment is made at Step S106, the control of the CPU goes to Step S108 to add one to the variable ‘count’. On the other hand, if a positive judgment is made at Step S106, the control goes to Step S110 to judge whether the variable ‘i’ is equal to 5 corresponding to the sixth piston #6. If a negative judgment is made at Step S110, the control goes to Step S111 to add one to the variable ‘i’ and then goes back to Step S106.

As can be understood from FIG. 24, in the case where it is assumed that two or more assembling faults do not simultaneously occur, it can be concluded that if the respective absolute values of the differences α, β, etc. are smaller than 3, the test engine 90 has normally been assembled without any fault.

If a positive judgment is made at Step S110, the control of the CPU goes to Step S112 to judge whether the variable ‘count’ is equal to 0. If a positive judgment is made at Step S112, the control goes to Step S114 to command the display 118 to light an OK lamp of the display 118 indicating that no fault has been found. Thus, the CPU quits the main routine. On the other hand, if a negative judgment is made at Step S112, that is, a fault has been found, the control goes to Step S116 to light an NG lamp of the display 118 indicating that situation. Subsequently, the control goes to Step S118, i.e., a fault identifying or specifying subroutine. Step S118 is followed by Step S120 to light a lamp of the display 118 corresponding to the fault specified at Step S118. Then, the CPU quits the main routine.

The display 118 may have an arrangement as shown in FIG. 26. In the figure, reference numeral 200 designates the OK lamp which is lit when no fault is found. Numeral 202 designates the NG lamp which is lit when a fault is found. In the case where a fault is found and specified, the control device 119 may light one of the following lamps which corresponds to the fault specified: a fast crank-pulley lamp 204, a slow crank-pulley lamp 206, a fast left-cam-pulley lamp 208, a slow left-cam-pulley lamp 210, a fast right-cam-pulley lamp 212, a slow right-cam-pulley lamp 214, a fast left-driven-gear lamp 216, a slow left-driven-gear lamp 218, a fast right-driven-gear lamp 220, and a slow right-driven-gear lamp 222. In addition, the CPU may light, for each of the pistons #1 to #6, one of a small intake-valve clearance lamp 224, a large intake-valve clearance lamp 226, a small exhaust-valve clearance lamp 228, a large exhaust-valve clearance lamp 230, and a compression-ring missing lamp 232. Moreover, in the case where a fault cannot be specified as will be described later, another lamp corresponding to a doubtful fault may be lit. Hereinafter, those lamps will be referred to as the fault lamps.

Figure 27:
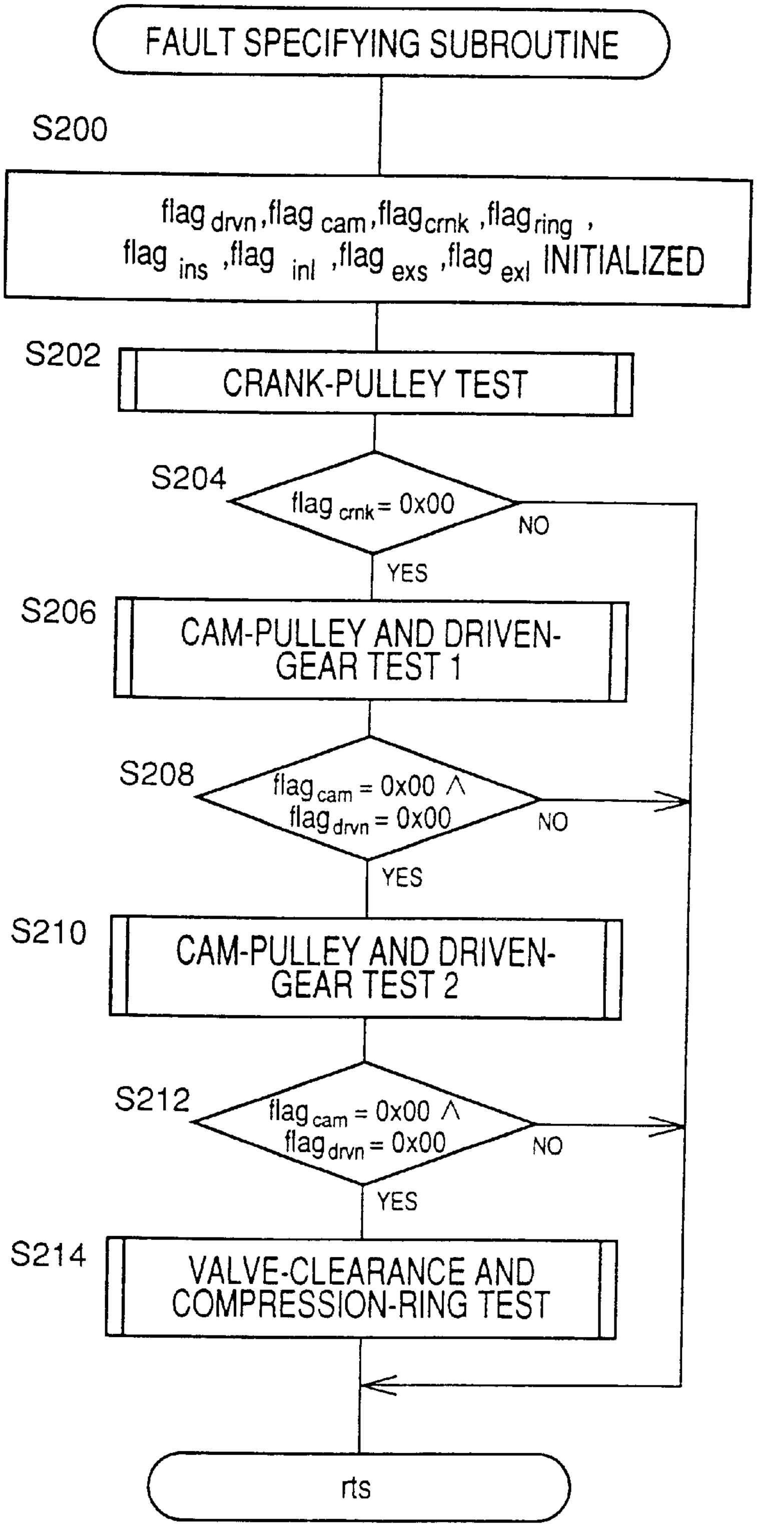
FIG. 27 is a flow chart representing a fault specifying routine carried out at Step S118 of the flow chart of FIG. 25.

FIG. 27 is a flow chart representing the fault specifying subroutine of Step S118 of FIG. 25. In the present subroutine, it is assumed that only a single fault occurs if any, that is, two or more faults do not simultaneously occur. Generally, it is possible that two or more assembling faults simultaneously occur to a single engine, but that possibility is very low. Therefore, in almost all cases, the present subroutine is effective in specifying the fault. Even if two or more faults simultaneously occur and accordingly the subroutine provides an incorrect specification of the fault, the main routine does not provide such a judgment that no fault has been found. Thus, the incorrect specification is permissible.

In the present fault specifying routine, first, at Step S200, the CPU of the fault finder 117 initializes each of eight flags corresponding to the above-indicated faults, to 0×00. Hereinafter, those flags will be referred to as the fault flags. As shown in FIG. 28, each of the eight flags comprises one byte data, i.e., eight bits data. If no fault has been found, each flag remains 0×00. The lower four bits of the flag 'flag$_{drvn}$' correspond to the fast and slow states of the left and right driven gears 40, 42, and the lower four bits of the flag 'flag$_{cam}$' correspond to the fast and slow states of the left and right cam pulleys 24, 26. The lower two bits of flag$_{crnk}$ correspond to the fast and slow states of the crank pulley 20. The lower six bits of the flags 'flag$_{ins}$', 'flag$_{inl}$', 'flag$_{exs}$', 'flag$_{exl}$', 'flag$_{ring}$' correspond to the presence or absence of the small and large intake-valve clearances, the small and large exhaust-valve clearances, and the compression-ring missing, respectively, of the six pistons or cylinders #1 to #6. The respective highest (leading) bits of the eight flags are doubtful-fault bits each of which may be set to 1 to indicate that a corresponding fault is doubtful but cannot be specified.

Step S200 is followed by Steps S202 to S214. Step S202 is a crank-pulley test for determining values to be set to the flag 'flag$_{crnk}$' Steps S206 and S210 are cam-pulley and driven-gear tests 1, 2 for determining values to be set to the flags 'flag$_{cam}$' and 'flag$_{drvn}$'.Step S214 is a valve-clearance and compression-ring test for determining values to be set to the flags 'flag$_{ins}$', 'flag$_{inl}$', 'flag$_{exs}$', 'flag$_{exl}$', 'flag$_{ring}$'. Hereinafter, those steps will be described in detail. If a fault is found at the first one of those steps, then the CPU quits the fault specifying routine and the remaining step or steps is or are not carried out. This corresponds to the above-indicated assumption that only a single fault occurs to a single engine 90.

First, the crank-pulley test at Step S202 of FIG. 27 will be described below.

Figure 29:
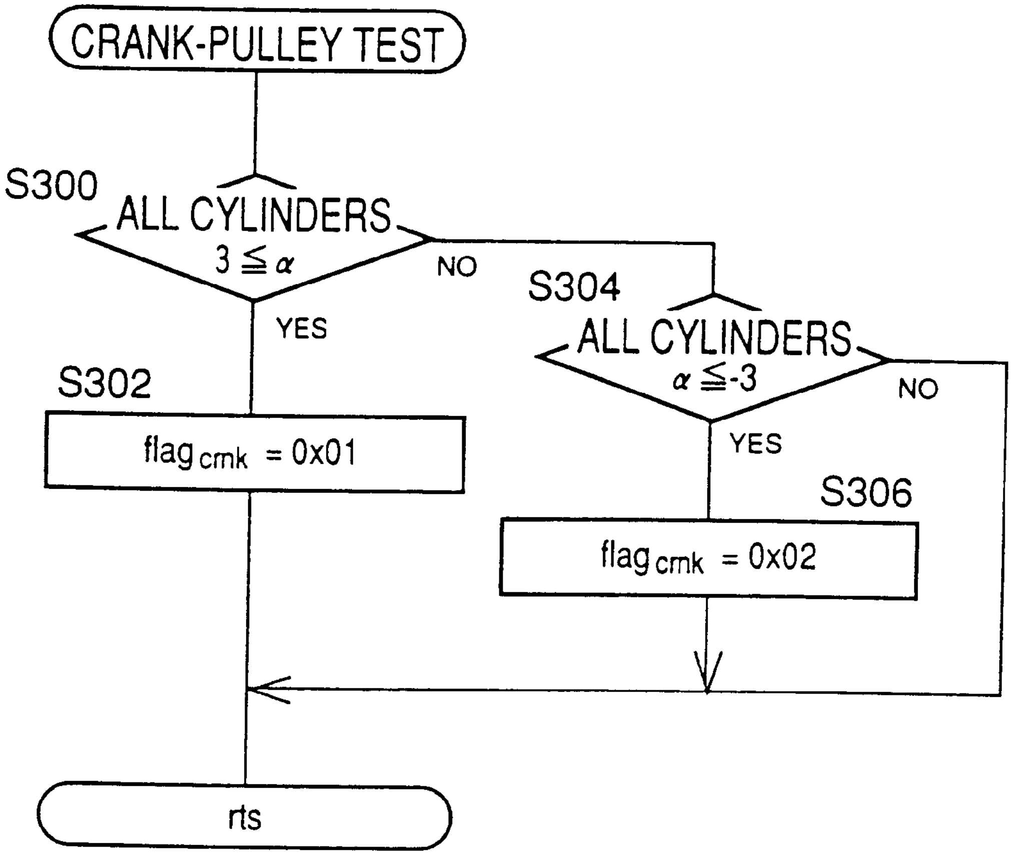
FIG. 29 is a flow chart representing a crank-pulley test routine carried out at Step S202 of the flow chart of FIG. 27.

FIG. 29 is a flow chart representing the crank-pulley testing subroutine of Step S202 of FIG. 27. First, at Step S300, the CPU of the fault finder 117 judges whether the respective exhaust-pressure maximal-value differences α[i] of all the six cylinders #1 to #6 are not smaller than 3. If a positive judgment is made at Step S300, the control goes to Step S302 to set 0×01 to the flag 'flag$_{crnk}$' indicating that the crank pulley 20 is fast by one tooth. Then, the CPU quits the present subroutine. On the other hand, if a negative judgment is made at Step S300, the control goes to Step S304 to judge whether the respective differences α[i] of all the cylinders #1 to #6 are not greater than −3. If a positive judgment is made at Step S304, the control goes to Step S306 to set 0×02 to the flag 'flag$_{crnk}$' indicating that the crank pulley 20 is slow by one tooth. Then, the CPU quits the subroutine. On the other hand, if a negative judgment is made at Step S304, the control directly quits the subroutine. The reason why the respective differences α[i] of all the cylinders #1 to #6 are compared with 3 or −3 at Step S300 or S304 is the same as that described for Step S106 of FIG. 25. However, here, not only the absolute values, but also the positive or negative signs, of the differences α[i] are utilized for finding the fast or slow state of the crank pulley 20. A negative judgment made at Step S304 indicates that the crank pulley 20 has normally been assembled into the engine 90, and the fault flag 'flag$_{crnk}$' remains 0×00. In this case only, a positive judgment is made at Step S204, and the control goes to Step S206. At Step S300 or S304, the CPU may take into account the detected changes of respective timings of occurrence of a certain pressure condition to the cylinders #1 to #6, for example, respective changes of the exhaust-pressure maximal-value-angle differences Γ of the cylinders #1 to #6.

Figure 30:
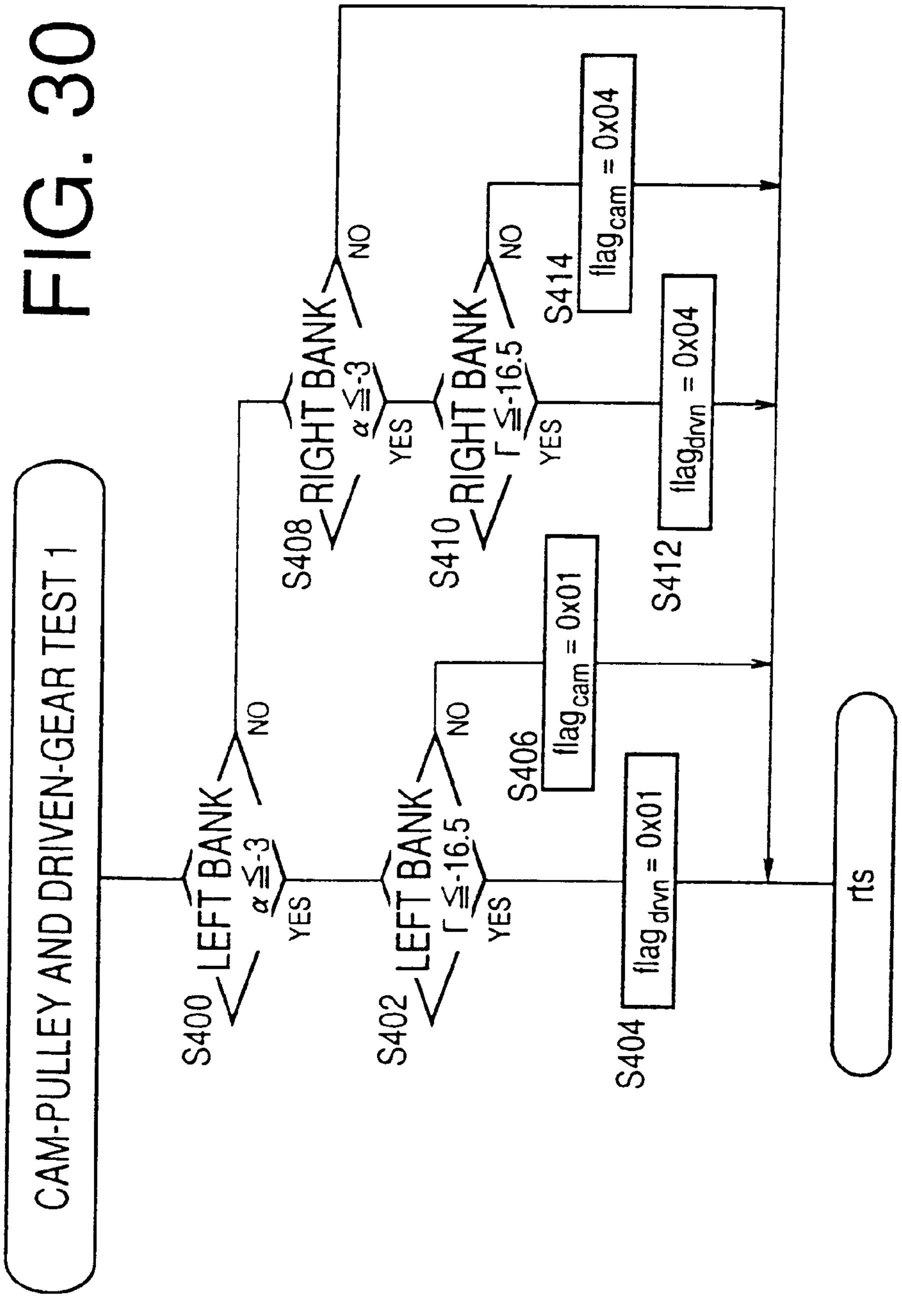
FIG. 30 is a flow chart representing a cam-pulley and driven-gear test 1 routine carried out at Step S206 of the flow chart of FIG. 27.

FIG. 30 is a flow chart representing the cam-pulley and driven-gear test 1 of Step S206 of FIG. 27. This subroutine is carried out for finding the one-tooth fast state of each of the cam pulleys 24, 26 and the driven gears 40, 42. First, at Step S400, the CPU of the fault finder 117 judges whether the respective differences α[i] of the cylinders #1 to #3 of the left bank are not greater than −3. If a positive judgment is made at Step S400, the control goes to Step S402 to judge whether the respective exhaust-pressure maximal-value-angle differences Γ of the cylinders #1 to #3 of the left bank are not greater than −16.5. If a positive judgment is made at Step S402, the control goes to Step S404 to set 0×01 to the flag 'flag$_{drvn}$' indicating that the left driven gear 40 is one-tooth fast. On the other hand, if a negative judgment is made at Step S402, the control goes to Step S406 to set 0×01 to the fault flag 'flag$_{cam}$' indicating that the left cam pulley 24 is one-tooth fast. Then, the CPU quits the present subroutine. The reason why the differences α[i] are compared with −3 at Step S400 or S408 is the same as that described for Steps S300 and S304 of FIG. 29. Step S402 is provided for judging which is one-tooth fast, the left cam pulley 24 or the left driven gear 40. The threshold value, −16.5, employed at Step S402 is the average of the corresponding two differences Γ, −15 and −18, shown in FIG. 24.

Likewise, other threshold values which are employed at other steps are so determined as to be able to specify the fault.

On the other hand, if a negative judgment is made at Step S400, the CPU carries out, for the right bank, Steps S408, S410, S412, and S414 corresponding to Steps S400 to S406 for the left bank, respectively. However, at Step S412, the CPU sets 0×04 to the flag '$flag_{drvn}$' indicating that the right driven gear 42 is one-tooth fast and, at Step S414 the CPU sets 0×04 to the flag '$flag_{cam}$' indicating that the right cam pulley 26 is one-tooth fast. On the other hand, if a negative judgment is made at Step S408, the control directly quits the subroutine. In the last case, a positive judgment is made at Step S208, and the control goes to Step S210.

Figure 31:
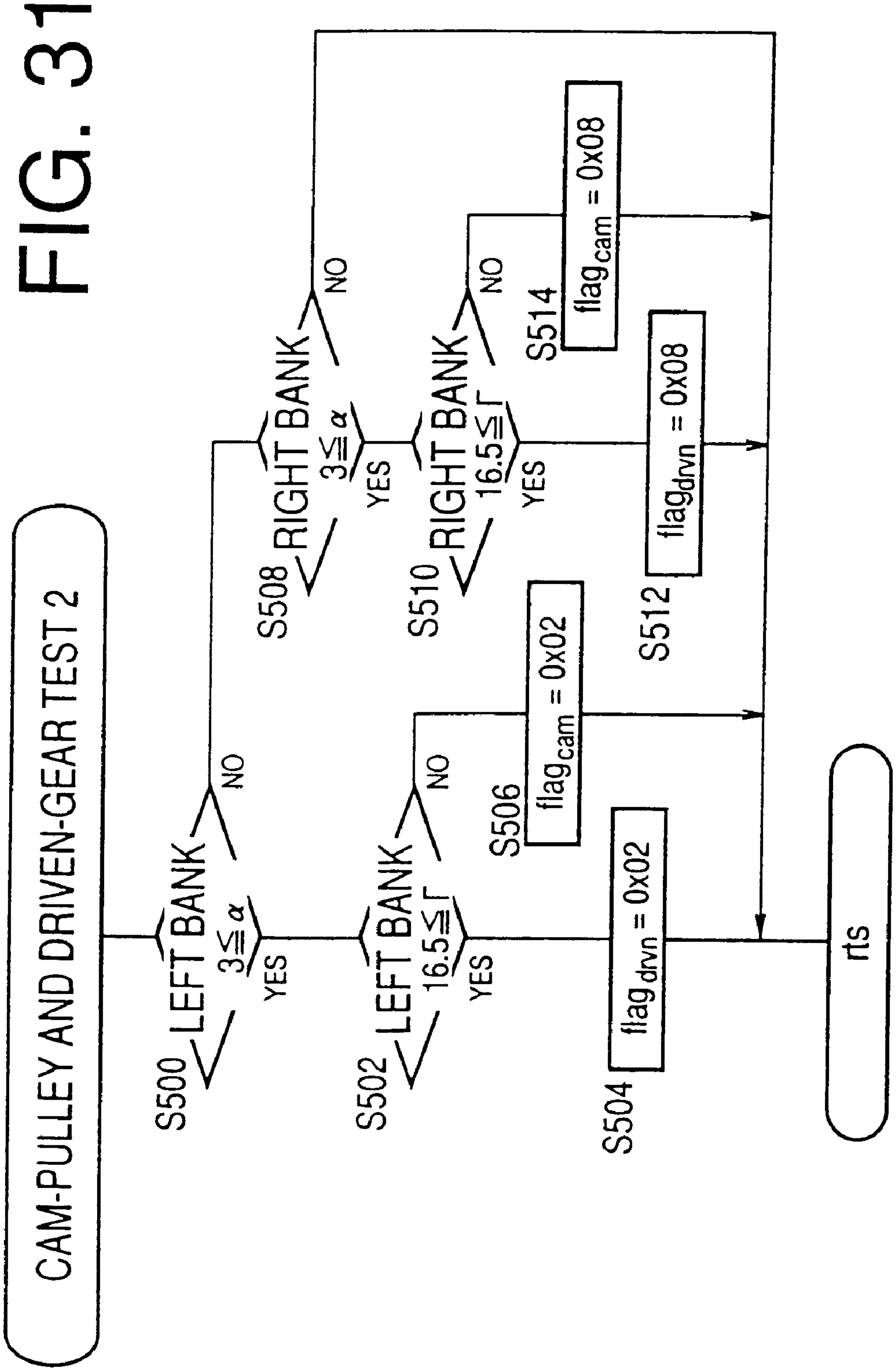
FIG. 31 is a flow chart representing a cam-pulley and driven-gear test 2 routine carried out at Step S210 of the flow chart of FIG. 27.

FIG. 31 is a flow chart representing the cam-pulley and driven-gear test 2 of Step S210 of FIG. 27. This subroutine is carried out for finding the one-tooth slow state of each of the cam pulleys 24, 26 and the driven gears 40, 42. First, at Step S500, the CPU of the fault finder 117 judges whether the respective differences α[i] of the cylinders #1 to #3 of the left bank are greater than 3. If a positive judgment is made at Step S500, the control goes to Step S502 to judge whether the respective differences Γ of the cylinders #1 to #3 of the left bank are greater than 16.5. If a positive judgment is made at Step S502, the control goes to Step S504 to set 0×02 to the flag '$flag_{drvn}$' indicating that the left driven gear 40 is one-tooth slow. On the other hand, if a negative judgment is made at Step S502, the control goes to Step S506 to set 0×02 to the flag '$flag_{cam}$' indicating that the left cam pulley 24 is one-tooth slow. Then, the CPU quits the subroutine. Step S502 is provided for judging which is one-tooth slow, the left cam pulley 24 or the left driven gear 40.

On the other hand, if a negative judgment is made at Step S500, the CPU carries out, for the right bank, Steps S508, S510, S512, and S514 corresponding to Steps S500 to S506 for the left bank, respectively. However, at Step S512, the CPU sets 0×08 to the flag '$flag_{drvn}$' indicating that the right driven gear 42 is one-tooth slow and, at Step S514 the CPU sets 0×08 to the flag '$flag_{cam}$' indicating that the right cam pulley 26 is one-tooth slow. On the other hand, if a negative judgment is made at Step S508, indicating that the cam pulleys 24, 26 and the driven gears 40, 42 have normally been assembled, the control directly quits the subroutine. In the last case, a positive judgment is made at Step S212, and the control goes to Step S214. The threshold values employed at Steps S500 and 508 are determined for the same reason as that described for those employed at Steps S400 and S408 of FIG. 30.

Although, in the tests 1, 2 shown in FIGS. 30 and 31, the fast or slow states of the cam pulleys 24, 26 and the driven gears 40, 42 are found based on the exhaust-pressure maximal-value angles Γ of the cylinders #1 to #6, they may be found based on the intake-pressure maximal-value angles Λ or the intake-pressure increase-start angles of the cylinders #1 to #6. Otherwise, they may be found based on two or more of those parameters Γ, Λ, Ψ. In the last case, the tests 1, 2 enjoy higher reliability. In addition, they may be found based on the exhaust-pressure constant-start angles Σ of the cylinders #1 to #6. In the last case, the threshold values employed at Steps S402, S410, S502, S510 are replaced with −12, −12, 8, and 8, respectively, and the less-than signs are replaced with greater-than signs, and visa-versa.

In the case where there is no possibility that any fault occurs to the assembling of the driven gears 40, 42, it is possible to omit, from the subroutines shown in FIGS. 30 and 31, the steps relating to the driven gears 40, 42, that is, Steps S404, S412, S504, and S512. In this case, a cam-pulley test may be carried out based on only the exhaust-pressure decrease-start angles Φ of the cylinders #1 to #6. For example, if all the exhaust-pressure decrease-start angles Φ of the three cylinders of each bank are smaller than −8, the CPU may set, in the flag '$flag_{cam}$', a value indicating that the cam pulley 24 or 26 of that bank is one-tooth fast and, if those are not smaller than −8, the CPU directly quits the subroutine. In addition, if all the angles Φ of the three cylinders of each bank are greater than 8, the CPU may set, in the flag '$flag_{cam}$', a value indicating that the cam pulley 24 or 26 of that bank is one-tooth slow and, if those are not greater than 8, the CPU directly quits the subroutine.

Figure 32:
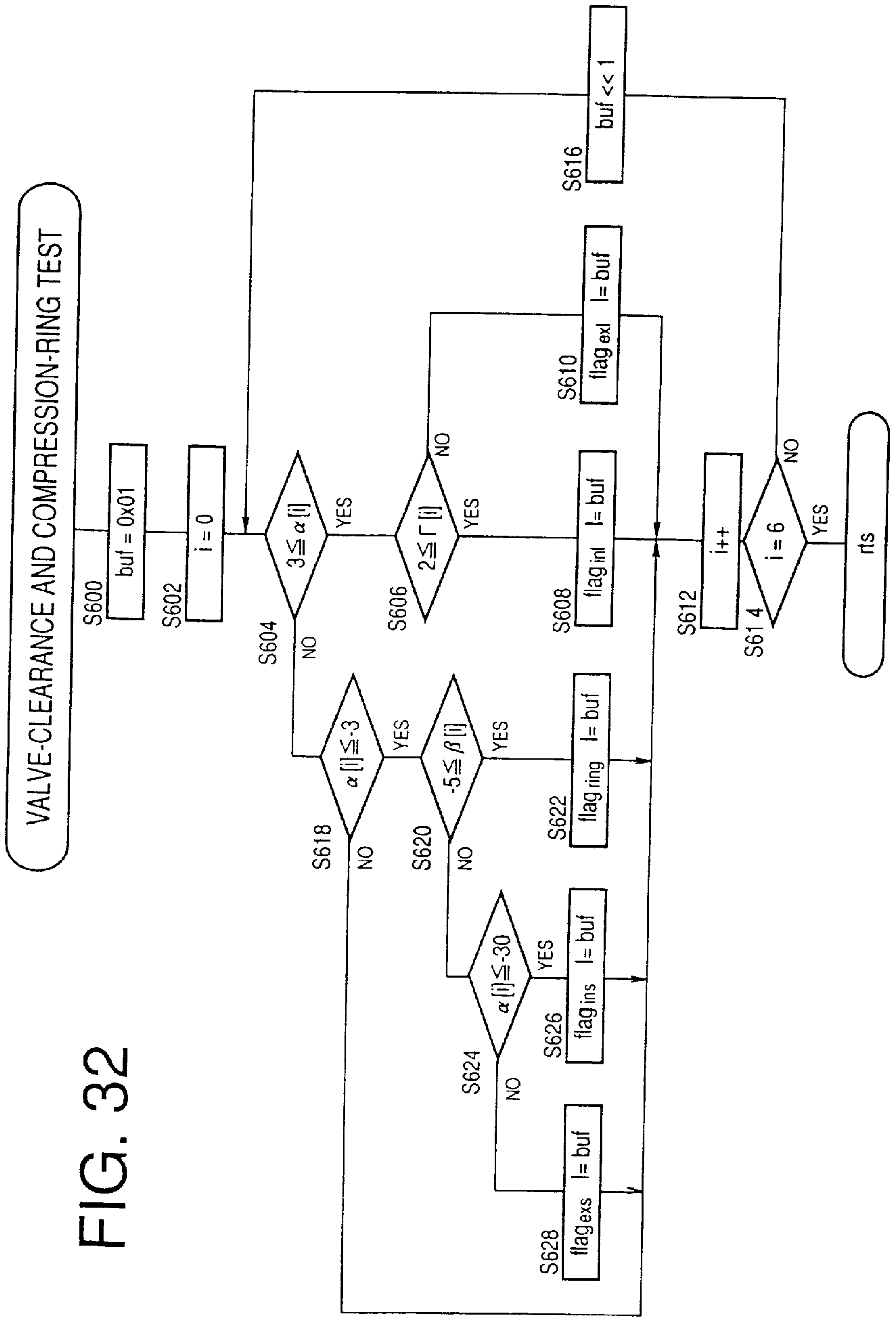
FIG. 32 is a flow chart representing a valve-clearance and compression-ring test routine carried out at Step S214 of the flow chart of FIG. 27.

FIG. 32 is a flow chart representing the valve-clearance and compression-ring test of Step S214 of FIG. 27. First, at Step S600, the CPU sets 0×01 to a variable 'buf' and, at Step S602, the CPU initializes the variable 'i' to 0 corresponding to the first piston or cylinder #1. Subsequently, at Step S604, the CPU judges whether the exhaust-pressure maximal-value difference α[i] of the current cylinder is not smaller than 3. If a positive judgment is made at Step S604, the control goes to Step S606 to judge whether the exhaust-pressure maximal-value-angle difference Γ[i] of the current cylinder is not smaller than 2. Only if a positive judgment is made at Step S604, the CPU makes a judgment that some fault has occurred to the engine 90. The reason why whether the difference Γ[i] of the current cylinder is not smaller than 2 is judged at Step S606 is that, as is apparent from FIG. 24, if the difference α[i] of the current cylinder is not smaller than 3, the difference Γ[i] of the current cylinder takes 5.4 in the case of a large intake-valve clearance, or 0 in the case of a large exhaust-valve clearance and that those two cases is distinguished from each other by comparing the difference Γ[i] with a value about the average of those two values, 5.4 and 0. If a positive judgment is made at Step S606, the control goes to Step S608 to set the logical sum of the flag '$flag_{inl}$' and the variable 'buf' to the flag '$flag_{inl}$'. Consequently one of the lower six bits of the flag '$flag_{inl}$' which corresponds to the current cylinder is changed to 1 indicating that a fault has occurred to the intake-valve clearance corresponding to the current cylinder. On the other hand, if a negative judgment is made at Step S606, the control goes to Step S610 to set the logical sum of the flag '$flag_{exl}$' and the variable 'buf' to the flag '$flag_{exl}$'.

Step S608 or S612 is followed by Step S612 to add 1 to the variable 'i' and subsequently by Step S614 to judge whether the variable 'i' is equal to 6. If a positive judgment is made at Step S614, the CPU quits the present subroutine. On the other hand, if a negative judgment is made at Step S614, the control goes to Step S616 to change, in the variable 'buf', the bit currently having 1, to 0 and change the next, higher bit currently having 0, to 1, so that the number currently indicated by the variable 'i' coincides with the number (FIG. 28) assigned to the bit newly changed to 1. Subsequently, the control goes back to Step S604. Thus, the provision of Step S616 ensures that at Step S608 or Step 610 one of the lower six bits of the flag '$flag_{inl}$' or '$flag_{exl}$' which corresponds to the current cylinder is changed to 1 indicating that a fault has occurred to the intake-valve or exhaust-valve clearance corresponding to the current cylinder.

On the other hand, if a negative judgment is made at Step S604, the control goes to Step S618 to judge whether the difference α[i] of the current cylinder is not greater than −3. If a negative judgment is made at Step S618, the control goes to Step S612. On the other hand, if a positive judgment is made at Step S618, the control goes to Step S620 to judge whether the exhaust-pressure constant-value difference β[i] of the current cylinder is not smaller than −5. The reason why whether the difference β[i] of the current cylinder is not smaller than −5 is judged at Step S620 is that, as is apparent from FIG. 24, if the difference α[i] of the current cylinder is not greater than −3, the difference β[i] of the current cylinder takes −16 in the case of a small intake-valve clearance, −10 in the case of a small exhaust-valve clearance, or −1 in the case of a compression-ring missing and that the compression-ring missing is distinguished from the other two cases by comparing the difference β[i] with a value about the average of the two values, −10 and −1. If a positive judgment is made at Step S620, the control goes to Step S622 to set the logical sum of the flag '$flag_{ring}$' and the variable 'buf' to the flag "$flag_{ring}$". Subsequently, the control goes to Step S612. On the other hand, if a negative judgment is made at Step S620, the control goes to Step S624 to judge whether the difference α[i] of the current cylinder is not greater than −30. If a positive judgment is made at Step S624, the control goes to Step S626 to set the logical sum of the flag '$flag_{ins}$' and the variable 'buf' to the flag '$flag_{ins}$'. On the other hand, if a negative judgment is made at Step S624, the control goes to Step S628 to set the logical sum of the flag '$flag_{exs}$' and the variable 'buf' to the flag '$flag_{exs}$'. Subsequently, the control goes to Step S612. The reason why whether the difference α[i] of the current cylinder is not greater than −30 is judged at Step S624 is that, as is apparent from FIG. 24, if the difference β[i] of the current cylinder is smaller than −5, the difference α[i] of the current cylinder takes −47 in the case of a small intake-valve clearance, or −8 in the case of a small exhaust-valve clearance and that those two cases is distinguished from each other by comparing the difference α[i] with a value about the average of the two values, −47 and −8. At Step S624, the test may be carried out based on the difference β[i] in place of the difference α[i], in particular in the case where there is no possibility that any compression-ring missing occurs. In this case, however, the threshold value, −30, employed at Step S624 is replaced by, e.g., −13 which is the average of −16 and −10.

In the case where it is only required to judge whether the intake-valve clearance is correct, the CPU can make a judgment based on only the exhaust-pressure maximal-value-angle difference Γ[i] of the current cylinder. For example, if the difference Γ[i] is greater than 2 which is about the average of 5.4 and 0, the CPU finds a large intake-valve clearance and, if the difference Γ[i] is smaller than −3 which is about the average of −6.4 and 0, the CPU finds a small intake-valve clearance. In this case, the difference Γ[i] may be replaced by the intake-pressure maximal-value-angle difference Λ or the intake-pressure increase-start-angle difference Ψ. In the case where the intake- or exhaust-valve clearance may continuously change, the difference α[i] or Γ[i] may also change continuously. Meanwhile, in the case where the intake- or exhaust-valve clearance may stepwise change, the difference α[i] or Γ[i] may also change stepwise. Therefore, it is preferred to change the criteria employed in the above-described fault finding tests, depending upon which is the case with the engine 90 to be tested.

Next, there will be described a second embodiment of the present invention. The second embodiment is different from the above-described first embodiment in that the fault specifying subroutine of FIG. 27 (i.e., Step S118 of FIG. 25) employed in the first embodiment is replaced by a different fault specifying subroutine employed in the second embodiment. The different subroutine is represented by the flow chart of FIG. 33. The engine testing apparatus of FIG. 4 employed in the first embodiment is also employed in the second embodiment.

In the first embodiment, it has been assumed that only a single assembling fault, if any, occurs to an assembled engine. In contrast, in the second embodiment, if a plurality of assembling faults simultaneously occur, at least two of the plurality of faults can be found. The flow chart of FIG. 33 includes Step S700 that is the same as Step S200 of FIG. 27. Step S700 is followed by Step S702, i.e., first test 1 as a subroutine and subsequently by Steps S704 and S706, i.e., second and third tests 2, 3 as subroutines. Step S706 is followed by Step S708 that is the same as Step S120 of FIG. 25. Hereinafter, the first to third tests 1, 2, 3 will be described below.

Figure 33:
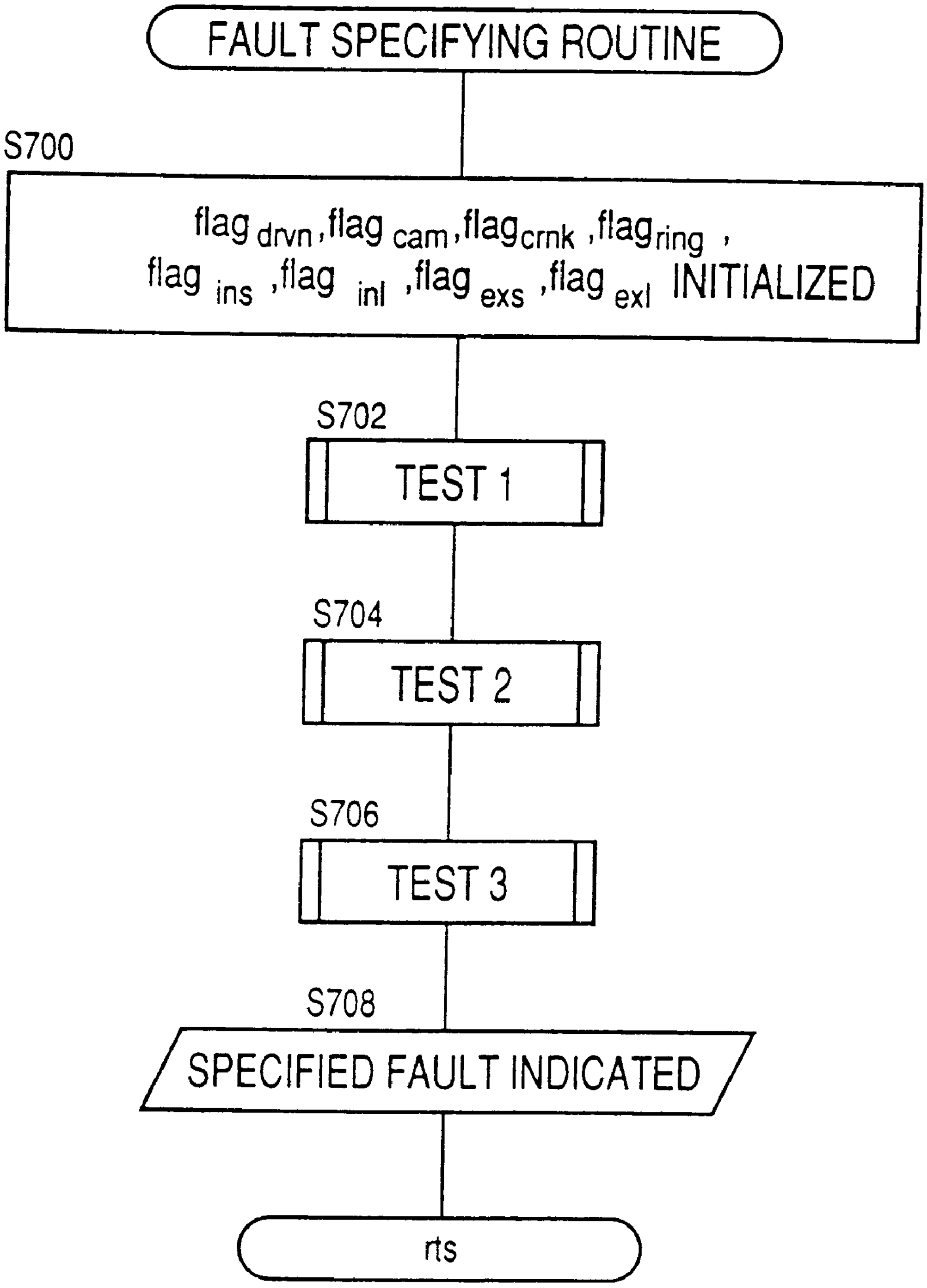
FIG. 33 is a flow chart representing another fault specifying routine which is carried out at Step S118 of the flow chart of FIG. 25, in place of the routine represented by the flow chart of FIG. 27, in another engine testing method as a second embodiment of the invention.
Figure 34:
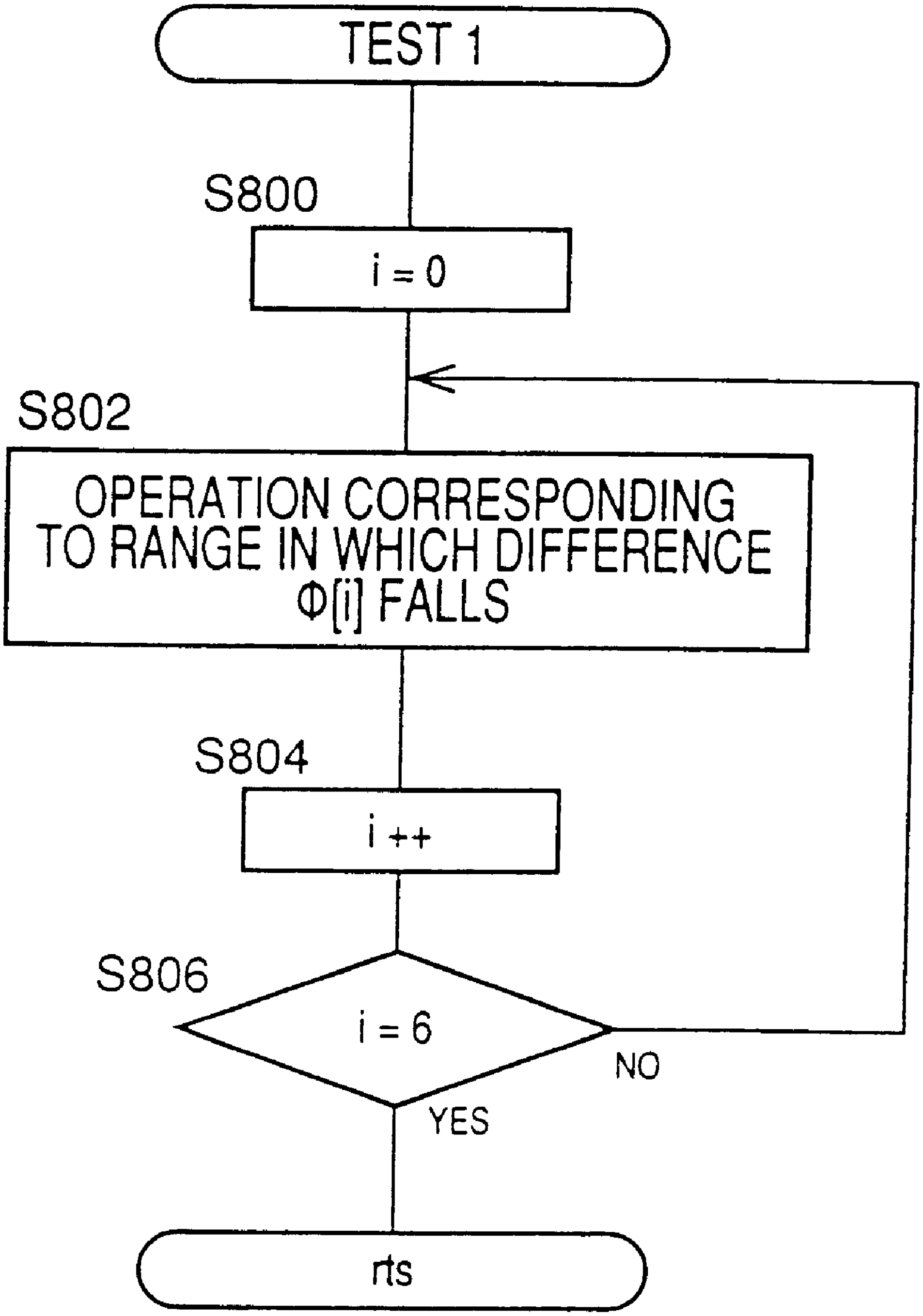
FIG. 34 is a flow chart representing a test 1 routine carried out at Step S700 of the flow chart of FIG. 33.
Figure 40:
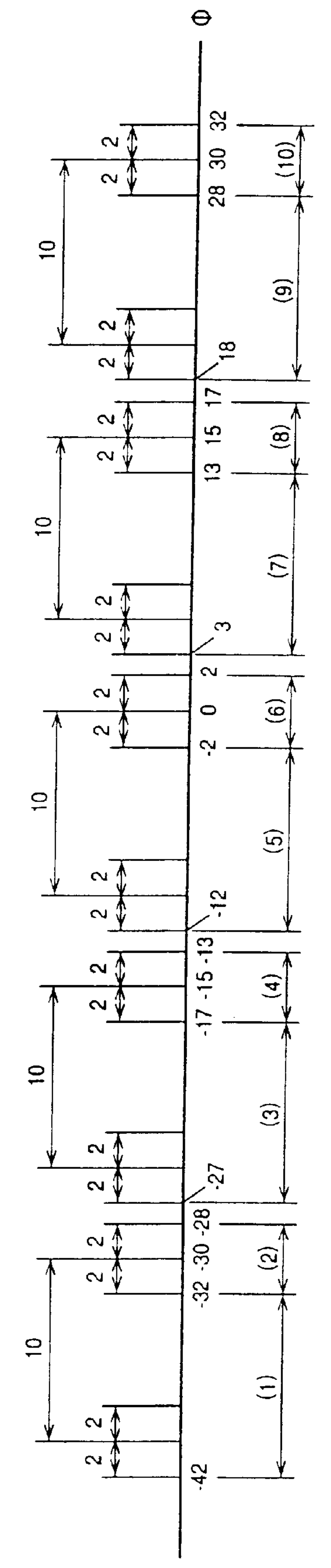
FIG. 40 is a graph showing the ranges of the exhaust-pressure decrease-start-angle difference Φ employed at Step S802 of the flow chart of FIG. 34.

FIG. 34 is a flow chart representing the first test 1 of Step S702 of FIG. 33. First, at Step S800, the CPU of the fault finder 117 sets, in the variable 'i', an initial value, 0, corresponding to the first piston or cylinder #1. Step S800 is followed by Step S802 to identify one of the following eleven ranges (1) through (11) in which the exhaust-pressure decrease-start-angle difference Φ[i] of the current cylinder falls:

Range (1): $-42 \leqq \Phi[i] < -32$
Range (2): $-32 \leqq \Phi[i] < -28$
Range (3): $-27 \leqq \Phi[i] < -17$
Range (4): $-17 \leqq \Phi[i] < -13$
Range (5): $-12 \leqq \Phi[i] < -2$
Range (6): $-2 < \Phi[i] < 2$
Range (7): $3 \leqq \Phi[i] < 13$
Range (8): $13 \leqq \Phi[i] < 17$
Range (9): $18 \leqq \Phi[i] < 28$
Range (10): $28 \leqq \Phi[i] < 32$
Range (11): $\Phi[i] < -42$ or $32 < \Phi[i]$ The reason why Step S802 is provided is that as is apparent from FIG. 24, the difference 4 is produced only when the fast or slow state of the crank pulley 20, the left cam pulley 24, or the right cam pulley 26, or the small exhaust-valve clearance occurs. When the crank pulley 20 is one-tooth fast, normal, or one-tooth slow, the difference Φ stepwise changes to 15, 0, or −15, respectively. Likewise, when the left or right cam pulley 24, 26 is one-tooth fast, normal, or one-tooth slow, the difference Φ stepwise changes to 15, 0, or −15, respectively. In the present embodiment, the fault finder 117 judges, if the difference Φ of one cylinder falls in the range of −2 to 2, that the exhaust-valve clearance corresponding to the cylinder is normal. Therefore, even if the exhaust-valve clearance of one cylinder is judged as normal, the difference Φ of the cylinder may not be equal to 0 but may take any value within the range of −2 to 2. In addition, the difference Φ of each cylinder cannot take a value smaller than −10, even if the exhaust-valve clearance of the cylinder is very small. FIG. 40 shows the ten ranges (1) to (10) of the difference 4 that are determined by taking the above-indicated facts into account. The ten ranges (1) to (10) are defined by the following fifteen border values: −30−(10+2), −30±2, −15−(10+2), −15±2, −(10+2), 0±2, 15−(10+2), 15±2, 30−(10+2), and 30±2. Each of the above eleven ranges (1) to (11) corresponds to the following faults of the crank pulley 20, one of the two crank pulleys 24, 26 which corresponds to the current cylinder, and the exhaust-valve clearance of the current cylinder:

Range (1): crank pulley 20 one-tooth slow, and cam pulley 24 or 26 one-tooth fast, and exhaust-valve clearance small
Range (2): crank pulley 20 one-tooth slow, and cam pulley 24 or 26 one-tooth fast, and exhaust-valve clearance normal Range (3): crank pulley 20 one-tooth slow, and cam pulley 24 or 26 normal, and exhaust-valve clearance small, or crank pulley 20 normal, and cam pulley 24 or 26 one-tooth fast, and exhaust-valve clearance small Range (4): crank pulley 20 one-tooth slow, and cam pulley 24 or 26 normal, and exhaust-valve clearance normal, or crank pulley 20 normal, and cam pulley 24 or 26 one-tooth fast, and exhaust-valve clearance normal Range (5): crank pulley 20 normal, and cam pulley 24 or 26 normal, and exhaust-valve clearance small, or crank pulley 20 one-tooth fast, and cam pulley 24 or 26 one-tooth fast, and exhaust-valve clearance small, or crank pulley 20 one-tooth slow, and cam pulley 24 or 26 one-tooth slow, and exhaust-valve clearance small Range (6): crank pulley 20 normal, and cam pulley 24 or 26 normal, and exhaust-valve clearance normal, or crank pulley 20 one-tooth fast, and cam pulley 24 or 26 one-tooth fast, and exhaust-valve clearance normal, or crank pulley 20 one-tooth slow, and cam pulley 24 or 26 one-tooth slow, and exhaust-valve clearance normal Range (7): crank pulley 20 one-tooth fast, and cam pulley 24 or 26 normal, and exhaust-valve clearance small, or crank pulley 20 normal, and cam pulley 24 or 26 one-tooth slow, and exhaust-valve clearance small Range (8): crank pulley 20 one-tooth fast, and cam pulley 24 or 26 normal, and exhaust-valve clearance normal, or crank pulley 20 normal, and cam pulley 24 or 26 one-tooth slow, and exhaust-valve clearance normal Range (9): crank pulley 20 one-tooth fast, and cam pulley 24 or 26 one-tooth slow, and exhaust-valve clearance small Range (10): crank pulley 20 one-tooth fast, and cam pulley 24 or 26 one-tooth slow, and exhaust-valve clearance normal Range (11): error The ranges (1) to (10) are obtained by combining the changes of the difference 4 due to the assembling faults with the crank pulley 20 and either one of the two cam pulleys 24, 26 and the changes of the difference Φ due to the assembling faults with the exhaust-valve clearance. As is apparent from FIG. 40, the difference Φ is influenced by the faults with the exhaust-valve clearance independent of the faults with the crank pulley 20 and the cam pulleys 24, 26.

The crank pulley 20 assembled into the engine 90 can take either one of the three states, i.e., normal, fast, and slow states, and likewise the left or right cam pulley 24, 26 assembled into the engine 90 can take either one of the three states, i.e., normal, fast, and slow states. Therefore, there are nine possible combinations. Since the exhaust valve clearance can take either one of the two states, i.e., normal and small states, there are eighteen possible combinations. However, since the difference Φ is similarly influenced by two or more different combinations of the respective states of the crank pulley 20 and the cam pulley 24, 26, only the above-indicated ten ranges (1) to (10) (except for the eleventh range (11)) are distinguished from one another. That is, there are some cases where the respective states of the crank pulley 20 and the cam pulley 24, 26 cannot be specified based on only the test 1 using the difference Φ. More specifically described, each of the ranges (3), (4), (7), and (8) corresponds to two different combinations of the respective states of the crank pulley 20 and the cam pulley 24, 26, and each of the ranges (5) and (6) corresponds to three different combinations.

However, since the engine 90 has the left and right cam pulleys 24, 26 corresponding to the left and right banks, respectively, there are 27 possible combinations of the respective states of the crank pulley 20 and the two cam pulleys 24, 26. As is described below, each of 12 state combinations out of the 27 state combinations corresponds to a single combination of the respective differences Φ corresponding to the left and right banks that is different from the other difference combinations corresponding to the other state combinations. Thus, each of the 12 state combinations can be specified or identified from the other state combinations. Moreover, since the exhaust-valve clearance can take either one of the two states (i.e., normal and small states), there are 54 possible state combinations (obtained by multiplying 27 by 2). Since the two states of the exhaust-valve clearance can be specified independent of the respective states of the three pulleys 20, 24, 26, twenty four combinations out of the 54 combinations can be specified based on only the first test 1 using the difference Φ.

More specifically described, in the case where only th respective states of the crank pulley 20 and the left and right cam pulleys 24, 26 are taken into account, the difference Θ takes a first value of 0,15, or −15 when the crank pulley 20 is normal, one-tooth fast, or one-tooth slow, respectively, and likewise the difference Θ takes a second value of 0, −15, or 15 when the left or right cam pulley 24, 26 is normal, one-tooth fast, or one-tooth slow, respectively. Addition of the first and second values provides 20 different combinations of the respective differences Θ corresponding to the left and right banks. The difference Θ corresponding to each of the left an right banks can take 5 different values, i.e., 0, +15, and +30. Accordingly, theoretically, there are 25 possible combinations of the two differences Θ corresponding to the two banks. However, the difference (absolute value) of the two differences Θ corresponding to the two banks cannot be greater than 30. Therefore, actually, the 27 different combinations of the respective states of the three pulleys 20, 24, 26 correspond to the 20 different combinations of the respective differences Θ corresponding to the two banks. The above-indicated 12 state combinations each of which can be specified from the other combinations of the 27 state combinations are as follows (a left value corresponds to the left bank, and a right value corresponds to the right bank) (0, −30), (0, 30), (−15, 30), (−15, 15), (−30, 0), (−30, −15), (−30, −30), (15, −15), (15, 30,(30, 0), (30,15), and (30, −30). For example, the difference combination (0, −30) corresponds to only the state combination of the crank pulley 20 to one-tooth slow, the left am pulley 24 one-tooth slow, and the right cam pulley 26 one-tooth fast.

However, each of the six difference combinations (0, −15), (0, 15), (−15, 0), (−15, −15), (15, 0), and (15, 15) corresponds to two state combinations. For example, the difference combination (0, −15) corresponds to (1) the state combination of the crank pulley 20 normal, the left cam pulley 24 normal, and the right cam pulley 26 one-tooth fast and (2) the state combination of the crank pulley 20 one-tooth slow, the left cam pulley 24 one-tooth slow, and the right cam pulley 26 normal. The difference combination (0, 0) corresponds to three state combinations (described later). Thus, the 12 state combinations can be specified from the other 15 state combinations (15=6×2+3×1) that cannot be specified. However, each of the above-indicated six difference combinations can be limited to the corresponding two state combinations, and the difference combination (0, 0) can be limited to the corresponding three state combinations. Thus, such information is very useful for the actual engine testing and the subsequent correction of the fault or faults.

Since the two states of the exhaust-valve clearance can be specified independent of the fast and slow states of the three pulleys 20, 24, 26, the 24 state combinations can be specified from the other combinations of the 54 combinations in total.

In actual engine tests, the difference combination (0, 0) occurs most frequency, because it corresponds to the combination of the respective normal states of the crank and cam pulleys 20, 24, 26. However, the combination (0, 0) also corresponds to the combination of the one-tooth fast state of the crank pulley 20 and the one-tooth slow state of each of the left and right cam pulleys 24, 26 (i.e., (15+(−15), 15+(−15))=(0, 0)) and the combination of the one-tooth slow state of the crank pulley 20 and the one-tooth fast state of each of the left and right cam pulleys 24, 26 (i.e., (−15+15, −15+15)=(0, 0)). Thus, a person might conclude that there are some cases where abnormal engines cannot be identified from normal engines based on only the first test 1 using the difference (. However, in fact, the combination of the respective one-tooth fast states of the three pulleys 20, 24, 26, and the combination of the respective one-tooth slow states of the three pulleys 20, 24, 26 are technically the same as the state in which the three pulleys 20, 24, 26 are normal and only the timing belt 22 is one-tooth slow or fast. Therefore, those state combinations do not adversely affect the operation of the engine 90.

Each of the state combinations corresponding to the difference combination (0, 0) may be judged as being indicative of a normal engine, depending upon whether a similar test is carried out on the engine 90 or not when it is partially taken apart and then re-assembled. For example, when one of the two cam pulleys 24, 26 is replaced with a new one in the case where the three pulleys 20, 24, 26 are one-tooth fast, the new cam pulley will be normal but then the engine 90 as a whole will have faults with the crank pulley and the other cam pulley. Thus, a person might not consider it appropriate to judge each of the state combinations corresponding to the difference combination (0, 0) as being indicative of a normal engine. However, if the invention engine test is carried out again on the engine 90 after it is partially taken apart and re-assembled, or an easier test is carried out on a specific section of the engine 90 which is actually taken apart and re-assembled and on a section or sections which is or are closely related to the specific section, such faults as indicated above can be avoided. Therefore, in the present embodiment, all the state combinations corresponding to the difference combination (0, 0) are judged as being indicative of a normal engine.

If, at Step S802, the CPU identifies that the difference Θ falls in the sixth range (6), it judges that the three pulleys 20, 24, 26 are normal and the exhaust-valve clearance is normal. Therefore, the CPU does not make any additional judgments and quits the step. On the other hand, if the difference Θ falls in the first range (1), the CPU sets, in the flag '$flag_{crnk}$', 0×02 indicating that the crank pulley 0 is one-tooth slow, sets, in the flag '$flag_{cam}$', a value indicating that the left or right cam pulley 24, 26 is one-tooth fast (i.e., sets the logical sum of 0×01 and the current value of the flag for the left cam pulley 24, or sets the logical sum of 0×04 and the current value of the flag for the right cam pulley 26), and sets I to one of the bits of the flag '$flag_{exs}$' which corresponds to the current content of the variable 'i'. Meanwhile, if the difference Θ falls in the second range (2), the CPU performs the same operation as that performed in the case where the difference Θ in the first range (1), except for changing the content of the flag '$flag_{exs}$'. In the case where the difference Θ falls in each of the third to tenth ranges (3) to (10), the CPU changes the respective contents of the corresponding fault flags. In the case where the difference Θ falls in the eleventh range (II), the CPU sets 1 to the highest bit of each of the flags '$flag_{crnk}$', '$flag_{cam}$', and '$flag_{exs}$', thereby indicating that an error may have occurred. Based on the values 1 set in the respective highest bits of those flags, the CPU may command the display 118 to indicate a message requesting an operator to check the present engine testing apparatus. In the present embodiment, in the case where the difference Θ falls in the eleventh range (11), the CPU stops the current engine testing operation and does not carry out any further steps for the testing operation. Step S802 is followed by Step 5804 to add 1 to the variable 'i', and subsequently by Step S806 to judge whether the content of the variable 'i' is equal to 6. If a positive judgment is made at Step S806, the control of th CPU quits the test 1. On the other hand, if a negative judgment is made, the control goes back to Step S802. In the test 1, whether the exhaust-valve clearance of each cylinder #1 to #6 is small or not can be judged clearly independent of the presence or absence of other possible faults. In addition, there are some cases where the presence or absence of the fault with the assembling of each of the crank pulley 20 and the cam pulley 24, 26 can be identified. Based on the results obtained from the test 1, the CPU can judge whether the operation of the engine 90 is adversely influenced by the small exhaust valve clearance and/or the inappropriate assembling of the three pulleys 20, 24, 26.

Figure 35:
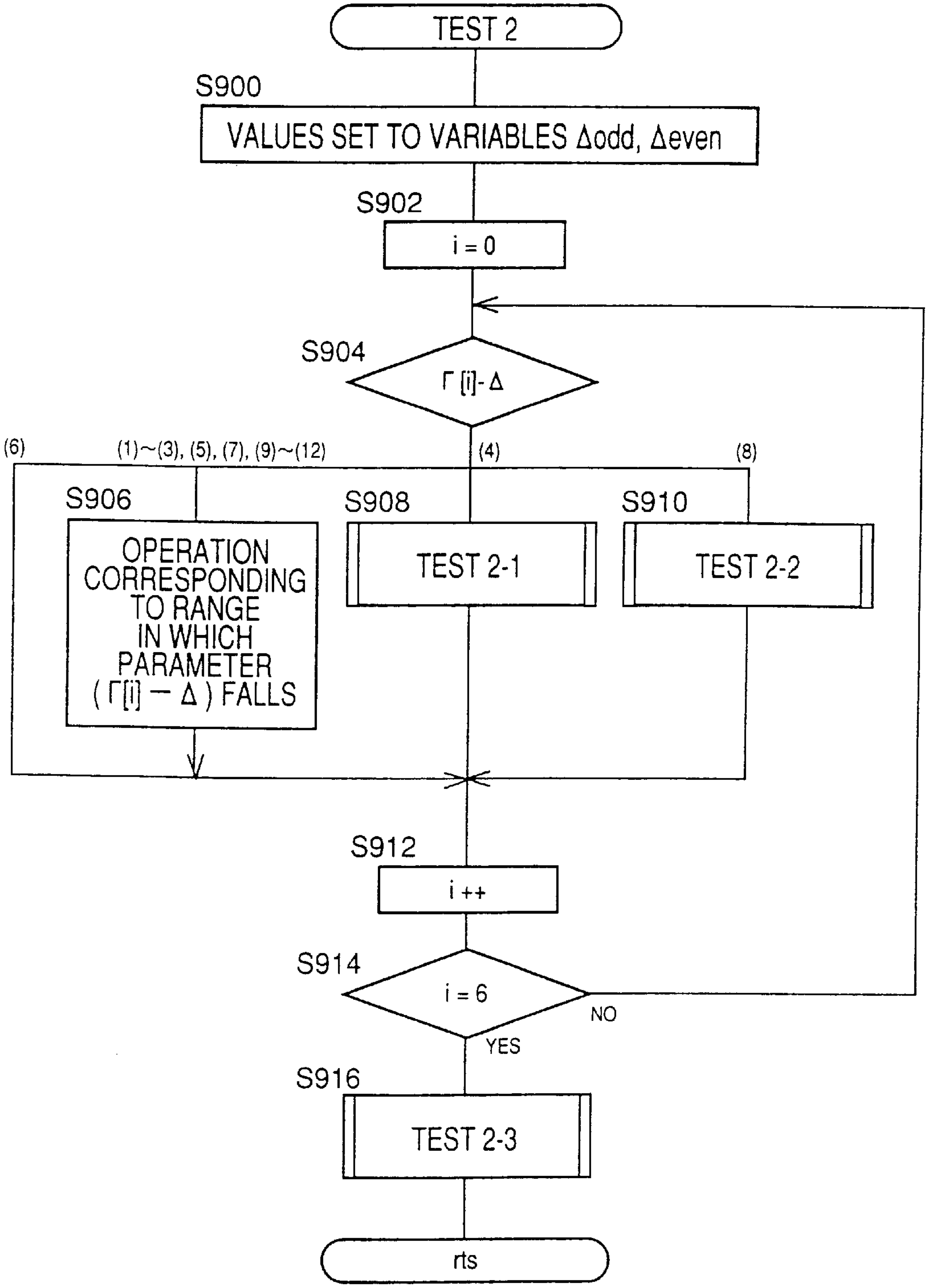
FIG. 35 is a flow chart representing a test 2 routine carried out at Step S702 of the flow chart of FIG. 33.
Figure 41:
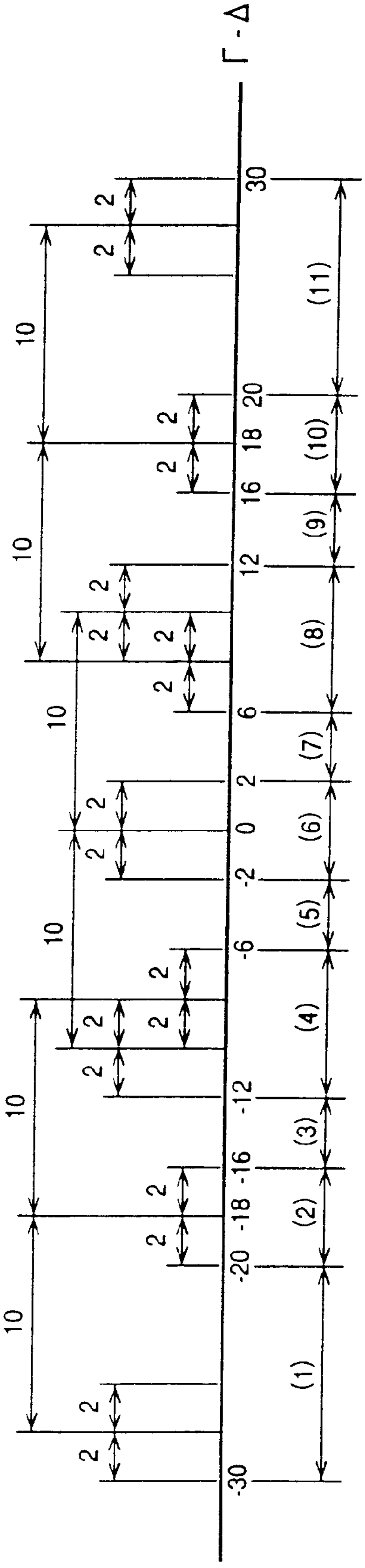
FIG. 41 is a graph showing the ranges of the exhaust-pressure maximal-value-angle difference Γ employed at Step S904 of the flow chart of FIG. 35.

FIG. 35 is a flow chart representing the test 2 called at Step S704 of FIG. 33. First, at Step S900, the CPU sets values in variables, $\Delta_{odd}$ and $\Delta_{even}$, respectively, based on the values obtained from the test 1 of FIG. 34. More specifically described, the CPU sets −30, −15, 0, 15, or 30 in the variable A odd when the exhaust-pressure decrease-start-angle difference (measured for the odd-numbered cylinders #1, #3, #5 of the left bank falls in the range (1) or (2), in the range (3) or (4), in the range (5) or (6), in the range (7) or (8), and in the range (9) or (10), respectively. Similarly, the CPU sets an appropriate value in the variable $\Delta_{even}$. Step S900 is followed by Step S902 to initialize the variable 'i' to i=0, and subsequently by Step S904 to set, in a variable Δ, the value set in one of the variables $\Delta_{odd}$ and $\Delta_{even}$ which corresponds to one of the two banks to which the current cylinder corresponding to the variable 'i' belongs. In addition, the CPU judges in which one of the following ranges (1) to (12) the value, Γ[i]−Δ, falls (Γ[i] is the exhaust-pressure maximal-value-angle difference of the current cylinder):

Range (1): $-30 \leqq \Gamma[i]-\Delta < -20$
Range (2): $-20 \leqq \Gamma[i]-\Delta < -16$
Range (3): $-16 \leqq \Gamma[i]-\Delta < -12$
Range (4): $-12 \leqq \Gamma[i]-\Delta < -6$
Range (5): $-6 \leqq \Gamma[i]-\Delta < -2$
Range (6): $-2 \leqq \Gamma[i]-\Delta < 2$
Range (7): $2 \leqq \Gamma[i]-\Delta < 6$
Range (8): $6 \leqq \Gamma[i]-\Delta < 12$
Range (9): $12 \leqq \Gamma[i]-\Delta < 16$
Range (10): $16 \leqq \Gamma[i]-\Delta < 20$
Range (11): $20 \leqq \Gamma[i]-\Delta < 30$
Range (12): $\Gamma[i]-\Delta < -30$ or $30 \leqq \Gamma[i]-\Delta$ The reason why Step S904 is provided is that as is apparent from FIG. 24, the difference Γ is produced only when the fast or slow state of the driven gear 40, 42 or the large or small intake-valve clearance occurs, except for when the fast or slow state of the crank pulley 20, the left cam pulley 24, or the right cam pulley 26 occurs. Since the difference Γ represents the sum of the respective influences of the faults with the three pulleys 20, 24, 26, the fault with the driven gear 40, 42, and the fault with the intake-valve clearance, the parameter, Γ−Δ, is free from the influences of the faults with the three pulleys 20, 24, 26. The above-indicated eleven ranges (1) to (11) are determined based on the actual values of parameter (Γ−Δ) when the fault with the driven gear 40, 42 and/or the fault with the intake-valve clearance occur or occurs. When the driven gear 40, 42 is one-tooth fast, normal, or one-tooth slow, the difference Γ stepwise changes to −18, 0, or 18, respectively. In the present embodiment, the fault finder 117 judges, if the difference Γ[i] of one cylinder falls in the range of −2 to 2, that the intake-valve clearance corresponding to the cylinder is normal. Therefore, even if the intake-valve clearance of one cylinder is judged as normal, the difference Γ[i] of the cylinder may not be equal to 0 but may take any value within the range of −2 to 2. In addition, the difference Γ[i] of each cylinder cannot take a value smaller than −10 or greater than 10, even if the intake-valve clearance of the cylinder is very small or very great. FIG. 41 shows the eleven ranges (1) to (11) of the parameter (Γ−Δ) that are determined by taking the above-indicated facts into account. The eleven ranges (1) to (11) are defined by the following twelve border values: −18±(10+2), −18±2, 0±(10+2), 0±2, 18±(10+2), and 18±2. Each of the above twelve ranges (1) to (12) corresponds to the following faults of one of the two driven gears 40, 42 which corresponds to the current cylinder, and the intake-valve clearance of the current cylinder:

Range (1): driven gear 40 or 42 one-tooth fast, and intake-valve clearance small Range (2): driven gear 40 or 42 one-tooth fast, and intake-valve clearance normal Range (3): driven gear 40 or 42 one-tooth fast, and intake-valve clearance large Range (4): not specified Range (5): driven gear 40 or 42 normal, and intake-valve clearance small Range (6): driven gear 40 or 42 normal, and intake-valve clearance normal Range (7): driven gear 40 or 42 normal, and intake-valve clearance large Range (8): not specified Range (9): driven gear 40 or 42 one-tooth slow, and intake-valve clearance small Range (10): driven gear 40 or 42 one-tooth slow, and intake-valve clearance normal Range (11): driven gear 40 or 42 one-tooth slow, and intake-valve clearance large Range (12): error In the case where the difference Γ[i] falls in the sixth range (6), the control of the CPU directly goes to Step S912. In the case where the difference Γ[i] falls in one of the ranges (1) to (3), (5), (7), and (9) to (12), the control goes to Step S906. For example, if the difference Γ[i] falls in the first range (1), the CPU sets, in the flag 'flag$_{drvn}$', a value indicating that one of the driven gears 40, 42 which corresponds to the current cylinder is one-tooth fast, and sets, in the flag 'flag$_{ins}$', a value indicating that the intake-valve clearance corresponding to the current cylinder is small. More specifically described, in the case where the variable 'i' is i=0, the CPU sets the logical sum of 0×04 and the current value of the flag 'flag$_{drvn}$' in the flag 'flag$_{drvn}$' and sets the logical sum of 0×01 and the current value of the flag 'flag$_{ins}$', in the flag 'flag$_{ins}$'. If the difference Γ[i] falls in each of the other ranges (2), (3), (5), (7), and (9) to (11), the CPU changes the respective contents of the corresponding fault flags. If the difference Γ[i] falls in the range (12), the CPU performs the same operation as that performed when the exhaust-pressure decrease-start-angle difference Φ[i] falls in the range (11) shown in FIG. 40, and stops the current engine testing operation.

If the difference Γ[i] falls in the fourth range (4), the control of the CPU goes to Step S908, i.e., test 2-1 as a subroutine. If the difference Γ[i] falls in the eighth range (8), the control goes to Step S910, i.e., test 2-2 as a subroutine. Step S906, S908, or S910 is followed by Step S912 to add 1 to the variable 'i' and subsequently by Step S914 to judge whether the variable 'i' is equal to 6. If a positive judgment is made at Step S806, the control of the CPU goes to Step S916 and then quits the test 2. On the other hand, if a negative judgment is made, the control goes back to Step S904. In the test 2, whether the assembling of the driven gears 40, 42 is normal or not and whether the intake-valve clearance of each cylinder #1 to #6 is normal or not can be judged clearly independent of the presence or absence of other possible faults, except for the case where the difference Γ[i] falls in the twelfth range (12). However, in the case where the difference r[i) falls in the eighth range (8), the faults with the driven gears 40, 42 and the intake-valve clearance may not be identified from other possible faults, as will be described later.

Figure 36:
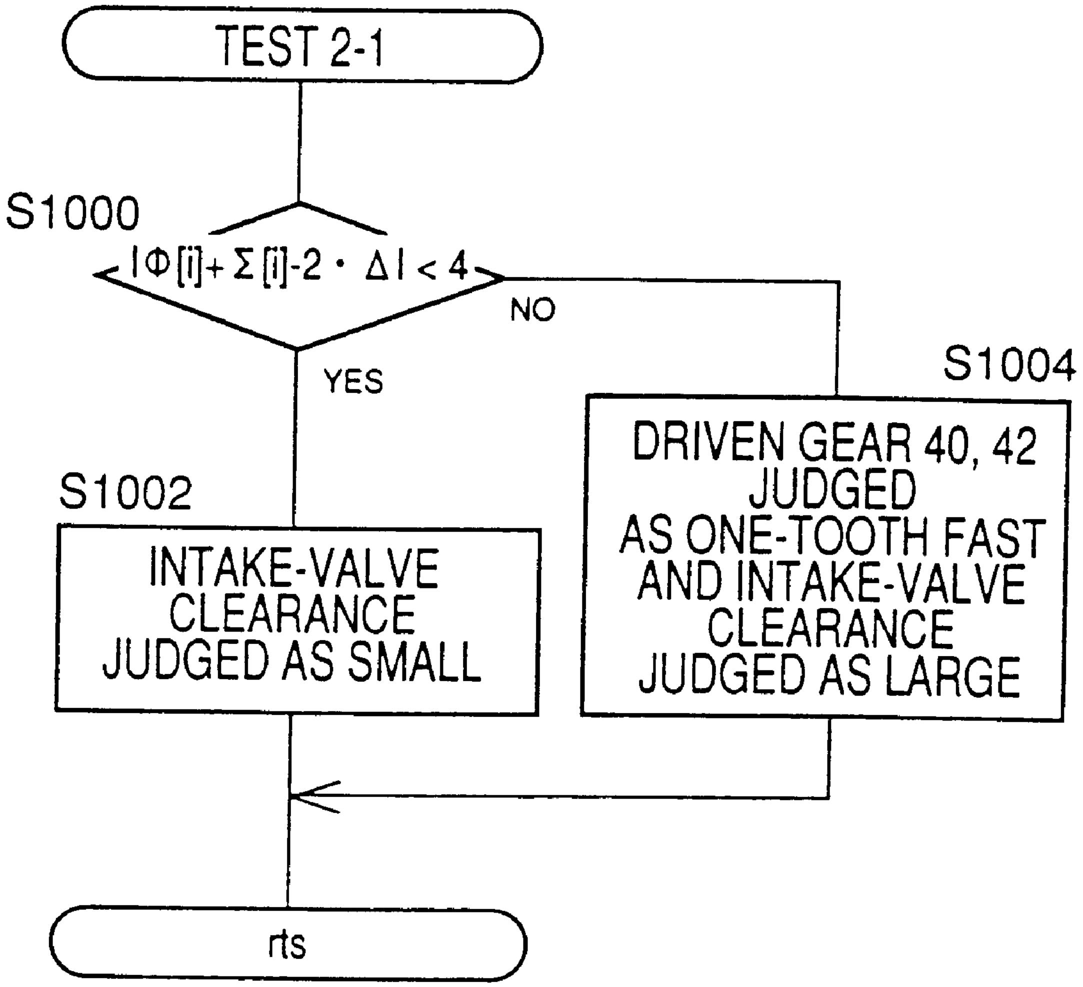
FIG. 36 is a flow chart representing a test 2-1 routine carried out at Step S908 of the flow chart of FIG. 35.

FIG. 36 is a flow chart representing the test 2-1 called at Step S908 of FIG. 35. In the case where the difference Γ[i] falls in the fourth range (4), it is not possible to judge, based on the difference Γ[i] only, whether the reason therefor is that the driven gear 40, 42 is one-tooth fast and the intake-valve clearance is large, or that the intake-valve clearance is small. Hence, this judgment is made based on other parameters. In the example shown in FIG. 36, the CPU calculates the sum of the exhaust-pressure decrease-start-angle difference Φ[i] and the exhaust-pressure constant-start-angle difference Σ[i], and subtracts, from the sum, double the variable obtained at Step S904. The absolute value of the thus obtained parameter (hereinafter, referred to as the "comparison parameter") is employed for making the above judgment. The reason why the comparison parameter is employed is that as is apparent from FIG. 24, if the driven gear 40, 42 is one-tooth fast and the intake-valve clearance is large, the comparison parameter takes 8.4 (=|−8.4+0|) and, if the intake-valve clearance is small, the comparison parameter takes 0 (=|0+0|). For example, when the cam pulley 24, 26 is one-tooth fast, the parameter (Φ[i]+Σ[i]) changes by −30 (=−15−15) (i.e., decreases by 30) and, when the cam pulley 24, 26 is one-tooth slow, the parameter (Φ[i]+Σ[i]) changes by 30 (=15+15) (i.e., increases by 30). When the crank pulley 20 is one-tooth fast and the cam pulley 24, 26 is one-tooth slow, the parameter (Φ[i]+Σ[i]) changes by 60. However, since the comparison parameter is obtained by subtracting double the variable from the sum of the differences Φ[i], Σ[i], the comparison parameter is free from the influences of possible faults with the pulleys 20, 24, 26.

First, at Step S1000, the CPU judges whether the comparison parameter (=|Φ[i]+[i]−2·Δ|) is smaller than 4 that is about the average of 8.4 and 0. If a positive judgment is made at Step S1000, the CPU judges that the intake-valve clearance is small, and the control thereof goes to Step S1002. On the other hand, if a negative judgment is made at Step S1000, the CPU judges that the driven gear 40, 42 is one-tooth fast and the intake-valve clearance is large, and the control thereof goes to Step S1004. The test 2-1 ends with Step S1002 or Step S1004. At Step S1002, the CPU sets 1 to one of the bits of the flag 'flag$_{ins}$' which corresponds to the current cylinder and, at Step S1004, the CPU sets 1 to one of the bits of each of the flags 'flag$_{drvn}$' and 'flag$_{inl}$' which corresponds to the current cylinder.

Figure 37:
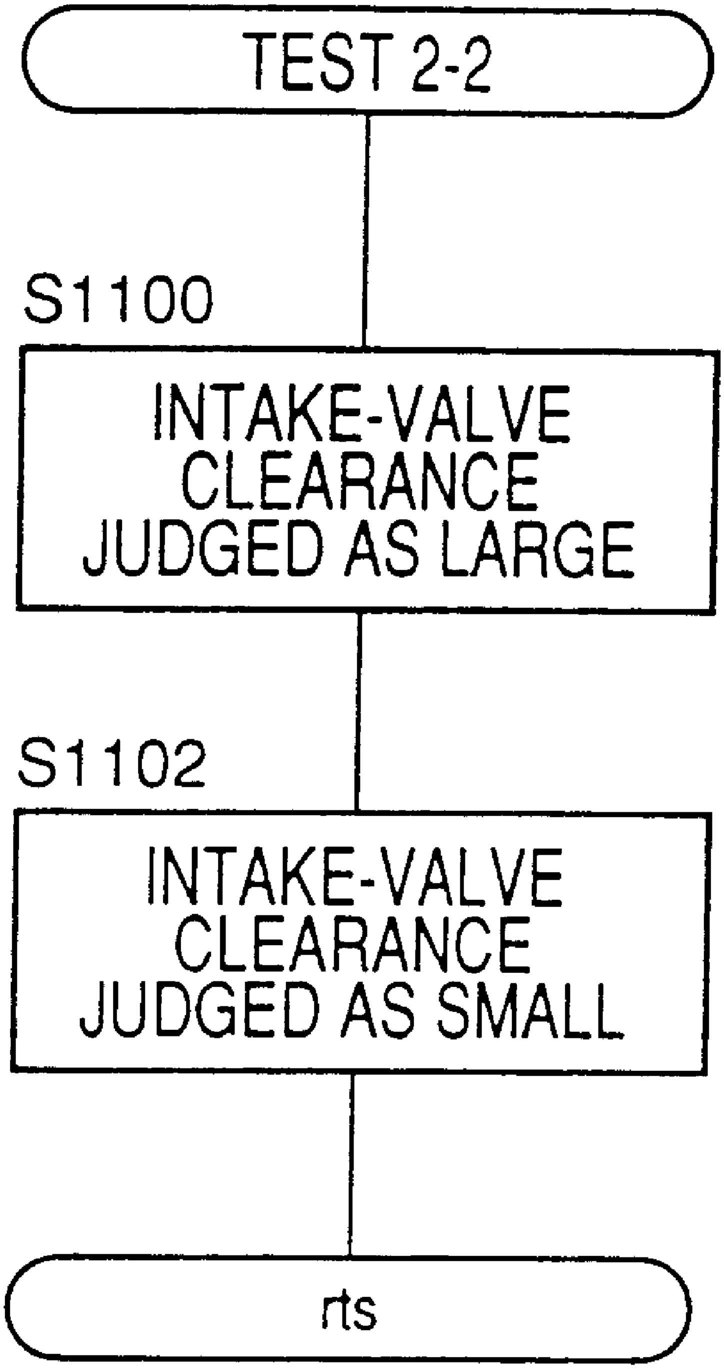
FIG. 37 is a flow chart representing a test 2-2 routine carried out at Step S910 of the flow chart of FIG. 35.

FIG. 37 is a flow chart representing the test 2-2 called at Step S910 of FIG. 35. In the case where the difference Γ[i] falls in the eighth range (8), it is not possible to judge, based on the difference Γ[i] only, whether the reason therefor is that the intake-valve clearance is large, or that the intake-valve clearance is small. Hence, this subroutine is carried out as a preliminary operation before the test 2-3, described later, in which the above judgment is made based on other information. Specifically described, at Step S1100, the CPU sets 1 to one of the bits of the flag '$flag_{inl}$' which corresponds to the current cylinder and, at Step S1102, the CPU sets 1 to one of the bits of the flag '$flag_{ins}$'0 which corresponds to the current cylinder. It is impossible that the intake-valve clearance is large and simultaneously small. Therefore, 1 is set to one of the bits of each of the flags '$flag_{inl}$', '$flag_{ins}$' which corresponds to the current cylinder, for just the purpose of indicating that the difference Γ[i] falls in the eighth range (8). The flags '$flag_{inl}$', '$flag_{ins}$' are utilized in the test 2-3 shown in FIG. 38 described below.

Figure 38:
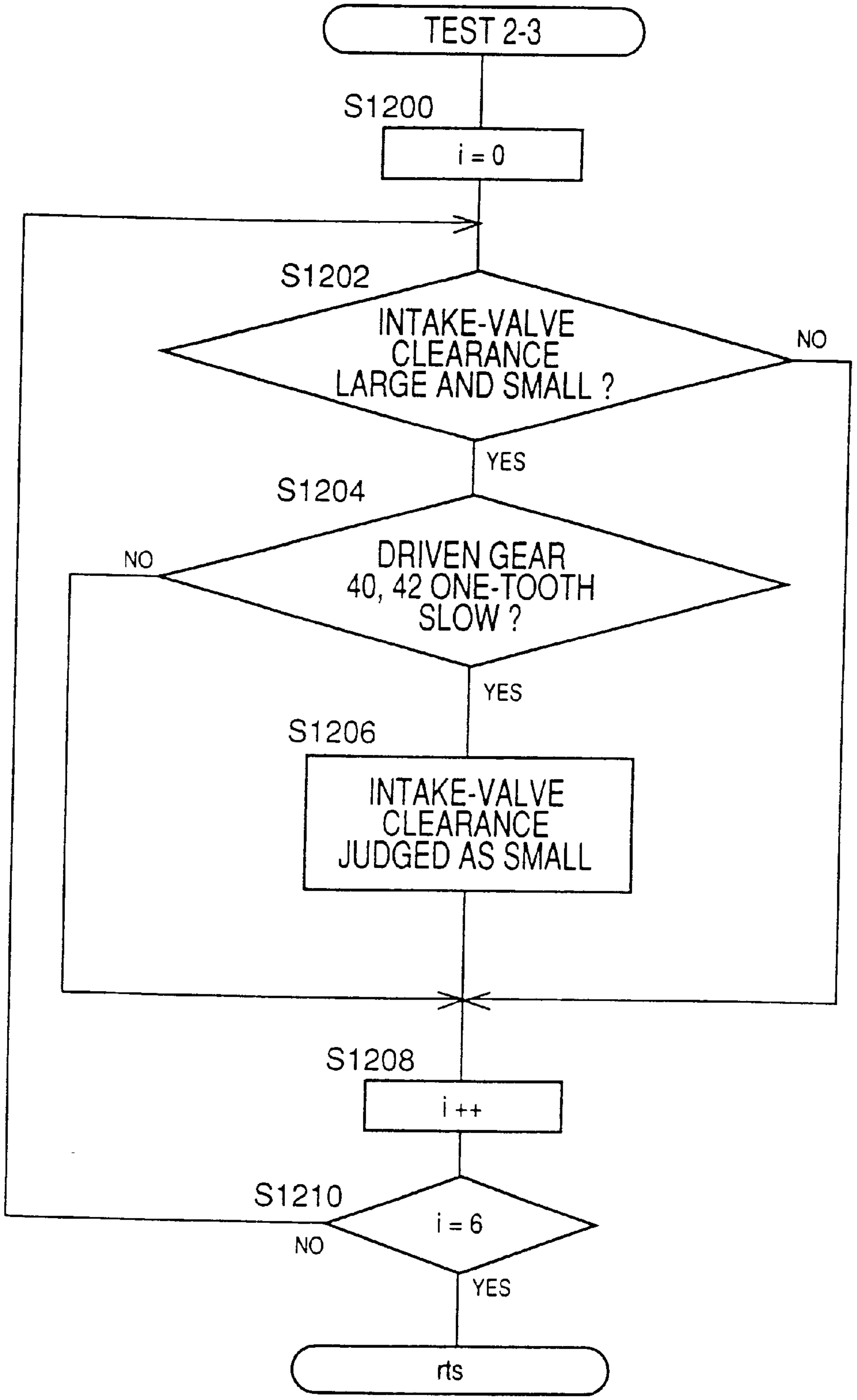
FIG. 38 is a flow chart representing a test 2-3 routine carried out at Step S916 of the flow chart of FIG. 35.

FIG. 38 is a flow chart representing the test 2-3 called at Step S916 of FIG. 35. According to this routine, in the case where the difference Γ[i] of at least one cylinder falls in the eighth range (8), the CPU judges whether the reason therefor is that the driven gear 40, 42 is one-tooth slow and the intake-valve clearance of the cylinder is small, or that the intake-valve clearance of the cylinder is large, based on the parameters obtained from the other cylinders of one of the two banks to which the current cylinder belongs to. First, at Step S1200, the CPU initializes the variable 'i' to i=0 and, at Step S1202, judges whether the respective bits of the flags '$flag_{inl}$' '$flag_{ins}$' which correspond to the current cylinder corresponding to the variable 'i' are both 1. A positive judgment made at Step S1202 indicates that the difference Γ[i] of the cylinder falls in the eighth range (8). In this case, the control of the CPU goes to Step S1204 to judge whether one of the driven gears 40, 42 which corresponds to one of the two banks which includes the cylinder indicated by the variable 'i' is one-tooth slow. If a positive judgment is made at Step S1204, the CPU judges that the intake-valve clearance of the current cylinder is small, because it is impossible that in the case where the difference Γ[i] falls in the range (8), the driven gear 40, 42 be one-tooth slow and the intake-valve clearance be large. In this case, Step S1204 is followed by Step S1206 to change 1 which has provisionally been set at Step S1100 of FIG. 37 in one of the bits of the flag '$flag_{inl}$' which corresponds to the current cylinder, to 0 confirming that the intake-valve clearance is small. Subsequently, Step S1206 is followed by Step S1208. On the other hand, if a negative judgment is made at Step S1204, the control of the CPU directly goes to Step S1208. At Step S1208, the CPU add one to the variable 'i' and, at Step S1210, the CPU judges whether the variable 'i' is equal to 6. If a positive judgment is made at Step S1210, the CPU quits the test 2-3. On the other hand, if a negative judgment is made at Step S1210, the control goes back to Step S1202. In the case where a negative judgment is made at Step S1204, the CPU cannot specify which fault has occurred to the cylinder whose difference Γ[i] falls in the range (8). In this case, the respective bits of the flags '$flag_{inl}$' '$flag_{ins}$' which correspond to the current cylinder corresponding to the variable 'i' are kept at 1, which may enable the CPU to inform the operator of this situation.

Figure 39:
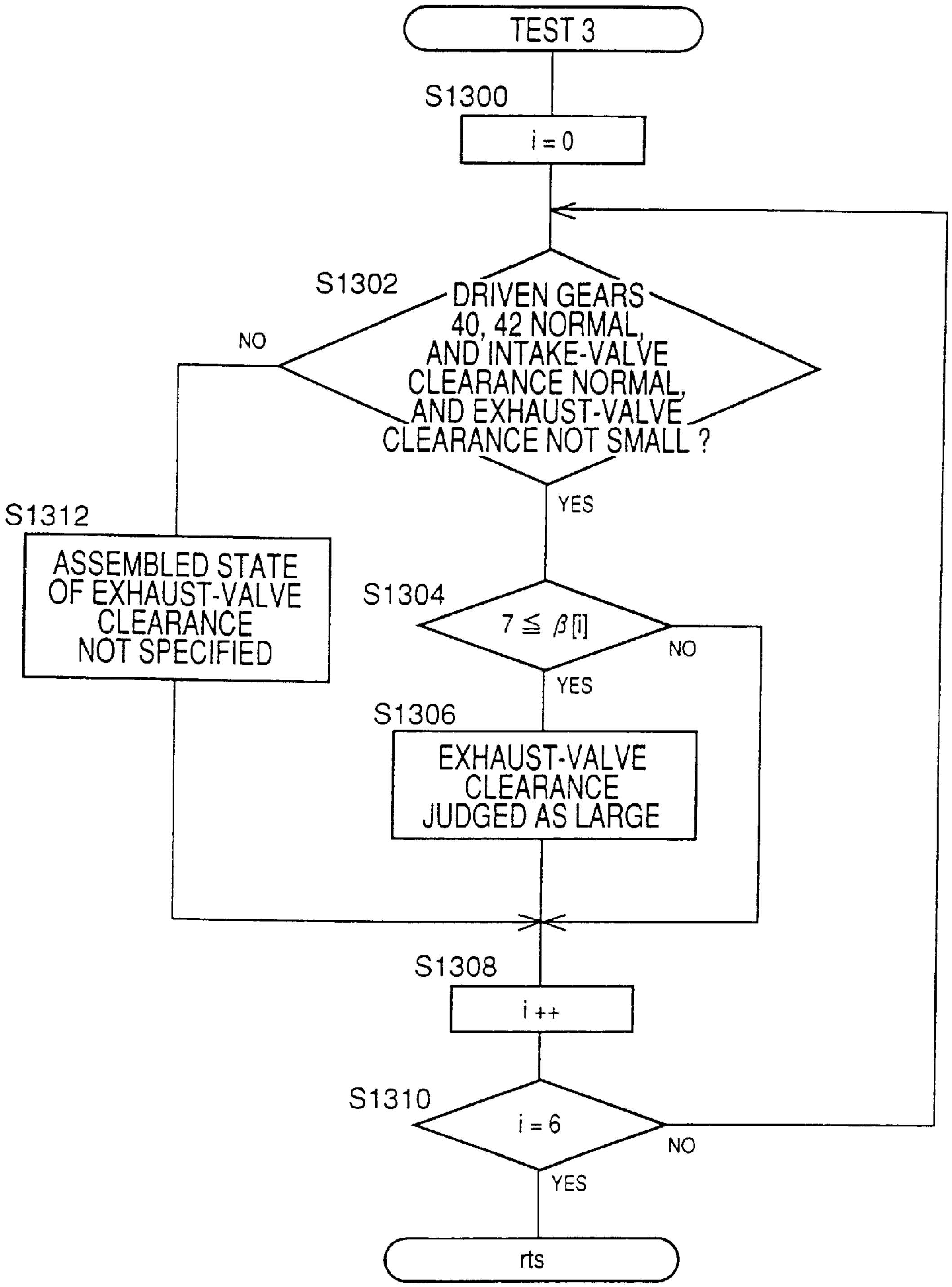
FIG. 39 is a flow chart representing a test 3 routine carried out at Step S704 of the flow chart of FIG. 33.

FIG. 39 is a flow chart representing the test 3 called at Step S706 of FIG. 33. According to this routine, in the case where the tests 1 and 2 show that the engine 90 is normal, the fault finder 117 can find the large exhaust-valve clearance. However, in the case where the tests 1 and 2 find a fault with at least one of the driven gear 40, 42 and the intake-valve clearance, the CPU judges that the large or normal state of the exhaust-valve clearance of one or more cylinders whose difference or differences β is or are influenced by that fault is not identifiable. In addition, in the case where the CPU judges that the exhaust-valve clearance of one cylinder is small when the test 2 ends, it is not possible that the exhaust-valve clearance of that cylinder is large. Therefore, the CPU does not perform, at Step S1312 of FIG. 39, any operation on that cylinder. Only a compression-ring missing and a large exhaust-valve clearance can influence the difference β of a cylinder, even if the difference β of the cylinder may not be influenced by any fault with the driven gear 40, 42 or the intake-valve clearance of the cylinder. However, as can be understood from FIG. 24, the influence due to the compression-ring missing is small. Therefore, if the difference β is not smaller than 7, the CPU can judge that the exhaust-valve clearance of that cylinder is large and, if not, judge that the exhaust-valve clearance is not large (i.e., small or normal). The threshold, 7, employed at Step S1304 is just an example like the above-described thresholds.

At Step S1300, the CPU clears the variable 'i' to i=0 and, at Step S1302, the CPU judges whether the driven gear 40, 42 corresponding to the cylinder indicated by the variable 'i' and the intake-valve clearance of that cylinder are normal and simultaneously the exhaust-valve clearance of that cylinder is not small. If a positive judgment is made at Step S1302, the control goes to Step S1304 to judge whether the difference β[i] is not smaller than 7. If a positive judgment is made at Step S1304, the CPU judges that the exhaust-valve clearance of that cylinder is large, and goes to Step S1306 to set 1 to one of the bits of the flag '$flag_{exl}$' which corresponds to that cylinder and then goes to Step S1308. On the other hand, if a negative judgment is made at Step S1304, the CPU directly goes to Step S1308. In this case, the CPU judges that the exhaust-valve clearance of that cylinder is normal. The test 3 is employed because this judgment can be made. At Step S1308, the CPU adds one to the variable 'i' and, at Step S1310, the CPU judges whether the variable 'i' is equal to 6. If a positive judgment is made at Step S1310, the CPU quits the test 3. On the other hand, if a negative judgment is made at Step S1310, the control goes back to Step S1302. If a negative judgment is made at Step S1302, the CPU judges that the large or normal state of the exhaust-valve clearance of the current cylinder is not identifiable. In this case, the control of the CPU goes to Step S1312 to set 1 to one of the bits of the flag '$flag_{exl}$' which corresponds to the current cylinder and set 1 to the highest bit of that flag and then goes to Step S1308. Thus, when the flag '$flag_{exl}$' has 1 in the highest bit thereof, it indicates that the large or normal state of the exhaust-valve clearance of the cylinder corresponding to the bit of that flag currently having 1 has not been identified or specified. However, as described previously, in the case where a negative judgment is made at Step S1302 because the exhaust-valve clearance of a cylinder is small, the CPU does not perform any operation at Step S1312.

In the present embodiment, in the case where the engine testing apparatus shows that the engine 90 does not have any faults except for the fault of compression-ring missing, the CPU checks the presence or absence of the fault on each of the cylinders, based on the exhaust-pressure maximal-value difference α of each cylinder. Although no flow chart is attached, if the engine 90 has no fault with the crank pulley 20, the cam pulleys 24, 26, or the driven gears 40, 42, the absolute value of the difference β of a cylinder is smaller than, e.g., 3, and simultaneously the difference α of the cylinder is not greater than −5, the CPU judges that the cylinder has the fault of compression-ring missing, and sets 1 to one of the bits of the flag '$flag_{ring}$' which corresponds to the cylinder. However, the CPU does not change 0 set in one of the bits of the flag which corresponds to a cylinder whose difference α has changed due to the presence of another fault or other faults. In the case where the CPU finds such cylinder or cylinders, the CPU sets 1 to the highest bit of the flag "$flag_{ring}$". When the highest bit of the flag '$flag_{ring}$' has 1, the cylinder corresponding to one of the bits of the flag which has 1 has the fault of compression-ring missing, but it has not been judged whether the cylinder corresponding to one of the bits of the flag which has 0 has the fault of compression-ring missing. The reason why the threshold, −5, is employed is that as is apparent from FIG. 24, the difference α takes a value about −10 when the compression-ring missing occurs. The threshold, −5, is about the average of 0 and −10. The reason why the difference β is compared with 3 is that as is apparent from FIG. 24, in the case where the engine 90 does not have any faults with the pulleys 20, 24, 26 or the valves 48, 50, the absolute value of the difference β is smaller than 3.

It emerges from the foregoing description that in the second embodiment of the present invention, the engine testing apparatus can specify at least two faults out of a plurality of faults which may have occurred to an assembled engine 90. However, the testing apparatus cannot do so in all cases. For example, in the case where a cylinder has the missing of the compression ring and simultaneously the bank including that cylinder has the one-tooth fast state of the cam pulley 24, 26, the testing apparatus does not judge whether the cylinder has the fault of compression-ring missing. However, for example, it is possible to gather, in advance, information about, e.g., the exhaust-pressure maximal-value difference α of a cylinder when the compression-ring missing and the one-tooth fast or slow state of the cam pulley 24, 26 simultaneously occur to the cylinder or the bank including the cylinder. In this case, the testing apparatus may judge whether the cylinder has the compression-ring missing even in the case where the compression-ring missing and the one-tooth fast or slow state of the cam pulley 24, 26 simultaneously occur. Thus, the testing apparatus can test an assembled engine 90 based on information other than that shown in FIG. 24.

Figure 42:
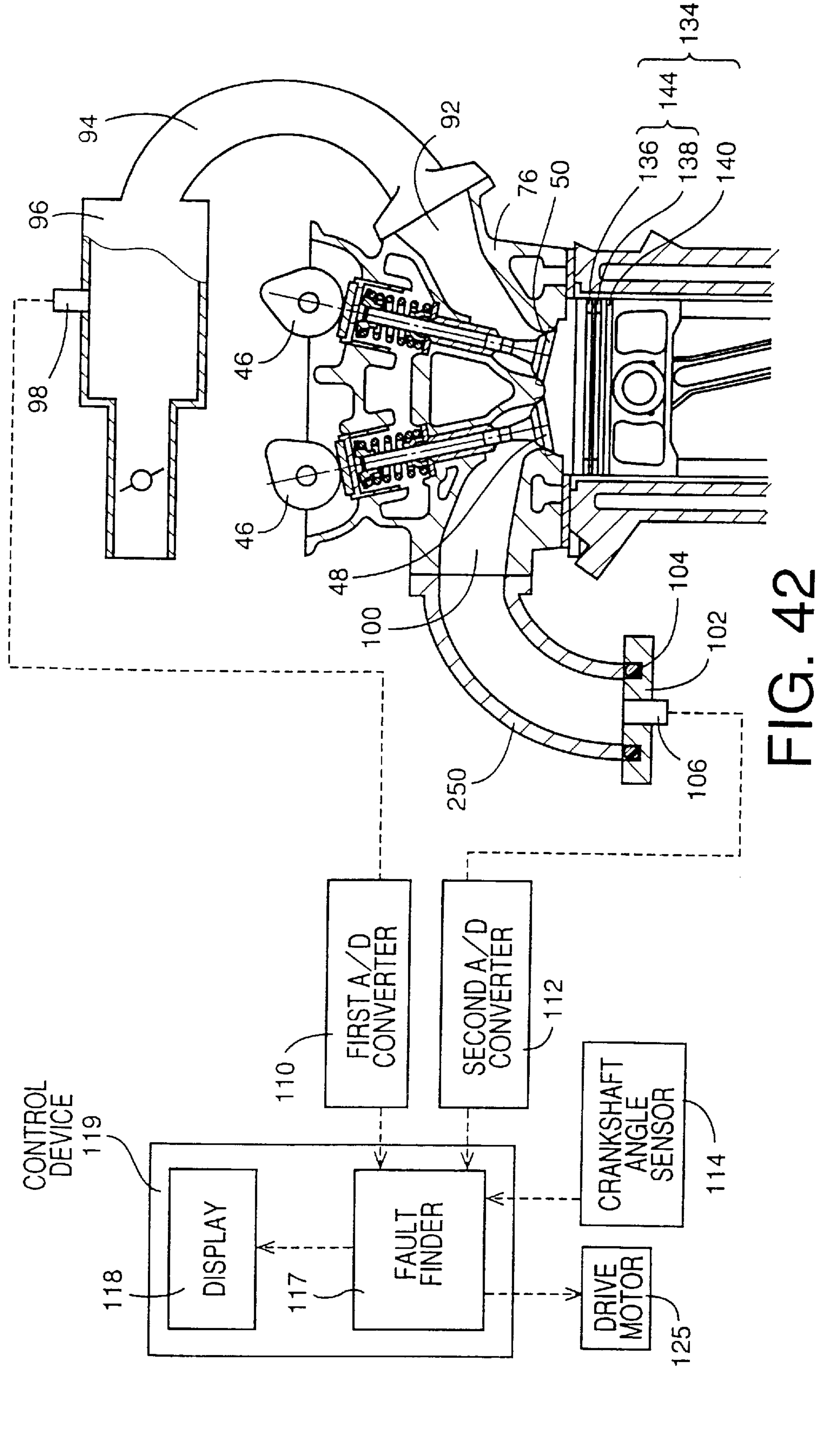
FIG. 42 is a diagrammatic view corresponding to FIG. 4, and showing an essential portion of another engine testing apparatus which carries out another engine testing method as a third embodiment of the invention.

Referring next to FIG. 42, there will be described a third embodiment of the present invention wherein an invention engine testing method is carried out by an engine testing apparatus shown in the figure. In the present testing method, two exhaust manifolds 250 (only one 250 is shown) are attached to a left and a right bank of an assembled engine 90 to be tested, respectively. Each of the exhaust manifolds 250 communicates with respective exhaust ports 100 of three cylinders of a corresponding one of the two banks, so that those exhaust ports 100 communicate with a single exhaust pipe (not shown) via that manifold 250. A cover member 102 which is provided with a pressure sensor 106 is attached to an outlet of each exhaust manifold 250. Thus, the engine 90 has the same intake-valve side space 92, 94, 96 as shown in FIG. 4, and a pair of exhaust-valve side spaces each of which is provided by respective inner spaces of a corresponding one of the two exhaust manifolds 250 and the corresponding three exhaust ports 100. Since the present testing apparatus has one cover member 102 and one pressure sensor 106 for each bank, it enjoys a simpler construction than that shown in FIG. 4.

Figure 43:
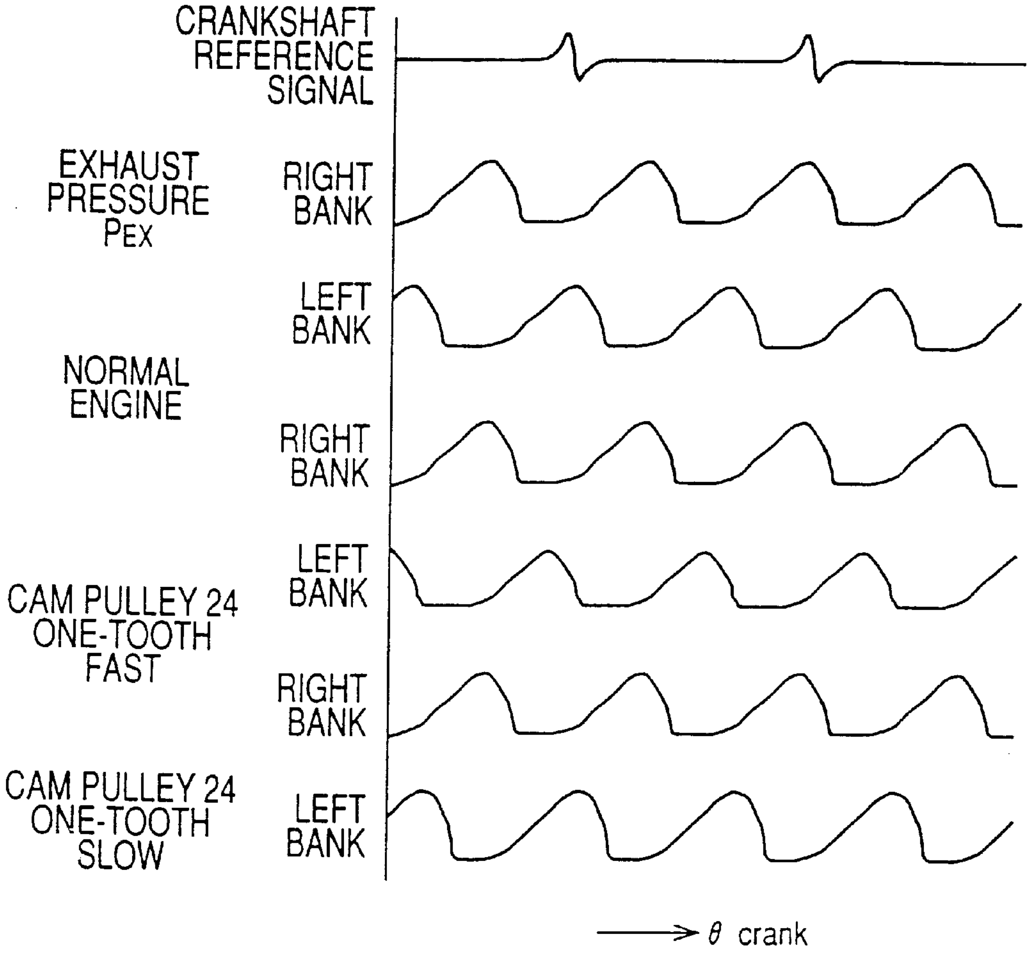
FIG. 43 is a graph showing the relationship, obtained by the apparatus of FIG. 42, between the change of crank-shaft reference signal obtained from the normal crank shaft of an engine, the respective changes of exhaust pressures $P_{EX}$ obtained from the right and left banks of an normal engine, the respective changes of exhaust pressures $P_{EX}$ obtained from the right and left banks of an engine having the fault of left-cam-pulley one-tooth fast state, and the respective changes of exhaust pressures $P_{EX}$ obtained from the right and left banks of an engine having the fault of left-cam-pulley one-tooth slow state, and the crank-shaft angle $\Theta_{crank}$.
Figure 44:
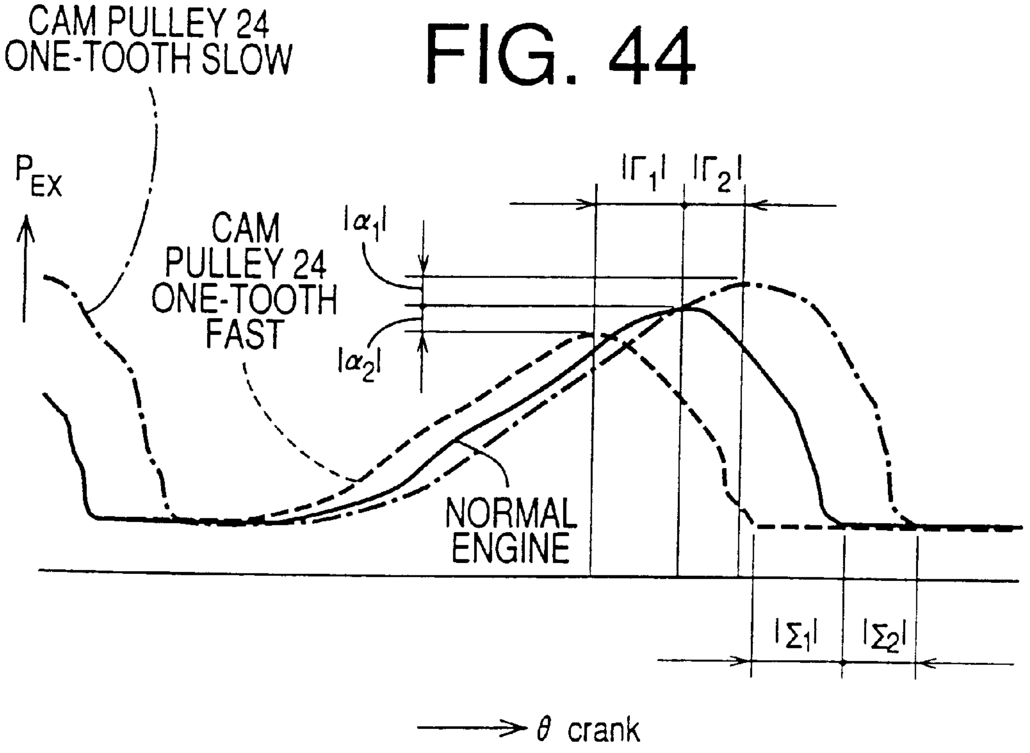
FIG. 44 is a graph showing the relationship, obtained by the apparatus of FIG. 42, between the change of exhaust pressure $P_{EX}$ obtained from the left bank of the normal engine, the change of exhaust pressure $P_{EX}$ obtained from the left bank of the engine having the fault of left-driven-gear one-tooth fast state, and the change of exhaust pressure $P_{EX}$ obtained from the left bank of the engine having the fault of left-driven-gear one-tooth slow state, and the crank-shaft angle $\Theta_{crank}$.
Figure 45:
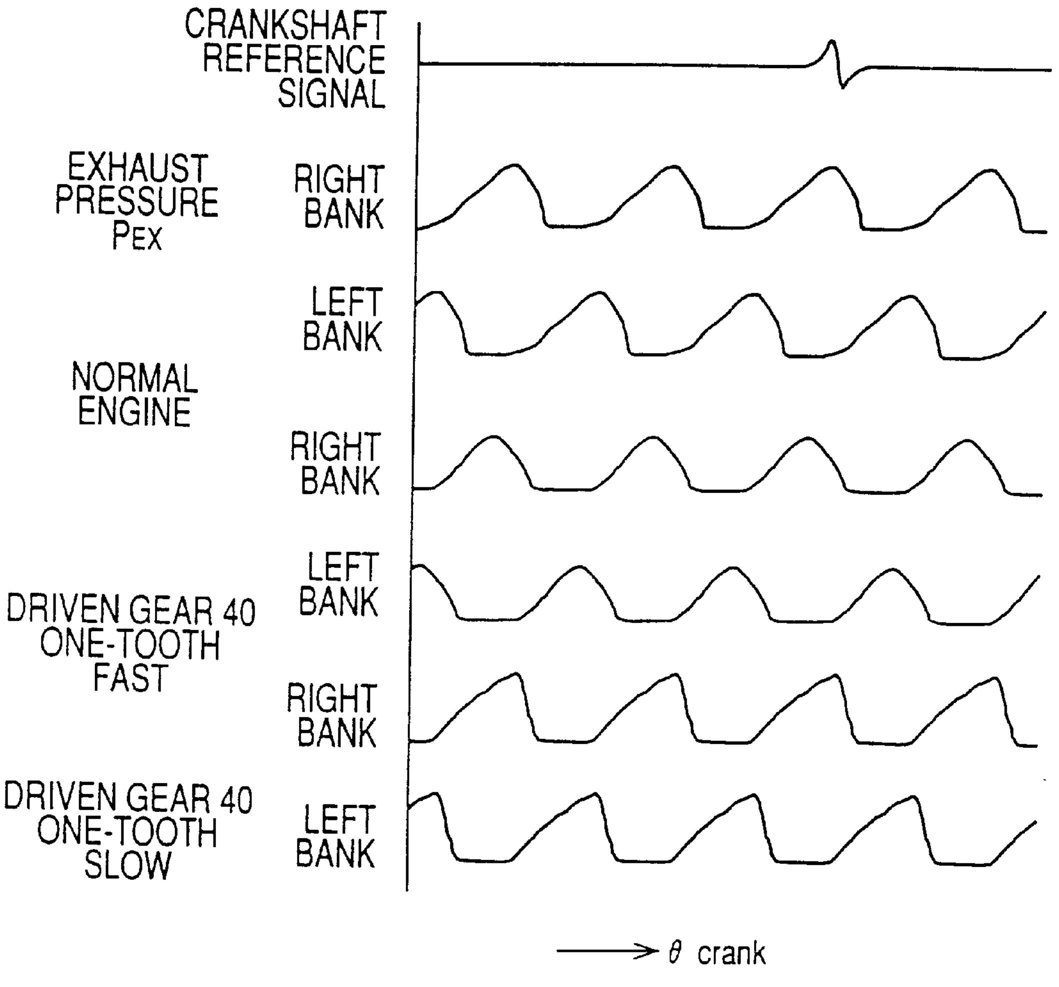
FIG. 45 is a graph showing the relationship, obtained by the apparatus of FIG. 42, between the change of crank-shaft reference signal obtained from the normal crank shaft of an engine, the respective changes of exhaust pressures $P_{EX}$ obtained from the right and left banks of an normal engine, the respective changes of exhaust pressures $P_{EX}$ obtained from the right and left banks of an engine having the fault of left-driven-gear one-tooth fast state, and the respective changes of exhaust pressures $P_{EX}$ obtained from the right and left banks of an engine having the fault of left-driven-gear one-tooth slow state, and the crank-shaft angle $\Theta_{crank}$.
Figure 46:
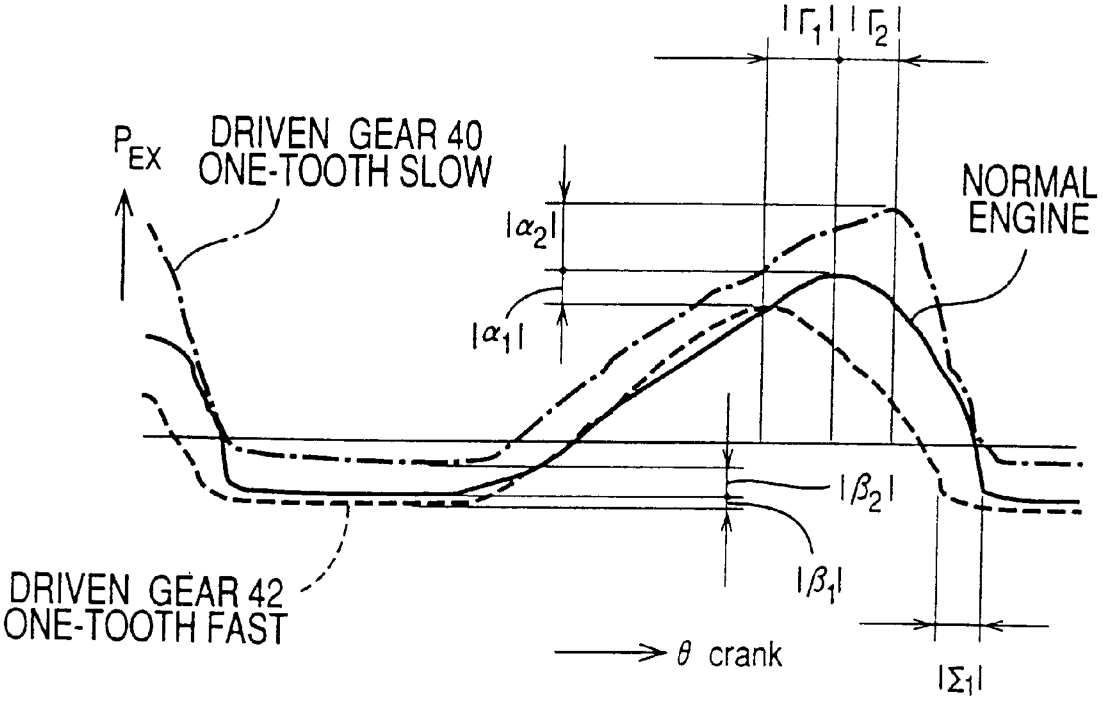
FIG. 46 is a graph showing the relationship, obtained by the apparatus of FIG. 42, between the change of exhaust pressure $P_{EX}$ obtained from the left bank of the normal engine, the change of exhaust pressure $P_{EX}$ obtained from the left bank of the engine having the fault of left-driven-gear one-tooth fast state, and the change of exhaust pressure $P_{EX}$ obtained from the left bank of the engine having the fault of left-driven-gear one-tooth slow state, and the crank-shaft angle $\Theta_{crank}$.

FIG. 43 shows respective exhaust-pressure signals $P_{EX}$ obtained from the left and right banks of the engine 90 by the testing apparatus shown in FIG. 42, together with a crank-shaft reference signal obtained by the same. More specifically, FIG. 43 shows three pairs of exhaust-pressure signals $P_{EX}$ obtained when the engine 90 is normal, when the left cam pulley 24 is one-tooth fast, and when the pulley 24 is one-tooth slows respectively. FIG. 44 illustrates, in a two-dimensional coordinate system and in an enlarged scale, the three exhaust-pressure signals $P_{EX}$ obtained from the left bank in the three cases shown in FIG. 43, respectively. FIG. 45 shows three pairs of exhaust-pressure signals $P_{EX}$ obtained when the engine 90 is normal, when the left driven gear 40 is one-tooth fast, and when the gear 40 is one-tooth slow, respectively. FIG. 46 shows, in a two-dimensional coordinate system and in an enlarged scale, the three exhaust-pressure signals $P_{EX}$ obtained from the left bank in the three cases shown in FIG. 45, respectively. FIG. 47 shows a table including actual values of the exhaust-pressure maximal-value-angle difference Γ, the exhaust-pressure constant-start-angle difference Σ, the exhaust-pressure maximal-value difference α, and the exhaust-pressure constant-value difference β when the left cam pulley 24 is one-tooth fast or slow or when the left drive gear 40 is one-tooth fast or slow. "Suffix 1" and "suffix 2" indicated in the table of FIG. 47 correspond to the respective suffixed numbers of the symbols Γ, Σ, etc. indicated in the graphs of FIGS. 44 and 46. "Suffix 1" corresponds to the case where the pulley 24 or the gear 40 is one-tooth fast, and "suffix 2" corresponds to the case where the pulley 24 or the gear 40 is one-tooth slow.

The comparison of FIG. 47 with FIG. 24 shows that the differences Γ, Σ of FIG. 47 are equal to those of FIG. 24 but the differences α, β of FIG. 47 are smaller than those of FIG. 24. This is because the space shown in FIG. 42 from which the exhaust pressure $P_{EX}$ is measured and the table of FIG. 47 is obtained is larger than that shown in FIG. 4. That is, the latter space is provided by the respective spaces of each cylinder and the corresponding exhaust port 100, whereas the former space is provided by the space of each manifold 250 in addition to the respective spaces of the corresponding three cylinders and the corresponding three exhaust ports 100. Accordingly, the change of pressure of the former space due to a certain event or fault is smaller than that of the latter space due to the same cause. Although the exhaust-valve side space or volumes shown in FIG. 42 are larger than those shown in FIG. 4, the differences Γ, Σ of FIG. 47 are equal to those of FIG. 24. This indicates that the simpler testing apparatus of FIG. 42 can operate for finding the one-tooth fast or slow state of the driven gear 40, 42 based on those differences Γ, Σ. The respective changes of the waveforms shown in FIG. 44 or FIG. 46 are produced because the respective timings of opening and closing of the intake and exhaust valves 50, 48 when the cam pulley 24, 26 or the driven gear 40, 42 is one-tooth fast or slow differ from those when the engine 90 is normal. Therefore, the engine testing apparatus of FIG. 42 can also find the large or small state of the intake- or exhaust-valve clearance by analyzing the changes of waveforms of FIG. 44 or FIG. 46 obtained from the engine 90. For example, the respective values of differences α, β, Γ, Σ indicated in the table of FIG. 47 stepwise change because of the fault with the cam pulley 24, 26 or the driven gear 40, 42. Therefore, if one of the differences α, β, Γ, Σ takes a value different from those indicated in the table of FIG. 47, the CPU of the present testing apparatus can judge that there is some possibility that the clearance of an intake or an exhaust valve be not normal.

In each of the first to third embodiments, an intake-valve side space is provided by the respective inner spaces of the intake ports 92, the intake manifolds 94, and the surge tank 96. However, it is possible that an intake-valve side space be provided by only the inner space of each intake port 92. In this case, a pressure sensor 98 is provided for each of the six intake-valve side spaces. That is, the respective intake pressures of the six cylinders are obtained independent of one another. Therefore, one or more faults with the assembling of an engine can be found based on one or more predetermined conditions of each of the six intake pressures. Meanwhile, in each of the illustrated embodiments, the exhaust-valve side spaces are closed. However, the intake-valve side space or spaces may be closed in addition to, or in place of, the closure of the exhaust-valve side spaces.

In the case where the six intake-valve side spaces are provided by the respective inner spaces of the intake ports 92 and each are closed, the engine testing apparatus can obtain intake-pressure differences corresponding to the exhaust-pressure maximal-value difference $\alpha$ and the exhaust-pressure constant-value difference $\beta$ and obtain angle differences corresponding to the exhaust-pressure decrease-start angle $\Phi$, etc., in the same manner as that employed for obtaining the table of FIG. 24. In this case, the assembled state of an engine can be checked based on those parameters.

In each of the illustrated embodiments, the V6 DOHC gasoline engines are tested. However, the present invention is applicable to the testing of various types of engines. For example, in the case where SOHC (single over head cam shaft) engines are tested, the testing steps for finding the fault with the driven gears 40, 42 are omitted. In addition, in the case where DOHC engines of the type wherein intake cam shafts (32, 34) are driven by not driven gears (40, 42) but different cam pulleys, testing steps for finding a fault with those different cam pulleys may be employed in place of the testing steps for finding the fault with the driven gears. Meanwhile, in each of the illustrated embodiments, the engine testing is carried out based on the characteristic parameter of the exhaust pressures $P_{EX}$, such as the exhaust-pressure maximal value $P_{EXmax}$ or the exhaust-pressure maximal-value angle $\Theta_{EXmax}$. However, the other parameters indicated in the table of FIG. 24 and/or the other characteristic parameters of the curves shown in the graphs of FIG. 8, FIG. 9, etc. may be employed for the same purpose. For example, the maximum slope of the curve shown in FIG. 8, or the crank-shaft angle corresponding to the maximum slope, the length and/or position of the interval in which the rate of change of the curve is greater than a reference value, etc. may be taken into account for finding a fault or faults with an assembled engine. The present invention may be also applicable to diesel engines.

In order to specify or identify, with higher reliability, each of a plurality of faults which simultaneously occur to a single engine, the engine testing apparatus can gather more information from the engine. For example, all possible combinations of presence or absence of predetermined faults are artificially created on an engine, and the testing apparatus gathers a group of respective values of predetermined parameters $P_{EXmax}$, $\Theta_{EXmax}$, etc. in each of all the combinations of the predetermined faults created on the engine. Then, the testing apparatus obtains a group of respective values of the predetermined parameters $P_{EXmax}$, $\Theta_{EXmax}$, etc. from an assembled engine, compares the obtained group of values with each of the groups of values gathered in advance in all the fault combinations, and selects one of all the fault combinations as the specified or identified fault combination of the engine. In each of the illustrated embodiments, the testing apparatus finds the one-tooth fast or slow state of the crank pulley 20, the cam pulley 24, 26, or the driven gear 40, 42. However, the testing apparatus may be adapted to find the two or more teeth fast or slow state of each pulley 20, 24, 26, 40, 42. In the last case, the parameters $P_{EXmax}$, $\Theta_{EXmax}$, etc. may be classified in more steps for finding a fault or faults with high accuracy. In this case, the slight differences of respective values of each of those parameters must be distinguished from each other. Since the engine testing apparatus employed in each of the illustrated embodiments can quickly obtain a number of values of each of the parameters, it can find a fault or faults with an engine with high reliability by, e.g., statistically analyzing those values.

Next, there will be described a fourth embodiment of the present invention. The fourth embodiment is different from the above-described first embodiment in that the engine testing routine of FIG. 25 employed in the first embodiment is replaced by a different engine testing routine of FIG. 51 employed in the fourth embodiment. The engine testing apparatus of FIG. 4 employed in the first embodiment is also employed in the fourth embodiment. However, in the fourth embodiment, the display 118 of the control device 119 additionally includes six intake-valve foreign-matter-biting lamps 332 and six exhaust-valve foreign-matter-biting lamps 334, as shown in FIG. 52.

Figure 3:
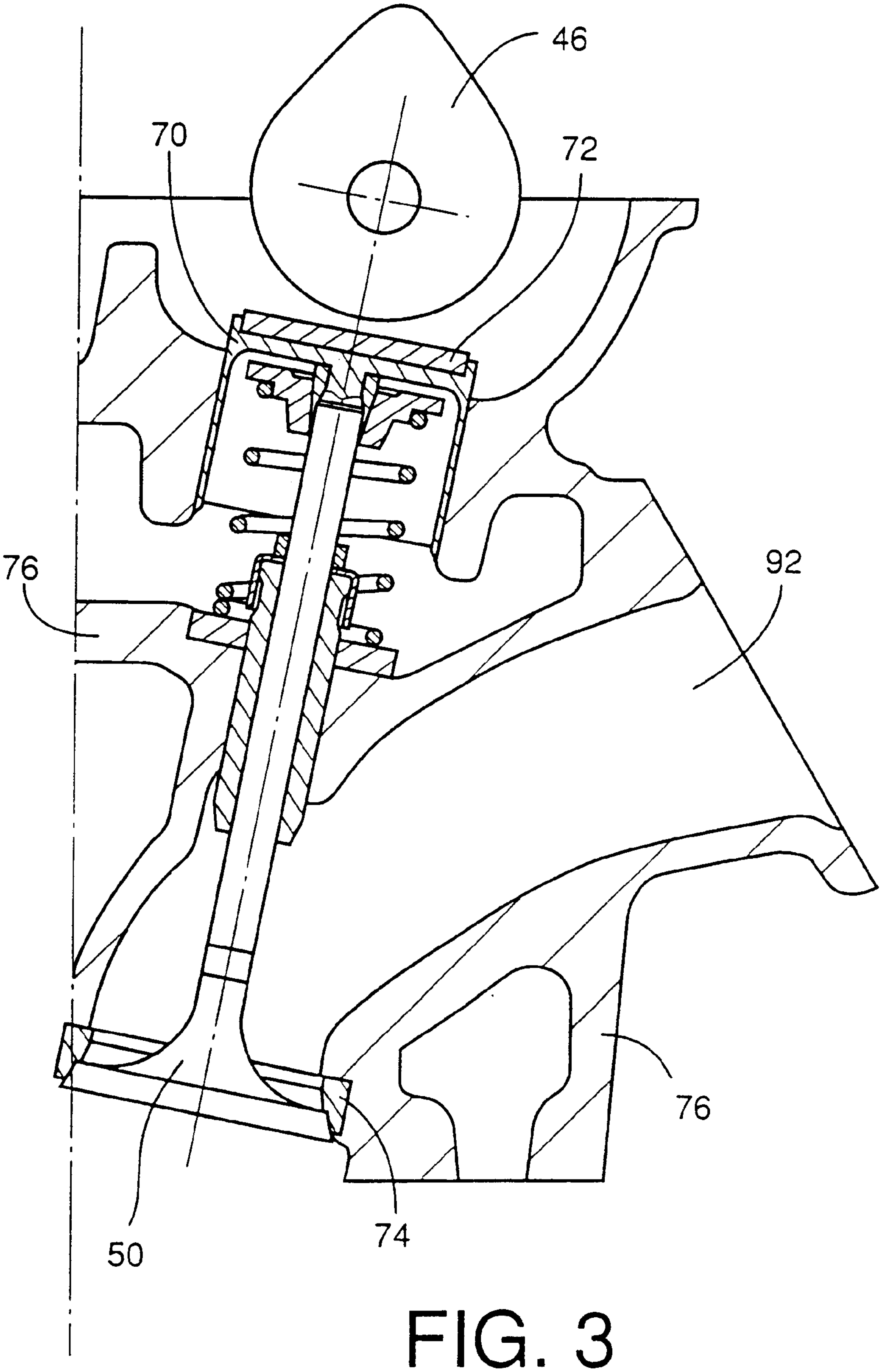
FIG. 3 is an enlarged cross-section view of a part of a dynamic valve system of the V6 engine of FIG. 1.

In the case where a foreign matter enters between each intake valve 50 and a corresponding valve seat 74 and the intake valve 50 bites the foreign matter, in the case where the valve seat 74 is not appropriately set in the cylinder head 92 and has an inappropriate posture or position in the head 92, in the case where the intake valve 50 is bent for some reason, or the like, the intake valve 50 cannot be appropriately seated on the valve seat 74 when the cam 46 is rotated (FIG. 3). Accordingly, the airtightness of the working volume of the cylinder cannot be maintained when it should be maintained. This is also the case with each exhaust valve 48. The above-indicated faults with the engine 90 may occur independent of the faults with the assembling of the engine 90. The following description relates to the fault of foreign-matter biting as a representative of the other faults that can be specified or identified in the same manner.

Figure 48:
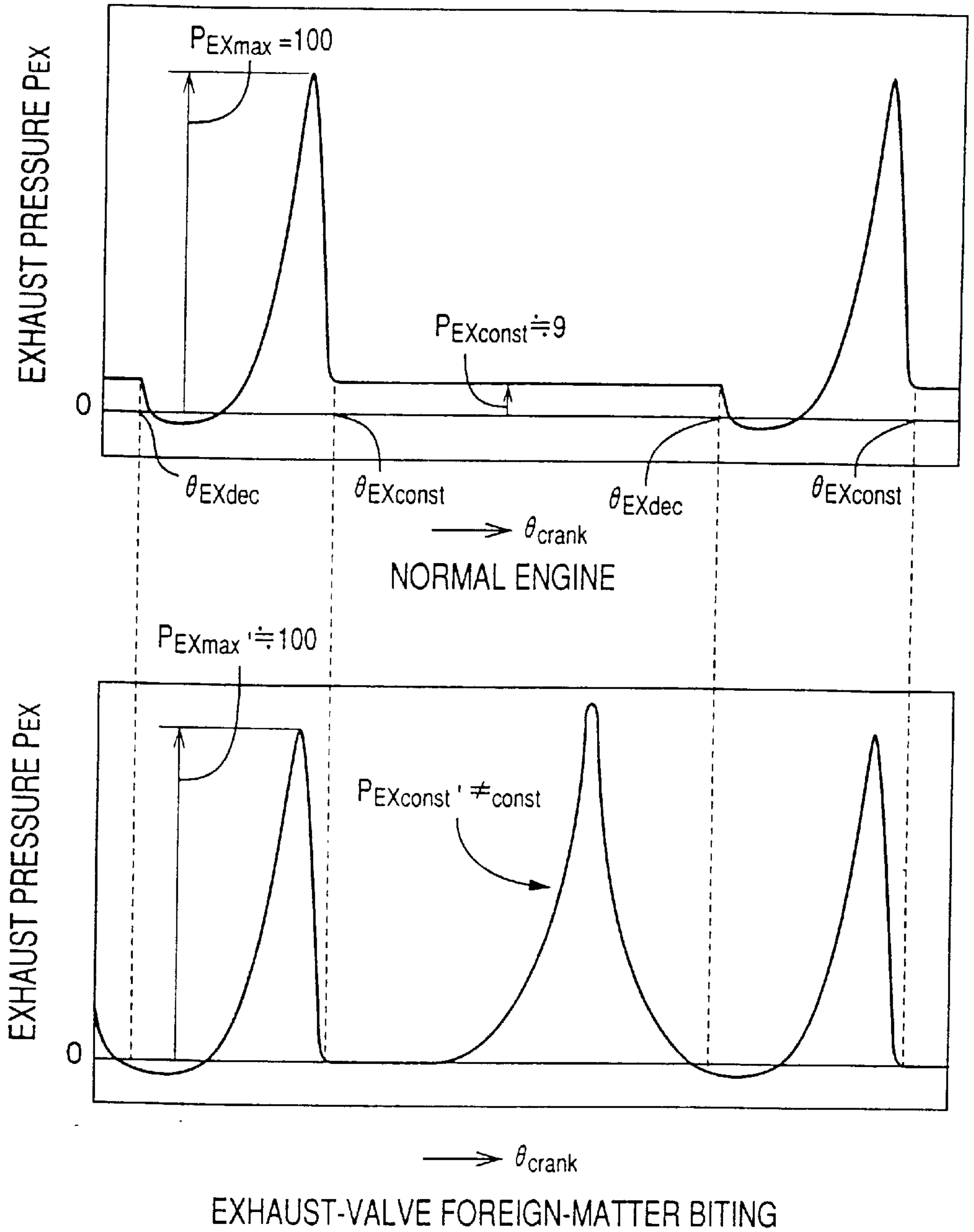
FIG. 48 is a graph showing the change of an exhaust pressure $P_{EX}$ obtained from a normal engine with respect to the crank-shaft angle, and the change of an exhaust pressure $P_{EX}$ obtained from an engine having the exhaust-valve foreign-matter biting, both of which are utilized in another engine testing method as a fourth embodiment of the invention.

FIG. 48 is a graph showing the change of exhaust pressure $P_{EX}$ obtained from a cylinder of a normal engine and the change of exhaust pressure $P_{EX}$ obtained from a cylinder of an engine having the fault of exhaust-valve foreign-matter biting. As is apparent from the graph, the latter exhaust pressure $P_{EX}$ significantly changes in a period corresponding to the constant state (from the exhaust-pressure constant-start angle $\Theta_{EXconst}$ to the exhaust-pressure decrease-start angle $\Theta_{EXdec}$) of the former exhaust pressure $P_{EX}$ obtained from the normal engine. This is because, if the exhaust valve 48 of the cylinder bites a foreign matter, airtightness cannot be maintained between the exhaust port 100 and the working volume of the cylinder. Accordingly, the latter pressure $P_{EX}$ in the exhaust port 100 is influenced and changed by the pressure in the working volume of the cylinder, while the pressure $P_{EX}$ would be constant if the valve 48 would be normal. More specifically described, the latter pressure $P_{EX}$ increases in a period in which the piston moves up toward its top dead position TDC, because the air compressed in the cylinder flows into the exhaust port 100. Subsequently, the latter pressure $P_{EX}$ decreases in a period in which the piston moves down toward its bottom dead position BDC, because the working volume of the cylinder increases and the high-pressure air in the exhaust port 100 flows into the working volume.

In the above process, the latter pressure $P_{EX}$ takes a maximal value, e.g., about 110 in the example shown in FIG. 48. This maximal value is greater by about 10% than the exhaust-pressure maximal value $P_{EXmax}$ (defined as 100) obtained from the normal engine. In addition, in the same process, the latter pressure $P_{EX}$ takes a minimal value, e.g., about 0 in the example shown in FIG. 48. Thus, if the engine 90 has the fault of exhaust-valve foreign-matter biting, the exhaust pressure $P_{EX}$ obtained from the engine 90 changes between 0 and 110 in the period corresponding the constant state of the exhaust pressure $P_{EX}$ obtained from the normal engine. Since the exhaust-pressure constant value $P_{EXconst}$ obtained from the normal engine is constant at about 9, the exhaust-pressure constant-value difference β which would be constant if the engine 90 would be normal changes between about −9 and about 101.

Figure 49:
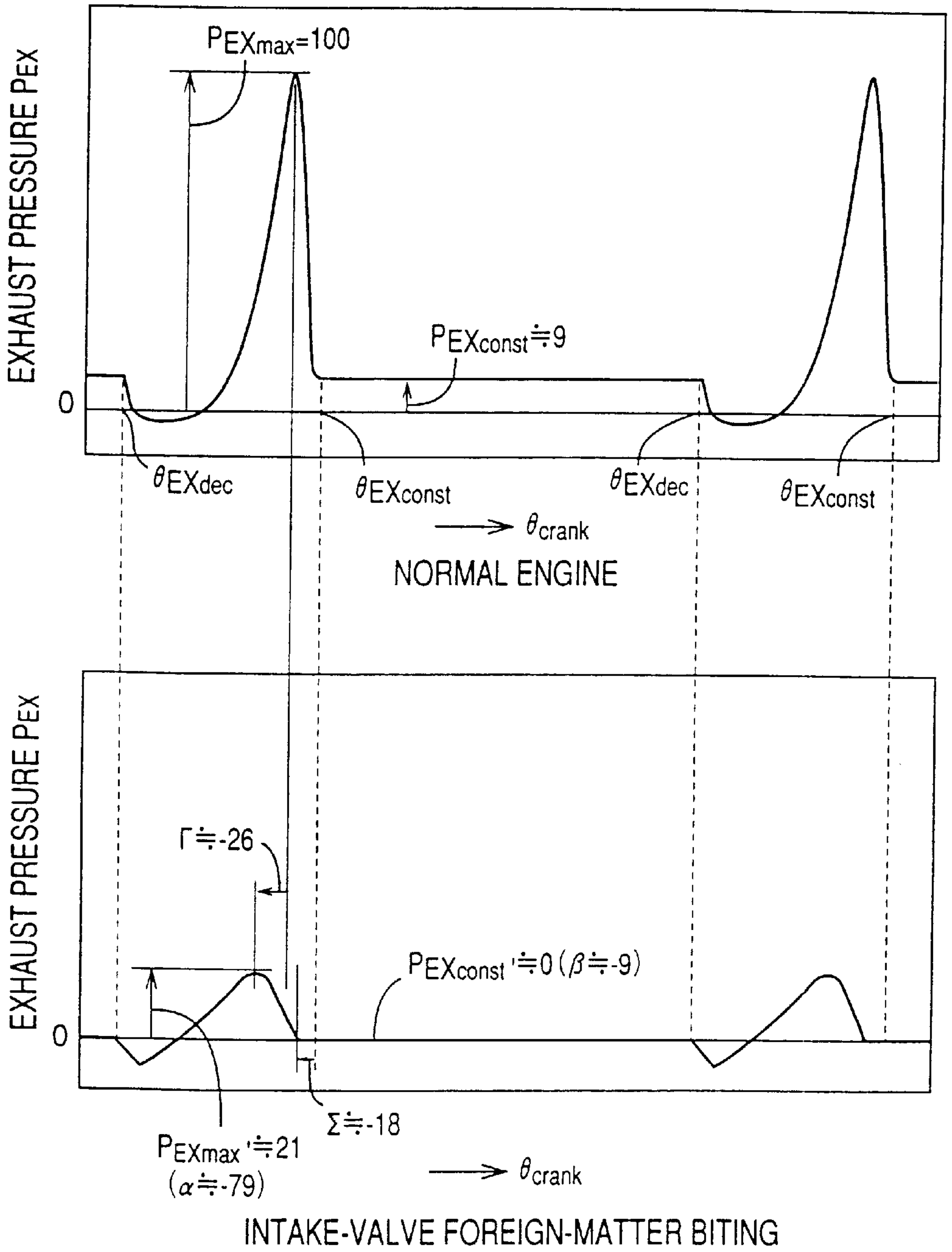
FIG. 49 is a graph showing the change of an exhaust pressure $P_{EX}$ obtained from a normal engine with respect to the crank-shaft angle, and the change of an exhaust pressure $P_{EX}$ obtained from an engine having the intake-valve foreign-matter biting.

FIG. 49 is a graph showing the change of exhaust pressure $P_{EX}$ obtained from a cylinder of a normal engine and the change of exhaust pressure $P_{EX}$ obtained from a cylinder of an engine having the fault of intake-valve foreign-matter biting. In the normal engine, the exhaust-pressure maximal-value angle $\Theta_{EXmax}$ that is a crank-shaft (CS) angle $\Theta_{crank}$ at which the exhaust pressure $P_{EX}$ takes the maximal value $P_{EXmax}$, is equal to a CS angle INopen at which the intake valve 50 opens (FIG. 6). However, in the engine having the fault of intake-valve foreign-matter biting, the exhaust pressure $P_{EX}$ takes a maximal value $P_{EXmax}$, at a CS angle smaller than the angle $\Theta_{INopen}$. Thus, the exhaust-pressure maximal-value-angle difference Γ is about −26 in the example shown in FIG. 49. In the case where the engine has the fault of intake-valve foreign-matter biting, the exhaust port 100 keeps fluid communication with the respective inner spaces of the cylinder and the intake port 92, when the piston is around its top dead position TDC (FIG. 6) in the cylinder, that is, when the exhaust pressure $P_{EX}$ is around the maximal value $P_{EXmax}'$ That is, the CS angle at which the exhaust pressure $P_{EX}$ takes the maximal value $P_{EXmax}'$ can change depending upon the respective pressures of the exhaust port 100, the working volume of the cylinder, and the intake port 92.

In the case where the engine 90 has the fault of intake-valve foreign-matter biting but does not have the fault of exhaust-valve foreign-matter biting, the exhaust pressure $P_{EX}$ takes a constant value $P_{EXconst}'$ in a period corresponding to the constant state of the exhaust pressure $P_{EX}$ obtained from the normal engine. However, the constant value $P_{EXconst}'$ is different from the constant value $P_{EXmax}$ obtained from the normal engine. This is because the working volume of the cylinder keeps fluid communication with the atmosphere via the intake port 92. Accordingly, the pressure of the air compressed in the cylinder is lower than that obtained from the normal engine, over the substantially entire range of the CS angle. That is, the maximal value $P_{EXmax}'$ is smaller than the maximal value $P_{EXmax}$ obtained from the normal engine. In the example shown in FIG. 49, the maximal value $P_{EXmax}'$ and the constant value $P_{EXconst}'$ are about 21 and about 0, respectively, and the differences α, β are about −79 and about −9, respectively.

In the case where the engine 90 has the fault of intake-valve foreign-matter biting, the CS angle at which the exhaust pressure $P_{EX}$ starts taking the constant value $P_{EXconst}'$ is smaller than that obtained from the normal engine. In the normal engine, this CS angle is equal to the angle at which the exhaust valve 48 starts closing. However, in the engine 90 having the fault, the respective pressures of the intake port 92, the exhaust port 100, and the working volume of the cylinder are balanced by one another earlier than in the normal engine, because the pressure in the cylinder is lower than that in the normal engine. Thus, the exhaust-pressure constant-start-angle difference Σ take a negative value, e.g., about −18 in the example shown in FIG. 49. The constant value $P_{EXconst}'$ is about 0 (in terms of gauge pressure), i.e., substantially equal to the atmospheric pressure.

FIG. 50 shows a table which is different from the table shown in FIG. 24 in that the former table additionally includes respective actual values of the exhaust-pressure maximal-value difference α, the exhaust-pressure constant-value difference β, the exhaust-pressure maximal-value-angle difference Σ, the exhaust-pressure constant-start-angle difference Σ, etc. which are obtained in the case where the fault of intake-valve or exhaust-valve foreign-matter biting occurs to the engine 90 independent of the other faults.

In the fourth embodiment, the engine 90 is tested mainly depending upon amounts relating to the exhaust-pressure constant-value difference β. Next, the fourth engine testing method in accordance with the present invention will be described.

Figure 51:
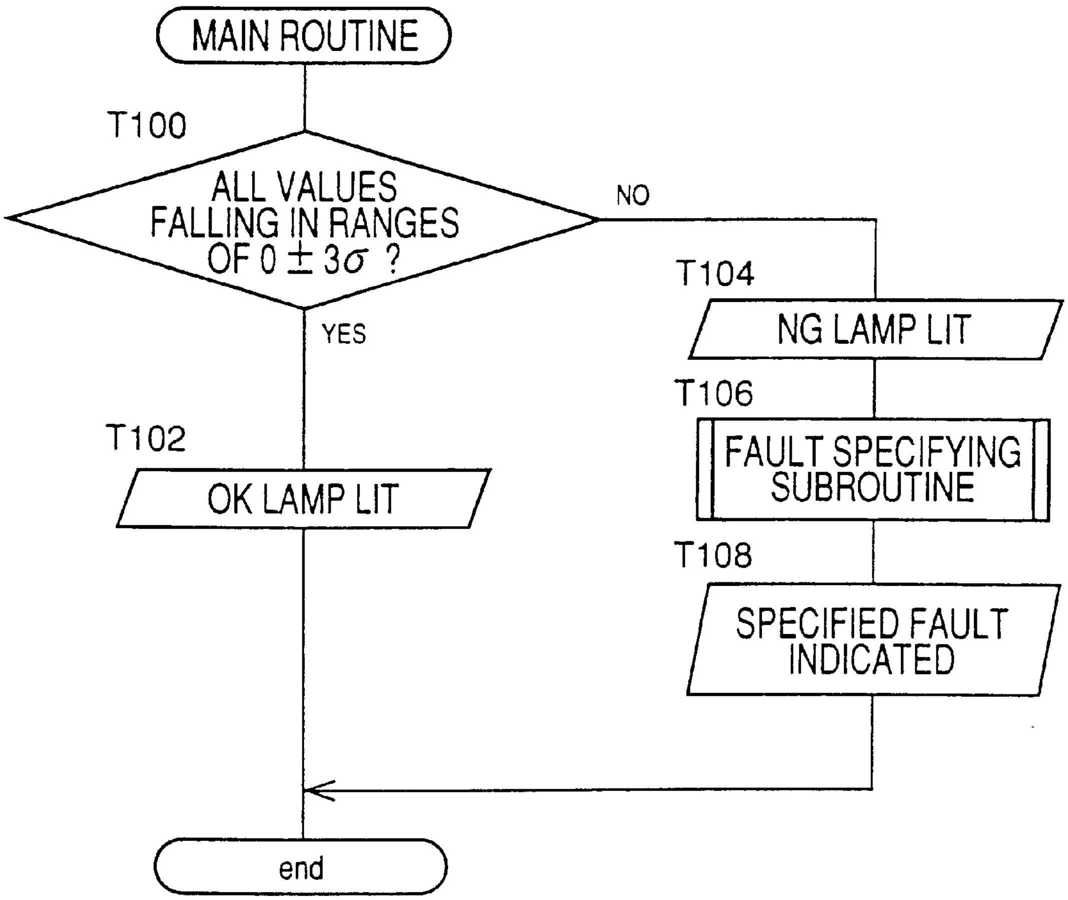
FIG. 51 is a flow chart representing the main routine of an engine testing program which is pre-stored in a ROM of a fault finder of an engine testing apparatus which carries out the engine testing method as the fourth embodiment.

FIG. 51 is a flow chart representing the main routine of an engine testing program which is employed in the fourth embodiment, in place of the main routine of FIG. 25 employed in the first embodiment. The present testing program is pre-stored in the ROM of the fault finder 117 and which is carried out by the CPU and the RAM of the finder 117. According to the main routine, the fault finder 117 identifies the presence or absence of a fault of the engine 90. If the engine 90 has no fault, the finder 117 commands the display 118 shown in FIG. 52 to indicate that the engine 90 has passed the test. On the other hand, if a fault is found, the finder 117 identifies or specifies what is the fault, and then commands the display 118 to indicate that the engine 90 has not passed the test and additionally indicate what is the fault. In the present testing program, it is assumed that only a single fault occurs, if any, that is, two or more faults do not simultaneously occur.

First, at Step T100, the fault finder 117 or the CPU thereof judges whether respective values of the exhaust-pressure maximal-value difference α, the exhaust-pressure constant-value difference β, the exhaust-pressure maximal-value-angle difference Γ, the exhaust-pressure constant-start-angle difference Σ, the exhaust-pressure decrease-start-angle difference Φ, the intake-pressure maximal-value-angle difference Λ, and the intake-pressure increase-start-angle difference Ψ which are measured from each one of the six cylinders #1 to #6 of the engine 90 fall in seven reference ranges, respectively. For example, a standard deviation, σ, of each of the seven differences indicated in the table is obtained from a plurality of normal engines (e.g., 1,000 engines), and the reference range therefor is determined as 0±3σ. The seven reference ranges which may differ from one another will be expressed as $\alpha_{TH}$, $\beta_{TH}$, $\Gamma_{TH}$, $\Sigma_{TH}$, $\Phi_{TH}$, $\Lambda_{TH}$, $\Psi_{TH}$, respectively. When the assembling of the engine 90 is normal, the difference α, for example, falls in the range of $0\pm\alpha_{TH}$, that is, the conditional expression: $0-\alpha_{TH}\leqq\alpha\leqq 0+\alpha_{TH}$ is true. Therefore, if the respective conditional expressions for the seven differences are all true, a positive judgment is made at Step T100 and the control of the CPU goes to Step T102 to command the display 118 to light the OK lamp 200 indicating that no fault has been found and the engine 90 has passed the test. Subsequently, the CPU quits the main routine. On the other hand, if a negative judgment is made at Step T100, that is, a fault has been found, the control goes to Step T104 to light the NG lamp 202 indicating this situation and that the engine 90 has not passed the test. Subsequently, the control of the CPU goes to Step T106, i.e., a fault identifying or specifying subroutine. Step T106 is followed by Step T108 to light a lamp of the display 118 corresponding to the fault specified at Step T106. Then, the CPU quits the main routine.

As indicated above, in the present engine testing method, the amounts relating to the exhaust-pressure constant-value difference β, that is, the difference B itself, the exhaust-pressure decrease-start-angle difference Φ, and the exhaust-pressure constant-start-angle difference Σ are mainly utilized for finding each of various faults with the assembling of the engine 90. However, other sorts of differences may be employed. For example, all the seven differences are utilized at Step T100.

Figure 53:
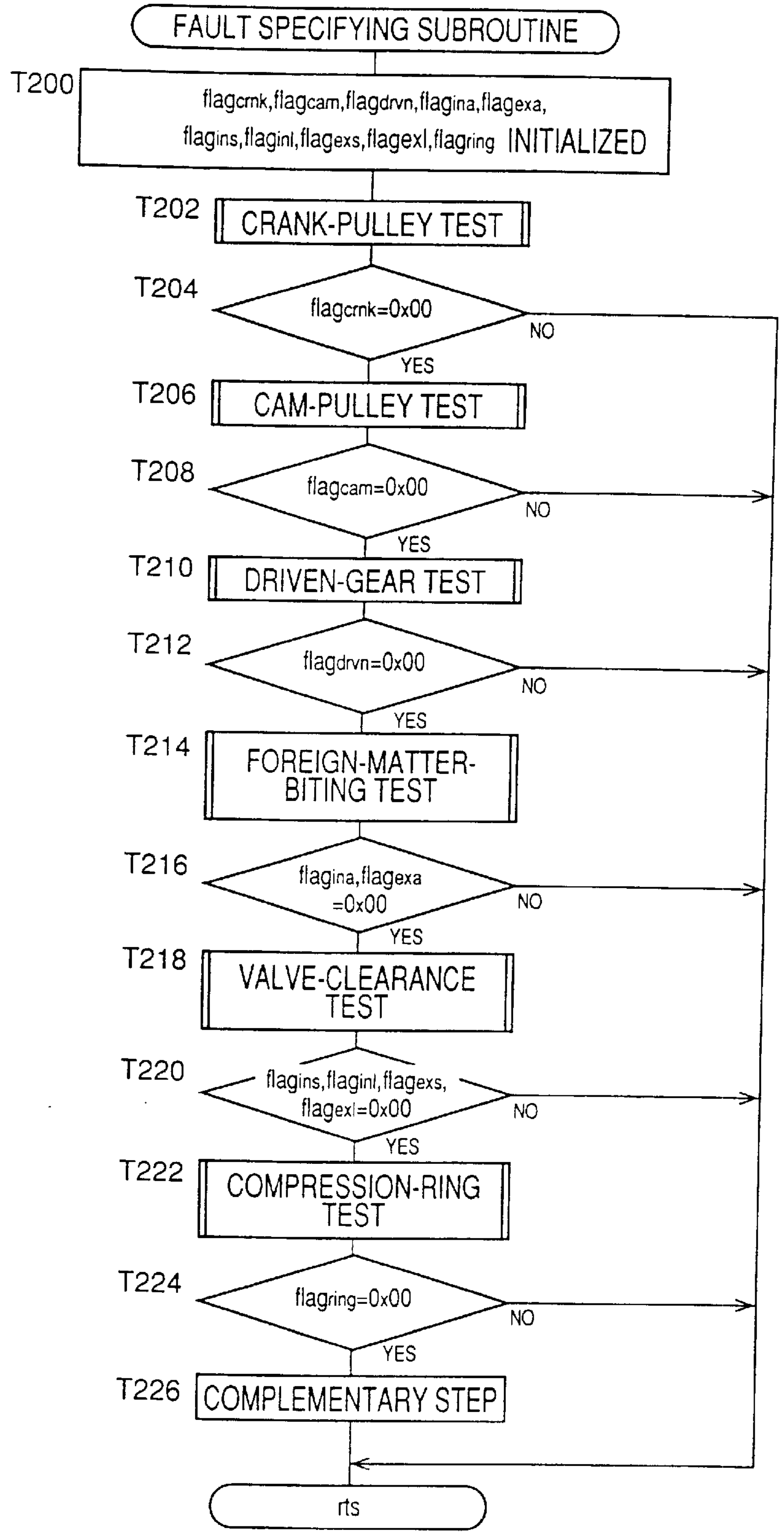
FIG. 53 is a flow chart representing a fault specifying routine called at Step T106 of the flow chart of FIG. 52.

FIG. 53 is a flow chart representing the fault specifying subroutine of Step T106 of FIG. 51. In the present subroutine, first, at Step T200, the CPU of the fault finder 117 initializes, to 0×00, each of ten fault flags corresponding to the faults indicated in the table of FIG. 50. In the present embodiment, the RAM of the fault finder 117 has the same fault flags as those employed in the first embodiment and shown in FIG. 28, and additionally has two fault flags, '$flag_{ina}$' and '$flag_{exa}$', corresponding to the intake-valve and exhaust-valve foreign-matter biting, respectively. As shown in FIG. 54, each of those two flags also comprises one byte data, i.e., eight bits data. If no fault has been found, each flag remains 0×00. The lower six bits of the flag '$flag_{ina}$' represent the presence or absence of the intake-valve foreign-matter biting of the cylinders #1 to #6 of the engine 90, respectively, and the lower six bits of the flag '$flag_{exa}$' represent the presence or absence of the exhaust-valve foreign-matter biting of the cylinders #1 to #6, respectively. The respective highest (left-end) bits of those two flags are doubtful-fault bits each of which may be set to 1 to indicate that a corresponding fault is doubtful but cannot be identified.

Step T200 is followed by Steps T202 to T226. Step T202 is a crank-pulley test for determining values to be set to the flag '$flag_{crnk}$'. Steps T206 is a cam-pulley test for determining values to be set to the flag '$flag_{cam}$'. Step T210 is a driven-gear test for determining values to be set to the flag '$flag_{drvn}$' Step T214 is a foreign-matter-biting test for determining values to be set to the flags '$flag_{ina}$', '$flag_{exa}$'. Step T218 is a valve-clearance test for determining values to be set to the flags '$flag_{ins}$', '$flag_{inl}$', '$flag_{exl}$'. Step T222 is a compression-ring test for determining values to be set to the flag '$flag_{ring}$'. If a fault is found at any of those steps, that is, if a negative judgment is made at any of Steps T204, T208, T212, T216, T220, and T224, then the CPU immediately quits the fault specifying routine and the remaining steps are not carried out. This manner corresponds to the above-indicated assumption that only a single fault occurs to a single engine 90. If a positive judgment is made at each of Steps T204, T208, T212, T216, T220, and T224, then the control of the CPU goes to Step T226 which will be described later. Thereafter, the CPU quits the present subroutine.

First, the crank-pulley test at Step T202 of FIG. 53 will be described below.

Figure 55:
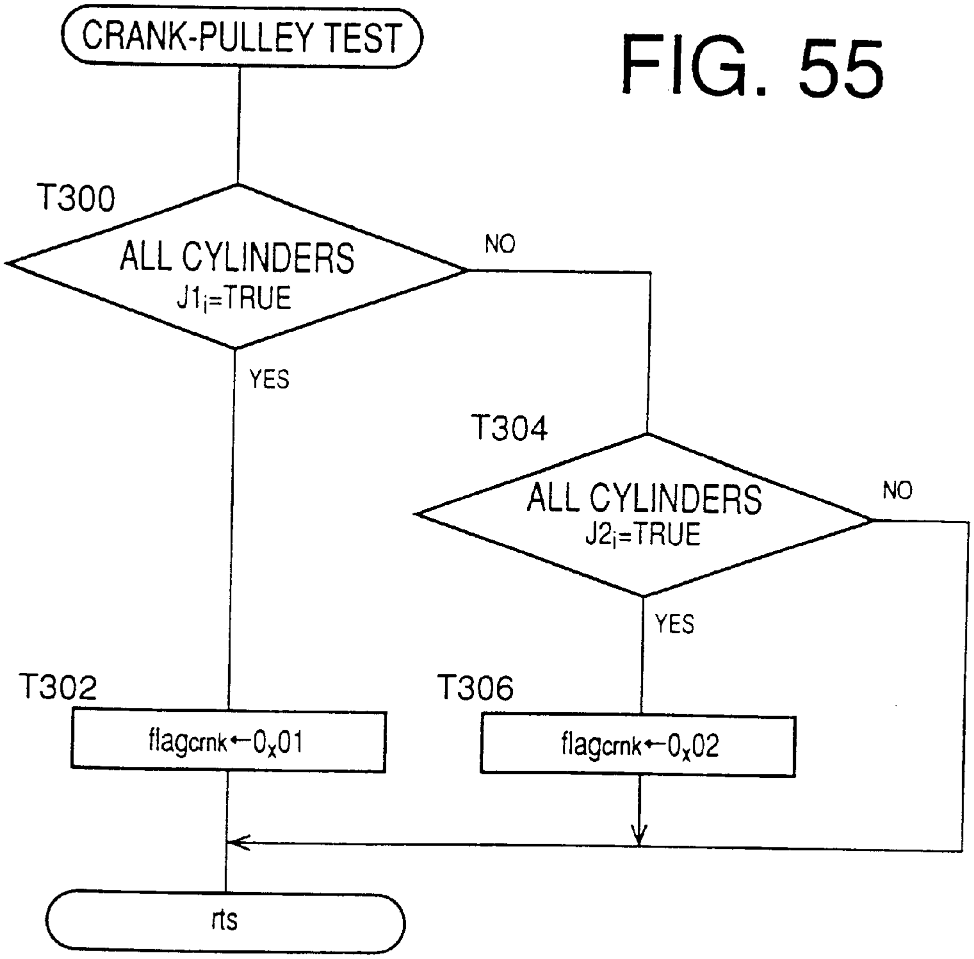
FIG. 55 is a flow chart representing a crank-pulley test routine called at Step T202 of the flow chart of FIG. 53.

FIG. 55 is a flow chart representing the crank-pulley testing subroutine of Step T202 of FIG. 53. First, at Step T300, the CPU of the fault finder 117 judges whether a variable, $J1_i$, corresponding to the current cylinder indicated by the content of a variable 'i' is 1. The variable $J1_i$ is defined by the following logical expression:

$$J1_i=(-\beta_{TH}\leqq\beta_i\leqq\beta_{TH})\cap(15-\Sigma_{TH}\leqq\Sigma_i\leqq 15+\Sigma_{TH})\cap(15-\Phi_{TH}\leqq\Phi_i\leqq 15+\Phi_{TH}) \quad (1)$$

The variable '$J1_i$' takes 1 corresponding to TRUE when the above expression is correct, or 0 corresponding to FALSE when the expression is not correct. If the variable $J1_i$ corresponding to every cylinder #1 to #6 is 1 (i.e., TRUE), the control of the CPU goes to Step T302 to set, in the fault flag '$flag_{crnk}$' 0×01 indicating that the crank pulley is one-tooth fast. Then, the CPU quits the present subroutine. On the other hand, if the variable $J1_i$ corresponding to at least one cylinder #1 to #6 is 0 (i.e., FALSE), the control goes to Step T304 to judge whether a variable, $J2_i$, corresponding to the current cylinder indicated by the variable 'i' is 1. The variable $J2_i$ is defined by the following logical expression:

$$J2_i=(-\beta_{TH}\leqq\beta_i\leqq\beta_{TH})\cap(-15-\Sigma_{TH}\leqq\Sigma_i\leqq -15+\Sigma_{TH})\cap(-15-\Phi_{TH}\leqq\Phi_i\leqq -15+\Phi_{TH}) \quad (2)$$

If the variable $J2_i$ corresponding to every cylinder #1 to #6 is 1 (TRUE), the control goes to Step T306 to set, in the flag '$flag_{crnk}$' 0×02 indicating that the crank pulley is one-tooth slow. Then, the CPU quits the subroutine. On the other hand, if the variable $J2_i$ corresponding to at least one cylinder #1 to #6 is 0 (FALSE), the CPU directly quits the subroutine.

A negative judgment made at Step T304 indicates that the crank pulley 18 is normal. In this case only, the content of the flag '$flag_{crnk}$' remains $_{0\times00}$ as it was initialized at Step T200 of FIG. 53, and a positive judgment is made at Step T204. Then, the control goes to Step T206.

Figure 56:
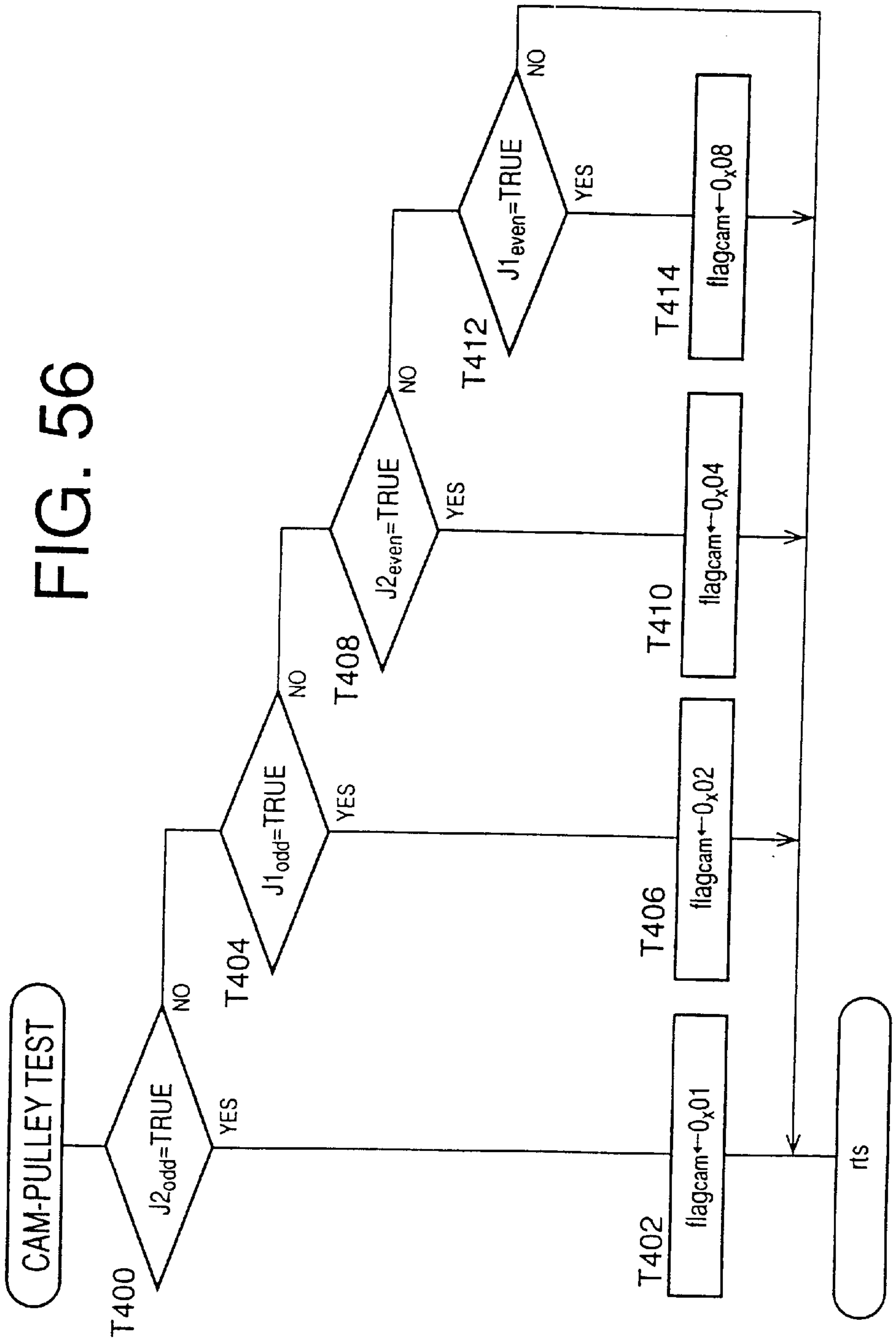
FIG. 56 is a flow chart representing a cam-pulley test routine called at Step T206 of the flow chart of FIG. 53.

FIG. 56 is a flow chart representing the cam-pulley testing subroutine of Step T206 of FIG. 53. First, at Step T400, the CPU judges whether the variable $J2_i$ corresponding to every cylinder #1, #3, #5 of the left bank is 1 (TRUE). Hereinafter, the variable $J2_i$ for the odd-numbered cylinders #1, #3, #5 of the left bank will be referred to as the variable $J2_{odd}$. The suffix "odd" indicates that the content of the variable 'i' is an odd number. If a positive judgment is made at Step T400, the control of the CPU goes to Step T402 to set, in the fault flag '$flag_{cam}$', 0×01 indicating that the left cam pulley 24 is one-tooth fast. Then, the CPU quits the present subroutine. On the other hand, if the variable $J2_{odd}$ corresponding to at least one cylinder #1, #3, #5 is 0 (FALSE), the control goes to Step T404 to judge whether the variable $J1_i$ corresponding to every cylinder #1, #3, #5 of the left bank is 1 (TRUE). Hereinafter, the variable $J1_i$ for the odd-numbered cylinders #1, #3, #5 of the left bank will be referred to as the variable $J1_{odd}$. If a positive judgment is made at Step T404, the control of the CPU goes to Step T406 to set, in the flag '$flag_{cam}$', 0×02 indicating that the left cam pulley 24 is one-tooth slow. Then, the CPU quits the subroutine. On the other hand, if the variable $J1_{odd}$ corresponding to at least one cylinder #1, #3, #5 is 0 (FALSE), the control goes to Step T408 to judge whether the variable $J2_i$ corresponding to every cylinder #2, #4, #6 of the right bank is 1 (TRUE). Hereinafter, the variable $J2_i$ for the even-numbered cylinders #2, #4, #6 of the right bank will be referred to as the variable $J2_{even}$. The suffix "even" indicates that the content of the variable 'i' is an even number. If a positive judgment is made at Step T408, the control of the CPU goes to Step T410 to set, in the flag '$flag_{cam}$', 0×04 indicating that the right cam pulley 26 is one-tooth fast. Then, the CPU quits the subroutine. On the other hand, if the variable $J2_{even}$ corresponding to at least one cylinder #2, #4, #6 is 0 (FALSE), the control goes to Step T412 to judge whether the variable $J1_i$ corresponding to every cylinder #2, #4, #6 of the right bank is 1 (TRUE). Hereinafter, the variable $J1_i$ for the even-numbered cylinders #2, #4, #6 of the right bank will be referred to as the variable $J1_{even}$. If a positive judgment is made at Step T412, the control of the CPU goes to Step T414 to set, in the flag '$flag_{cam}$', 0×08 indicating that the right cam pulley 26 is one-tooth slow. Then, the CPU quits the subroutine. On the other hand, if the variable $J1_{even}$ corresponding to at least one cylinder #2, #4, #6 is 0 (FALSE), the CPU directly quits the subroutine. A negative judgment made at Step T412 indicates that the two cam pulleys 24, 26 are normal. In this case only, the content of the flag '$flag_{cam}$' remains 0×00 as it was initialized at cam Step T200 of FIG. 53, and a positive judgment is made at Step T208. Then, the control goes to Step T210.

Figure 57:
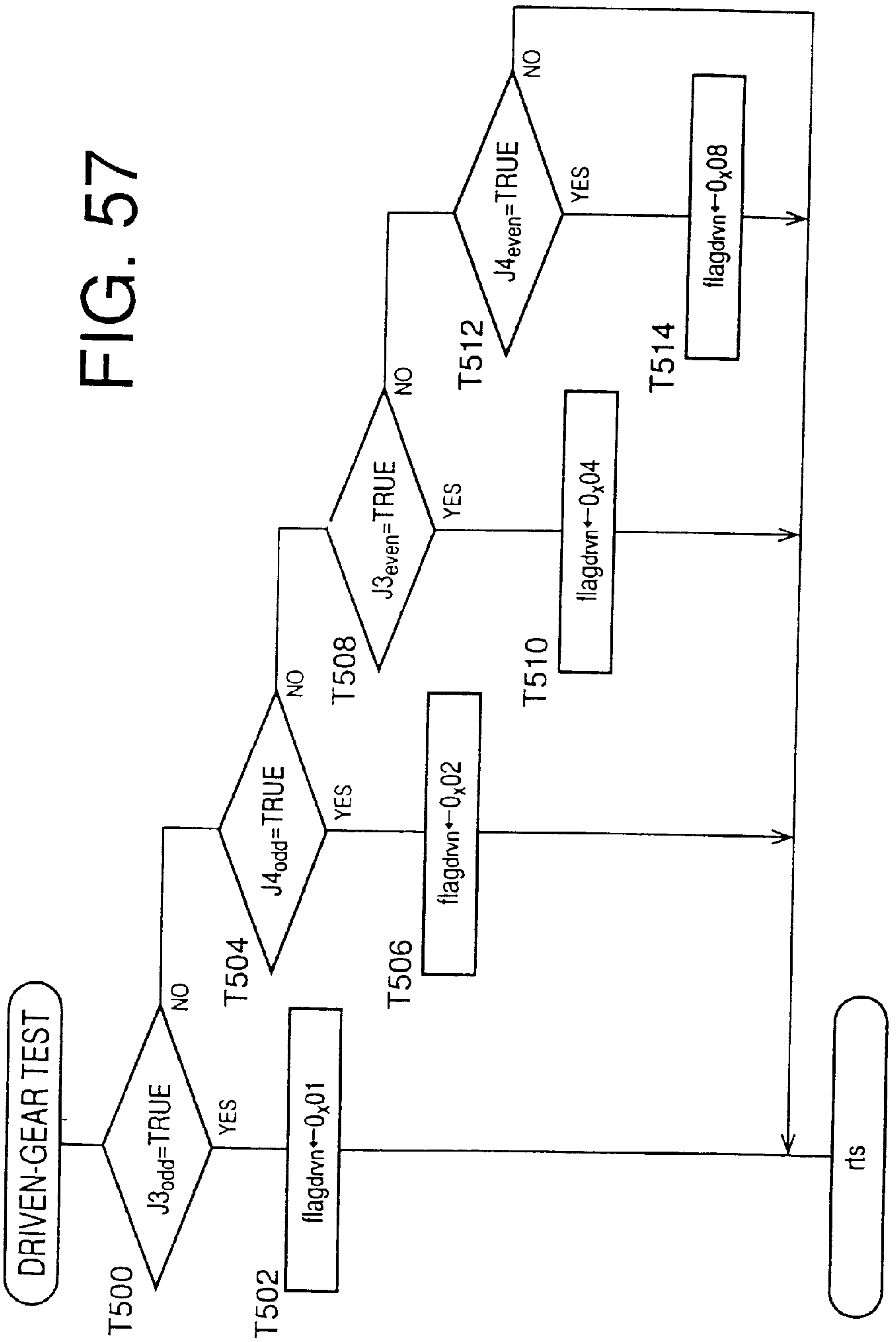
FIG. 57 is a flow chart representing a driven-gear test routine called at Step T210 of the flow chart of FIG. 53.

FIG. 57 is a flow chart representing the driven-gear testing subroutine of Step T210 of FIG. 53. First, at Step T500, the CPU judges whether a variable, $J3_i$ (expressed as $J3_{odd}$), corresponding to every cylinder #1, #3, #5 of the left bank is 1 (TRUE). The variable $J3_i$ is defined by the following logical expression:

$$J3_i=(-10-\beta_{TH}\leqq\beta_i\leqq-10+\beta_{TH})\cap(-8.4-\Sigma_{TH}\leqq\Sigma_i\leqq-8.4+\Sigma_{TH})\cap(-\Phi_{TH}\leqq\Phi_i\leqq\Phi_{TH}) \quad (3)$$

If a positive judgment is made at Step T500, the control of the CPU goes to Step T502 to set, in the fault flag '$flag_{drvn}$' 0×01 indicating that the left driven gear 40 is one-tooth fast. Then, the CPU quits the present subroutine. On the other hand, if a negative judgment is made at Step S500, the control goes to Step T504 to judge whether a variable, $J4_i$ (expressed as $J4_{odd}$), corresponding to every cylinder #1, #3, #5 of the left bank is 1 (TRUE). The variable $J4_i$ is defined by the following logical expression:

$$J4_i=(36-\beta_{TH}\leqq\beta_i\leqq36+\beta_{TH})\cap(-\Sigma_{TH}\leqq\Sigma_i\leqq\Sigma_{TH})\cap(-\Phi_{TH}\leqq\Phi_i\leqq\Phi_{TH}) \quad (4)$$

If a positive judgment is made at Step T504, the control of the CPU gores to Step T506 to set, in the flag '$flag_{drvn}$', 0×02 indicating that the left driven gear 40 is one-tooth slow. Then the CPU quits the subroutine. On the other hand, if a negative judgment is made at Step T504, the control goes to Step T508 to judge whether the variable $J3_i$ ($J3_{even}$) corresponding to every cylinder #2, #4, #6 of the right bank is 1 (TRUE). If a positive judgment is made at Step T508, the control of the CPU goes to Step T510 to set, in the flag '$flag_{drvn}$', 0×04 indicating that the right driven gear 42 is one-tooth fast. Then, the CPU quits the subroutine. On the other hand, if a negative judgment is made at Step T508, the control goes to Step T512 to judge whether the variable $J4_i$ ($J4_{even}$) corresponding to every cylinder #2, #4, #6 of the right bank is 1 (TRUE). If a positive judgment is made at Step T512, the control of the CPU goes to Step T514 to set, in the flag '$flag_{drvn}$', 0×08 indicating that the right driven gear 42 is one-tooth slow. Then the CPU quits the subroutine. On the other hand, if a negative judgment is made at Step T512, the CPU directly quits the subroutine. A negative judgment made at Step T512 indicates that the two driven gears 40, 42 are normal. In this case only, the content of the flag '$flag_{drvn}$' remains 0×00 as it was initialized at Step T20 of FIG. 53, and a positive judgment is made at Step T212. Then, the control goes to Step T214.

Figure 58:
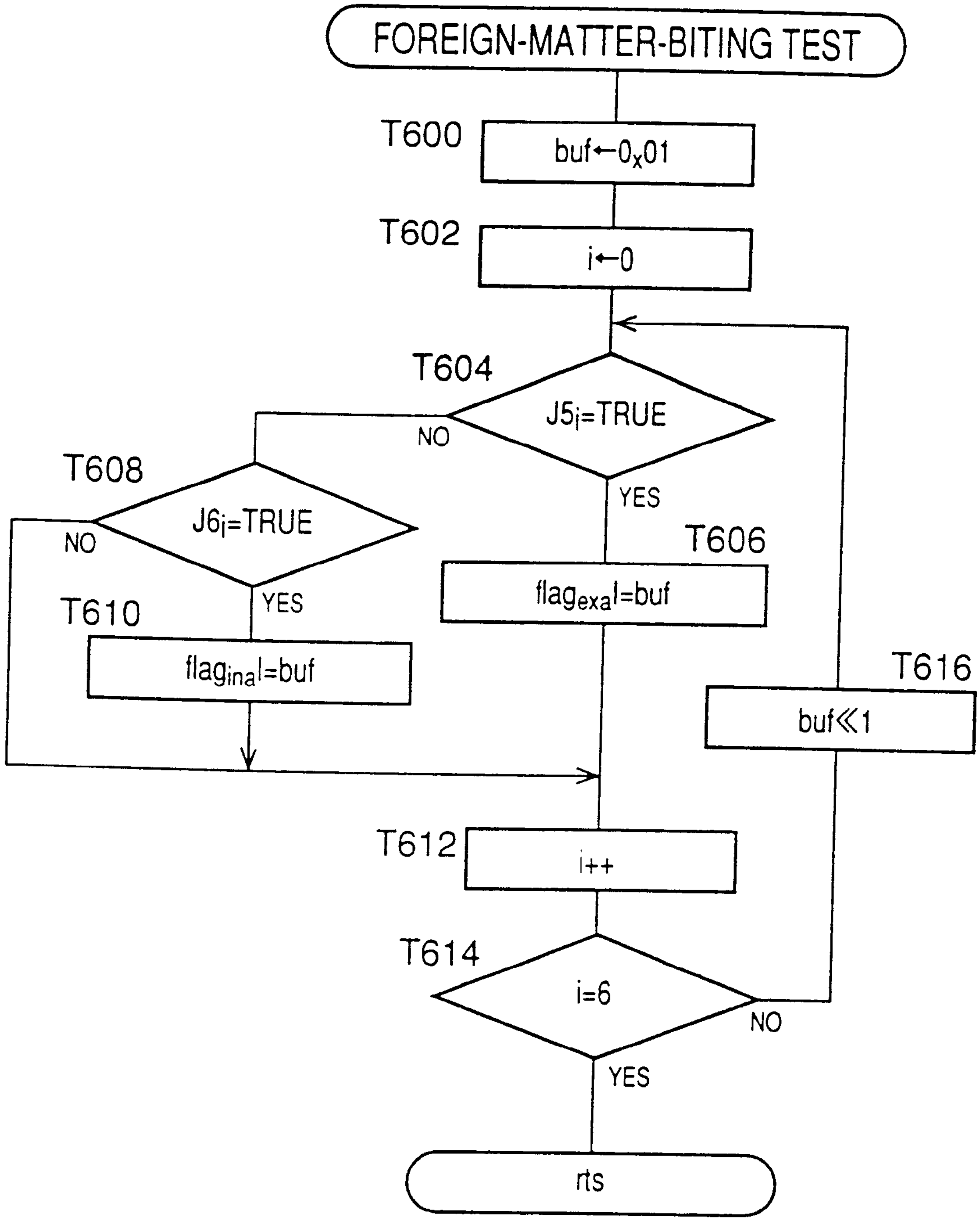
FIG. 58 is a flow chart representing a foreign-matter-biting test routine called at Step T214 of the flow chart of FIG. 53.

FIG. 58 is a flow chart representing the foreign-matter-biting testing subroutine called at Step T214 of FIG. 53. First, at Step T600, the CPU sets 0×01 to a variable 'buf' and, at Step T602, the CPU initializes the variable it to 0 corresponding to the first piston or cylinder #1. Subsequently, at Step T604, the CPU judges whether a variable, $J5_i$, corresponding to the current cylinder is 1 (TRUE). The variable $J5_i$ is defined by the following logical expression:

$$J5_i=(MAX\beta_{TH}<MAX(\beta_i))\cap(-\Sigma_{TH}\leqq\Sigma_i\leqq\Sigma_{TH})\cap(-\Phi_{TH}\leqq\Phi_i\leqq\Phi_{TH}) \quad (5)$$

$MAX(\beta_i)$ is a function which provides the maximum value of the variable exhaust-pressure constant-value difference $\beta_i$ (FIG. 48), and $MAX\beta_{TH}$ is a threshold value. In the present embodiment, the threshold value is selected at 60. However, any value that permits the CPU to make a reliable judgment at Step T604 may be selected as the threshold value. For example, the average value $\beta$ obtained from normal engines plus $3\sigma$ may be employed as the threshold value. That the difference $\beta_i$ is greater than the threshold value $MAX\beta_{TH}$ is one condition for judging that the foreign-matter biting has occurred. A positive judgment made at Step T604 indicates that the foreign-matter biting has occurred to the exhaust valve or valves 48 of the current cylinder indicated by the variable 'i'. In this case, the control of the CPU goes to Step T606 to set the logical sum of the flag '$flag_{exa}$' and the variable 'buf', again to the flag '$flag_{exa}$'. Consequently one of the lower six bits of the flag '$flag_{exa}$' which corresponds to the current cylinder is changed to 1 indicating that the fault has occurred to that cylinder.

On the other hand, if a negative judgment is made at Step T604, the control goes to Step T608 to judge whether a variable, $J6_i$, corresponding to the current cylinder is 1 (TRUE). The variable $J6_i$ is defined by the following logical expression:

$$J6_i=(\beta_i<-\beta_{TH})\cap(\Sigma_i<-\Sigma_{TH})\cap(-\Phi_{TH}\leqq\Phi_i\leqq\Phi_{TH}) \quad (6)$$

A positive judgment made at Step T608 indicates that the foreign-matter biting has occurred to the intake valve or valves 50 of the current cylinder indicated by the variable 'i'. In this case, the control goes to Step T610 to set the logical sum of the content of the variable 'buf' and the content of the flag '$flag_{ina}$', again in the flag '$flag_{ina}$'. On the other hand, if a negative judgment is made at Step T608, the control goes to Step T612, which also follows Step T606 or Step T610. At Step T612, the CPU adds one to the content of the variable 'i'. Step T612 is followed by Step T614 to judge whether the content of the variable 'i' is equal to 6. If a positive judgment is made at Step T614, the CPU quits the present subroutine. On the other hand, if a negative judgment is made, the control goes to Step T616 to shift 1 from the current bit to the next, higher bit in the variable 'buf', so that the number (0, 1, 2, 3, 4, or 5) allotted to the bit having 1 coincides with the number indicated by the content of the variable 'i'. Then, the control of the CPU goes back to Step T604. The value '1' set in a bit of the flag '$flag_{exa}$' or '$flag_{ina}$' indicates that a fault has occurred to the cylinder corresponding to that bit.

Figure 59:
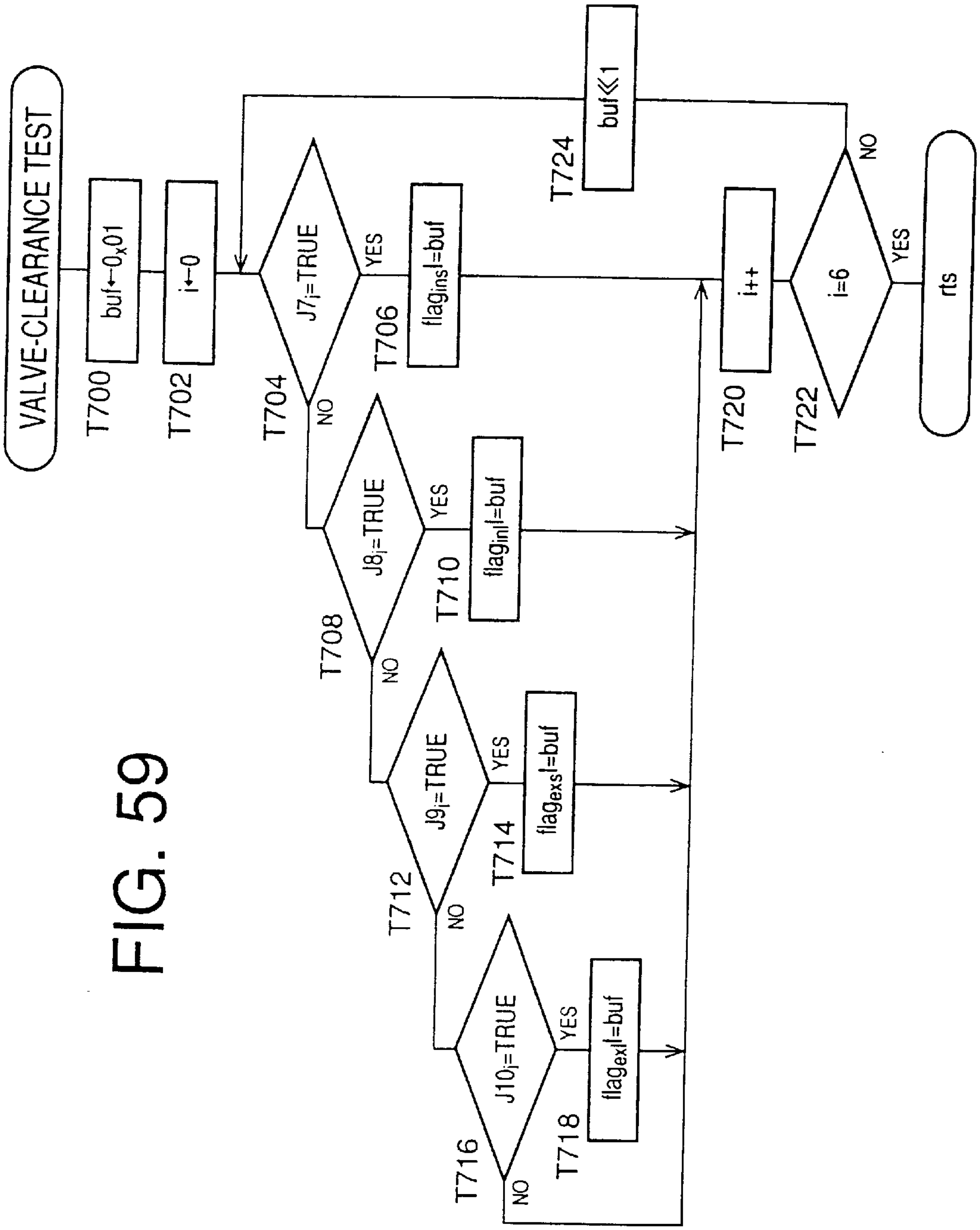
FIG. 59 is a flow chart representing a valve-clearance test routine called at Step T218 of the flow chart of FIG. 53.

FIG. 59 is a flow chart representing the valve-clearance testing subroutine called at Step T218 of FIG. 53. First, at Step T700, the CPU sets 0×01 to the variable 'buf' and, at Step T702, the CPU initializes the variable 'i' to 0 corresponding to the first piston or cylinder #1. Subsequently, at Steps T704, T708, T712, and T716, the CPU judges whether the small or large state of the intake-valve or exhaust-valve clearance has occurred to the current cylinder, by utilizing four variables $J7_i$, $J8_i$, $J9_i$, and $J10_i$ defined by the following four logical expressions, respectively:

$$J7_i=(\beta_i<-\beta_{TH})\cap(\Gamma_i<-\Gamma_{TH})\cap(-\Sigma_{TH}\leqq\Sigma_i\leqq\Sigma_{TH})\cap(-\Phi_{TH}\leqq\Phi_i\leqq\Phi_{TH}) \quad (7)$$

$$J8_i=(\beta_{TH}<\beta_i)\cap(-\Sigma_{Th}\leqq\Sigma_i\leqq\Sigma_{Th})\cap(-\Phi_{TH}\leqq\Phi_i\leqq\Phi_{TH})\cap(\Gamma_{TH}<\Gamma_i) \quad (8)$$

$$J9_i=(\beta_i<-\beta_{TH})\cap(\Sigma_{TH}<\Sigma_i)\cap(\Phi_i<-\Phi_{TH}) \quad (9)$$

$$J10_i=(\beta_{Tj}<\beta_o)\cap(-\Sigma_{TH}\leqq\Sigma_i\leqq\Sigma_{TH})\cap(-\Phi_{TH}\leqq\Phi_i\leqq\Phi_{TH})\cap(-\Gamma_{TH}\leqq\Gamma_i\leqq\Gamma_{TH}) \quad (10)$$

In each of the expressions (8) and (10), the exhaust-pressure maximal-value-angle difference $\Gamma_i$ is taken into account, because as is apparent from the table shown in FIG. 50, the respective large states of the intake-valve and exhaust-valve clearances cannot be distinguished from each other based on only the exhaust-pressure constant-value difference $\beta_i$, the exhaust-pressure constant-start-angle difference $\Sigma_i$, and the exhaust-pressure decrease-start-angle difference $\Phi_i$. The difference $\Gamma_i$ is also taken into account, because as is apparent from FIG. 50 the compression-ring missing (the test therefor will be described later by reference to FIG. 60) and the small state of the intake-valve clearance cannot be distinguished from each other based on only those differences.

If it is judged that the variable $J7_i$ is 1 (TRUE), that is, if a positive judgment is made at Step T704, the control of the CPU goes to Step T706 to set the logical sum of the content of the variable 'buf' and the content of the fault flag '$flag_{ins}$', again in the flag '$flag_{ins}$'. If it is judged at Step T708 that the variable $J8_i$ is 1 (TRUE), the control of the CPU goes to Step T710 to set the logical sum of the content of the variable 'buf' and the content of the f lag '$flag_{inl}$', again in the fault flag '$flag_{inl}$'. If it is judged at Step T712 that the variable $J9_i$ is 1 (TRUE), the control of the CPU goes to Step T714 to set the logical sum of the content of the variable 'buf' and the content of the fault flag '$flag_{exs}$' again in the flag '$flag_{exs}$'. If it is judged at Step T716 that the variable $J10_i$ is 1 (TRUE), the control of the CPU goes to Step T718 to set the logical sum of the content of the variable 'buf' and the content of the fault flag '$flag_{exl}$', again in the flag '$flag_{exl}$'. At Step T720, one is added to the variable 'i' and, at Step T722, the CPU judges whether the content of the variable 'i' is equal to 6. If a positive judgment is made at Step T722, the CPU quits the subroutine. On the other hand, if a negative judgment is made, the control goes to Step T724 to shift 1 from the current bit to the next, higher bit in the variable 'buf', so that the number allotted to the bit having 1 coincides with the number indicated by the content of the variable 'i' incremented at Step T720. Then, the control of the CPU goes back to Step T704.

Figure 60:
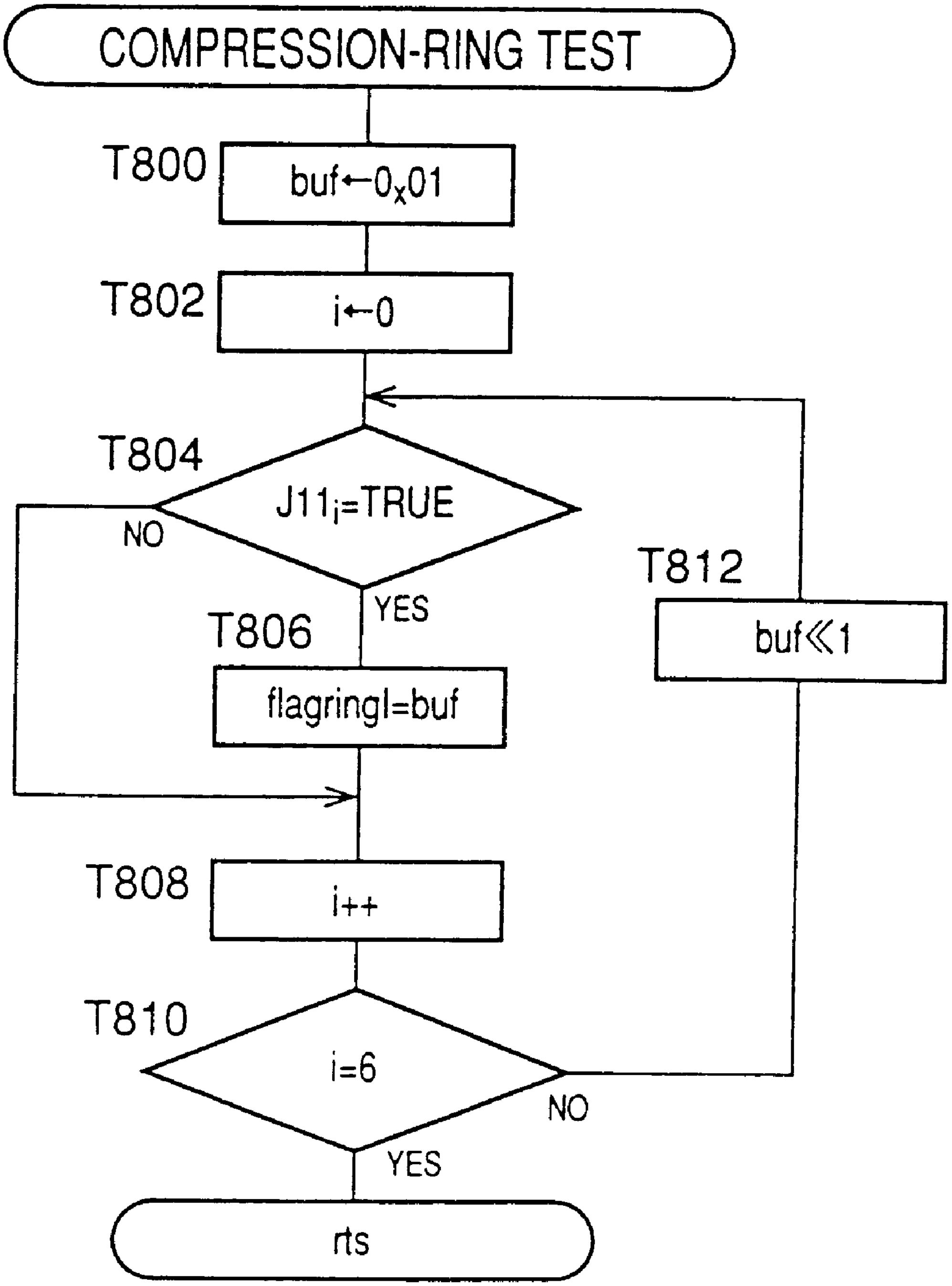
FIG. 60 is a flow chart representing a compression-ring test routine called at Step T222 of the flow chart of FIG. 53.

FIG. 60 is a flow chart representing the compression-ring testing subroutine called at Step T222 of FIG. 53. First, at Step T800, the CPU sets 0×01 to the variable 'buf' and, at Step T802, the CPU initializes the variable 'i' to 0 corresponding to the first piston or cylinder #1. Subsequently, at Step T804, the CPU judges whether a variable, $J11_i$, corresponding to the current cylinder is 1 (TRUE). The variable $J11i$ is defined by the following logical expression:

$$J11_i=(\beta_i\leqq\beta_{TH})\cap(-\Gamma_{TH}\leqq\Gamma_i\leqq\Gamma_{TH})\cap(-\Sigma_{TH}\leqq\Sigma_i\leqq\Sigma_{TH})\cap(-\Phi_{TH}\leqq\Phi_i\leqq\Phi_{TH}) \quad (11)$$

In the logical expression (11), the exhaust-pressure maximal-value-angle difference $\Gamma_i$ is taken into account, so that the compression-ring missing may be distinguished from the small state of the intake-valve clearance. However, in the present subroutine, the conditional expression relating to the difference $\Gamma_i$ may be omitted from the logical expression (11), because the difference $\Gamma_i$ has been taken into account at Step T218, i.e., the valve-clearance test for distinguishing the fault of small intake-valve clearance from the fault of compression-ring missing. A positive judgment made at Step T804 indicates that the compression-ring missing has occurred to the piston of the current cylinder. In this case, the control of the CPU goes to Step T806 to set the logical sum of the content of the variable 'buf' and the content, of the fault flag '$flag_{ring}$' again in the flag '$flag_{ring}$'. At Step T808, one is added to the variable 'i' and, at Step T810, the CPU judges whether the content of the variable 'i' is equal to 6. If a positive judgment is made at Step T810, the CPU quits the subroutine. On the other hand, if a negative judgment is made, the control goes to Step T812 to shift 1 from the current bit to the next, higher bit in the variable 'buf'. Then, the control of the CPU goes back to Step T804.

Step T224 is followed by Step T226, i.e., a complementary step. Only in the case where no fault has been specified or identified at Steps T200 to T224 of the fault specifying subroutine of FIG. 53, the control of the CPU reaches this step. However, the subroutine of FIG. 53 is called when the main routine of FIG. 51 shows that there is possibility that some fault has occurred to the engine 90. That is, the fact that the CPU reaches Step T226 indicates that the test result obtained from the routine of FIG. 53 is not compatible with that obtained from the routine of FIG. 51. However, the CPU cannot know the reason therefor. Accordingly, the CPU sets 1 to the highest bit of every fault flag, so that the lamps corresponding to all the fault flags flash on the display 118. Thus, the fault finder 117 can prevent itself from erroneously judging that the engine 90 is a normal engine, notwithstanding the presence of incompatibility of the test results.

Figure 61:
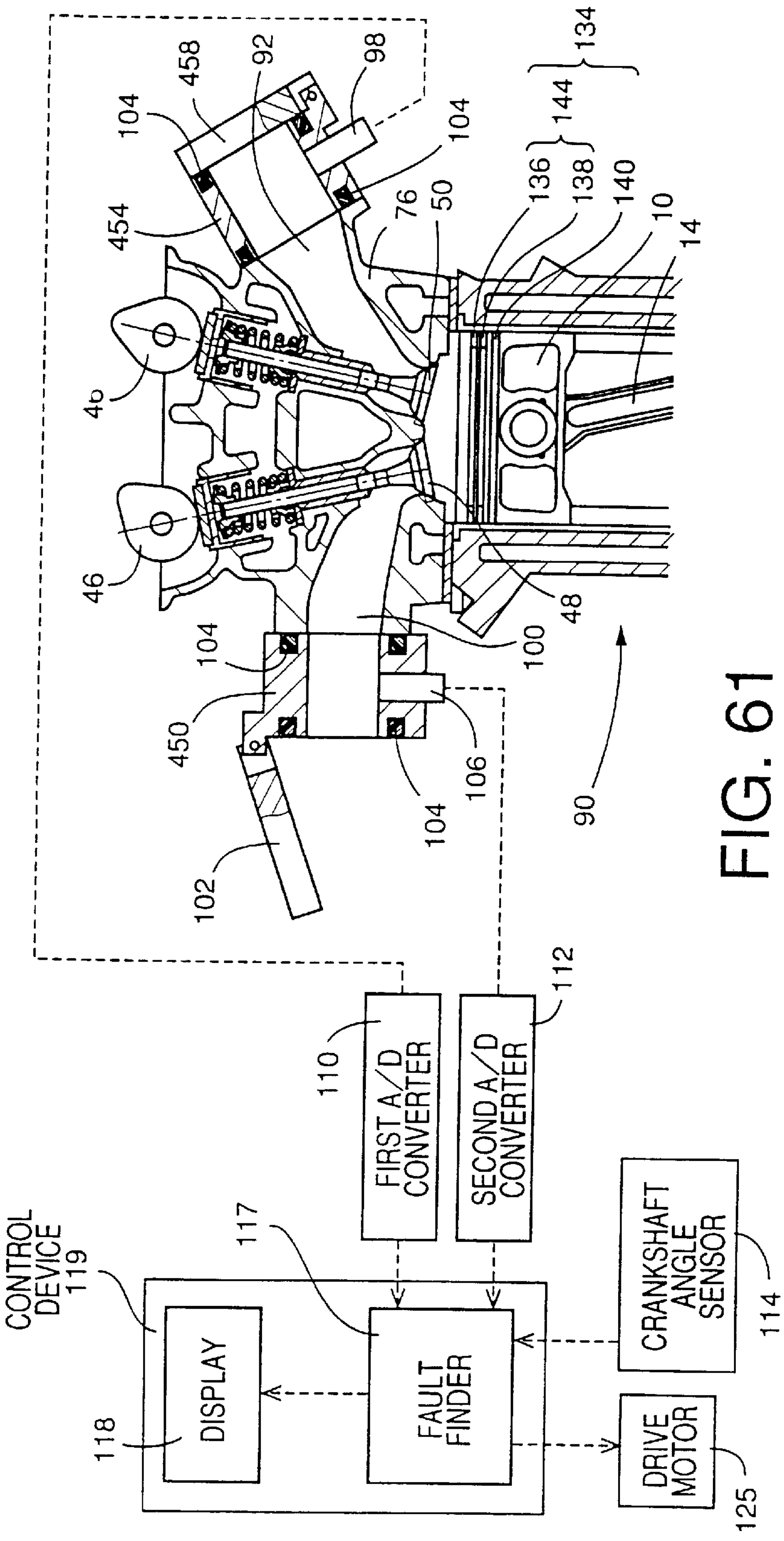
FIG. 61 is a diagrammatic view corresponding to FIG. 4, and showing an essential portion of another engine testing apparatus which carries out another engine testing method as a fifth embodiment of the invention.

Referring next to FIG. 61, there will be described a fifth embodiment of the present invention wherein an invention engine testing method is carried out by an engine testing apparatus shown in the figure. The testing apparatus shown in FIG. 61 is basically similar to the apparatus shown in FIG. 4. The same reference numerals as used in FIG. 4 are used to designate the corresponding elements and parts of the apparatus shown in FIG. 61, and the description of those elements and parts is omitted. In the present testing method, a generally tubular support member 450 is fixed to each of the six exhaust ports 100. Two O-shaped rings 104 are attached to opposite end faces of the support member 450 to maintain airtightness. One of the two end faces of the support member 450 is held in close contact with the exhaust port 100. A cover member 102 is attached to the other end face of the support member 450. When the cover member 102 is closed or opened, the exhaust-valve side space (i.e., respective inner spaces of the exhaust port 100 and the support member 450) is closed or opened. FIG. 61 shows the cover member 102 in its opened state. With the cover member 102 being closed, the respective inner spaces of the exhaust port 100 and the support member 450 are isolated from the atmosphere. A pressure sensor 106 is attached to each of the six support members 450, at a position where the sensor 106 can measure the pressure in the inner space of each support member 450. Thus, the pressure sensor 106 can measure the pressure in the exhaust-valve side space both when the space is its closed state and when the space is in its opened state. A similar arrangement is provided for each of the intake ports 92. More specifically described, a generally tubular support member 454 is fixed to each of the six intake ports 92. Two O-shaped rings 104 are attached to opposite end faces of the support member 454 to maintain airtightness. One of the two end faces of the support member 454 is held in close contact with the intake port 92. A cover member 458 is attached to the other end face of the support member 454. When the cover member 458 is closed or opened, the intake-valve side space (i.e., respective inner spaces of the intake port 92 and the support member 454) is closed or opened. FIG. 61 shows the cover member 458 in its closed state. With the cover member 458 being closed, the respective inner spaces of the intake port 92 and the support member 454 are isolated from the atmosphere. A pressure sensor 98 is attached to each of the six support members 454, at a position where the sensor 98 can measure the pressure in the inner space of each support member 454. Thus, the pressure sensor 98 can measure the pressure in the intake-valve side space both when the space is its closed state and when the space is in its opened state. Each of the cover members 102, 458 is switched between its closed and opened states by a drive device (not shown) under control of the control device 119.

Thus, the cover members 102 can be closed and opened independent of the closing and opening of the cover members 458. In the present embodiment, two covering manners are utilized for testing an engine 90, as will be described below: in the first covering manner, the cover members 102 are opened and the cover members 458 are closed and, in the second covering manner, vice versa. It is possible that an engine test be carried out in a manner in which all the cover members 102, 458 are opened, or in a manner in which all the cover members 102, 458 are closed. However, since those manners are just employed for very specific-purposes, the detailed description thereof is omitted.

The first covering manner is similar to the covering manner employed in the fourth embodiment of the invention engine testing method, since the exhaust-valve side space is closed and the intake-valve side space is opened. Therefore, the results similar to those shown in FIG. 50 (i.e., the exhaust-pressure maximal-value difference $\alpha$, the exhaust-pressure constant-value difference $\beta$, the exhaust-pressure maximal-value-angle difference $\Gamma$, the exhaust-pressure constant-start-angle difference $\Sigma$, and the exhaust-pressure decrease-start-angle difference $\Phi$) are obtained based on the exhaust pressures $P_{EX}$ measured in the first covering manner. Although in the fourth embodiment the intake manifolds 94 are employed like the first embodiment shown in FIG. 4, no intake manifold is employed in the present, fifth embodiment. This causes differences of the respective exhaust pressures $P_{EX}$ obtained from the two embodiments. However, those differences are small. Hereinafter, the differences $\alpha$, $\beta$, $\Gamma$, $\Sigma$, $\Phi$ obtained in the first covering manner will be indicated by symbols $\alpha_{EX}$, $\beta_{EX}$, $\Gamma_{EX}$, $\Sigma_{EX}$, $\Phi_{EX}$, respectively.

In the second covering manner, the drive motor 125 is rotated in the opposite direction, so that the crank shaft 18 is rotated in the direction opposite to the normal direction in which the crank shaft 18 is rotated when the engine 90 is actually operated by firing. Accordingly, the respective intake pressures $P_{IN}$ measured by the six pressure sensors 98 change like the respective exhaust pressures $P_{EX}$ measured by the six pressure sensors 106 in the first covering manner. Thus, the control device 119 obtains, from each cylinder, an exhaust-pressure maximal-value difference $\alpha_{IN}$, an exhaust-pressure constant-value difference $\beta_{IN}$, an exhaust-pressure maximal-value-angle difference $\Gamma_{IN}$, an exhaust-pressure constant-start-angle difference $\Sigma_{IN}$, and an exhaust-pressure decrease-start-angle difference $\Phi_{IN}$ which correspond to the differences $\alpha_{EX}$, $\beta_{EX}$, $\Gamma_{EX}$, $\Sigma_{EX}$, $\Phi_{EX}$, respectively. In the present embodiment, the respective waveforms of the six exhaust-pressure signals $P_{EX}$ are obtained in the first covering manner, and the respective waveforms of the six intake-pressure signals $P_{IN}$ are obtained in the second covering manner. Thus, more information about the current state of the engine 90 is obtained than that obtained in the fourth embodiment.

Figure 62:
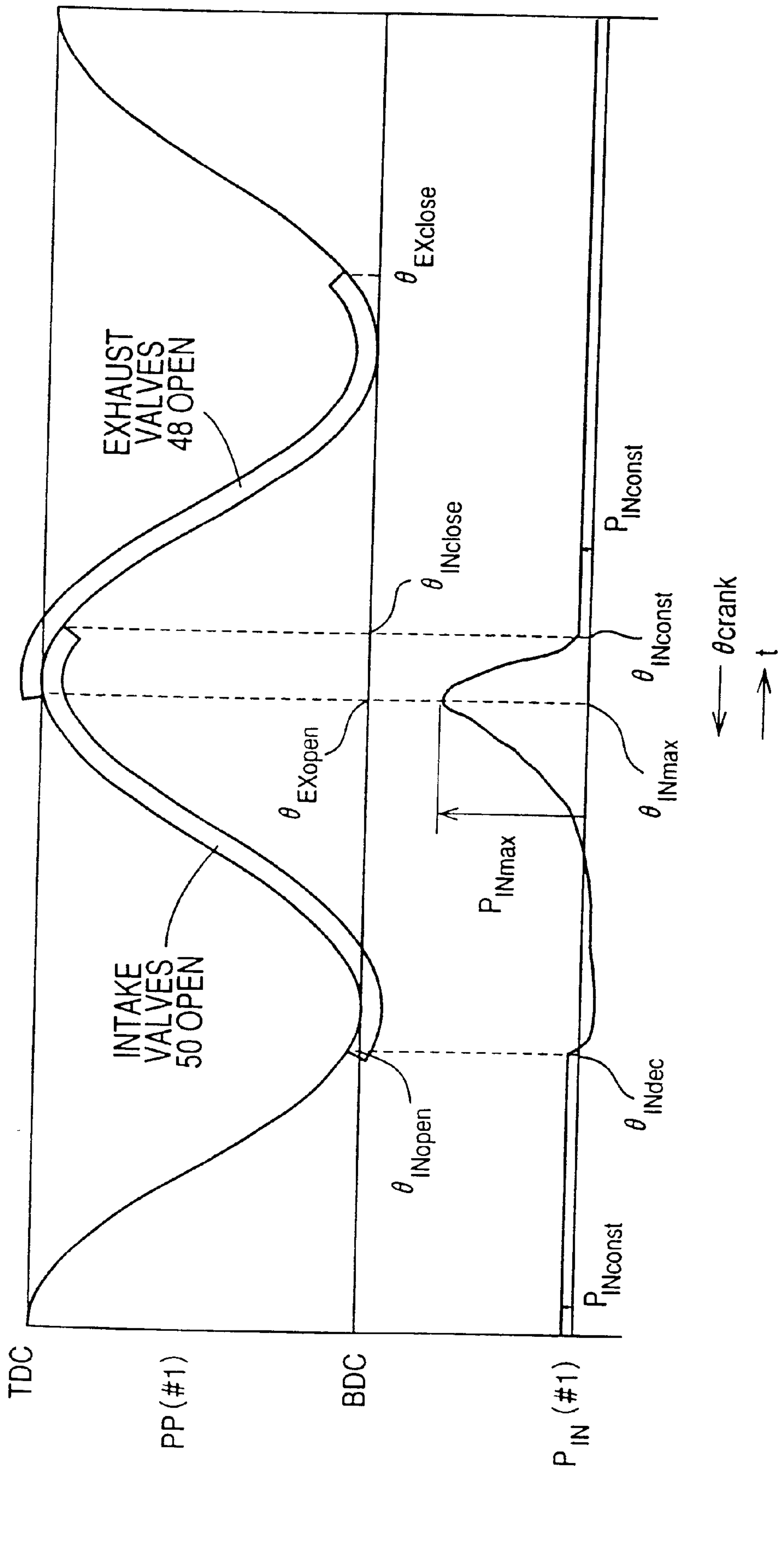
FIG. 62 is a graph showing the change of position PP of a piston of a normal engine with respect to the crank-shaft angle $\Theta_{crank}$, and the change of an intake pressure $P_{IN}$ of the engine, both of which are obtained when the engine is rotated in a direction opposite to its normal direction.

FIG. 62 is a graph showing the respective changes of the position PP of the first piston #1 and the intake pressure $P_{IN}$ of the first cylinder #1, with respect to the crank-shaft angle $\Theta_{crank}$, in the second covering manner. In the graph, as time, t, elapses, the angle $\Theta_{crank}$ decreases from 720 degrees toward 0 degree. The opening period of the exhaust valves 48 or the intake valves 50 shown in FIG. 62 is obtained by reversing that shown in FIG. 6, with respect to a center line corresponding to the angle $\Theta_{crank}$=360 degrees. Accordingly, the opening and closing timings of the exhaust or intake valves 48, 50 shown in FIG. 62 are obtained by reversing those shown in FIG. 6, with respect to the center line. As is apparent from the comparison of FIGS. 6 and 62, the change of the intake pressure $P_{IN}$ shown in FIG. 62 is not completely identical with that obtained when the motor 125 is rotated in the normal direction, but is very similar to the same. This fact can be utilized for determining a crank-shaft (CS) angle corresponding to the timing when the intake valves 50 are closed. More specifically, the CS angle corresponding to the timing when the intake pressure $P_{IN}$ starts decreasing from a constant value in the second covering manner is equal to the CS angle corresponding to the timing when the intake valves 50 are closed. This angle (hereinafter, referred to as the "intake-pressure decrease-start angle") is indicated by symbol, $\Theta_{INdec}$. The opening timing of the intake valves 50 and the opening and closing timings of the exhaust valves 48 are known in the first covering manner as shown in FIG. 6. Thus, in the present engine testing method, the control device 119 can accurately determine the respective CS angles corresponding to the opening and closing timings of the exhaust and intake valves 48, 50. However, it is noted that the intake-pressure maximal-value angle $\Theta_{INmax}$ shown in FIG. 6 differs from the intake-pressure maximal-value angle $\Theta_{INmax}$ shown in FIG. 62 although each of the two angles corresponds to the timing when the corresponding intake pressure $P_{IN}$ takes a maximal value, because the two angles are obtained in the different covering manners.

When an engine test is actually carried out, the exhaust-pressure decrease-start angle $\Theta_{EXdec}$, the exhaust-pressure maximal-value angle $\Theta_{EXmax}$, and the exhaust-pressure constant-value angle $\Theta_{EXconst}$ shown in FIG. 6 are obtained based on the exhaust pressure $P_{EX}$ measured in the first covering manner. In the second covering manner, the intake-pressure decrease-start angle $\Theta_{INdec}$, the intake-pressure maximal-value angle $\Theta_{INmax}$, and the intake-pressure constant-value angle $\Theta_{INconst}$ shown in FIG. 62 are obtained based on the intake pressure $P_{IN}$ measured. The angle $\Theta_{Exdec}$ corresponds to the timing when the exhaust valves 48 open when the engine 90 is rotated in the normal direction. The angle $\Theta_{EXconst}$ and the angle $\Theta_{INmax}$ correspond to the timing when the exhaust valves 48 close when the engine 90 is rotated in the normal direction. However, in the case where the driven gear 40, 42 is one-tooth fast, the angle $\Theta_{EXconst}$ does not correspond to the closing timing of the exhaust valves 48, and the exhaust-pressure constant-start-angle difference $\Sigma_{EX}$ is produced (FIGS. 22 and 50). Thus, the angle $\Theta_{INmax}$ should be employed. Meanwhile, the angle $\Theta_{INdec}$ corresponds to the timing when the intake valves 50 close when the engine 90 is rotated in the normal direction, and the angle $\Theta_{EXmax}$ and the angle $\Theta_{INconst}$ correspond to the timing when the intake valves 50 open when the engine 90 is rotated in the normal direction. However, in the case where the driven gear 40, 42 is one-tooth fast, the angle $\Theta_{INconst}$ does not correspond to the opening timing of the intake valves 50, and the intake-pressure constant-start-angle difference $\Sigma_{IN}$ is produced. Thus, the angle $\Theta_{EXmax}$ should be employed. In the present embodiment, since the engine 90 can be rotated in both the first and second covering manners, the respective angles $\Theta_{crank}$ corresponding to the opening and closing timings of the exhaust and intake valves 48, 50 are obtained.

Figure 63:
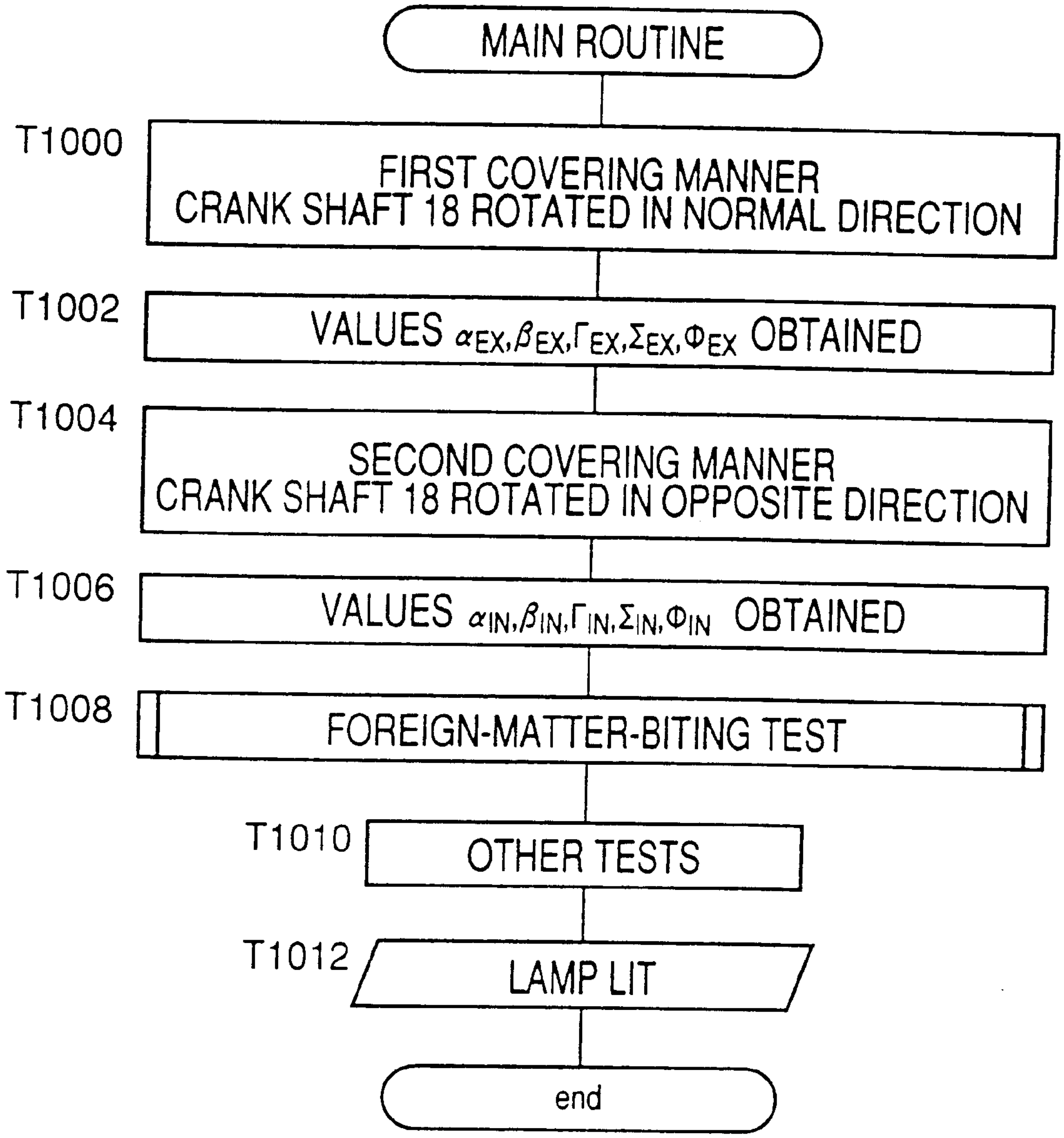
FIG. 63 is a flow chart representing the main routine of an engine testing program which is pre-stored in a ROM of a fault finder of an engine testing apparatus which carries out the engine testing method as the fifth embodiment.

FIG. 63 is a flow chart representing the main routine of an engine testing program which is stored in the ROM of the fault finder 117 and which is carried out by the CPU and the RAM of the finder 117. First, at Step T1000, the CPU operates for establishing the first covering manner on the engine testing apparatus, and rotating the drive motor 125 in the normal direction. Step T1000 is followed by Step T1002 to measure the exhaust pressure $P_{EX}$ from each of the cylinders #1 to #6 of the engine 90 and obtain an exhaust-pressure maximal-value difference $\alpha_{EX}$, an exhaust-pressure constant-value difference $\beta_{EX}$, an exhaust-pressure maximal-value-angle difference $\Gamma_{EX}$, an exhaust-pressure constant-start-angle difference $\Sigma_{EX}$, and an exhaust-pressure decrease-start-angle difference $\Phi_{EX}$ of each cylinder from the corresponding exhaust pressure $P_{EX}$. Subsequently, the control of the CPU goes to Step T1004 to establish the second covering manner on the testing apparatus, and rotate the drive motor 125 in the opposite direction. Step T1004 is followed by Step T1006 to measure the intake pressure PIN from each of the cylinders #1 to #6 of the engine 90 and obtain an intake-pressure maximal-value difference $\alpha_{IN}$, an intake-pressure constant-value difference $\beta_{IN}$, an intake-pressure maximal-value-angle difference $\Gamma_{IN}$, an intake-pressure constant-start-angle difference $\Sigma_{IN}$, and an intake-pressure decrease-start-angle difference $\Phi_{IN}$ of each cylinder from the corresponding intake pressure $P_{IN}$.

Subsequently, the control of the CPU goes to Step T1008 to call a foreign-matter-biting testing subroutine in which the CPU judges whether the foreign-matter biting has occurred to each cylinder. This test will be described later. Step T1008 is followed by Step T1010 to carry out other tests than the foreign-matter-biting test. Those tests will also be described later. Subsequently, the control goes to Step T1012 to command, based on the contents of the fault flags, the display 118 to light a lamp corresponding to the fault identified or specified at Step T1008 or Step T1010. Then, the CPU quits the main routine. The contents of the flags 'flag$_{ina}$', 'flag$_{exa}$' are determined at Step T1008, and the contents of the other, eight flags are determined at Step T1010.

Figure 64:
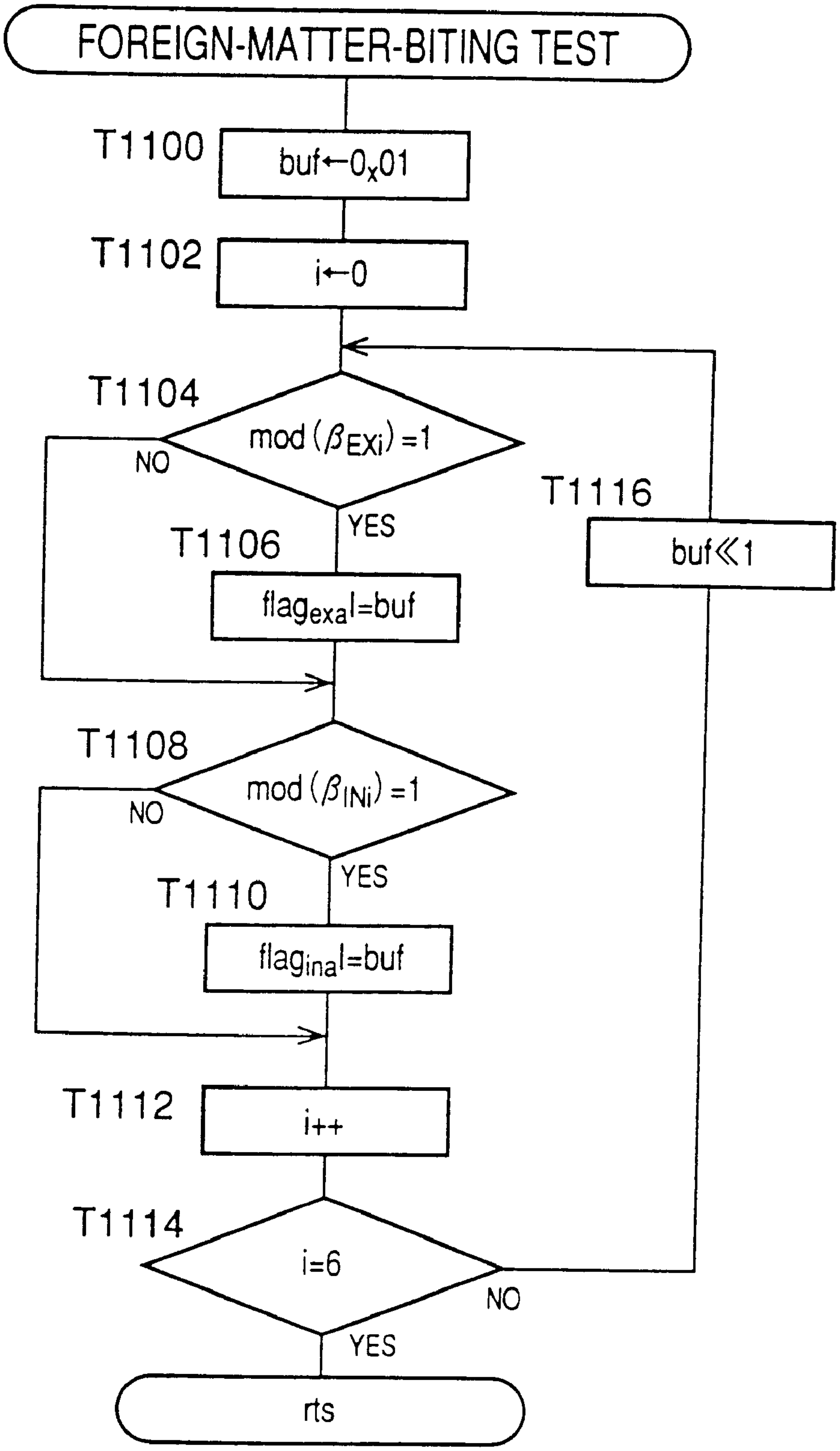
FIG. 64 is a flow chart representing a foreign-matter-biting test routine called at Step T1008 of the flow chart of FIG. 63.

FIG. 64 is a flow chart representing the foreign-matter-biting test called at Step T1008 of FIG. 63. First, at Step T1100, the CPU sets 0×01 to the variable 'buf' and, at Step T1102, the CPU initializes the variable 'i' to 0 corresponding to the first piston or cylinder #1. Subsequently, at Step T1104, the CPU judges whether the value provided by a function, mod($\beta_{EXi}$), corresponding to the current cylinder is 1. The function mod(x) is defined as a function which provides 1 if a parameter, x, changes by more than a reference amount, and provides 0 if not. Thus, a positive judgment is made at Step T1104 if the exhaust-pressure constant-value difference $\beta_{EXi}$ changes by more than the reference amount. In the present embodiment, the reference amount is selected at 60, but any value may be employed as the reference amount so long as the value permits the CPU to judge whether the foreign-matter biting has occurred to the exhaust valve or valves 48 of the cylinder, based on the difference $\beta_{EXi}$. If a positive judgment is made at Step T1104, the control goes to Step T1106 to set the logical sum of the content of the fault flag 'flag$_{exa}$' and the content of the variable 'buf', again to the flag 'flag$_{exa}$'. Consequently one of the lower six bits of the flag 'flag$_{exa}$' which corresponds to the current cylinder is changed to 1 indicating that the fault has occurred to that cylinder. Then, the control goes to Step T1108. On the other hand, if a negative judgment is made at Step T1104, the control directly goes to Step T1108.

At Step T1108, the CPU judges whether the value provided by a function, mod($\beta_{INi}$), corresponding to the current cylinder is 1. That is, the CPU judges whether the intake-pressure constant-value difference $\beta_{INi}$ changes by; more than a reference amount. In the present embodiment, this reference amount is also selected at 60. If a positive judgment is made at Step T1108, the control goes to Step T1110 to set the logical sum of the content of the fault flag 'flag$_{ina}$' and the content of the variable 'buf', again to the flag 'flag$_{ina}$'. Consequently one of the lower six bits of the flag 'flag$_{ina}$' which corresponds to the current cylinder is changed to 1 indicating that the fault has occurred to that cylinder. Then, the control goes to Step T1112. On the other hand, if a negative judgment is made at Step T1108, the control directly goes to Step T1112. At Step T1112, the CPU adds one to the content of the variable 'i'. Step T1112 is followed by Step T1114 to judge whether the content of the variable 'i' is equal to 6. If a positive judgment is made at Step T1114, the CPU quits the present subroutine. On the other hand, if a negative judgment is made, the control goes to Step T1116 to shift 1 from the current bit to the next, higher bit in the variable 'buf', so that the number (0, 1, 2, 3, 4, or 5) allotted to the bit having 1 coincides with the number indicated by the content of the variable 'i'. Then, the control of the CPU goes back to Step T1104. Thus, this foreign-matter-biting test provides a highly reliable result obtained by judging whether the difference $\beta_{EX}$ or $\beta_{IN}$ that does not change if the engine 90 does not have the fault of foreign-matter biting changes by more than the reference amount.

Next, there will be described the other tests carried out at Step T1010 of FIG. 63. At this step, a crank-pulley test, a cam-pulley test, a driven-gear test, a valve-clearance test, and a compression-ring test are carried out based on the differences $\alpha_{EX}$, $\beta_{EX}$, $\Gamma_{EX}$, $\Sigma_{EX}$, $\Phi_{EX}$, $\alpha_{IN}$, $\beta_{IN}$, $\Gamma_{IN}$, $\Sigma_{IN}$, $\Phi_{IN}$ of each of the six cylinders #1 to #6. Those tests are basically similar to the crank-pulley test (FIG. 55), the cam-pulley test (FIG. 56), the driven-gear test (FIG. 57), the valve-clearance test (FIG. 59), and the compression-ring test (FIG. 60) employed in the fourth embodiment. However, since more information is utilized at Step T1010, a more reliable test result is obtained at this step.

For example, in the case where only whether the intake-valve clearance is small or not is judged (on the assumption for easier understanding that the other sorts of faults do not occur), the differences $\Phi_{IN}$, $\Sigma_{IN}$ of each cylinder obtained in the second covering manner can be utilized. The differences $\Phi$, $\Sigma$ relating to the exhaust-valve clearance, indicated in the table of FIG. 50, can be regarded as those relating to the intake-valve clearance, obtained in the second covering manner. That is, in the second covering manner, whether the intake-valve clearance is small or not influences the differences $\Phi_{IN}$, $\Sigma_{IN}$. Therefore, if the intake-valve clearance is small, and if it can be assumed that the influence of the small intake-valve clearance to the differences $\Phi_{IN}$, $\Sigma_{IN}$ is the same as that to the differences $\Phi_{EX}$, $\Sigma_{EX}$, the difference $\Phi_{IN}$ takes −6.4, and the difference $\Sigma_{IN}$ takes 6.4. Thus, whether the intake-valve clearance is small can be judged by judging whether the difference $\Phi_{IN}$ takes a negative value and simultaneously the difference $\Sigma_{IN}$ takes a positive value.

If the respective crank-shaft angles corresponding to the opening and closing timings of the intake valves 50 and the opening and closing timings of the exhaust valves 48, measured from the engine 90 being tested, are equal to those measured from a normal engine, the engine 90 can be judged as a normal engine. Hence, the above-indicated angles measured from the engine 90 are displayed on the display 118 together with those measured from the normal engine. The display 118 may be replaced by a display of a personal computer. In the latter case, the personal computer is connected to the control device 119 in such a manner that information can be interchanged between the two elements. The angles measured from the engine 90 are transferred from the control device 119 to the personal computer, so that the display of the computer displays the angles received from the control device 119. In addition, the display of the computer may display, for each cylinder, the graphs shown in FIGS. 6 and 62. In the last case, the differences between the angles measured from the engine 90 and those measured from the normal engine, if any, are indicated on those graphs. If the display of the computer indicates that a fault has occurred to the engine 90, then an operator can perform a sensory test on the engine 90. This testing method is employed as a preliminary test or a screening test which helps the operator to identify or specify the fault which has occurred to the engine 90. Generally, the operator's identification or specification of the fault can be performed very quickly and very accurately. In addition, since the fault finder 117 of the control device 119 has only to judge whether an engine 90 being tested has a fault or not, the finder 117 enjoys a simpler arrangement.

In the present embodiment, the pressure sensor 98 is provided for each cylinder. If an orifice is formed through the covering member 458 of each cylinder, for restricting air flowing therethrough, or if the degree of opening of the covering member 458 of each cylinder is adapted to be changeable, then the intake pressure $P_{IN}$ of each cylinder can be obtained, in the first covering manner, independent of the respective intake pressures $P_{IN}$ of the other cylinders. In this case, the engine 90 can be rotated in an increased number of states, which contributes to improving the reliability of the present engine testing method, and/or increasing the number of sorts of faults are identified or specified by the same. This also applies to the covering members 102, in the case where the engine 90 is rotated in the second covering manner.

In the first covering manner, the engine 90 may be rotated in the opposite direction in addition to, or in place of in the normal direction. Similarly, in the second covering manner, the engine 90 may be rotated in the normal direction in addition to, or in place of in the opposite direction. In each case, the current state of the engine 90 is evaluated based on the obtained test result.

In each of the fourth and fifth embodiments, the V6 DOHC gasoline engines are tested. However, the present invention is applicable to the testing of various types of engines. For example, in the case where SOHC engines are tested, the testing steps for finding the fault with the driven gears 40, 42 are omitted. In addition, in the case where DOHC engines of the type wherein intake cam shafts (32, 34) are driven by not driven gears (40, 42) but different cam pulleys, testing steps for finding a fault with those different cam pulleys may be employed in place of the testing steps for finding the fault with the driven gears. Meanwhile, in each of the fourth and fifth embodiments, the engine test is carried out based on the characteristic parameters of the exhaust pressures $P_{EX}$. However, the other parameters indicated in the table of FIG. 50 and/or the other characteristic parameters of the curves shown in the graphs of FIG. 8, etc. may be employed for the same purpose. For example, the maximum slope of the curve shown in FIG. 8, or the crank-shaft angle corresponding to the maximum slope, the length and/or position of the interval in which the rate of change of the curve is greater than a reference value, etc. may be taken into account for finding a fault or faults with an engine. The present invention may be also applicable to diesel engines.

In order to specify or identify, with higher reliability, each of a plurality of faults which simultaneously occur to a single engine, the engine testing apparatus can gather more information from the engine. For example, all possible combinations of presence or absence of predetermined faults are artificially created on an engine, and the testing apparatus gathers a group of respective values of predetermined parameters $P_{EXmax}$, $\Theta_{EXmax}$, etc. in each of all the combinations of the predetermined faults created on the engine. Then, the testing apparatus obtains a group of respective values of the predetermined parameters $P_{EXmax}$, $\Theta_{EXmax}$, etc. from an engine being tested, compares the obtained group of values with each of the groups of values gathered in advance in all the fault combinations, and selects one of all the fault combinations as the specified or identified fault combination of the engine. In each of the fourth and fifth embodiments, the testing apparatus finds the one-tooth fast or slow state of the crank pulley 20, the cam pulley 24, 26, or the driven gear 40, 42. However, the testing apparatus may be adapted to find the two or more teeth fast or slow state of each pulley 20, 24, 26, 40, 42. In the last case, the parameters $P_{EXmax}$, $\Theta_{EXmax}$, etc. may be classified in more steps for finding a fault or faults with high accuracy. In this case, the slight differences of respective values of each of those parameters must be distinguished from each other. Since the engine testing apparatus employed in each of the fourth and fifth embodiments can quickly obtain a number of values of each of the parameters, it can find a fault or faults with an engine with high reliability by, e.g., statistically analyzing those values.

Next, there will be described a sixth embodiment of the present invention. The sixth embodiment is different from the above-described first embodiment in that the engine testing routine of FIG. 25 employed in the first embodiment is replaced by a different engine testing routine of FIG. 67 employed in the sixth embodiment. The engine testing apparatus of FIG. 4 employed in the first embodiment is also employed in the sixth embodiment. Accordingly, the description of the testing apparatus is omitted. Thus, the present testing apparatus can provide the table shown in FIG. 24.

The respective values (in degrees) of the exhaust-pressure maximal-value-angle difference Γ, the exhaust-pressure constant-start-angle difference Σ, the exhaust-pressure decrease-start-angle difference Φ, etc. indicated in the table of FIG. 24 cannot be obtained unless, e.g., an actual value (in degrees) of the exhaust-pressure maximal-value angle $\Theta_{EXmax}$ of each cylinder is determined with respect to a reference value therefor (e.g., 0 degree) based on the output of the crank-shaft sensor 114. That is, the values of difference Γ indicated in the table of FIG. 24 cannot be obtained by comparing the respective actual values of difference Γ of the cylinders #1 to #6 with one another, e.g., calculating the difference between the respective actual values of difference Γ of each pair of successively ignited cylinders, or the difference between the respective actual values of difference Γ of each pair of successive odd-numbered (or even-numbered) cylinders. This can be easily understood from the respective definitions of the differences Γ, Σ, Φ, etc. which have been described in the first embodiment by reference to FIGS. 8, 11, etc. However, the values of differences Γ, Σ, Φ, etc. indicated in the table of FIG. 24 are closely related to the information which is obtained by comparing the respective actual values of each difference Γ, Σ, Φ, etc. of the cylinders #1 to #6 with one another. Therefore, there are some cases where even if the respective actual values of each difference Γ, Σ, Φ, etc. of the cylinders #1 to #6 with respect to a reference value therefor may not be known, at least one fault with the assembling of the engine 90 can be identified or specified based on the information obtained by comparing the actual values of each difference Γ, Σ, Φ, etc. of the cylinders #1 to #6 with one another. Hereinafter, there will be described those cases.

For example, an exhaust-pressure maximal-value-angle relative difference, $\Delta\Gamma_i$ (i=1 to 6), is obtained by calculating the difference between the respective actual values of exhaust-pressure maximal-value angle $\Theta_{EXmax}$ of each pair of successively ignited cylinders of the six cylinders #1 to #6. The relative difference $\Delta\Gamma_i$ is obtained by subtracting the angle $\Theta_{EXmax}$ of the cylinder #i from the angle $\Theta_{EXmax}$ of the cylinder #i+1. However, if the value, i+1, exceeds 6, it is reduced by 6. Similarly, an exhaust-pressure decrease-start-angle relative difference, $\Delta\Sigma_i$, is obtained by calculating the difference between the respective actual values of exhaust-pressure decrease-start angle $\Theta_{EXdec}$ of each pair of successively ignited cylinders of the six cylinders #1 to #6, and an exhaust-pressure constant-start-angle relative difference, $\Delta\Phi_i$, is obtained by calculating the difference between the respective actual values of exhaust-pressure constant-start angle $\Theta_{EXconst}$ of each pair of successively ignited cylinders. The relative differences $\Delta\Gamma_i$, $\Delta\Sigma_i$, $\Delta\Phi_i$ can be utilized for finding one or more faults with the assembling of the engine 90, as described below.

Figure 65:
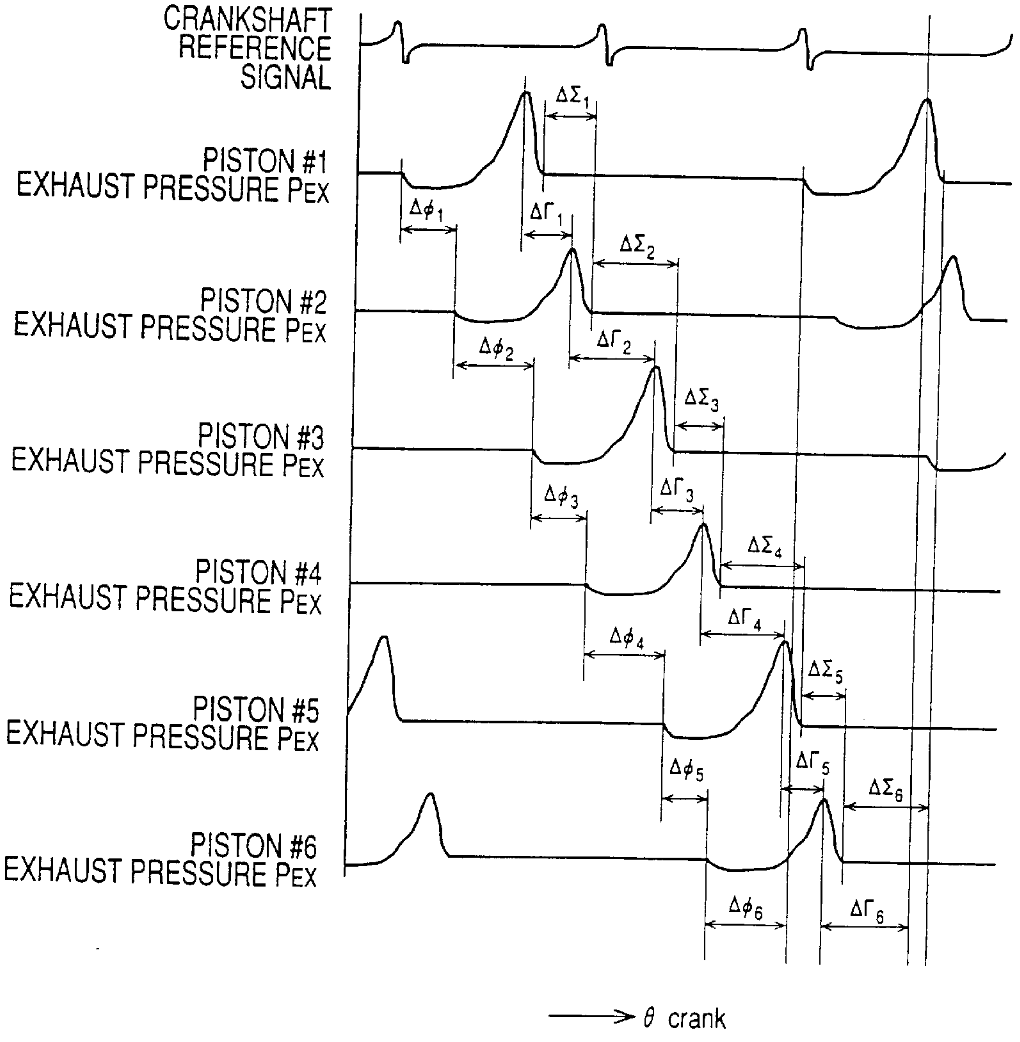
FIG. 65 is a graph showing an exhaust-pressure maximal-value-angle relative difference, $\Delta\Gamma_i$, an exhaust-pressure constant-start-angle relative difference, $\Delta\Sigma_i$, and an exhaust-pressure decrease-start-angle relative difference, $\Delta\Phi_i$, of each of cylinders of an engine having the one-tooth fast state of a right cam pulley, which is utilized by another engine testing method as a sixth embodiment of the invention.

FIG. 65 is a graph showing the respective values of relative differences $\Delta\Gamma_i$, $\Delta\Sigma_i$, $\Delta\Phi_i$ obtained from the waveform of exhaust pressure $P_{EX}$ of each of the six cylinders #1 to #6. The respective values of relative differences $\Delta\Gamma_i$, $\Delta\Sigma_i$, $\Delta\Phi_i$ can be obtained without needing the output of the CS sensor 114. For example, the six values of relative difference $\Delta\Gamma_i$ are obtained by measuring, using a timer (not shown) provided in the fault finder 117, a time when the output of each of the six pressure sensors 106 takes a maximal value, and calculating the difference between the respective measured times of each pair of successively ignited cylinders of the six cylinders #1 to #6. Thus, six time differences are obtained. Each of the six time differences is converted into an crank-shaft (CS) angle (in degrees) by dividing each time difference by the sum of the six time differences and multiplying the thus obtained value by 720 degrees corresponding to one cycle. In addition, the relative difference $\Delta\Phi_i$ can be obtained by identifying a time when the exhaust pressure $P_{EX}$ of each cylinder #1 to #6 represented by the output of the corresponding pressure sensor 106 changes from a constant state in which the pressure $P_{EX}$ takes a substantially constant value, to a first decreasing state in which the pressure $P_{EX}$ quickly decreases. As is apparent from FIG. 6, regarding the engine 90 being tested, the constant state of the exhaust pressure $P_{EX}$ of each cylinder #1 to #6 occupies more than 60% of the total time of each cycle. The six values of relative difference $\Delta\Phi_i$ are obtained by calculating the difference between the respective identified times of each pair of successively ignited cylinders of the six cylinders #1 to #6, like the six values of relative difference $\Delta\Gamma_i$. The relative difference $\Delta\Sigma_i$ can be obtained, contrary to the manner in which the relative difference $\Delta\Phi_i$ is obtained, by identifying a time when the exhaust pressure $P_{EX}$ of each cylinder #1 to #6 changes from a second decreasing state different from the first decreasing state, to the constant state. Hereinafter, the above-indicated manners will be referred to as the "time-difference-dependent relative-angle-difference obtaining manners".

Figure 66:
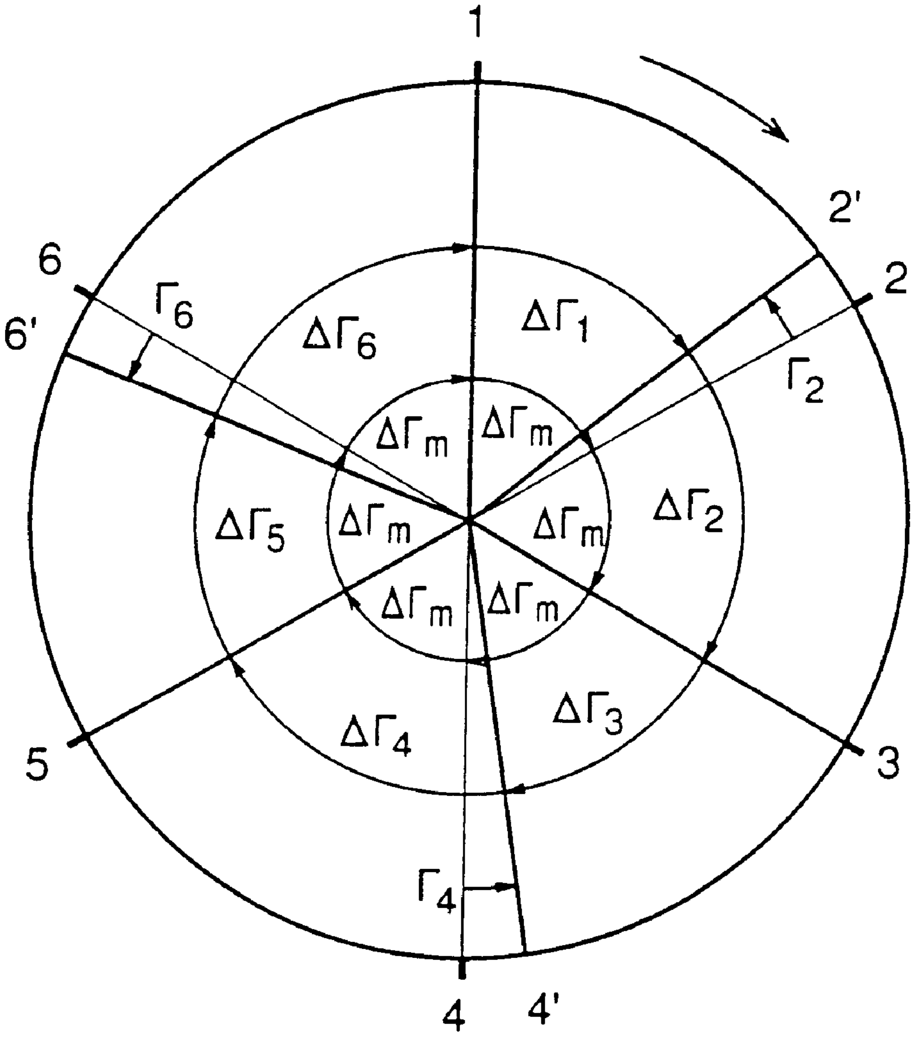
FIG. 66 is a view illustrating the six values of relative difference $\Delta\Gamma_i$ obtained from an engine having the one-tooth fast state of a right cam pulley.

The respective values of relative differences $\Delta\Gamma_i$, $\Delta\Sigma_i$, $\Delta\Phi_i$ are influenced by the two values of exhaust-pressure maximal-value-angle difference $\Gamma_i$, $\Gamma_{i+1}$, the two values of exhaust-pressure decrease-start-angle difference $\Phi_i$, $\Phi_{i+1}$, and the two values of exhaust-pressure constant-start-angle difference $\Sigma_i$, $\Sigma_{i+1}$, respectively. That is, the respective values of relative differences $\Delta\Gamma_i$, $\Delta\Sigma_i$, $\Delta\Phi_i$ are influenced by the assembled state of the engine 90. For example, in the case where the right cam pulley 26 of the right bank of the engine 90 is one-tooth fast as indicated in FIG. 65, the six values of relative difference $\Delta\Gamma_i$ (i.e., $\Delta\Gamma_1$, $\Delta\Gamma_2$, $\Delta\Gamma_3$, $\Delta\Gamma_4$, $\Delta\Gamma_5$, $\Delta\Gamma_6$ corresponding to the six cylinders #1 to #6, respectively), indicated in FIG. 66, are measured from the engine 90. The six numerals, 1, 2, 3, 4, 5, 6, provided along the outermost circle shown in FIG. 66 represent the six cylinders #1 to #6, respectively, and the respective angular positions of the six numerals represent respective angular phases at which the respective exhaust pressures $P_{EX}$ of the six cylinders take respective maximal values in the case where the engine 90 is normal. The full circle corresponds to 720 degrees of the CS angle. since in the present embodiment it is not needed to specify the angular position corresponding to the zero degree of the CS angle, that position is not shown in the figure. If the engine 90 is normal, each of the six values of relative difference $\Delta\Gamma_i$ (i.e., $\Delta\Gamma_1$ to $\Delta\Gamma_6$) is 120 degrees (=720 (degrees)/6 (cylinders)). This angle will be referred to as the "exhaust-pressure maximal-value-angle average relative difference, $\Delta\Gamma_m$".

In the case where the right cam pulley 26 of the engine 90 is one-tooth fast, the respective values ($\Gamma_1$, $\Gamma_3$, $\Gamma_5$) of difference $\Gamma$ of the odd-numbered cylinders #1, #3, #5 of the left bank are zero but those ($r_2$, $\Gamma_4$, $\Gamma_6$) of the even-numbered cylinders #2, #4, #6 of the right bank are not zero. Regarding the example shown in FIG. 24, $\Gamma_1=\Gamma_3=\Gamma_5=0$ and $\Gamma_2=\Gamma_4=\Gamma_6=-15$. The relative difference $\Delta\Gamma_i$ is defined by the following expression:

$$\Delta\Gamma_i=\Delta\Gamma_m+\Gamma_{i+1}-\Gamma_i \quad (12)$$

The six values $\Delta\Gamma_1$ to $\Delta\Gamma_6$ of relative difference $\Delta\Gamma_i$ are obtained by using the expression (12), as follows:

$\Delta\Gamma_1=\Delta\Gamma_m+\Gamma_2-\Gamma_1=120+(-15)-0=105$ $\Delta\Gamma_2=\Delta\Gamma_m+\Gamma_3-\Gamma_2=120+0-(-15)=135$ $\Delta\Gamma_3=\Delta\Gamma_m+\Gamma_4-\Gamma_3=120+(-15)-0=105$ $\Delta\Gamma_4=\Delta\Gamma_m+\Gamma_5-\Gamma_4=120+0-(-15)=135$ $\Delta\Gamma_5=\Delta\Gamma_m+\Gamma_6-\Gamma_5=120+(-15)-0=105$ $\Delta\Gamma_6=\Delta\Gamma_m+\Gamma_1-\Gamma_6=120+0-(-15)=135$ In the case where the variable i=6, the value, i+1, is reduced by 6 to 1, as defined above. Thus, the phases indicated at the numerals 2, 4, 6 which are obtained when the engine 90 is normal move to the phases indicated at the numerals 2', 4', 6' which are obtained when the engine 90 has the one-tooth fast state of the right cam pulley 26.

The relative differences $\Delta\Phi_i$, $\Delta\Sigma_i$ are defined by the following expressions, respectively:

$$\Delta\Phi_i=\Delta\Phi_m+\Phi_{i+1}-\Phi_i \quad (13)$$

$$\Delta\Sigma_i=\Delta\Sigma_m+\Sigma_{i+1}-\Sigma_i \quad (14)$$

The average relative differences $\Delta\Gamma_m$, $\Delta\Phi_m$, $\Delta\Sigma_m$ are equal to 120 degrees. In the case where the actual values indicated in the table of FIG. 24 have already been known, the respective values of three relative differences $\Delta\Gamma_i$, $\Delta\Phi_i$, $\Delta\Sigma_i$ corresponding to each of the assembling faults are obtained by replacing the difference of appropriate terms, $\Gamma_{i+1}-\Gamma_i$, $\Phi_{i+1}-\Phi_i$, or $\Sigma_{i+1}-\Sigma_i$, in each of the expressions (12) to (14) with the difference of appropriate values, indicated in the table, which correspond to the each fault. In the case where a plurality of faults simultaneously occur to the single engine 90, the respective values of three relative differences $\Delta\Gamma_i$, $\Delta\Phi_i$, $\Delta\Sigma_i$ corresponding to the simultaneous occurrence of the plurality of faults are obtained by replacing the difference of appropriate terms in each of the expressions (12) to (14) with the sum of respective differences of appropriate values which correspond to the plurality of faults. However, converses are not always true. In the case where there is some possibility that a plurality of unspecified faults simultaneously occur to the engine 90, those faults may not be specified based on only the respective values of relative differences $\Delta\Gamma_i$, $\Delta\Phi_i$, $\Delta\Sigma_i$ which are obtained in the above-described time-difference-dependent relative-angle-difference obtaining manners.

For example, as is apparent from FIG. 24, in the case where the crank pulley 18 is one-tooth fast or slow, or in the case where both the left and right cam pulleys 24, 26 or both the left and right driven gears 40, 42 are one-tooth fast or slow, all the cylinders #1 to #6 have the same values of differences Γ, Φ, Σ. Accordingly, the three expressions (12), (13), (14) show $\Delta\Gamma_i=\Delta\Gamma_m=\Delta\Phi_i=\Delta\Phi_m=\Delta\Sigma_i=\Delta\Sigma_m=120$ (degrees). This result is the same as that obtained when the engine 90 is normal. In addition, the case where the right cam pulley 26 is one-tooth fast and the left cam pulley 24 is normal, cannot be distinguished from the case where the right cam pulley 26 is normal and the left cam pulley 24 is one-tooth slow. Moreover, the case where the intake vales 50 or the exhaust valves 48 of all the cylinders #1 to #6 have the same clearance fault (e.g., small clearance) cannot be identified from the case where the engine 90 is normal. Thus, the present engine testing method that relies on the relative differences $\Delta\Gamma_i$, $\Delta\Phi_i$. $\Delta\Sigma_i$ is not always effective in judging whether the engine 90 being tested is normal or not. However, as described below, the present testing method can specify at least one "candidate" for a plurality of faults, in the case where there is some possibility that the plurality of faults have simultaneously occurred to the single engine 90. However, the candidate or candidates specified by the present method may not include the fault, or all the faults, which has or have actually occurred to the engine 90. If at least one candidate is specified, then an operator can actually check the candidate on the engine 90. If the candidate is found as a fault, the operator corrects the fault, and the present testing method may be performed once again on the engine 90. Thus, the present testing method can effectively prevent itself from judging that the engine 90 is normal, notwithstanding the presence of one or more faults with the engine 90.

Figure 67:
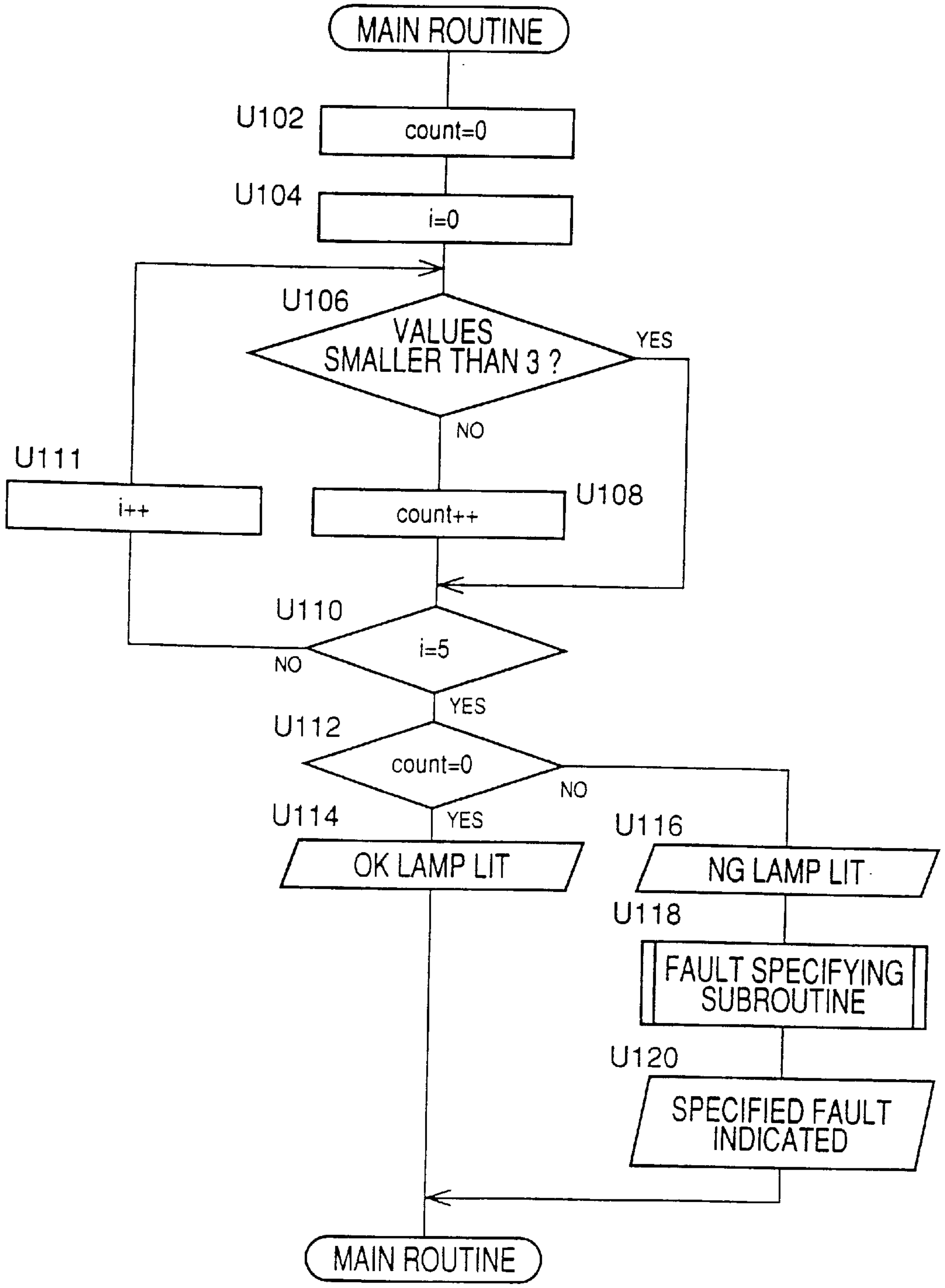
FIG. 67 is a flow chart representing the main routine of an engine testing program which is pre-stored in a ROM of a fault finder of an engine testing apparatus which carries out the engine testing method as the sixth embodiment.

FIG. 67 is a flow chart representing the main routine of an assembled engine testing program which is stored in the ROM of the fault finder 117 and which is carried out by the CPU and the RAM of the finder 117. According to the main routine, the fault finder 117 identifies the presence or absence of one or more assembling faults of the engine 90, based on the respective exhaust-pressure maximal values corresponding to the six pistons or cylinders #1 to #6. If the engine 90 has no fault, the finder 117 commands the display 118 (FIG. 26) to indicate that the engine 90 has passed the test. On the other hand, if a fault is found, the finder 117 identifies or specifies what is the fault and commands the display 118 to indicate that the engine 90 has not passed the test, and the place where the fault has occurred.

First, at Step U102, the fault finder 117 or the CPU thereof initializes a variable 'count' to count=0. At Step U104, the CPU initializes a variable 'i' to i=0 corresponding to the first piston or cylinder #1. The number greater by one than the variable 'i' is equal to the number of the current piston or cylinder. Subsequently, at Step U106, the CPU judges whether both the respective absolute values of exhaust-pressure maximal-value difference $\alpha_i$ and exhaust-pressure constant-value difference $\beta_i$ which are measured from the current cylinder #i+1 are smaller than 3. If a negative judgment is made at Step U106, the control of the CPU goes to Step U108 to add one to the variable 'count'. On the other hand, if a positive judgment is made at Step U106, the control goes to Step U110 to judge whether the variable 'i' is equal to 5 corresponding to the sixth piston #6. If a negative judgment is made at Step U110, the control goes to Step U111 to add one to the variable 'i' and then goes back to Step U106.

As can be understood from FIG. 24, it can be concluded that if the respective absolute values of differences α, β are smaller than 3, the test engine 90 has normally been assembled without any fault.

If a positive judgment is made at Step U110, the control of the CPU goes to Step U112 to judge whether the variable 'count' is equal to 0. If a positive judgment is made at Step U112, the control goes to Step U114 to command the display 118 to light the OK lamp 200 of the display 118 indicating that no fault has been found. Thus, the CPU quits the main routine. On the other hand, if a negative judgment is made at Step U112, that is, a fault has been found, the control goes to Step U116 to light the NG lamp 202 of the display 118 indicating the above situation. Subsequently, the control goes to Step U118, i.e., a fault identifying or specifying subroutine. Step U118 is followed by Step U120 to light a lamp or lamps of the display 118 which corresponds or correspond to the fault or faults specified at Step U118. Then, the CPU quits the main routine.

The OK lamp 200 is lit when no fault is found. The NG lamp 202 is lit when one or more faults are found. In the case where one or more faults is or are found and specified, the control device 119 may light one or more of the fault lamps 204, 206, 208, 210, 212, 214, 216, 218, 220, 222 which corresponds or correspond to the specified fault or faults. In addition, the CPU may light, for each of the pistons #1 to #6, one or more of the fault lamps 224, 226, 228, 230, 232 which corresponds to the specified fault or faults. Moreover, in the case where one or more faults cannot be specified as will be described later, that is, in the case where there is some possibility that the engine 90 has one or more faults but it cannot be concluded that the engine 90 does have one or more faults, one or more fault lamps corresponding to the doubtful fault or faults is or are flashed.

Figure 68:
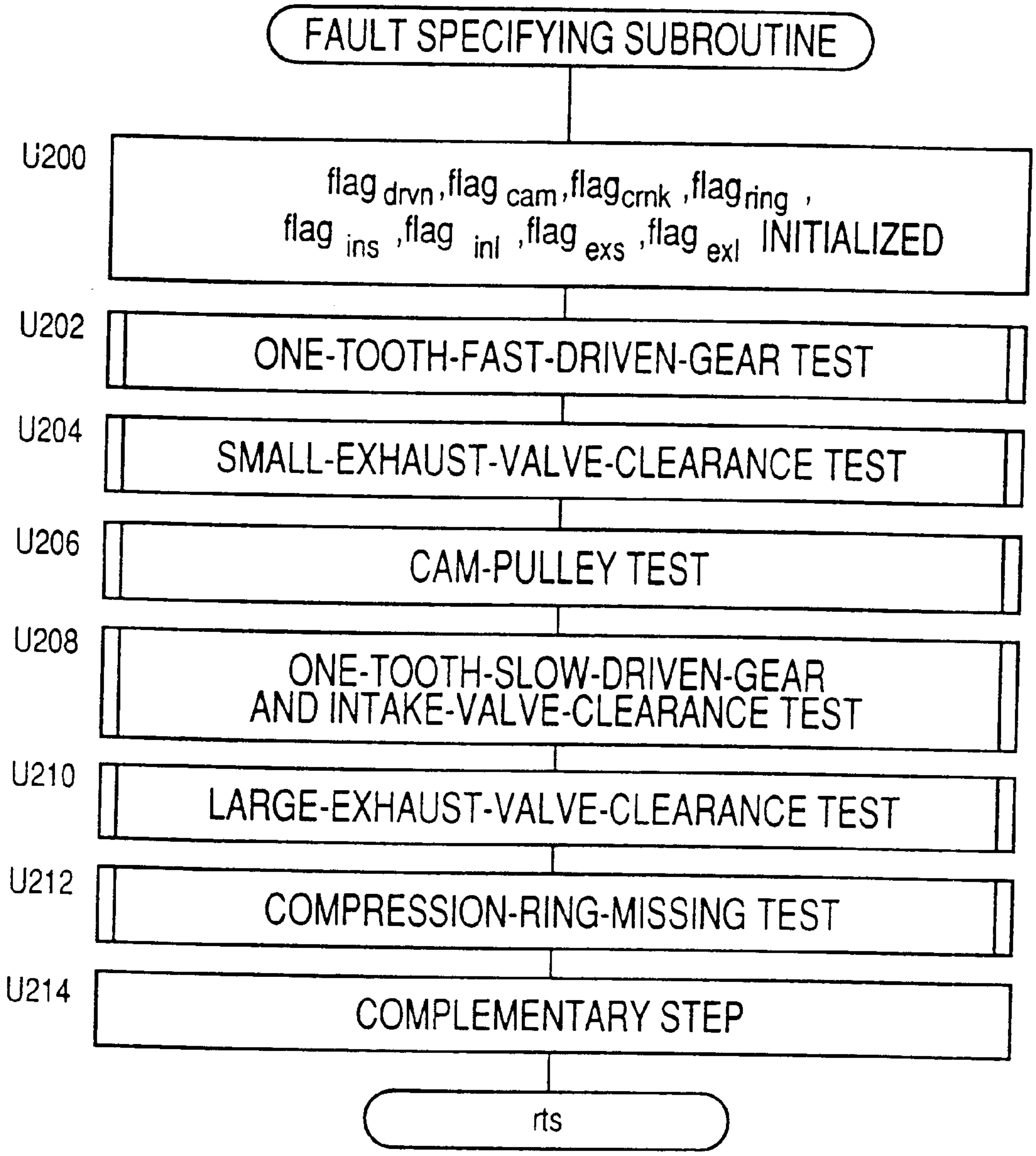
FIG. 68 is a flow chart representing a fault specifying routine carried out at Step U118 of the flow chart of FIG. 67.

FIG. 68 is a flow chart representing the fault specifying subroutine of Step U118 of FIG. 67. First, at Step U200, the CPU of the fault finder 117 initializes, to 0×00, each of eight fault flags corresponding to the faults indicated in the table of FIG. 24. As shown in FIG. 69, each of the eight flags comprises one byte data, i.e., eight bits data. If no fault has been found, each flag remains 0×00. The lower four bits of the flag '$flag_{drvn}$' correspond to the fast and slow states of the left and right driven gears 40, 42, and the lower four bits of the flag '$flag_{cam}$' correspond to the fast and slow states of the left and right cam pulleys 24, 26. The lower two bits of the flag '$flag_{crnk}$' correspond to the fast and slow states of the crank pulley 20. The lower six bits of the flags '$flag_{ins}$', '$flag_{inl}$', '$flag_{exs}$', '$flag_{exl}$', '$flag_{ring}$' correspond to the presence or absence of the small and large intake-valve clearances, the small and large exhaust-valve clearances, and the compression-ring missing, respectively, of the six pistons or cylinders #1 to #6. The respective highest and second highest bits (i.e., "7" and "6" bits shown in FIG. 69) of each of the eight flags are doubtful-fault bits (hereinafter, referred to as the "error-1" bit and the "error-2" bit, respectively). When the value of 0 is set in the error-1 bit of each one of those flags, the value of 0 is also set in the error-2 bit of the same flag. In this case, the remaining bits of the flag are used to indicate the test result. However, when the value of 1 is set in the error-1 bit, the value of 0 or 1 is set in the error-2 bit. In this case, the value of 0 set in the error bit 2 of each flag indicates that the engine 90 may have one or more faults corresponding to another or other bits of the flag (except for the nonsense bits indicated at "-" in FIG. 69) which has or have the value of 0. In this case, the fault lamp or lamps corresponding to one or more of the lower six bits which has or have the value of 0 is or are flashed (i.e., alternately turned on and off). Meanwhile, the value of 1 set in the error bit 2 of each flag indicates that the engine 90 may have one or more faults corresponding to another or other bits of the flag which has or have the value of 1. In the second case, the fault lamp or lamps corresponding to one or more of the lower six bits which has or have the value of 1 is or are flashed. In other words, in the first case, it is concluded that the engine 90 has one or more faults corresponding to the bit or bits having the value of 1 and, in the second case, it is concluded that the engine 90 does not have any faults corresponding to the bit or bits having the value of 0. In addition, in the first case, the lamp or lamps corresponding to the bit or bits having the value of 0 is or are flashed and the lamp or lamps corresponding to the bit or bits having the value of 1 is or are lit and, in the second case, the lamp or lamps corresponding to the bit or bits having the value of 1 is or are flashed and the lamp or lamps corresponding to the bit or bits having the value of 0 is or are not lit.

Step U200 is followed by Steps U202 to U214. Step U202 is a one-tooth-fast-driven-gear test for determining values to be set to the fault flag '$flag_{drvn}$' Step U204 is a small-exhaust-valve-clearance test for determining values to be set to the flag '$flag_{exs}$'. Step U206 is a cam-pulley test for determining values to be set to the flag '$flag_{cam}$'. Step U208 is a one-tooth-slow-driven-gear and intake-valve-clearance test for determining values to be set to the flags '$flag_{drvn}$', '$flag_{ins}$'. '$flag_{inl}$'. Step U210 is a large-exhaust-valve-clearance test for determining values to be set to the flag '$flag_{exl}$'. Step U212 is a compression-ring-missing test for determining values to be set to the flag '$flag_{ring}$'. Step U212 is followed by Step U214, i.e., a complementary step which will be described later. The present fault specifying subroutine does not include any test for specifying the fast or slow state of the crank pulley 18. Accordingly, if a negative judgment is made at Step U112, the value of 1 is set in the error-l (highest) bit of the fault flag '$flag_{crnk}$'.

Figure 70:
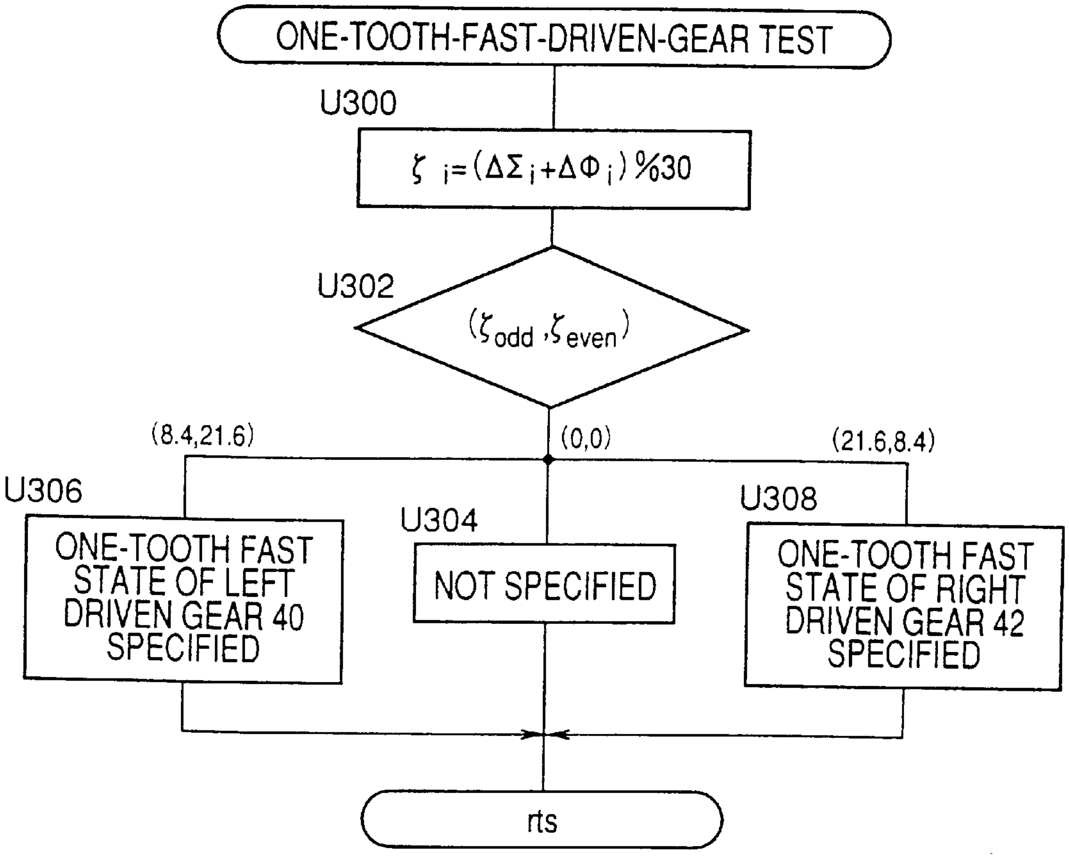
FIG. 70 is a flow chart representing a one-tooth-fast-driven-gear test routine carried out at Step U202 of the flow chart of FIG. 68.

FIG. 70 is a flow chart representing the one-tooth-fast-driven-gear test called at Step U202 of FIG. 68. In this test, the CPU of the fault finder 117 judges whether the driven gear 40, 42 of the left or right bank is one-tooth fast, based on the exhaust-pressure decrease-start-angle relative difference $\Phi_i$ and the exhaust-pressure constant-start-angle relative difference $\Delta\Sigma_i$ of the cylinder indicated by a variable 'i' (i=1 to 6), irrespective of whether the engine 90 has another or other faults. As indicated above, the case where both of the left and right driven gears 40, 42 are one-tooth fast and the case where both the two driven gears 40, 42 are normal cannot be identified or distinguished from each other. This fact is indicated by flashing both the fast-left-driven-gear lamp 216 and the fast-right-driven-gear lamp 220.

First, at Step U300, the CPU calculates a variable, $\zeta_i$, for each cylinder #1 to #6 based on the relative differences $\Delta\Phi_i$, $\Delta\Sigma_i$ of the same, according to the following expression:

$$\zeta_i=(\Delta\Sigma\Phi_i+\Delta\Phi_i)\%30 \quad (15)$$

The relative differences $\Delta\Phi_i$, $\Delta\Sigma_i$ of each cylinder are obtained by analyzing the waveform of the exhaust-pressure signal $P_{EX}$ detected from the cylinder, as described above. The symbol "%" is a so-called modular operator, and "a%b" indicates the remainder obtained by dividing the value of "a" by the value of "b". Hereinafter, the variable $\zeta_i$ will be indicated by $\zeta_{odd}$ when the variable 'i' is an odd number, i.e., when the current cylinder is a cylinder of the left bank, and by $\zeta_{even}$ when the variable 'i' is an even number, i.e., when the current cylinder is a cylinder of the right bank.

The reason why the relative differences $\Delta\Phi_i$, $\Delta\Sigma_i$ are added to each other in the expression (15) defining the variable $\zeta_i$ is to eliminate the respective influences of the fault of small exhaust-valve clearance that may have occurred to the current cylinder with respect to the relative differences $\Delta\Phi_i$, $\Delta\Sigma_i$. More specifically described, the respective influences of the small exhaust-valve clearance to the relative differences $\Delta\Phi_i$, $\Delta\Sigma_i$ have different signs and substantially equal absolute values. However, the absolute values of the influences of the large or small exhaust-valve clearance to the relative differences $\Delta\Phi_i$, $\Delta\Sigma_i$ are changeable. In fact, in the case where the current cylinder has the fault of small exhaust-valve clearance, the exhaust-pressure constant-start-angle difference $\Sigma$ is changeable in the range of from 2 to 10. The actual value, 6.4, of the difference $\Sigma$ indicated in the table of FIG. 24 is just an example falling in this range. However, when the absolute value of the influence to the difference $\Sigma$ and accordingly to the relative difference $\Delta\Sigma_i$ change, also do the absolute value of the influence to the difference $\phi$ and accordingly to the relative difference $\Delta\Phi_i$. Since those influences have opposite signs, the sum of them is not influenced by the small exhaust-valve clearance. The sum of relative differences $\Delta\Phi_i$, $\Delta\Sigma_i$, i.e., $\Delta\Phi_{odd}+\Delta\Sigma_{odd}$, or $\Delta\Phi_{even}+\Delta\Sigma_{even}$, must be calculated based on the respective values of relative differences $\Delta\Phi_i$, $\Delta\Sigma_i$ obtained from a single odd-numbered or even-numbered cylinder.

Meanwhile, the fault of large exhaust-valve clearance does not influence the exhaust-pressure constant-start-angle difference $\Sigma$ nor the exhaust-pressure decrease-start-angle difference $\Phi$. Therefore, the sum of relative differences $\Delta\Phi_i$, $\Delta\Sigma_i$ is not influenced by the small or large exhaust-valve clearance.

The reason why the variable $\zeta_i$ is defined by the remainder obtained when the sum of relative differences $\Delta\Phi_i$, $\Delta\Sigma_i$ is divided by 30 is that the sum is influenced by the one-tooth fast or slow state of the left or right cam pulley 24, 26 that may have occurred to the bank corresponding to the current cylinder, in such a manner that the sum is stepwise increased or decreased in units of 30 (i.e., 15+15=30). Meanwhile, the influences of the one-tooth fast state of the driven gear 40, 42 are smaller than 30. Thus, the variable $\zeta_i$ defined by the expression (15) is free from the influences of the fast or slow state of the cam pulley 24, 26 as well as the small or large exhaust-valve clearance. Accordingly, the variable $\zeta_i$ is influenced by the one-tooth fast state of either the left or right driven gear 40, 42.

The following expression (16) is obtained by replacing, in the expression (15), the relative differences $\Delta\Phi_i$, $\Delta\Sigma_i$ with those defined by the expressions (13) and (14):

$$\zeta_i=(\zeta\Sigma_m+\Sigma_{i+1}-\Sigma_i+\zeta\Phi_m+\Phi_{i+1}-\Phi_i)\%30 \quad (16)$$

In the above expression, the exhaust-pressure constant-start-angle average relative difference $\Delta\Sigma_m$ and the exhaust-pressure decrease-start-angle average relative difference $\Delta\Phi_m$ are both equal to 120 degrees. Thus, the variable $\zeta_i$ can be calculated from the respective values of differences $\Sigma$, $\Phi$ indicated in the table of FIG. 24. In actual engine tests, those values of differences $\Sigma$, $\Phi$ are unknown, and the variable $\zeta_i$ is calculated according to the expression (15). However, since the expression (16) is more convenient than the expression (15), the following description will be made by reference to the expression (16).

Step U300 is followed by Step U302 to identify which one of three combinations, (0, 0), (8.4, 21.6) and (21.6, 8.4), is taken by the combination, $(\zeta_{odd}, \zeta_{even})$, of respective values of variable $\zeta_i$ for an odd-numbered cylinder and an even-numbered cylinder. The combination $(\zeta_{odd}, \zeta_{even})$ can only take one of the above three combinations, for the following reasons:

In the case where the engine 90 does not have any faults including the faults with the driven gears 40, 42, the relative differences $\Delta\Sigma_{odd}$, $\Delta\Sigma_{even}$ and the relative differences $\Delta\Phi_{odd}$, $\Delta\Phi_{even}$ take the following values:

$$\Delta\Sigma_{odd}=\Delta\Sigma_m+\Sigma_{even}-\Sigma_{odd}=120+0-0=120$$

$$\Delta\Sigma_{even=\Delta\Sigma m}+\Sigma_{odd}-\Sigma_{even}=120+0-0=120$$

$$\Delta\Phi_{odd}=\Delta\Phi_m+\Phi_{even}-\Phi_{odd}=120+0-0=120$$

$$\Delta\Phi_{even=\Delta\Phi m}+\Phi_{odd}-\Phi_{even}=120+0-0=120$$

The variables $\zeta_{odd}$, $\zeta_{even}$ are calculated from the above values, as follows:

$$\zeta_{odd}(\Delta\Sigma_{odd}+\Delta\Phi_{odd})\%30=(120+120)\%30=0$$

$$\zeta_{even}(\Delta\Sigma_{even}+\Delta\Phi_{even})\%30=(120+120)\%30=0$$

In the case where the left driven gear 40 is one-tooth fast and the engine 90 does not have any other faults, the relative differences $\Delta\Sigma_{odd}$, $\Delta\Sigma_{even}$, $\Delta\Phi_{odd}$, $\Delta\Phi_{even}$ take the following values:

$$\Delta\Sigma_{odd}=\Delta\Sigma_m+\Sigma_{even}-\Sigma_{odd}=120+0-(-8.4)=128.4$$

$$\Delta\Sigma_{even=\Delta\Sigma m}+\Sigma_{odd}-\Sigma_{even}=120+(-8.4)-0=111.6$$

$$\Delta\Phi_{odd}=\Delta\Phi_m+\Phi_{even}-\Phi_{odd}=120+0-0=120$$

$$\Delta\Phi_{even=\Delta\Phi m}+\Phi_{odd}-\Phi_{even}=120+0-0=120$$

The variables $\zeta_{odd}$, $\zeta_{even}$ are calculated from the above values, as follows:

$$\zeta_{odd}=(\Delta\Sigma_{odd}+\Delta\Phi_{odd})\%30=(128.4+120)\%30=8.4$$

$$\zeta_{even}=(\Delta\Sigma_{even}+\Delta\Phi_{even})\%30=(111.6+120)\%30=21.6$$

In the case where the right driven gear 42 is one-tooth fast and the engine 90 does not have any other faults, the relative differences $\Delta\Sigma_{odd}$, $\Delta\Sigma_{even}$, $\Delta\Phi_{odd}$, $\Delta\Phi_{even}$ take the following values:

$$\Delta\Sigma_{odd}=\Delta\Sigma_m+\Sigma_{even}\Sigma_{odd}=120+(-8.4)-0=111.6$$

$$\Delta\Sigma_{even=\Delta\Sigma m}+\Sigma_{odd}-\Sigma_{even}=120+0-(-8.4)=128.4$$

$$\Delta\Phi_{odd}=\Delta\Phi_m+\Phi_{even}-\Phi_{odd}=120+0-0=120$$

$$\Delta\Phi_{even=\Delta\Phi m}+\Phi_{odd}-\Phi_{even}=120+0-0=120$$

The variables $\zeta_{odd}$, $\zeta_{even}$ are calculated from the above values, as follows:

$$\zeta_{odd}=(\Delta\Sigma_{odd}+\Delta\Phi_{odd})\%30=(111.6+120)\%30=21.6$$

$$\zeta_{even}=(\Delta\Phi_{even}+\Delta\Phi_{even})\%30=(128.4+120)\%30=8.4$$

For the above reasons, when the engine 90 has no fault, the combination ($\zeta_{odd}$, $\zeta_{even}$) takes (0, 0); when the left driven gear 40 is one-tooth fast, the combination takes (8.4, 21.6); and when the right driven gear 42 is one-tooth fast, the combination takes (21.6, 8.4).

In the case where the CPU identifies at Step U302 that the combination ($\zeta_{odd}$, $\zeta_{even}$) is equal to (0, 0), the control of the CPU goes to Step U304 to set, in the fault flag 'flag$_{drvn}$' the logical sum, 0×C5, of (a) 0×05 that is the logical sum of 0×01 indicating that the left driven gear 40 is one-tooth fast and 0×04 indicating that the right driven gear 42 is one-tooth fast and (b) 0×C0 indicating that the value of 1 is set in each of the error-1 and error-2 (highest and second highest) bits of the flag 'flag$_{drvn}$'. Based on the content of the flag 'flag$_{drvn}$' the CPU commands the display 118 to flash both the lamps 216, 220 as described above. In the case where the CPU identifies at Step U302 that the combination ($\zeta_{odd}$, $\zeta_{even}$) is equal to (8.4, 21.6), the control of the CPU goes to Step U306 to set, in the flag 'flag$_{drvn}$', 0×01 indicating that the left driven gear 40 is one-tooth fast. In the case where the CPU identifies at Step U302 that the combination ($\zeta_{odd}$, $\zeta_{even}$) are equal to (21.6, 8.4), the control of the CPU goes to Step U308 to set, in the flag 'flag$_{drvn}$', 0×04 indicating that the right driven gear 42 is one-tooth fast.

However, strictly, the above conclusion that the combination ($\zeta_{odd}$, $\zeta_{even}$) can only take one of the three combinations (0, 0), (8.4, 21.6), (21.6, 8.4) is not correct. In fact, the variables $\zeta_{odd}$, $\zeta_{even}$ may contain errors. Those errors can be measured, and the measured errors fall in, e.g., the range of from −2 to 2. Therefore, the combination ($\zeta_{odd}$, $\zeta_{even}$) falls in one of three range combinations (from −2 to 2, from −2 to 2), (from 6.4 to 10.4, from 19.6 to 23.6), and (from 19.6 to 23.6, from 6.4 to 10.4). The CPU can easily identify in which range the combination (odd) falls.

The combination ($\zeta_{odd}$, $\zeta_{even}$) obtained from one pair of odd-numbered and even-numbered cylinders may be used alone. However, the former combination ($\zeta_{odd}$, $\zeta_{even}$) may be used with another or other combinations obtained from another or other pairs of odd-numbered and even-numbered cylinders. For example, the average of respective values of variable $\zeta_{odd}$ for the three odd-numbered cylinders #1, #3, #5 may be combined with the average of respective values of variable 4 even for the three even-numbered cylinders #2, #4, #6.

Thus, it can be said that the one-tooth-fast driven-gear test indicated in FIG. 70 is carried by comparing the variable $\zeta_i$ of at least one odd-numbered cylinder with that of at least one even-numbered cylinder. Otherwise, it can be said that the test is carried out by grouping the respective values of variable $\zeta_i$ for all the six cylinders, into a first group including the values for the odd-numbered cylinders and a second group including the values for the even-numbered cylinders, and then comparing one or more values of one of the two groups with one or more values of the other group.

Figure 71:
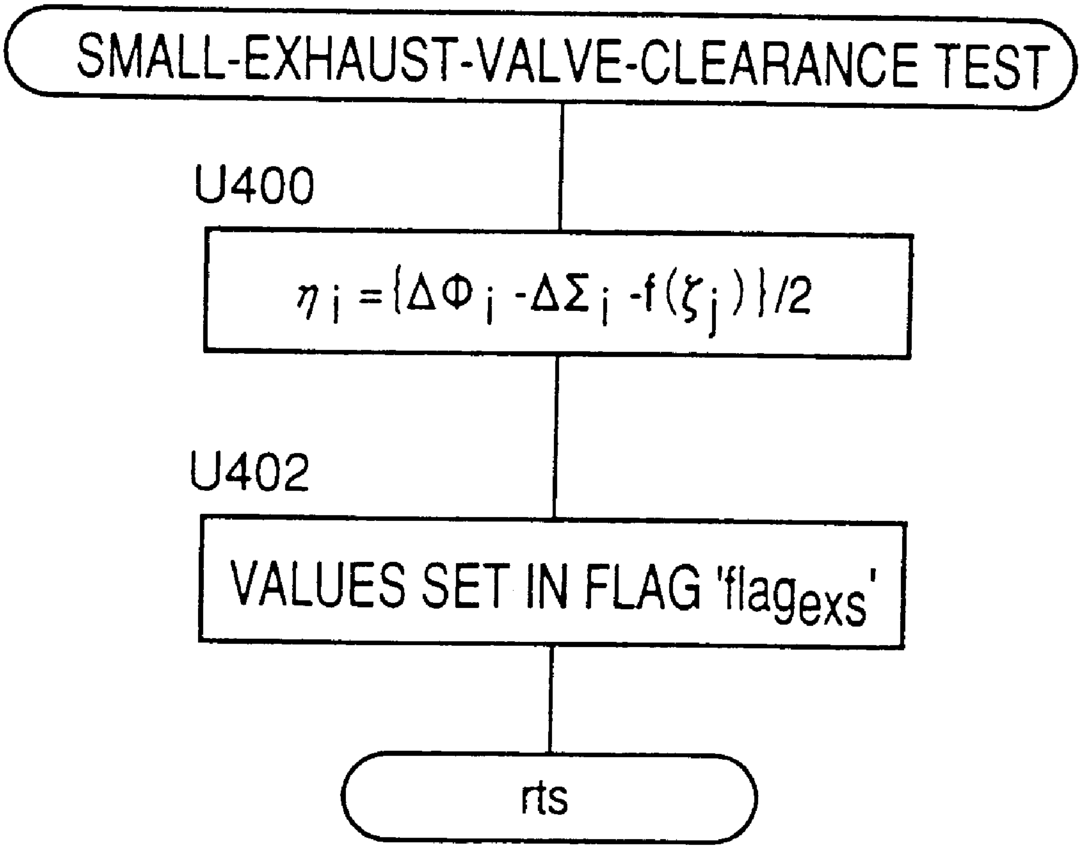
FIG. 71 is a flow chart representing a small-exhaust-valve-clearance test routine carried out at Step U204 of the flow chart of FIG. 68.

FIG. 71 shows a flow chart representing the small-exhaust-valve-clearance test called at Step U204 of FIG. 68. First, at Step U400, the CPU calculates a variable, $\eta_i$, for each cylinder #1 to #6, based on the relative differences $\Delta\Phi_i$, $\Delta\Sigma_i$ of the same, according to the following expression (17):

$$\eta_i=\{\Delta\Phi_i-\Delta\Sigma_i-f(\zeta_i)\}/2 \quad (17)$$

The relative differences $\Delta\Phi_i$, $\Delta\Sigma_i$ of each cylinder are obtained by analyzing the waveform of the exhaust-pressure signal $P_{EX}$ detected from the cylinder, as described above. The function, $f(\zeta_i)$, is employed for eliminating the influence of the one-tooth fast state of the left or right driven gear 40, 42 that may be contained in the relative difference $\Delta\Sigma_i$. The variable $\zeta_i$ is obtained according to the expression (15). The function $f(\zeta_i)$ provides −8.4 when the driven gear 40, 42 corresponding to the bank including the current cylinder is one-tooth fast; 8.4 when the driven gear 40, 42 corresponding to the other bank than the bank including the current cylinder is one-tooth fast; and 0 when both of the two driven gears 40, 42 are normal (or both are one-tooth fast). Thus, the function $f(\zeta_i)$ provides the same value, 0, both when the two driven gears 40, 42 are normal and when the two gears 40, 42 are one-tooth fast. However, this does not influence the result of the present test about whether the current cylinder has the fault of small exhaust-valve clearance.

The following expression (18) is obtained by replacing, in the expression (17), the relative differences $\Delta\Phi_i$, $\Delta\Sigma_i$ with those defined by the expressions (13) and (14):

$$\begin{aligned}\eta_i &= \{(\Delta\Phi_m+\Phi_{i+1}-\Phi_i)-(\Delta\Sigma_m+\Sigma_{i+1}-\Sigma_i)-f(\zeta_i)\}/2\\ &= \{\Phi_{i+1}-\Phi_i-(\Sigma_{i+1}-\Sigma_i)-f(\zeta_i)\}/2\end{aligned} \quad (18)$$

The above expression (18) is obtained by using the fact that both the average relative difference $\Delta\Sigma_m$ and the average relative difference $\Delta\Phi_m$ are equal to 120 degrees. Thus, the variable $\eta_i$ can be calculated from the respective values of differences Σ, Φ indicated in the table of FIG. 24 and the value provided by the function $f(\zeta_i)$. The thus calculated values of variable $\eta_i$ are equal to those which are calculated according to the expression (17) in actual engine tests.

For example, in the case where the first cylinder #1 has the fault of small exhaust-valve clearance and each of the two driven gears 40, 42 is not one-tooth fast, the value of variable $\eta_i$ for each cylinder is obtained as follows:

$$\eta\mathbf{1}=\{\Phi_2-\Phi_1-(\Sigma_2-\Sigma_1)-f(\zeta_1)\}/2=\{0-(-6.4)-(0-6.4)-0\}/2=6.4$$

$$\eta\mathbf{2}=\{\Phi_3-\Phi_2-(\Sigma_{3-\Sigma 2})-f(\zeta_2)\}/2=\{0-0-(0-0)-0\}/2=0$$

$$\eta\mathbf{3}=\{\Phi_4-\Phi_3-(\Sigma_{4-\Sigma 3})-f(\zeta_3)\}/2=\{0-0-(0-0)-0\}/2=0$$

$$\eta\mathbf{4}=\{\Phi_5-\Phi_4-(\Sigma_{5-\Sigma 4})-f(\zeta_4)\}/2=\{0-0-(0-0)-0\}/2=0$$

$$\eta\mathbf{5}=\{\Phi_6-\Phi_5-(\Sigma_{6-\Sigma 5})-f(\zeta_5)\}/2=\{0-0-(0-0)-0\}/2=0$$

$$\eta\mathbf{6}=\{\Phi_1-\Phi_6-(\Sigma_{1-\Sigma 6})-f(\zeta_6)\}/2=\{0-0-(0-0)-0\}/2=0$$

In addition, in the case where the first and second cylinders #1, #2 have the fault of small exhaust-valve clearance and each of the two driven gears 40, 42 is not one-tooth fast, the value of variable $\eta_i$ for each cylinder is obtained as follows:

$$\eta_1=\{\Phi_2-\Phi_1-(\Sigma_2-\Sigma_1)-f(\zeta_1)\}/2=\{6.4)-(-6.4)-(6.4-6.4)-0\}/2=0$$

$$\eta_2=\{\Phi_3-\Phi_2-(\Sigma_3-\Sigma_2)-f(\zeta_2)\}/2=\{0-(-6.4)-(0-6.4)-0\}/2=6.4$$

$$\eta_3=\{\Phi_4-\Phi_3-(\Sigma_4-\Sigma_3)-f(\zeta_3)\}/2=\{0-0-(0-0)-0\}/2=0$$

$$\eta_4=\{\Phi_5-\Phi_4-(\Sigma_5-\Sigma_4)-f(\zeta_4)\}/2=\{0-0-(0-0)-0\}/2=0$$

$$\eta_5=\{\Phi_6\mathbf{31}\ \Phi_5-(\Sigma_6-\Sigma_5)-f(\zeta_5)\}/2=\{0-0-(0-0)-0\}/2=0$$

$$\eta_6=\{\Phi_1-\Phi_6-(\Sigma_1-\Sigma_6)-f(\zeta_6)\}/2=\{-6.4-0-(6.4-0\}/2=-6.4$$

Moreover, in the case where the first, second and fifth cylinders #1, #2, #5 have the fault of small exhaust-valve clearance and only the right driven gear 42 is one-tooth fast, the value of variable $\eta_i$ for each cylinder is equal to the value obtained from the respective values of differences Φ, Γ indicated in the table of FIG. 24, as follows:

$$\eta_1=\{\Phi_2-\Phi_1-(\Sigma_{2-\Sigma 1)-}f(\zeta_1)\}/2=0$$

$$\eta_2=\{\Phi_3-\Phi_2-(\Sigma_{3-\Sigma 2)-}f(\zeta_2)\}/2=6.4$$

$$\eta_3=\{\Phi_4-\Phi_3-(\Sigma_4-\Sigma_3)-f(\zeta_3)\}/2\{0-0\}(-8.4)-0]/2=0$$

$$\eta_4=\{\Phi_5-\Phi_4-(\Sigma_{5-\Sigma 4)-}f(\zeta_4)\}/2\{06.4-0-\{(-8.4)\}-(=8.4)\}/2=-6.4$$

$$\eta_5=\{\Phi_6-\Phi_5-(\Sigma_6-\Sigma_5)-f(\zeta_5)\}/2\{0-(6.4)-\{(-8.4)-6.4\}-8.4\}/2=6.4$$

$$\eta_6=\{\Phi_1-\Phi_6-(\Sigma_{1-\Sigma 6})-f(\zeta_6)\}/2\{-6.4\ \ -0-\{6.4-(8.4)\}-(-8.4)\}/2=-6.4$$

As is apparent from the above results, one or more cylinders which has or have the value of variable $\eta_i$ equal to 6.4 has or have the small exhaust-valve clearance, and one or more cylinders which has or have the number or numbers (#1 to #6) smaller than the number of the above one cylinder or each of the above cylinders and greater than the number of a cylinder having the value of variable $\eta_i$ equal to −6.4 has or have the small exhaust-valve clearance. For example, if $\eta_5=6.4$, $\eta_4=\eta_3=\eta_2=0$, $\eta_1=-6.4$, and $\eta_6=-6.4$, then the fifth, fourth, third, second cylinders #5, #4, #3, #2 have the fault of small exhaust-valve clearance and the first and sixth cylinders #1, #6 does not have the fault. Step U400 is followed by Step U402 to judge whether each of the six cylinders #1 to #6 has the fault of small exhaust-valve clearance based on the corresponding value of variable $\eta_i$ calculated for the each cylinder at Step U400. The thus made judgments are used to determine values to be set in the fault flag '$flag_{exs}$'. The above description has been made on the assumption that the variable $\eta_i$ can take one of 0, 6.4, and −6.4. However, in fact, the variable $\eta_i$ falls in one of three ranges, from −2 to 2, from 2 to 10, and from −10 to −2.

In the case where it can be said that the assumption that the fault of small exhaust-valve clearance does not simultaneously occur to all the three cylinders of each one of the two banks is correct, the CPU can judge whether the cylinder indicated by the variable 'i' has the fault of small exhaust-valve clearance, based on a variable, $\Delta\Delta\Phi_i$, defined by the following expression (19):

$$\Delta\Delta\Phi_i=\Delta\Phi_i+\Delta\Phi_{i+1}-2\cdot\Delta\Phi_m \tag{19}$$

Since the variable $\Delta\Delta\Phi_i$ is obtained based on the sum of the value of relative difference $\Delta\Phi_i$ when the variable 'i' is an odd number and the value of relative difference $\Delta\Phi_i$ when the variable 'i' is an even number, the influences which may result from the faults with the cam pulleys 24, 26 and the driven gears 40, 42 are offset. Therefore, the variable $\Delta\Delta\Phi_i$ is influenced by only the fault of small exhaust-valve clearance.

The following expression (20) is obtained by replacing, in the expression (19), the relative differences $\Delta\Phi_i$, $\Delta\Phi_{i+1}$ with those defined by the expression (13):

$$\Delta\Delta\Phi_i=\Phi_{i+2}-\Phi_i \tag{20}$$

Thus, it can be said that the test using the variable $\Delta\Delta\Phi_i$ is carried by grouping the respective values of difference $\Phi_i$ for all the six cylinders #1 to #6, into a first group including the values for the odd-numbered cylinders #1, #3, #5 and a second group including the values for the even-numbered cylinders #2, #4, #6, and then comparing, in each of the first and second groups, two values with each other.

The variable $\Delta\Delta\Phi_i$ can be calculated according to the expression (20), based on the value of difference $\Phi_i$ indicated in the table of FIG. 24, and the thus obtained values of variable $\Delta\Delta\Phi_i$ are equal to those obtained according to the expression (19) in actual engine tests. Next, there will be shown some examples calculated according to the expression (20).

For example, in the case where the cylinder #1 corresponding to the variable 'i' =1 has the fault of small exhaust-valve clearance, the following results are obtained: $\Delta\Delta\Phi_1=\Phi_3-\Phi_1=6.4$, $\Delta\Delta\Phi_{5=\Phi 1}-\Phi_5=-6.4$, $\Delta\Delta\Phi_2(=\Phi_4-\Phi_2)=\Delta\Delta\Phi_3(=\Phi_5-\Phi_2)=\Delta\Delta\Phi_4(=\Phi_6-\Phi_4)=\Delta\Delta\Phi_6(=\Phi_2-\Phi_6)=0$. The respective values of variable $\Delta\Delta\Phi_i$ for the even-numbered cylinders #2, #4, #6 are all zero, which indicates that the right bank has no cylinder having the fault of small exhaust-valve clearance.

In addition, in the case where the cylinders #1, #3 corresponding to the variable 'i'=1 and the variable 'i'=3 have the fault of small exhaust-valve clearance, the following results are obtained: $\Delta\Delta\Phi 1=\Delta\Delta\Phi_2=0$, $\Delta\Delta\Phi_3=6.4$, $\Phi_4=0$, $\Delta\Delta\Phi_5=-6.4$, and $\Delta\Delta\Phi_6=0$.

Although no more examples are provided, in the case where it can be assumed that the fault of small exhaust-valve clearance occurs to at most two cylinders of each one of the two banks, one or two cylinders having the fault of small exhaust-valve clearance can be specified based on the pattern of respective values of variable $\Delta\Delta\Phi_i$ for the three cylinders of that bank.

A similar test can be performed using a variable, $\Delta\Delta\Sigma_i$, $(=\Delta\Sigma_i+\Delta\Sigma_{i+1}-2\cdot\Delta\Sigma_m)$ which is calculated from the respective values of relative difference $\Delta\Sigma_i$.

In the foregoing description, it has been assumed that the difference $\Phi_i$ takes the value of −6.4 indicated in the table of FIG. 24 when the cylinder has the fault of small exhaust-valve clearance. However, since the difference $\Phi_i$ is changeable in the range of from −2 to −10, the CPU identifies in which one of three ranges, from −2 to 2, from 2 to 10, and from −2 to −10, the value of variable $\Delta\Delta\Phi_i$ for each cylinder falls and, based on the obtained results, specifies one or two cylinders having the fault of small exhaust-valve clearance.

Figure 72:
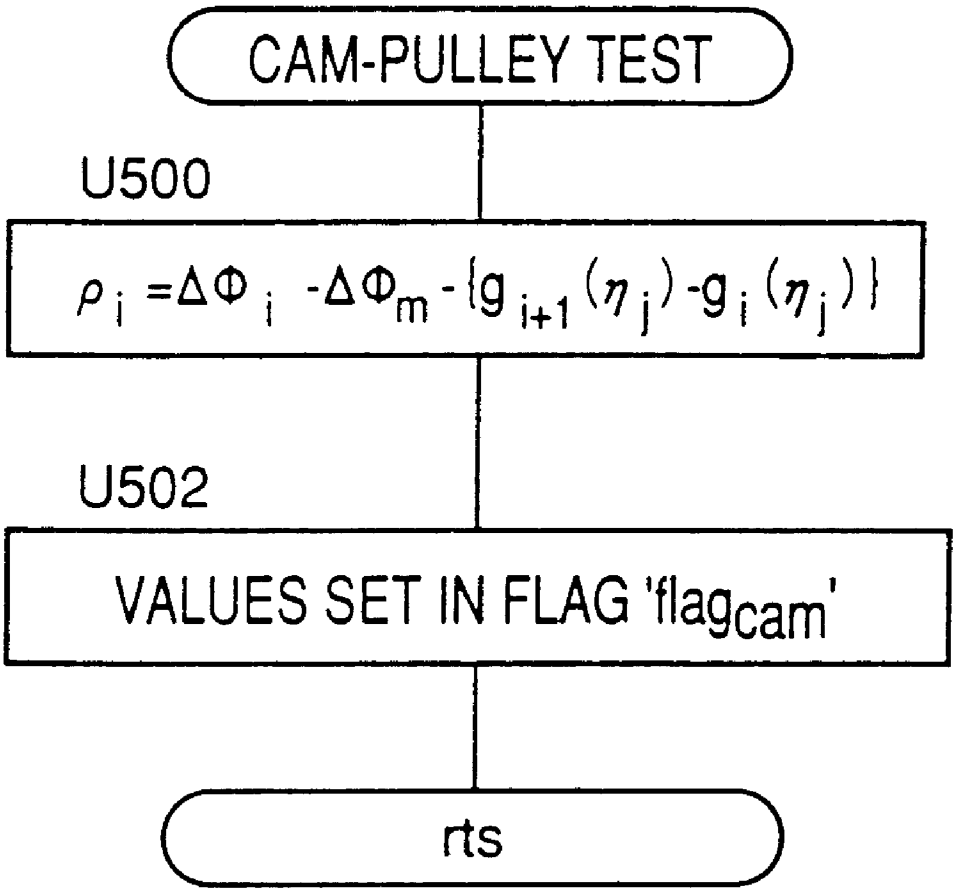
FIG. 72 is a flow chart representing a cam-pulley test routine carried out at Step U206 of the flow chart of FIG. 68.

FIG. 72 is a flow chart representing a cam-pulley test called at Step U206 of FIG. 68. First, at Step U500, the CPU calculates a variable, $\rho_i$, for each of the six cylinders #1 to #6 which is indicated by the variable 'i' according to the following expression:

$$\rho_i = \Delta\Phi_i - \Delta\Phi_m - \{f_{i+1}(\eta_j) - g_i(\eta_j)\} \quad (21)$$

The relative difference $\Delta\Phi_i$ is a value which is actually obtained, and the average relative difference $\Delta\Phi_m$ is equal to 120 degrees. The function, $g_i(\eta_j)$, is employed for eliminating the influence of the fault of small exhaust-valve clearance that may be contained in the relative difference $\Delta\Phi_i$. The variable $\eta_j$ is obtained according to the expression (17). The function $g_i(\eta_j)$ provides −6.4 when the cylinder indicated by the variable 'i' has the fault of small exhaust-valve clearance; and 0 when it does not. The suffix, 'j', of the variable $\eta_j$ is used to distinguish the variable $\eta_j$ from the variable $\rho_i$. This means that it is not possible to judge, based on only the variable $\eta_i$, whether the cylinder indicated by the variable 'i' has the fault of small exhaust-valve clearance and that it is possible to do so based on the respective values of variable $\eta_j$ obtained for all the cylinders. From the above-indicated expression (13), it is understood that the difference, $\Delta\Phi_i - \Delta\Phi_m$, present in the right side of the expression (21) is equal to the difference, $\Delta\Phi_{i+1} - \Delta\Phi_i$. Therefore, the expression (21) can be modified as follows:

$$\rho_i = \Phi_{i+1} - \Phi_i - \{g_{i+1}(\eta_j) - g_i(\eta_j)\} \quad (22)$$

The values of variable $\rho_i$, which will be exemplified later, can be calculated according to this expression (22), based on the value of difference 4 indicated in the table of FIG. 24. However, in actual engine tests, the values of variable $\rho_i$ are calculated according to the expression (21).

The influence of the small exhaust-valve clearance that may be contained in the difference $\Phi_i$ or the relative difference $\Delta\Phi_i$ is changeable as described above. Therefore, it is preferred that the value provided by the function $g_i(\eta_j)$ reflect the magnitude of the changeable influence. The changeable influence may be removed by, e.g., defining the function $g_i(\eta_j)$ such that the function $g_i(\eta_j)$ provides a value obtained by subtracting, from the actually measured value of the relative difference $\Delta\Phi_i$, a multiple of fifteen which is the most approximate to the measured value. The thus obtained value of variable $\rho_i$ is one of 0, ±15, and ±30 and is free from any influence of the faults with the exhaust-valve clearance.

Hereinafter, the value of variable $\rho_i$ when the variable 'i' is an odd number will be indicated at $\rho_{odd}$, and the value of variable $\rho_i$ when the variable 'i' is an even number will be indicated at $\rho_{even}$. The combination, ($\rho_{odd}$, $\rho_{even}$), can take one of five combinations, (0, 0), (15, −15), (−15, 15), (30, −30), and (−30, 30). The five combinations correspond to the following assembled states of the cam pulleys 24, 26:

Combination (1)-(0, 0):

- two cam pulleys 24, 26 normal, or
- two cam pulleys 24, 26 one-tooth fast or slow Combination (2)-(15, −15):

- left cam pulley 24 one-tooth fast and right cam pulley 26 normal, or
- left cam pulley 24 normal and right cam pulley 26 one-tooth slow Combination (3)-(−15, 15):

- left cam pulley 24 normal and right cam pulley 26 one-tooth fast, or
- left cam pulley 24 one-tooth slow and right cam pulley 26 normal Combination (4)-(30, −30):

- left cam pulley 24 one-tooth fast and right cam pulley 26 one-tooth slow Combination (5)-(−30, 30):

- left cam pulley 24 one-tooth slow and right cam pulley 26 one-tooth fast When the combination ($\rho_{odd}$, $\rho_{even}$) indicated fourth or fifth combination (4), (5), the CPU can completely specify the respective assembled states of the two cam pulleys 24, 26. On the other hand, when the combination ($\rho_{odd}$, $\rho_{even}$) is one of the above-indicated first to third combinations (1), (2), (3), the CPU cannot completely specify the assembled states of the two cam pulleys 24, 26. However, when the combination ($\rho_{odd}$, $\rho_{even}$) is the second or third combination (2), (3), the CPU can specify two possible cases; and when the combination ($\rho_{odd}$, $\rho_{even}$) is the first combination (1), the CPU can specify the three possible cases. This information is very useful when an operator or worker corrects the engine 90 based on the outcome of the present test. Regarding the first combination (1), it should be noted that the possibility that both the two cam pulleys 24, 26 are one-tooth fast or slow is very low.

Step U500 is followed by Step U502 to set values in the fault flag '$flag_{cam}$' based on the combination ($\rho_{odd}$, $\rho_{even}$). When the combination ($\rho_{odd}$, $\rho_{even}$) is the first combination (1), the CPU sets 0×Cf (i.e., 11001111) in the flag '$flag_{cam}$'. As is understood from FIG. 69, the values, 0×Cf, are provided by the logical sum of 0×05 (00000101) indicating that the two cam pulleys 24, 26 are one-tooth fast, and 0×0a (00001010) indicating that the two cam pulleys 24, 26 are one-tooth slow, and the value of 1 set in each of the error-1 and error-2 bits of the flag '$flag_{cam}$'. Since both the error-1 and error-2 bits have the value of 1, the lamps corresponding to the bits each having the value of 1 are flashed as described above. Alternatively, the flag '$flag_{cam}$' may be set to 0×80 (10000000). When the combination ($\rho_{odd}$, $\rho_{even}$) is the second combination (2), the CPU sets 0×C9 (i.e., 11001001) in the flag '$flag_{cam}$'. The values, 0×C9, are provided by the logical sum of 0×01 (00000001) indicating that the left cam pulley 24 is one-tooth fast and the right cam pulley 26 is normal, and 0×08 (00001000) indicating that the left cam pulley 24 is normal and the right cam pulley 26 is one-tooth slow, and the value of 1 set in each of the error-1 and error-2 bits of the flag '$flag_{cam}$'.

When the combination ($\rho_{odd}$, $\rho_{even}$) is the third combination (3), the CPU sets 0×86 (i.e., 11000110) in the flag '$flag_{cam}$'. The values, 0×86, are provided by the logical sum of 0×02 (00000010) indicating that the left cam pulley 24 is one-tooth slow and the right cam pulley 26 is normal, and 0×04 (00000100) indicating that the left cam pulley 24 is normal and the right cam pulley 26 is one-tooth fast, and the value of 1 set in each of the error-1 and error-2 bits of the flag '$flag_{cam}$'. When the combination ($\rho_{odd}$, $\rho_{even}$) is the fourth combination (4), the CPU sets 0×09 (i.e., 00001001) in the flag '$flag_{cam}$'. The values, cam 0×09, indicate that the left cam pulley 24 is one-tooth fast and the right cam pulley 26 is one-tooth slow. When the combination ($\rho_{odd}$, $\rho_{even}$) is the fifth combination (5), the CPU sets 0×06 (i.e., 00000110) in the flag '$flag_{cam}$'. The values, 0×06, indicate that the left cam pulley 24 is one-tooth slow and the right cam pulley 26 is one-tooth fast. In the case where both the error-1 and error-2 bits of the flag '$flag_{cam}$' have the value of 1, the lamps (FIG. 26) corresponding to the bits which are other than the error-1 and error-2 bits in the flag and have the value of 1 are flashed under control of the CPU.

The combination ($\rho_{odd}$, $\rho_{even}$) obtained from one pair of odd-numbered and even-numbered cylinders may be used alone. However, the former combination ($\rho_{odd}$, $\rho_{even}$) may be used with another or other combinations obtained from another or other pairs of odd-numbered and even-numbered cylinders. For example, the average of respective values of the variable $\rho_{odd}$ for the three odd-numbered cylinders may be combined with the average of respective values of the variable $\rho_{even}$ for the three even-numbered cylinders. Thus, it can be said that the cam-pulley test indicated in FIG. 72 is carried by comparing the variable $\rho_i$ of at least one odd-numbered cylinder with that of at least one even-numbered cylinder. Otherwise, it can be said that the test is carried out by grouping the respective values of variable $\rho_i$ for all the six cylinders, into a first group including the values for the odd-numbered cylinders and a second group including the values for the even-numbered cylinders, and then comparing one or more values of one of the two groups with one or more values of the other group.

Figure 73:
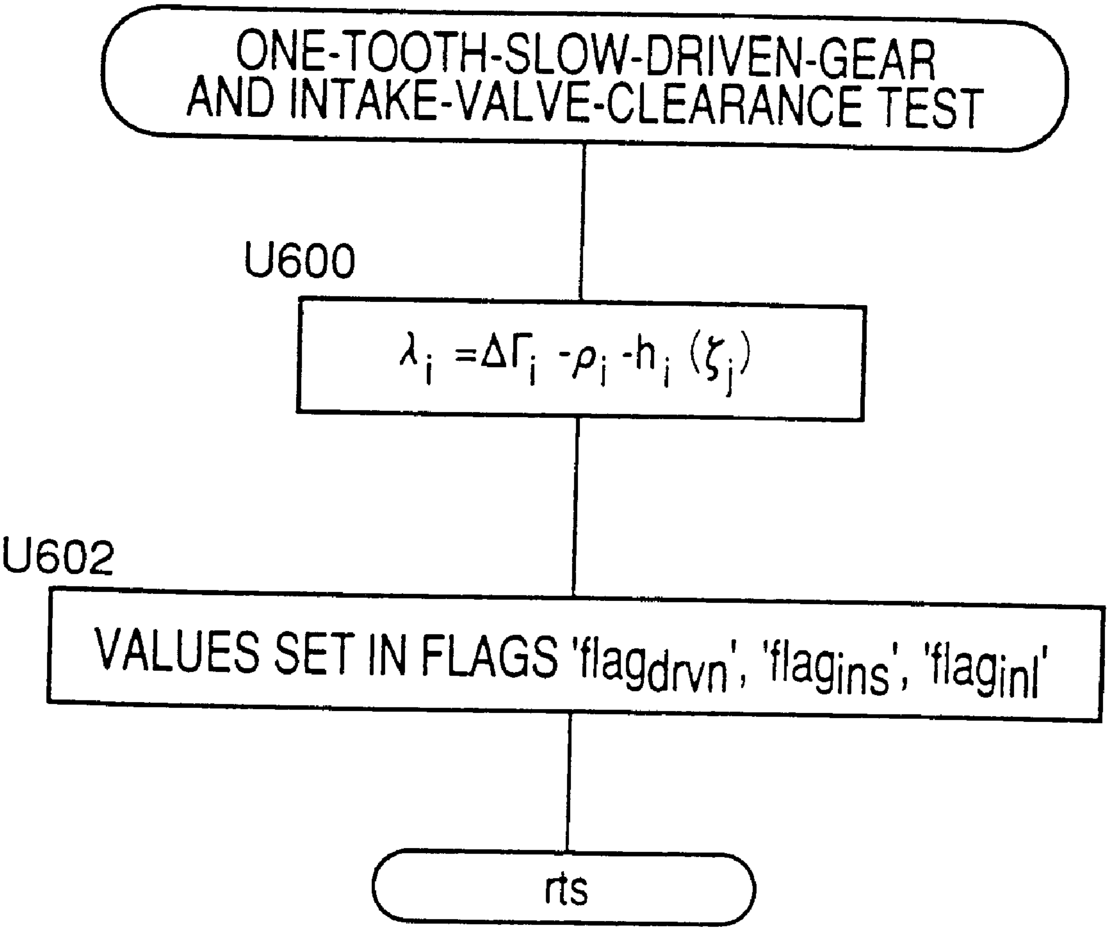
FIG. 73 is a flow chart representing a one-tooth-slow-driven-gear and intake-valve-clearance test routine carried out at Step U208 of the flow chart of FIG. 68.

FIG. 73 shows a flow chart representing the one-tooth-slow-driven-gear and intake-valve-clearance test called at Step U208 of FIG. 68. First, alt Step U600, the CPU calculates a variable, $\lambda_i$, for each of the cylinders #1 to #6 which is indicated by the variable 'i', according to the following expression (23):

$$\lambda_i=\Delta\Gamma_i-\rho_i-h_i(\zeta_j) \tag{23}$$

The function, $h_i(\zeta_j)$, is a function of the above-described variable $\zeta_j$, and is employed for eliminating the influence of the one-tooth fast state of the driven gear 40, 42 that may be contained in the actually measured value of relative difference $\Delta\Gamma_i$. The function $h_i(\zeta_j)$ provides 0 when both the two driven gears 40, 42 are one-tooth fast, or when neither of the two driven gears 40, 42 is one-tooth fast; 18 when one of the driven gears 40, 42 which corresponds to the cylinder indicated by the variable 'i' is one-tooth fast; and −18 when one of the driven gears 40, 42 which does not correspond to the cylinder indicated by the variable 'i' is one-tooth fast. The reason why not the suffix 'i' but the suffix 'j' is used for the variable $\zeta_j$ is that it is not possible to specify, based on only the value of variable $\zeta_i$ for the cylinder indicated by the variable 'i', whether one of the driven gears 40, 42 which corresponds to that cylinder is one-tooth fast and that it is possible to do so based on the combination (ζodd, ζeven) according to the test indicated in FIG. 70. The influence of the one-tooth fast or slow state of the cam pulley 24, 26 can be removed by subtracting the variable ρi from the relative difference $\Delta\Gamma_i$.

The variable $\lambda_i$ calculated according to the expression (23) is free from the influences of the above-indicated faults and may contain the influences of the one-tooth slow state of the driven gear 40, 42 and/or the small or large state of the intake-valve clearance. The following expression (24) is obtained by replacing, in the expression (23), the relative difference $\Delta\Gamma_i$ with that defined by the expression (12), and transposing the term, $\Delta\Gamma_m$, from the right side to the left side:

$$\lambda_i-\Delta\Gamma_m=\Gamma_{i+1}-\Gamma_i-\rho_i-h_i(\lambda_j) \tag{24}$$

Figure 74:
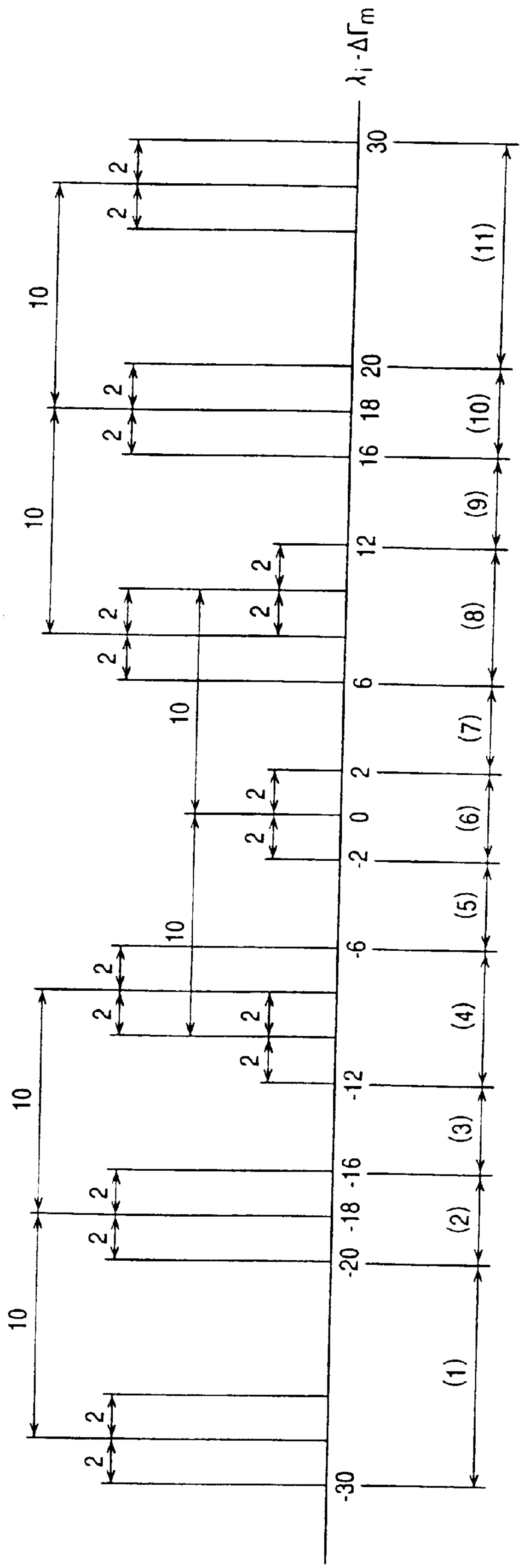
FIG. 74 is a graph showing the ranges of parameter, $\lambda_i$-$\Delta\Gamma_m$, which is employed at Step U602 of the flow chart of FIG. 73.

The right side of the expression (24) can be calculated based on the value of difference Γ indicated in the table of FIG. 24. Although the expression (24) is different from the expression (23) that is employed in actual engine tests, the two expressions (23), (24) provide the same result for the same engine 90. The left side of the expression (24) (i.e., value obtained by subtracting, from the variable $\lambda_i$, the exhaust-pressure maximal-value-angle average relative difference $\Delta\Gamma_m$=120 degrees) falls one of the following eleven ranges (1) to (11), depending upon the presence or absence of the one-tooth-slow driven gear and/or the small or large intake-valve clearance:

Range (1): $-30\leqq\lambda_i-\Delta\Gamma_m<-20$
Range (2): $-20\leqq\lambda_i-\Delta\Gamma_m<-16$
Range (3): $-16\leqq\lambda_i-\Delta\Gamma_m<-12$
Range (4): $-12\leqq\lambda_i-\Delta\Gamma_m<-6$
Range (5): $-6\leqq\lambda_i-\Delta\Gamma_m<-2$
Range (6): $-2\leqq\lambda_i-\Delta\Gamma_m<2$
Range (7): $2\leqq\lambda_i-\Delta\Gamma_m<6$
Range (8): $6\leqq\lambda_i\Delta\Gamma_m<12$
Range (9): $12\leqq\lambda_i-\Delta\Gamma_m<16$
Range (10): $16\leqq\lambda_i-\lambda\Gamma_m<20$
Range (11): $20\leqq\lambda_i-\Delta\Gamma_m<30$ FIG. 74 shows the above eleven ranges (1) to (11). The one-tooth slow state of the driven gear 40, 42 stepwise influences the value, $\lambda_i-\Delta\Gamma_m$. The magnitude of this influence is 0 when both the two driven gears 40, 42 are one-tooth slow, or when the two driven gears are normal; −18 when one of the driven gears 40, 42 which corresponds to the cylinder indicated by the variable 'i' is one-tooth slow; and 18 when one of the driven gears 40, 42 which does not correspond to the cylinder indicated by the variable 'i' is one-tooth slow.

Meanwhile, the CPU can judge that the intake-valve clearance of each cylinder is normal, if the difference Γ of that cylinder falls in the range of −2 to 2. Therefore, even if it may be judged that the intake-valve clearance of one cylinder is normal, the difference Γ of that cylinder may take any value falling in the range of −2 to 2. In addition, even if the intake-valve clearance may be very small, the difference Γ cannot be smaller than −10; and even if the intake-valve clearance may be very large, the difference Γ cannot be greater than 10. Therefore, the entire range of parameter, $\lambda_i-\Delta\Gamma_m$, is divided into the eleven ranges (1) to (11) which are defined by the following border values: −18±(10+2), −18±2, 0±(10+2), 0±2, 18±(10+2), and 18±2.

Each of the above eleven ranges (1) to (11) corresponds to the following fault or faults with one of the two driven gears 40, 42 which corresponds to the cylinder indicated by the variable 'i' and/or the other gear which does not corresponds to the same cylinder, and with the intake-valve clearance of the same cylinder:

Range (1): the one of driven gears 40, 42 one-tooth slow, and intake-valve clearance large Range (2): the one of driven gears 40, 42 one-tooth slow, and intake-valve clearance normal Range (3): the one of driven gears 40, 42 one-tooth slow, and intake-valve clearance small Range (4): the one of driven gears 40, 42 one-tooth slow, and intake valve clearance small, or
both driven gears 40 and 42 normal, and intake-valve clearance large, or
both driven gears 40 and 42 one-tooth slow, and intake-valve clearance large Range (5): both driven gears 40 and 42 normal, and intake-valve clearance large, or
both driven gears 40 and 42 one-tooth slow, and intake-valve clearance large Range (6): both driven gears 40 and 42 normal, and intake-valve clearance normal, or
both driven gears 40 and 42 one-tooth slow, and intake-valve clearance normal Range (7): both driven gears 40 and 42 normal, and intake-valve clearance small, or
both driven gears 40 and 42 one-tooth slow, and intake-valve clearance small Range (8): both driven gears 40 and 42 normal, and intake-valve clearance small, or both driven gears 40 and 42 one-tooth slow, and intake-valve clearance small, or the other of driven gears 40, 42 one-tooth slow, and intake-valve clearance large Range (9): the other of driven gears 40, 42 one-tooth slow, and intake-valve clearance large Range (10): the other of driven gears 40, 42 one-tooth slow, and intake-valve clearance normal Range (11): the other of driven gears 40, 42 one-tooth slow, and intake-valve clearance small When the value, $\lambda_i-\Delta\Gamma_m$, falls in one of the first to third ranges (1) to (3) and ninth to eleventh ranges (9) to (11), the CPU can specify the assembled state (i.e., large, normal, or small state) of the intake-valve clearance of the cylinder indicated by the variable 'i', and the assembled state (i.e., one-tooth slow or normal state) of one of the two driven gears 40, 42 which corresponds to that cylinder. On the other hand, when the value, $\lambda_i-\Delta\Gamma_m$, falls in one of the fourth to eighth ranges (4) to (8), the CPU can only specify a plurality of candidates for the assembled state of the intake-valve clearance of the cylinder indicated by the variable 'i' and the assembled state of one of the two driven gears 40, 42 which corresponds to that cylinder. However, even in the case where the value, $\lambda_i-\Delta\Gamma_m$, falls in one of the ranges (4) to (8), the CPU may be able to specify the assembled state of the intake-valve clearance of the cylinder and the assembled state of one of the two driven gears 40, 42 which corresponds to the cylinder. For example, when the value, $\lambda_i-\Delta\Gamma_m$, of one cylinder falls in the eighth range (8), the CPU can specify that the other of driven gears 40, 42 which does not corresponds to the one cylinder is one-tooth slow and the intake-valve clearance of the one cylinder is large, if the value, $\lambda_i-\Delta\Gamma_m$, of another cylinder belonging to the same bank as that to which the above one cylinder belongs falls in the ninth range (9). Thus, the present engine testing apparatus can collect information from each one of the two banks of the engine 90, independent of the other bank, and can collect more information about the assembled state of the engine 90. Step U600 is followed by Step U602 to set values in the fault flags '$flag_{drvn}$' '$flag_{inl}$' '$flag_{ins}$'. However, when the CPU specifies a plurality of candidates for one or more faults, the CPU sets 1 in each of the error-1 and error2 bits of corresponding one or more flags, thereby indicating that the CPU failed to specify clearly one or more faults with the driven gears 40, 42 and the intake valves 50 of the engine 90.

Figure 75:
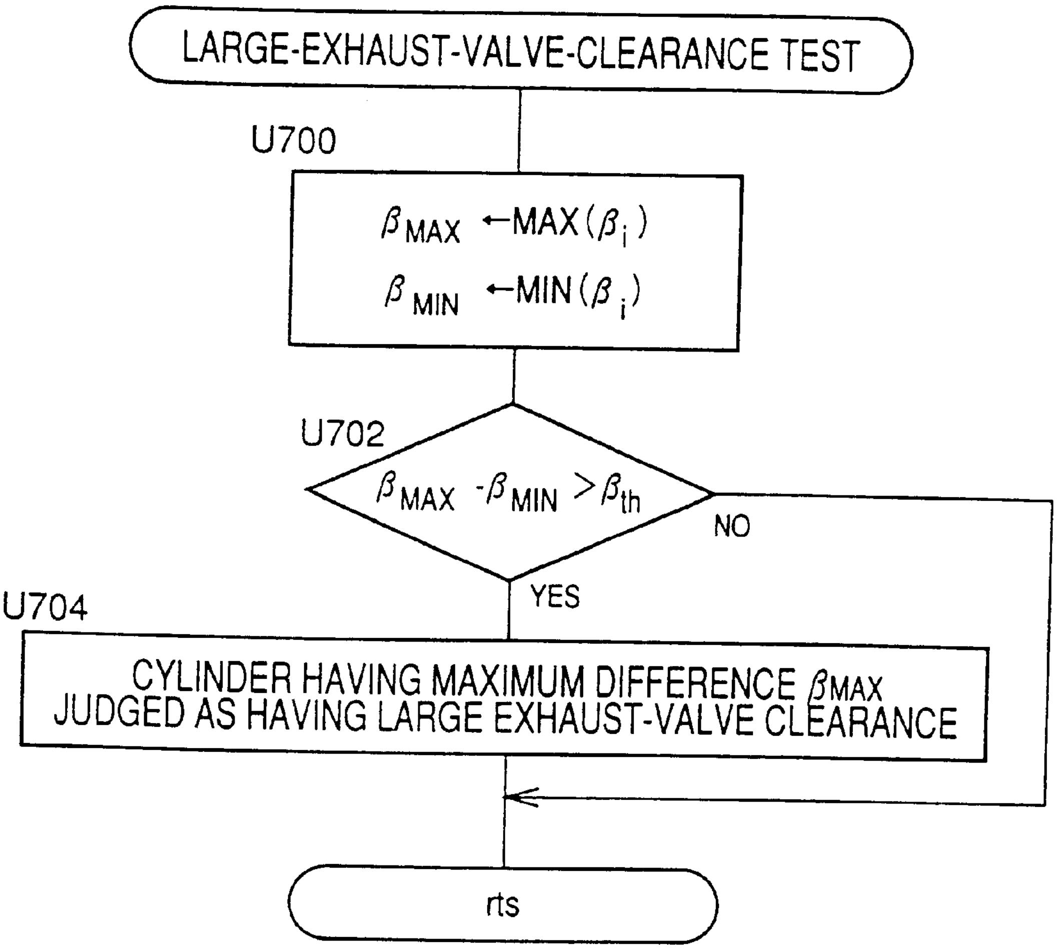
FIG. 75 is a flow chart representing a large-exhaust-valve-clearance test routine carried out at Step U210 of the flow chart of FIG. 68.

FIG. 75 is a flow chart representing a large-exhaust-valve-clearance test called at Step U210 of FIG. 68. This test may not provide a correct result, if the engine 90 has another or other faults with the cam pulleys 24, 26, the driven gears 40, 42, the intake-valve clearances of the cylinders #1 to #6, etc. However, if the engine 90 has a cylinder with the fault of large exhaust-valve clearance and does not have any other faults, the CPU can specify that cylinder. Therefore, if the fault finder 117 finds one or more faults in the above-described prior tests, the CPU does not carry out the present subroutine, and concludes that whether the exhaust-valve clearance of each cylinder is large or not cannot be judged. In this case, the CPU sets 1 in the error-1 bit of the fault flag '$flag_{exl}$'. Accordingly, the lamps 230 corresponding to all the cylinders #1 to #6 are flashed.

In the test of FIG. 75, first, at Step U700, the CPU determines, as a variable, $\beta_{MAX}$, the maximum one of the respective values of exhaust-pressure constant-value difference $\beta_i$ for all the cylinders #1 to #6 (i=1 to 6), and determines, as a variable, $\beta_{MIN}$, the minimum one of the same values. Step U700 is followed by Step U702 to judge whether a value obtained by subtracting the variable $\beta_{MIN}$ from the variable $\beta_{MAX}$ is greater than a threshold value, $\beta_{th}$. If a positive judgment is made at Step U702, the control of the CPU goes to Step U704 to specify that the cylinder having the maximum difference $\beta_{MAX}$ has the large exhaust-valve clearance, and sets 1 in one of the bits of the flag '$flag_{exl}$' which corresponds to that cylinder. Then, the CPU quits the present subroutine. The threshold value $\beta_{th}$ is a prescribed constant value. On the other hand, if a negative judgment is made at Step U702, the CPU directly quits the present test.

The test indicated in FIG. 75 is based on the assumption that the engine 90 has at most one cylinder with the fault of large exhaust-valve clearance. Even if this assumption may not be correct, this test is useful in the case where it can be said that the assumption that the exhaust-valve clearance of at least one cylinder is normal is correct, that is, in the case where it can be said that there is no possibility that the respective exhaust-valve clearances of all the cylinders be large. In the last case, the present test is carried out for the purpose of finding one of the cylinders which has the largest exhaust-valve clearance. If the CPU finds a cylinder with the large exhaust-valve clearance in this manner, then there remains some possibility that another or other (but not all) cylinders may have the large exhaust-valve clearance. In this case, the CPU may set 1 in one of the bits of the fault flag '$flag_{exl}$' which corresponds to the cylinder judged as having the large exhaust-valve clearance, and set 1 in the error-1 bit of the flag. Consequently the lamp corresponding to the cylinder is lit, and the lamps corresponding to the other cylinders are flashed. Thus, the display 118 indicates that there is some possibility that another or other (but not all) cylinders may have the large exhaust-valve clearance.

In the case where the possibility that all the cylinders may have the large exhaust-valve clearance cannot completely be negated, the CPU commands the display 118 to indicate the above situation, even if the test of FIG. 75 may show that all the cylinders are normal. Therefore, when the test of FIG. 75 shows that all the cylinders are normal, the CPU may set 1 in the error-1 bit of the flag '$flag_{exl}$' and set 0 in each of the first to sixth bits of the flag, thereby indicating that there is some possibility that all the cylinders may have the large exhaust-valve clearance. In this case, the lamps 230 corresponding to all the cylinders are flashed.

Figure 76:
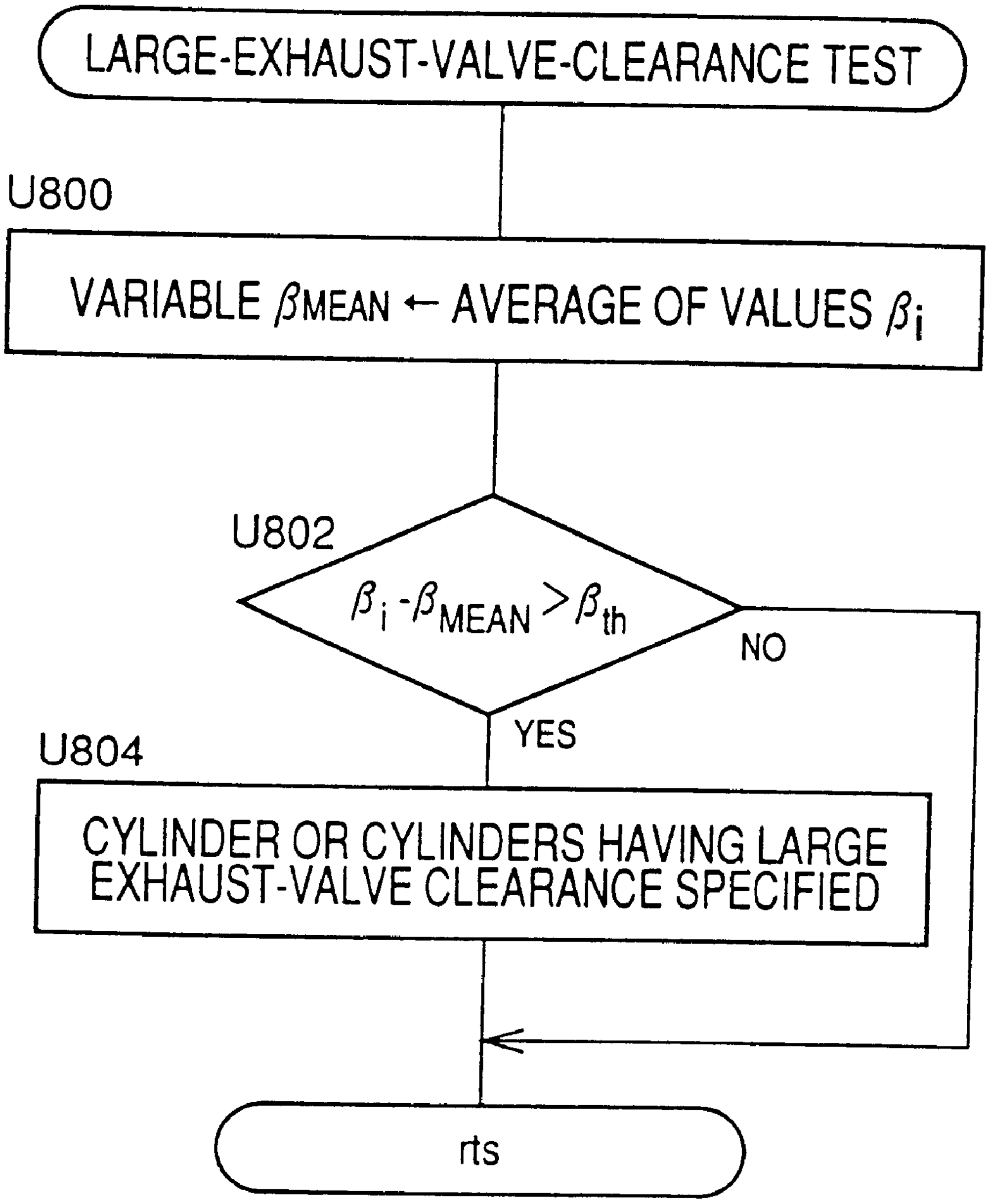
FIG. 76 is a flow chart representing another large-exhaust-valve-clearance test routine carried out at Step U210 of the flow chart of FIG. 68.

FIG. 76 is a flow chart representing another large-exhaust-valve-clearance test which may be called in place of the test of FIG. 75 at Step U210 of FIG. 68. This test is based on the comparison between the value of difference $\beta_i$ obtained for each cylinder #1 to #6 and the average of the respective values of difference $\beta_i$ obtained for all the cylinders. First, at Step U800, the CPU determines, as a variable, $\beta_{MEAN}$, the average of respective values of difference $\beta_i$ obtained for all the cylinders. Step U800 is followed by Step U802 to judge whether a value obtained by subtracting the variable $\beta_{MEAN}$ from the value of difference $\beta_i$ for the current cylinder indicated by the variable 'i' is greater than a threshold value, $\beta_{th}$, (i.e., a prescribed constant value). If a positive judgment is made at Step U802, the control of the CPU goes to Step U804 to specify that the cylinder or cylinders satisfying the above condition has or have the large exhaust-valve clearance, and sets 1 in one or more of the bits of the fault flag '$flag_{exl}$' which corresponds or correspond to that cylinder or those cylinders. Then, the CPU quits the present subroutine. On the other hand, if a negative judgment is made at Step U802, the CPU directly quits the present test. This test is based on the assumption that the engine 90 has at most a small number of cylinders (i.e., one or two cylinders) which have the fault of large exhaust-valve clearance. Therefore, in the case where there is some possibility that this assumption may not be correct, it is preferred to carry out one of the two modified tests which have additionally been described in association with the description of the test of FIG. 75.

Figure 77:
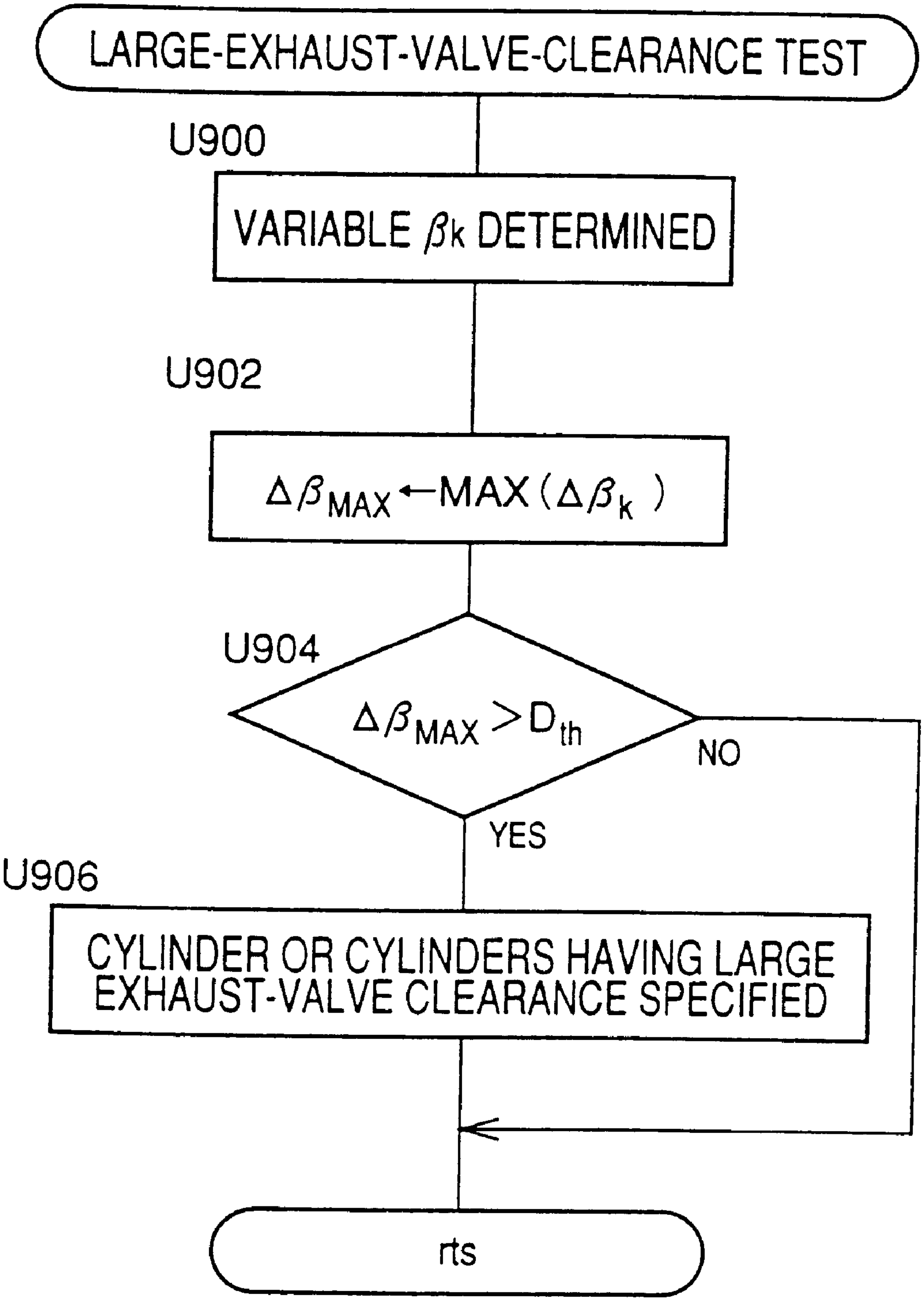
FIG. 77 is a flow chart representing yet another large-exhaust-valve-clearance test routine carried out at Step U210 of the flow chart of FIG. 68.

FIG. 77 is a flow chart representing yet another large-exhaust-valve-clearance test which may be called in place of the test of FIG. 75 or FIG. 76 at Step U210 of FIG. 68. This test is carried out by grouping the respective values of difference $\beta_i$ obtained for all the cylinders #1 to #6, into two groups, and comparing the values of the first group with those of the second group. First, at Step U900, the CPU arranges the respective values of difference $\beta_i$ for all the cylinders, in the order from the maximum value to the minimum value, and determines, as a variable, $\Delta\beta_k$, the difference between each pair of successive values in this order. The variable $\Delta\beta_i$ takes five values when the suffix 'k' thereof takes 1 to 5, respectively. Step U900 is followed by Step U902 to determine, as a variable $\Delta\beta_{MAX}$, the maximum one of the five values which are taken by the variable $\Delta\beta_k$. Subsequently, at Step U904, the CPU judges whether the variable $\Delta\beta_{MAX}$ is greater than a threshold value, $D_{th}$. The threshold value $D_{th}$ may be a value which is smaller than the smaller one (hereinafter, referred to as the value $\beta_S$; and the larger one will be referred to as the value $\beta_L$) of the two values $\beta_i$ used for calculating the variable $\beta_{MAX}$ and which is determined by taking the inevitable changes of difference $\beta$ on the normal cylinders into account. If a positive judgment is made at Step U904, the control of the CPU goes to Step U906 to judge that one or more cylinders having the value of difference $\beta_i$ not smaller than the value $\beta_L$ has or have the large exhaust-valve clearance, and sets 1 in one or more bits of the fault flag 'flag$_{exl}$' which corresponds or correspond to that cylinder or those cylinders. Then, the CPU quits the present subroutine. On the other hand, if a negative judgment is made at Step U904, the CPU directly quits the present test.

If the variable $\Delta\beta_{MAX}$ obtained from the respective values of difference $\beta_i$ for all the cylinders is greater than the threshold value $D_{th}$ also obtained based on the same values, it can be judged that a cylinder or cylinders having a value $\beta_i$ not smaller than the value $\beta_L$, and a cylinder or cylinders having a value $\beta_i$ not greater than the value $\beta_S$, provide different groups, respectively. The CPU judges that the cylinder or cylinders having the value $B_i$ not smaller than the value $B_L$, that is, the cylinder or cylinders of the first group has or have the fault of large exhaust-valve clearance. The test of FIG. 77 is based on the assumption that the inevitable changes of difference $\beta_i$ on the normal cylinders is very small. However, in the case where this assumption may not be correct, it is preferred to carry out the test of FIG. 75 or FIG. 76 or a different large-exhaust-valve-clearance test.

In the test of FIG. 77, the CPU judges whether each cylinder has the large exhaust-valve clearance or not, based on the variable $\Delta\beta_k$, the variable $\Delta\beta_{MAX}$, the threshold value $D_{th}$, etc. obtained from the respective values of difference $\beta_i$ for all the cylinders. This manner is advantageous because the threshold value $D_{th}$ does not need any adjustment which would otherwise be needed.

Each one of the three tests of FIGS. 75, 76, and 77 may be carried out independent of the other tests. However, two or all of those tests may be carried out in succession. In the latter case, the result obtained from one test may differ from that or those obtained from the other test, or the other tests. The CPU may be adapted to judge, regarding one or more cylinders which is or are judged as having the large exhaust-valve clearance in at least one of those tests, that there is some possibility that the fault of large exhaust-valve clearance may have occurred to the cylinder or cylinders.

Figure 78:
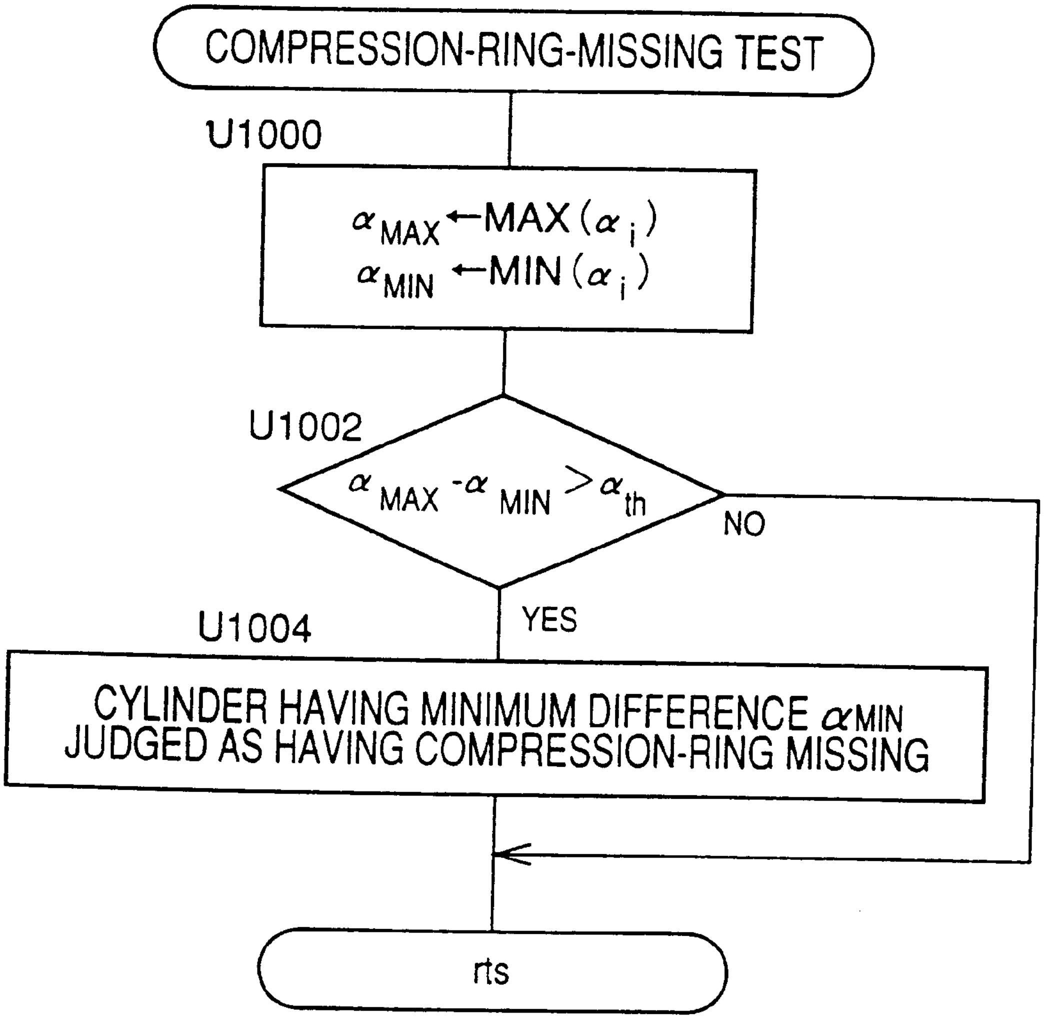
FIG. 78 is a flow chart representing a compression-ring test routine carried out at Step U212 of the flow chart of FIG. 68.

FIG. 78 is a flow chart representing the compression-ring-missing test called at Step U212 of FIG. 68. This test may not provide a correct result, if the engine 90 has another or other faults with the cam pulleys 24, 26, the driven gears 40, 42, the intake-valve clearances of the cylinders #1 to #6, etc. However, if the engine 90 has a cylinder with the fault of compression-ring missing and does not have any other faults, the CPU can specify that cylinder. Therefore, if the fault finder 117 finds one or more faults in the above-described prior tests, the CPU does not carry out the present test, and concludes that whether each cylinder has the fault of compression-ring missing cannot be judged. In this case, the CPU sets 1 in the error-1 bit of the fault flag 'flag$_{ring}$', and sets 0 in the bits of the flag which correspond to all the cylinders #1 to #6. Accordingly, the lamps 232 corresponding to all the cylinders #1 to #6 are flashed.

In the test of FIG. 78, first, at Step U1000, the CPU determines, as a variable, $\alpha_{MAX}$, the maximum one of the respective values of exhaust-pressure maximal-value difference $\alpha_i$ for all the cylinders #1 to #6, and determines, as a variable, $\alpha_{MIN}$, the minimum one of the same values. Step U1000 is followed by Step U1002 to judge whether a value obtained by subtracting the variable $\alpha_{MIN}$ from the variable $\alpha_{MAX}$ is greater than a threshold value, $\alpha_{th}$. If a positive judgment is made at Step U1002, the control of the CPU goes to Step U1004 to specify that the cylinder having the minimum difference $\alpha_{MIN}$ has the fault of compression-ring missing, and sets 1 in one of the bits of the flag 'flag$_{ring}$' which corresponds to that cylinder. Then, the CPU quits the present subroutine. The threshold value $\alpha_{th}$ is a prescribed constant value. On the other hand, if a negative judgment is made at Step U1002, the CPU directly quits the present test.

The test indicated in FIG. 78 is based on the assumption that the engine 90 has at most one cylinder with the fault of compression-ring missing. Even if this assumption may not be correct, this test is useful in the case where it can be said that the assumption that the compression ring of at least one cylinder is normal is correct, that is, in the case where it can be said that there is no possibility that all the cylinders may have the fault of compression-ring missing. In the last case, the present test is carried out for the purpose of finding one of the cylinders which has the compression-ring missing. If the CPU finds a cylinder with the compression-ring missing in this manner, then there remains some possibility that another or other (but not all) cylinders may have the same fault. Accordingly, the CPU sets 1 in one of the bits of the flag 'flag$_{ring}$' which corresponds to the cylinder judged as having the compression-ring missing, and sets 1 in the error-1 bit of the flag. Consequently the lamp 232 corresponding to the cylinder is lit, and the lamps 232 corresponding to the other cylinders are flashed. Thus, the display 118 indicates that there is some possibility that another or other (but not all) cylinders may have the fault of compression-ring missing.

In the case where the possibility that all the cylinders may have the fault of compression-ring missing cannot completely be negated, the CPU commands the display 118 to indicate the above situation, even if the test of FIG. 78 may show that all the cylinders are normal. Therefore, when the test of FIG. 78 shows that all the cylinders are normal, the CPU may set 1 in the error-1 bit of the flag 'flag$_{ring}$' and set 0 in each of the first to sixth bits of the flag, thereby indicating that there is some possibility that all the cylinders may have the fault of compression-ring missing. In this case, the lamps 232 corresponding to all the cylinders are flashed.

As is apparent from the above description, the test of FIG. 78 is obtained by modifying the test of FIG. 75 in such a manner that the difference $\beta_i$ of FIG. 75 is replaced with the difference $\alpha_i$ of FIG. 78, the threshold value $\beta_{th}$ at Step U702 of FIG. 75 is replaced with the threshold value $\alpha_{th}$ at Step U1002 of FIG. 78, and Step U1004 of FIG. 78 is obtained by modifying Step U704 of FIG. 75. Similarly, another or other compression-ring-missing tests can be obtained by modifying the test of FIG. 76 and/or the test of FIG. 77. In the latter case, in addition to the same modifications as the above-indicated modifications to the test of FIG. 75, Step U802 of FIG. 76 is modified so that the CPU judges whether a value obtained by subtracting, from the variable $\alpha_{MEAN}$ (corresponding to the variable $\beta_{MEAN}$), the value of difference $\alpha_i$ for the cylinder indicated by the variable 'i' is greater than the threshold value $\alpha_{th}$, and Step U906 of FIG. 77 is modified so that the CPU judges that one or more cylinders having the value of difference $\alpha_i$ not greater than the value $\alpha_S$ (corresponding to the value $\beta_S$) has or have the fault of compression-ring missing.

Subsequently, the complementary operation carried out at Step U214 of FIG. 68 will be described. At this step, the CPU sets 1 in the error-1 bit of the fault flag "flag$_{crnk}$". In the present fault specifying routine, no test is performed for specifying the one-tooth fast or slow state of the crank pulley 24, 26. Therefore, if a negative judgment is made at Step U112, there is always possibility that the engine 90 may have the one-tooth fast or slow state of the crank pulley 24, 26. Based on the value of 1 set in the error-1 bit of the flag 'flag$_{crnk}$', the display 118 indicates the above situation.

Next, there will be described a seventh embodiment of the present invention. The seventh embodiment is different from the above-described first embodiment in that the engine testing routine of FIG. 25 employed in the first embodiment is replaced by a different engine testing routine of FIG. 81 employed in the seventh embodiment. The engine testing apparatus of FIG. 4 employed in the first embodiment is also employed in the seventh embodiment, for carrying out the seventh engine testing method in accordance with the present invention. Thus, the present testing apparatus can provide the table shown in FIG. 24.

The seventh engine testing method is one of methods which can specify a single assembling fault which may have occurred to an engine 90 being tested. That is, the present method is based on the assumption that the engine 90 has, if any, a single assembling fault as one of the above-described thirteen faults, i.e., the one-tooth fast and slow states of each of the cam pulleys 24, 26, the one-tooth fast and slow states of each of the driven gears 40, 42, the small and large states of the intake-valve clearance, the small and large states of the exhaust-valve clearance, and the missing of the compression ring, and also based on the assumption that each of the small and large states of the intake-valve clearance, the small and large states of the exhaust-valve clearance, and the missing of the compression ring does not simultaneously occur to two or more of the six cylinders #1 to #6 of the engine 90. In the present testing method, no test is carried out for finding any faults with the crank pulley 18.

Each of the above-described thirteen faults can be identified or specified based on respective values of exhaust-pressure maximal-value finite difference, $\delta P_{EXmaxi}$, exhaust-pressure constant-value finite difference, $\delta P_{EXconsti}$, exhaust-pressure maximal-value-angle finite relative difference, $\delta\Gamma_i$, exhaust-pressure constant-start-angle finite relative difference, $\delta\Sigma_i$, exhaust-pressure decrease-start-angle finite relative difference, $\delta\Phi_i$, intake-pressure maximal-value-angle finite relative difference, $\delta\Lambda_i$, and intake-pressure increase-start-angle finite relative difference, $\delta\Psi_i$, which are obtained for each of the six cylinders #1 to #6. The suffix 'i' of each of the respective symbols $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$ of the above-indicated seven parameters changes to 1 to 6 corresponding to the first to sixth cylinders #1 to #6, respectively. The respective values of seventh parameters $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$ for each cylinder #1 to #6 are calculated based on the respective values of exhaust-pressure maximal value $P_{EXmaxi}$, exhaust-pressure constant value $P_{EXconsti}$, exhaust-pressure maximal-value-angle relative difference $\Delta\Gamma_i$, exhaust-pressure constant-start-angle relative difference $\Delta\Sigma_i$, exhaust-pressure decrease-start-angle relative difference $\Delta\Phi_i$, intake-pressure maximal-value-angle relative difference $\Delta\Lambda_i$, and intake-pressure increase-start-angle relative difference $\Delta\Psi_i$ which are obtained for the each cylinder, according to the following seven expressions (25), (26), (27), (28), (29), (30), and (31), respectively:

$$\delta P_{EXmaxi}=P_{EXmaxi+1}-P_{EXmaxi} \quad (25)$$

$$\delta P_{EXconsti}=P_{EXconsti+1}-P_{EXconsti} \quad (26)$$

$$\delta\Gamma_i=\Delta\Gamma_i-\Delta\Gamma_m \quad (27)$$

$$\delta\Sigma_i=\Delta\Sigma_i-\Delta\Sigma_m \quad (28)$$

$$\delta\Phi_i=\Delta\Phi_i-\Delta\Phi_m \quad (29)$$

$$\delta\Lambda_i=\Delta\Lambda_i-\Delta\Lambda_m \quad (30)$$

$$\delta\Psi_i=\Delta\Psi_i-\Delta\Psi_m \quad (31)$$

The intake-pressure maximal-value-angle relative difference $\Delta\Lambda_i$ and the intake-pressure increase-start-angle relative difference $\Delta\Psi_i$ which are present-in the expressions (30), (31) are calculated according to the following expressions (32), (33), respectively:

$$\Delta\Lambda_i=\Delta\Lambda_m+\Lambda_{i+1}-\Lambda_i \quad (32)$$

$$\Delta\Psi_i=\Delta\Psi_m+\Psi_{i+1}-\Psi_i \quad (33)$$

In addition, the intake-pressure maximal-value-angle average relative difference $\Delta\Lambda_m$ and the intake-pressure increase-start-angle average relative difference $\Delta\Psi_m$ which are present in the expressions (30), (31) are equal to 120 degrees. It is noted that in the following description, when the number, i+1, exceeds six, the number is replaced by a number smaller by six.

In actual engine tests, the respective values of above-indicated seven parameters $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$ are calculated according to the expressions (25) to (31), respectively. However, in the following description in which the values indicated in the table of FIG. 24 are utilized, the seven parameters are calculated according to the following seven expressions (34), (35), (36), (37), (38), (39), and (40), respectively, in place of the expressions (25) to (31):

$$\delta P_{EXmaxi}=\alpha_{i+1}-\alpha_i \quad (34)$$

$$\delta P_{EXconsti}=\beta_{i+1}-\beta_i \quad (35)$$

$$\delta\Gamma_i=\Gamma_{i+1}-\Gamma_i \quad (36)$$

$$\delta\Sigma_i=\Sigma_{i+1}-\Sigma_i \quad (37)$$

$$\delta\Phi_i=\Phi_{i+1}-\Phi_i \quad (38)$$

$$\delta\Lambda_i=\Lambda_{i+1}-\Lambda_i \quad (39)$$

$$\delta\Psi_i=\Psi_{i+1}-\Psi_i \quad (40)$$

The respective values of the terms on the right side of each of the expressions (34) to (40) are indicated in the table of FIG. 24. That is, the same values as those calculated according to the expressions (25) to (31) in actual engine tests can be calculated based on the table of FIG. 24 according to the expressions (34) to (40). For example, when the value of exhaust-pressure maximal value $P_{EXmax}$ obtained from a normal engine is expressed as $P_{EXmaxSTD}$, the following expressions (41), (42) are obtained:

$$\alpha_i = P_{EXmaxi} - P_{EXmaxSTD} \tag{41}$$

$$\alpha_{i+1} = P_{EXmaxi+1} - P_{EXmaxSTD} \tag{42}$$

The expression (34) is obtained by substituting, in the expression (25), the terms, $P_{EXmaxi}$ and $P_{EXmaxi+1}$, with those defined in the expressions (41), (42). That is, the expression (25) is equivalent to the expression (34). Similarly, regarding the finite difference $\delta P_{EXconsti}$, it can easily be concluded that the expression (26) is equivalent to the expression (35). In addition, the five expressions (36) to (40) are obtained by substituting, in the five expressions (27) to (31), the terms, $\Delta\Gamma_i$, $\Delta\Sigma_i$, $\Delta\Phi_i$, $\Delta\Lambda_i$, $\Delta\Psi_i$, with those defined by the expressions (27) to (31), (32) and (33). Accordingly, values which will be exemplified below are obtained in the calculating manners different from those in which values are obtained according to the expressions (25) to (31) in actual engine tests. However, the values obtained according to the expressions (34) to (40) are equal to those obtained according to the expressions (25) to (31), and the former values are calculated from the values indicated in the table of FIG. 24. Thus, the values obtained according to the expressions (34) to (40) can be used as the values obtained according to the expressions (25) to (31) in actual engine tests.

First, the manner in which each of the one-tooth fast and slow states of the cam pulleys 24, 26 and the one-tooth fast and slow states of the driven gears 40, 42 is identified or specified will be described below.

In the case where the engine 90 has either the one-tooth fast state of the left cam pulley 24 of the left bank or the one-tooth slow state of the right cam pulley 26 of the right bank, the respective values of above-indicated seven parameters $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$ are calculated according to the expressions (34) to (40), as follows:

$\delta P_{EXmaxodd} = \alpha_{Even} - \alpha_{odd} = 0-(-17) = 17$ $\delta P_{EXmaxeven} = \alpha_{odd} - \alpha_{even} = -17-0 = -17$ $\delta P_{EXconstodd} = \beta_{even} - \beta_{odd} = 0-0 = 0$ $\delta P_{EXconsteven} = \beta_{odd} - \beta_{even} = 0-0 = 0$ $\delta\Gamma_{odd} = \Gamma_{even} - \Gamma_{odd} = 0-(-15) = 15$ $\delta\Gamma_{even} = \Gamma_{odd} - \Gamma_{even} = -15-0 = -15$ $\delta\Sigma_{odd} = \Sigma_{even} - \Sigma_{odd} = 0-(-15) = 15$ $\delta\Sigma_{even} = \Sigma_{pdd} - \Sigma_{even} = -15-0 = -15$ $\delta\Phi_{odd} = \Phi_{even} - \Phi_{odd} = 0-(-15) = 15$ $\delta\Phi_{even} = \Phi_{odd} - \Phi_{even} = -15-0 = -15$ $\delta\Lambda_{odd} = \Lambda_{even} - \Lambda_{odd} = 0-(-14) = 14$ $\delta\Lambda_{even} = \Lambda_{odd} - \Lambda_{even} = -14-0 = -14$ $\delta\Psi_{odd} = \Psi_{even} - \Psi_{odd} = 0-(-15) = 15$ $\delta\Psi_{even} = \Psi_{odd} = \Psi_{even} = -15-0 = -15$ In the above calculations, the suffix "odd" indicates the case where the variable 'i' takes an odd number and the suffix "even" indicates the case where the variable 'i' takes an even number. The above calculations relate to the case where the engine 90 has the one-tooth fast state of the left cam pulley 24. However, the same results are obtained also in the case where the engine 90 has the one-tooth slow state of the right cam pulley 26.

In the case where the engine 90 has either the one-tooth slow state of the left cam pulley 24 or the one-tooth fast state of the right cam pulley 26, the respective values of seven parameters $\delta P_{EXmaxi}$, $\delta P_{consti}$, $\delta\Gamma_i$, $\delta\Sigma_i$, $\delta\Phi_i$, $\delta\Lambda_i$, $\delta\Psi_i$ are calculated according to the expressions (34) to (40), as follows:

$\delta P_{EXmaxodd} = \alpha_{even} - \alpha_{odd} = 0-17 = -17$ $\delta P_{EXmaxeven} = \alpha_{odd} - \alpha_{even} = 17-0 = 17$ $\delta P_{EXconstodd} = \beta_{even} - \beta_{odd} = 0-0 = 0$ $\delta P_{EXconsteven} = \beta_{odd} - \beta_{even} = 0-0 = 0$ $\delta\Gamma_{odd} = \Gamma_{even} - \Gamma_{odd} = 0-15 = -15$ $\delta\Gamma_{even} = \Gamma_{odd} - \Gamma_{even} = 15-0 = 15$ $\delta\Sigma_{odd} = \Sigma_{even} - \Sigma_{odd} = 0-15) = -15$ $\delta\Sigma_{even} = \Sigma_{odd} - \Sigma_{even} = 15-0 = 15$ $\delta\Phi_{odd} = \Phi_{even} - \Phi_{odd} = 0-15 = -15$ $\delta\Phi_{even} = \Phi_{odd} - \Phi_{even} = 15-0 = 15$ $\delta\Lambda_{odd} = \Lambda_{even} - \Lambda_{odd} = 0-14 = -14$ $\delta\Lambda_{even} = \Lambda_{odd} - \Lambda_{even} = 14-0 = 14$ $\Psi_{odd} = \Psi_{even} - \Psi_{odd} = 0-15 = -15$ $\delta\Psi_{even} = \Psi_{odd} - \Psi_{even} = 15-0 = 15$ The above calculations relate to the case where the engine 90 has the one-tooth slow state of the left cam pulley 24. However, the same results are obtained also in the case where the engine 90 has the one-tooth fast state of the right cam pulley 26.

In the case where the engine 90 has the one-tooth fast state of the left driven gear 40 of the left bank, the respective values of seven parameters $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$ are calculated according to the expressions (34) to (40), as follows:

$\delta P_{EXmaxodd} = \alpha_{even} - \alpha_{odd} = 0-(-42) = 42$ $\delta P_{EXmaxeven} = \alpha_{odd} - \alpha_{even} = -42-0 = -42$ $\delta P_{EXconstodd} = \beta_{even} - \beta_{odd} = 0-(-10) = 10$ $\delta P_{EXconsteven} = \beta_{odd} - \beta_{even} = -10-0 = -10$ $\delta\Gamma_{odd} = \Gamma_{even} - \Gamma_{odd} = 0-(-18) = 18$ $\delta\Gamma_{even} = \Gamma_{odd}\Gamma_{even} = -18-0 = -18$ $\delta\Sigma_{odd} = \Sigma_{even} - \Sigma_{odd} = 0-(-8.4) = 8.4$ $\delta\Sigma_{even} = \Sigma_{odd} - \Sigma_{even} = -8.4-0 = -8.4$ $\delta\Phi_{odd} = \Phi_{even} - \Phi_{odd} = 0-0 = 0$ $\delta\Phi_{even} = \Phi_{odd} - \Phi_{even} = 0-0 = 0$ $\delta\Lambda_{odd} = \Lambda_{even} - \Lambda_{odd} = 0-(-17) = 17$ $\delta\Lambda_{even} = \Lambda_{odd} - \Lambda_{even} = -17-0 = -17$ $\delta\Psi_{odd} = \Psi_{even} - \Psi_{odd} = 0-(-18) = 18$ $\delta\Psi_{even} = \Psi_{odd} - \Psi_{even} = -18-0 = -18$ In the case where the engine 90 has the one-tooth slow state of the left driven gear 40, the respective values of seven parameters $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$ are calculated according to the expressions (34) to (40), as follows:

$\delta P_{EXmaxodd} = \alpha_{even} - \alpha_{odd} = 0-42 = -42$ $\delta P_{EXmaxeven} = \alpha_{odd} - \alpha_{even} = 42-0 = 42$ $\delta P_{EXconstodd} = \beta_{even} - \beta_{odd} = 0-36 = -36$ $\delta P_{EXconsteven} = \beta_{odd} - \beta_{even} = 36\ -0 = 36$ $\delta\Gamma_{odd} = \Gamma_{even} - \Gamma_{odd} = 0-18 = 18$ $\delta\Gamma_{even}\Gamma_{odd} - \Gamma_{even} = 18-0 = 18$ $\delta\Sigma_{odd} = \Sigma_{even} - \Sigma_{odd} = 0-0 = 0$ $\delta\Sigma_{even} = \Sigma_{odd} - \Sigma_{even} = 0-0 = 0$ $\delta\Phi_{odd} = \Phi_{even} - \Phi_{odd} = 0-0 = 0$ $\delta\Phi_{even} = \Phi_{odd} - \Phi_{even} = 0-0 = 0$ $\delta\Lambda_{odd} = \Lambda_{even} - \Lambda_{odd} = 0-17 = -17$ $\delta\Lambda_{even} = \Lambda_{odd} - \Lambda_{even} = 17-0 = 17$ $\delta\Psi_{odd} = \Psi_{even} - \Psi_{odd} = 0-18 = -18$ $\delta\Psi_{even} = \Psi_{odd} - \Psi_{even} = 18-0 = 18$ In the case where the engine 90 has the one-tooth fast state of the right driven gear 42 of the right bank, the respective values of seven parameters $\delta P_{EXmaxi}$, $\delta P_{EXconsti}$, $\delta\Gamma_i$, $\delta\Sigma_i$, $\delta\Phi_i$, $\delta\Psi_i$, $\delta\Psi_i$ are calculated according to the expressions (34) to (40), as follows:

$$\delta P_{EXmaxodd}=\alpha_{even}-\alpha_{odd}=-42-0=-42$$
$$\delta P_{EXmaxeven}=\alpha_{odd}-\alpha_{even}=0-(-42)=42$$
$$\delta P_{EXconstodd}=\beta_{even}-\beta_{odd}=-10-0=-10$$
$$\delta P_{EXconsteven}=\beta_{odd}-\beta_{even}=0-(-10)=10$$
$$\delta\Gamma_{odd}=\Gamma_{even}-\Gamma_{odd}=-18-0=-18$$
$$\delta\Gamma_{even}=\Gamma_{odd}-\Gamma_{even}=0-(-18)=18$$
$$\delta\Sigma_{odd}=\Sigma_{even}-\Sigma_{odd}=-8.4-0=-8.4$$
$$\delta\Sigma_{even}=\Sigma_{odd}-\Sigma_{even}=0-(-8.4)=8.4$$
$$\delta\Phi_{odd}=\Phi_{even}-\Phi_{odd}=0-0=0$$
$$\delta\Phi_{even}=\Phi_{odd}-\Phi_{even}=0-0=0$$
$$\delta\Lambda_{odd}=\Lambda_{even}-\Lambda_{odd}=-17-0=-17$$
$$\delta\Lambda_{even}=\Lambda_{odd}-\Lambda_{even}=0-(-17)=17$$
$$\delta\Psi_{idd}=\mathbf{105}\ _{even}-\Psi_{odd}=-18-0=-18$$
$$\delta\Psi_{even}=\Psi_{odd}-\Psi_{even}=0-(-18)=18$$

In the case where the engine 90 has the one-tooth slow state of the right driven gear 42, the respective values of seven parameters $\delta P_{EXmaxi}$, $\delta P_{EXconsti}$, $\delta\Gamma_i$, $\delta\Sigma_i$, $\delta\Phi_i$, $\delta\Psi_i$, $\delta\Psi_i$ are calculated according to the expressions (34) to (40), as follows:

$$\delta P_{EXmaxodd}=\alpha_{even}-\alpha_{odd}=42-0=42$$
$$\delta P_{EXmaxeven}=\alpha_{odd}-\alpha_{even}=0-42=-42$$
$$\delta P_{EXconstodd}=\beta_{even}-\beta_{odd}=36-0=36$$
$$\delta P_{EXconsteven}=\beta_{odd}-\beta_{even}=0-36=-36$$
$$\delta\Gamma_{odd}=\Gamma_{even}-\Gamma_{odd}=18-0=18$$
$$\delta\Gamma_{even}=\Gamma_{odd-\Gamma even}=0-18=-18$$
$$\delta\Sigma_{odd}=\Sigma_{evem}-\Sigma_{odd}=0-0=0$$
$$\delta\Sigma_{even}=\Sigma_{odd}-\Sigma_{even}=0-0=0$$
$$\delta\Phi_{odd}=\Phi_{even}-\Phi_{odd}=0-0=0$$
$$\delta\Phi_{even}=\Phi_{odd}-\Phi_{even}=0-0=0$$
$$\delta\Lambda_{odd}=\Lambda_{even}-\Lambda_{odd}=17-0=17$$
$$\delta\Lambda_{even}=\Lambda_{odd}-\Lambda_{even}=0-17=-17$$
$$\delta\Psi_{odd}=\Psi_{even}-\Psi_{odd}=18-0=18$$
$$\delta\Psi_{even}=\Psi_{odd}-\mathbf{105}\ _{even}=0-18=-18$$

FIG. 79 shows a table representing the relationship between each of the above-indicated eight faults and the thus obtained values of seven parameters $\delta O_{EXmaxi}$, $\delta P_{EXconsti}$, $\delta\Gamma_i$, $\delta\Sigma_i$, $\delta\Phi_i$, $\delta\Lambda_i$, $\delta\Psi_i$ which are equal to those calculated according to the expressions (25) to (31). The parameter, $\delta(\Gamma-\Psi)_i$, indicated in the table of FIG. 79 is defined by the following expression (43):

$$\delta(\Gamma-\Phi)_i=\Delta\Gamma_m-\Delta\Phi_m-(\Delta\Gamma_i-\Delta\Phi_i)=\Delta\Phi_i-\Delta\Gamma_i \quad (43)$$

In the expression (43), that the average relative differences $\Delta\Gamma_m$, $\Delta\Phi_m$ are equal to 120 degrees are utilized. The following expression (44) is obtained by substituting, in the expression (43), the terms $\Delta\Gamma_i$, $\Delta\Phi_i$ with those defined by the expressions (12), (13), respectively:

$$\delta(\Gamma-\Phi)_i=\Gamma_i-\Phi_i-(\Gamma_{i+1}-\Phi_{i+1}) \quad (44)$$

The values of parameter $\delta(\Gamma-\Phi)_i$ indicated in the table of FIG. 79 are not those calculated according to the expression (43) but those calculated according to the expression (44) using the values indicated in the table of FIG. 24. In actual engine tests, the values of parameter $\delta(\Gamma-\Phi)_i$ calculated according to the expression (43) are used. As is apparent from the expression (43) and the table of FIG. 79, the parameter $\delta(\Gamma-\Phi)_i$ is equal to a parameter, $\delta(\Psi-\Phi)_i$. Hence, the parameter $\delta(\Gamma-\Phi)_i$ may be replaced by the parameter $\delta(\Psi-\Phi)_i$.

FIG. 79 shows that the combination of respective left-bank-related and right-bank-related values of eight parameters $\delta P_{EXmaxi}$, $\delta_{EXconsti}$, $\delta\Gamma_i$, $\delta\Sigma_i$, $\delta\Phi_i$, $\delta\Lambda_i$, $\delta\Psi_i$, $\delta(\Gamma-\Phi)_i$, that is, the pattern of sixteen finite-difference values, for each one of the eight faults is different from those for the other faults, except that the pattern for the one-tooth fast state of the left cam pulley 24 is equal to that for the one-tooth slow state of the right cam pulley 26 and that the pattern for the one-tooth slow state of the left cam pulley 24 is equal to that for the one-tooth fast state of the right cam pulley 26. Thus, for example, the one-tooth fast or slow state of the left or right driven gear 40, 42 can be identified or specified from the other faults. However, the one-tooth fast state of the left cam pulley 24 and the one-tooth slow state of the right cam pulley 26 cannot be identified from each other, and the one-tooth slow state of the left cam pulley 24 and the one-tooth fast state of the right cam pulley 26 cannot be identified from each other.

Next, the manner in which each of the small and large states of the intake-valve clearance, the small and large states of the exhaust-valve clearance, and the missing of the compression ring is specified will be described below.

In the case where only one cylinder #i of the engine 90 has the small intake-valve clearance, the respective values $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$, $\delta(\Gamma-\Phi)_i$ for that one cylinder #i that should be equal to those calculated according to the expressions (25) to (31) are calculated according to the expressions (34) to (40) and (44), as follows:

$$\delta P_{EXmaxi}=\alpha_{i+1}-\alpha_i=0-(-47)=47$$
$$\delta P_{EXconsti}=\beta_{i+1}-\beta_i=0-(-16)=16$$
$$\delta\Gamma_i=\Gamma_{i+1}-\Gamma_i=0-(-6.4)=6.4$$
$$\delta\Sigma_i=\Sigma_{i+1}-\Sigma_i=0-0=0$$
$$\delta\Phi_i=\Phi_{i+1}-\Phi_i=0-0=0$$
$$\delta\Lambda_i=\Lambda_{i+1}\Lambda_i=0-(-6)=6$$
$$\delta\Psi_i=\Psi_{i+1}-\Psi_i=0-(-6.4)=6.4$$
$$\delta(\Gamma-\Phi)_i=\Gamma_i-\Phi_i-(\Gamma_{i+1}-\Phi_{i+1})=-6.4-0-(0-0)=\mathbf{-6.4}$$

In the case where only one cylinder #i of the engine 90 has the large intake-valve clearance, the respective values $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$, $\delta(\Gamma-\Phi)_i$ for that one cylinder #i are calculated according to the expressions (34) to (40) and (44), as follows:

$$\delta P_{EXmaxi}=\alpha_{i+1}-\alpha_i=0-18=-18$$
$$\delta P_{EXconsti}=\beta_{i+1}-\beta_i=0-20=-20$$
$$\delta\Gamma_i=\Gamma_{i+1}-\Gamma_i=0-5.4=-5.4$$
$$\delta\Sigma_i=\Sigma_{i+1}-\Sigma_i=0-0=0$$
$$\delta\Phi_i=\Phi_{i+1}-\Phi_i=0-0=0$$
$$\delta\Lambda_i=\Lambda_{o+1}-\Lambda_i=0-5=-5$$
$$\delta\Psi_i=\Psi_{i+1}-\Psi_i=0-5.4)=-5.4$$
$$\delta(\Gamma-\Phi)_i=5.4-0-(0-0)=5.4$$

In the case where only one cylinder #i of the engine 90 has the small exhaust-valve clearance, the respective values $\delta P_{EXmaxi}$, $\delta P_{EXconsti}$, $\delta\Gamma_i$, $\delta\Sigma_i$, $\delta\Phi_i$, $\delta\Lambda_i$, $\delta\Phi_i$, $\delta(\Gamma-\Phi)_i$ for that one cylinder #i are calculated according to the expressions (34) to (40) and (44), as follows:

$$\delta P_{EXmaxi}=\alpha_{i+1}-\alpha_i=0-(-8)=8$$
$$\delta P_{EXconsti}=\beta_{i+1}-\beta_i=0-(-10)=10$$
$$\delta\Gamma_i=\Gamma_{i+1}-\Gamma_i=0-0=0$$
$$\delta\Sigma_i=\Sigma_{i+1}-\Sigma_i=0-6.4=-6.4$$
$$\delta\Phi_i=\Phi_{i+1}-\Phi_i=0-(-6.4)=6.4$$

$\delta\Lambda_i=\Lambda_{i+1}-\Lambda_i=0-0=0$ $\delta\Psi_i=\Psi_{i+1}-\Psi_i=0-0=0$ $\delta(\Gamma-\Phi)_i=0-(-6.4)-(0-0)=6.4$ In the case where only one cylinder #i of the engine 90 has the large exhaust-valve clearance, the respective values $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$, $\delta(\Gamma-\Phi)_i$ for that one cylinder #i are calculated according to the expressions (34) to (40) and (44), as follows:

$\delta P_{EXmaxi}=\alpha_{i+1}-\alpha_i=0-12=-12$ $\delta P_{EXconsti}=\beta B_{i+1}-\beta_i=0-14=-14$ $\delta\Gamma_i=\Gamma_{u+1}-\Gamma_i=0-0=0$ $\delta\Sigma_i=\Sigma_{i+1}-\Sigma_i=0-0=0$ $\delta\Phi_i=\Phi_{i+1}-\Phi_i=0-0=0$ $\delta\Lambda_i=\Lambda_{i+1}-\Lambda_i=0-0=0$ $\delta\Psi_i=\Psi_{i+1}-\Psi_i=0-0=0$ $\delta(\Gamma-\Phi)_i=0-0-(0-0)=0$ In the case where only one cylinder #i of the engine 90 has the compression-ring missing, the respective values $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$, $\delta(\Gamma-\Phi)_i$ for that one cylinder #i are calculated according to the expressions (34) to (40) and (44), as follows:

$\delta P_{EXmaxi}=\alpha_{i+1}-\alpha_i=0-(-10)=10$ $\delta P_{EXconsti}=\beta_{i+1}-\beta_i=0-(-1)=1$ $\delta\Gamma_i=\Gamma_{i+1}-\Gamma_i=0-0=0$ $\delta\Sigma_i=\Sigma_{i+1}-\Sigma_i=0-0=0$ $\delta\Phi_i=\Phi_{i+1}-\Phi_i=0-0=0$ $\delta\Lambda_i=\Lambda_{i+1}-\Lambda_i=0-0=0$ $\delta\Psi_i=\Psi_{i+1}-\Psi_i=0-0=0$ $\delta(\Gamma-\Phi)_i=0-0-(0-0)=0$ FIG. 80 shows a table representing the relationship between each of the above-indicated five faults and the thus obtained values of eight parameters $\delta P_{EXmaxi}$, $\delta P_{EXconsti}$, $\delta\Gamma_i$, $\delta\Sigma_i$, $\delta\Phi_i$, $\delta\Lambda_u$m $\delta\Phi_i$m $\delta(\Gamma-\Phi)_i$. However, as far as the intake-valve or exhaust-valve clearance is concerned, each of those parameters changes continuously, for example, in the case where the thickness of the shim 72 shown in FIG. 3 changes among different engines 90 to be tested. Thus, the table of FIG. 80 just exemplifies the values of eight parameters obtained when an engine 90 has each of the faults with the intake-valve and exhaust-valve clearances. In actual engine tests, each of those parameters can take different values on different engines 90.

As is understood from the tables of FIGS. 79 and 80, each of the eight parameters $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$, $\delta(\Gamma-\Phi)_i$ takes different values for the different assembling faults. This fact is utilized in the present engine testing method as described below.

Whether the engine 90 is normal is judged by judging whether all the respective values of eight parameter $\delta P_{EXmaxi}$, $\delta P_{EXconsti}$, $\delta\Gamma_i$, $\delta\Sigma_i$, $\delta\Phi_i$, $\delta\Phi_i$, $\delta\Lambda_i$, $\delta\Psi_i$, $\delta(\Gamma-\Phi)_i$ measured for each cylinder #1 to 6# are zero. However, the measured values of those parameters may not be equal to zero because of measurement errors, even if the engine 90 may be normal. In the present embodiment, a standard deviation, σ, of each of the eight parameters is obtained, in advance, from a number of normal engines (e.g., 1,000 engines), and a reference range for each parameter is determined as 0±3σ. If all the respective values of eight parameters for each cylinder #1 to 6# falls in the eight references, respectively, the CPU of the fault finder 117 judges that the engine 90 is normal as will be described later. Usually, the respective standard deviations for the eight parameters differ from one another. However, in the following description, they are indicated by the common symbol, σ, for easier understanding.

Initially, a first cam-pulley test will be described. Whether the left cam pulley 24 of the left bank is one-tooth fast or whether the right cam pulley 26 of the right bank is one-tooth slow is judged by judging whether all the following sixteen expressions are satisfied by the eight values obtained for each of the odd-numbered cylinders #1, #3, #5 and the eight values obtained for each of the even-numbered cylinders #2, #4, #6 (see FIG. 79), i.e., are correct ("TRUE"):

$0+3\sigma<\delta P_{EXmaxodd}$ $\delta P_{EXmaxeven}<0-3\sigma$ $0-3\sigma<\delta P_{EXconstodd}\leqq 0+3\sigma$ $0-3\sigma\leqq\delta P_{EXconsteven}\leqq 0+3\sigma$ $0+3\sigma<\delta\Gamma_{odd}$ $\delta\Gamma_{even}<0-3\sigma$ $0+3\sigma<\delta\Sigma_{odd}$ $\delta\Sigma_{even}<0-3\sigma$ $0+3\sigma<\delta\Phi_{odd}$ $\delta\Phi_{even}<0-3\sigma$ $0+3\sigma<\delta\Lambda_{odd}$ $\delta\Lambda_{even}<0-3\sigma$ $0+3\sigma<\delta\Psi_{odd}$ $\delta\Psi_{even}<0-3\sigma$ $0-3\sigma\leqq\delta(\Gamma-\Psi)_{odd}\leqq 0+3\sigma$ $0-3\sigma\leqq\delta(\Gamma-\Phi)_{even}\leqq 0+3\sigma$ The suffix "odd" is used when the variable 'i' indicates an odd number, and the suffix "even" is used when the variable 'i' indicates an even number. In the present embodiment, when the respective values of each parameter $\delta P_{EXmaxodd}$, $\delta P_{EXconstodd}$, $\delta\Gamma_{odd}$, $\delta\Sigma_{odd}$, $\delta\Phi_{odd}$, $\delta\Lambda_{odd}$, $\delta\Psi_{odd}$, $\delta(\Gamma-\Phi)_{odd}$ which are measured from all the three cylinders #1, #3, #5 of the left bank satisfy a corresponding one of the above-indicated expressions, a positive judgment ("TRUE") is obtained from that expression and, when the respective values of each parameter $\delta P_{EXmaxodd}$, $\delta P_{EXconstodd}$, $\delta\Gamma_{odd}$, $\delta\Sigma_{odd}$, $\delta\Phi_{odd}$, $\delta\Lambda_{odd}$, $\delta\Psi_{odd}$, $\delta(\Gamma-\Phi)_{odd}$ which are measured from all the three cylinders #2, #4. #6 of the right bank satisfy a corresponding one of the above-indicated expressions, a positive judgment ("TRUE") is obtained from that expression and, when the respective values of each parameter $\delta P_{EXmaxodd}$, $\delta P_{EXconstodd}$, $\delta\beta_{odd}$,$\delta\Sigma_{odd}$, $\delta\Phi_{odd}$, $\delta\Lambda_{odd}$, $\delta\Psi_{odd}$, $\delta(\Gamma-\Phi)_{odd}$ which are measured from all the three #2, #4, #6 of the right bank satisfy a corresponding one of the above-indicated expressions, a positive judgment ("TRUE") is obtained from the expression.

The above-indicated sixteen expressions may be replaced by the following sixteen expressions wherein the values indicated in the table of FIG. 79 are positively utilized for specifying the faults with the cam pulleys 24, 26:

$17-3\sigma\leqq\delta P_{EXmaxodd}\leqq 17+3\sigma$ $-17-3\sigma\leqq\delta P_{Exmaxeven}\leqq -17+3\sigma$ $0-3\sigma\leqq\delta P_{EXconstodd}\leqq 0+3\sigma$ $0-3\sigma\leqq\delta P_{EXconsteven}\leqq 0+3$ $15-3\sigma\leqq\delta\Gamma_{odd}\leqq 15+3\sigma$ $-15-3\sigma\leqq\delta\Gamma_{even}\leqq -15+3\sigma$ $15-3\sigma\leqq\delta\Sigma_{odd}\leqq 15+3\sigma$ $-15-3\sigma\leqq\delta\Sigma_{even}\leqq -15+3\sigma$ $15-3\sigma\leqq\delta\Phi_{odd}\leqq 15+3\sigma$ $-15-3\sigma\leqq\delta\Phi_{even}\leqq -15+3\sigma$ $14-3\sigma\leqq\delta\Lambda_{odd}\leqq 14+3\sigma$ $-14-3\sigma\leqq\delta\Lambda_{even}\leqq -14+3\sigma$ $15-3\sigma\leqq\delta\Psi_{odd}\leqq 15+3\sigma$ $-15-3Y \leqq \delta\Psi_{even} \leqq -15+3\sigma$ $0-3\sigma \leqq \delta(\Gamma-\Phi)_{odd} \leqq 0+3\sigma$ $0-3\sigma \leqq \delta(\Gamma-\Phi)_{even} \leqq 0+3\sigma$ In each of other cam-pulley or driven-gear tests which will be described below, a first group of expressions employed therein and described therefor may be replaced by a second group of expressions similar to the above-indicated alternative group of expressions for the first cam-pulley test, though the second group of expressions are not expressly described.

Next, a second cam-pulley test will be described. Whether the left cam pulley 24 is one-tooth slow or whether the right cam pulley 26 is one-tooth fast is judged by judging whether all the following sixteen expressions are satisfied by the respective values of each parameter which are obtained for each odd-numbered cylinder #1, #3, #5 and the respective values of each parameter which are obtained for each even-numbered cylinder #2, #4, #6 (see FIG. 79), i.e., are correct ("TRUE"):

$\delta P_{EXmaxodd} < 0-3\sigma$ $0+3\sigma < \delta P_{EXmaxeven}$ $0-3\sigma \leqq \delta P_{EXconstodd} \leqq 0+3\sigma$ $0-3\sigma \leqq \delta P_{EXconsteven} \leqq 0+3\sigma$ $\delta\Gamma_{odd} < 0-3\sigma$ $0+3\sigma < \delta\Gamma_{even}$ $\delta\Sigma_{odd} < 0-3\sigma$ $0+3\sigma < \delta\Sigma_{even}$ $\delta\Phi_{odd} < 0-3\sigma$ $0+3\sigma < \delta\Phi_{even}$ $\delta\Lambda_{odd} < 0-3\sigma$ $0+3\sigma < \delta\Lambda_{even}$ $\delta\Psi_{odd} < 0-3\sigma$ $0+3\sigma < \delta\Psi_{even}$ $0-3\sigma \leqq \delta(\Gamma-\Phi)_{odd} \leqq 0+0\sigma$ $0-3\sigma \leqq \delta(\Gamma-\Phi)_{even} \leqq 0+3\sigma$ Whether the left driven gear 40 of the left bank is one-tooth fast is judged by judging whether all the following expressions are satisfied or are correct ("TRUE"):

$0+3\sigma < \delta P_{EXmaxodd}$ $\delta P_{EXmaxeven} < 0-3\sigma$ $0+3\sigma < \delta P_{EXconstodd}$ $P_{EXconsteven} < 0-3\sigma$ $0+3\sigma < \delta\Gamma_{odd}$ $\delta\Gamma_{even} < 0-3\sigma$ $0+3\sigma < \delta\Sigma_{odd}$ $\delta\Sigma_{even} < 0-3\sigma$ $0-3\sigma \leqq \delta\Phi_{odd} \leqq 0+3\sigma$ $0-3\sigma < \delta\Phi_{even} \leqq 0+3\sigma$ $0+3\sigma < \delta\Lambda_{odd}$ $\delta\Lambda_{even} < 0-3\sigma$ $0+3\sigma < \delta\Psi_{odd}$ $\delta\Psi_{even} < 0-3\delta$ $\delta(\Gamma-\Phi)_{odd} < 0-3\sigma$ $0+3\sigma \leqq \delta(\Gamma-\Phi)_{even}$ Whether the left driven gear 40 of the left bank is one-tooth slow is judged by judging whether all the following expressions are satisfied or are correct ("TRUE"):

$\delta P_{EXmaxodd} < 0-3\sigma$ $0+3\sigma < \delta P_{EXmaxeven}$ $P_{EXconstodd} < 0-3\sigma$ $0+3\sigma < \delta P_{EXconsteven}$ $\delta\Gamma_{odd} < 0-3\sigma$ $0+3\sigma < \delta\Gamma_{even}$ $0-3\sigma \leqq \delta\Sigma_{odd} \leqq 0+3\sigma$ $0-3\sigma \leqq \delta\Sigma_{even} \leqq 0+3\sigma$ $0-3\sigma \leqq \delta\Phi_{odd} \leqq 0+3\sigma$ $0-3\sigma \leqq \delta\Phi_{even} \leqq 0+3\sigma$ $\delta\Lambda_{odd} < 0-3\sigma$ $0+3\sigma < \delta\Lambda_{even}$ $\delta\Psi_{odd} < 0-3\sigma$ $0+3\sigma < \delta\Psi_{even}$ $0+3\sigma < \delta(\Gamma-\Phi)_{odd}$ $\delta(\Gamma-\Phi)_{even} < 0-3\sigma$ Whether the right driven gear 42 of the right bank is one-tooth fast is judged by judging whether all the following expressions are satisfied or are correct ("TRUE"):

$\delta P_{EXmaxodd} < 0-3\sigma$ $0+3\sigma < \delta P_{EXmaxeven}$ $P_{EXconstodd} < 0-3\sigma$ $0+3\sigma < \delta P_{EXconsteven}$ $\delta\Gamma_{odd} < 0-3\sigma$ $0+3\sigma < \delta\Gamma_{even}$ $\Sigma_{odd} < 0-3\sigma$ $0+3\sigma < \delta\Sigma_{even}$ $0-3\sigma \leqq \delta\Phi_{odd} \leqq 0+3\sigma$ $0-3\sigma \leqq \delta\Phi_{even} \leqq 0+3\sigma$ $\delta\Lambda_{odd} < 0-3\sigma$ $0+3\sigma < \delta\Lambda_{even}$ $\delta\Psi_{odd} < 0-3\sigma$ $0+3\sigma < \delta\Psi_{even}$ $0+3\sigma < \delta(\Gamma-\Phi)_{odd}$ $\delta(\Gamma-\Phi)_{even} < 0-3\sigma$ Whether the right driven gear 42 of the right bank is one-tooth slow is judged by judging whether all the following expressions are satisfied or are correct ("TRUE",):

$0+3\sigma < \delta P_{EXmaxodd}$ $\delta P_{EXmaxeven} < 0-3\sigma$ $0+3\sigma < \delta P_{EXconstodd}$ $P_{EXconsteven} < 0-3\sigma$ $0+3\sigma < \delta\Gamma_{odd}$ $\delta\Gamma_{even} < 0-3\sigma$ $0-3\sigma \leqq \delta\Sigma_{odd} \leqq 0+3\sigma$ $0-3\sigma \leqq \delta\Sigma_{even} \leqq 0+3\sigma$ $0-3\sigma \leqq \delta\Phi_{odd} \leqq 0+3\sigma$ $0-3\sigma \leqq \delta\Phi_{even} \leqq 0+3\sigma$ $0+3\sigma < \delta\Lambda_{odd}$ $\delta\Lambda_{even} < 0-3\sigma$ $0+3\sigma < \delta\Psi_{odd}$ $\delta\Psi_{even} < 0-3\sigma$ $\delta(\Gamma-\Phi)_{odd} < 0-3\sigma$ $0+3\sigma < \delta(\Gamma-\Phi)_{even}$ Next, there will be described intake-valve-clearance tests. Whether the cylinder indicated by the variable 'i' (i=1 to 6) has the small intake-valve clearance is judged by judging whether all the following expressions are satisfied (see FIG. 80), i.e., are correct ("TRUE"):

$0+3\sigma < \delta P_{EXmaxi}$ $0+3\sigma < \delta P_{EXconsti}$ $0+3\sigma<\delta\Gamma_i$ $0-3\sigma\leqq\delta\Sigma_i\leqq 0+3\sigma$ $0-3\sigma\leqq\delta\Phi_i\leqq 0+3\sigma$ $0+3\sigma<\delta\Lambda_i$ $0+3\sigma<\delta\Psi_i$ $\delta(\Gamma-\Phi)_i<0-3\sigma$ Whether the cylinder indicated by the variable 'i' has the large intake-valve clearance is judged by judging whether all the following expressions are satisfied (see FIG. 80), i.e., are correct ("TRUE"):

$\delta P_{EXmaxi}<0-3\sigma$ $P_{EXconsti}<0-3\sigma$ $\delta\Gamma_i<0-3\sigma$ $0-3\sigma\leqq\delta\Sigma_i\leqq 0+3\sigma$ $0-3\sigma\leqq\delta\Phi_i\leqq 0+3\sigma$ $\delta\Lambda_i<0-3\sigma$ $\delta\Psi_i<0-3\sigma$ $0+3\sigma<\delta(\Gamma-\Phi)_i$ Next, there will be described exhaust-valve-clearance tests. Whether the cylinder indicated by the variable 'i' (i=1 to 6) has the small exhaust-valve clearance is judged by judging whether all the following expressions are satisfied (see FIG. 80), i.e., are correct ("TRUE"):

$0+3\sigma<\delta P_{EXmaxi}$ $0+3\sigma<\delta P_{EXconsti}$ $0-3\sigma\leqq\delta\Gamma_i\leqq 0+3\sigma$ $\delta\Sigma_i<0-3\sigma$ $0+3\sigma<\delta\Phi_i$ $0-3\sigma\leqq\delta\Lambda_i\leqq 0+3\sigma$ $0-3\sigma\leqq\delta\Psi_i\leqq 0+3\sigma$ $0+3\sigma<\delta(\Gamma-\Phi)_i$ Whether the cylinder indicated by the variable 'i' has the large exhaust-valve clearance is judged by judging whether all the following expressions are satisfied (see FIG. 80), i.e., are correct ("TRUE"):

$\delta P_{EXmaxi}<0-3\sigma$ $P_{EXconsti}<0-3\sigma$ $0-3\sigma\leqq\delta\Gamma_i\leqq 0+3\sigma$ $0-3\sigma\leqq\delta\Sigma_i\leqq 0+3\sigma$ $0-3\sigma\leqq\delta\Phi_i\leqq 0+3\sigma$ $0-3\sigma\leqq\delta\Lambda_i\leqq 0+3\sigma$ $0-3\sigma\leqq\delta\Psi_i\leqq 0+3\sigma$ $0-3\sigma\leqq\delta(\Gamma-\Phi)_i\leqq 0+3\sigma$ Next, there will be described a compression-ring-missing test. Whether the cylinder indicated by the variable 'i' has the compression-ring missing is judged by judging whether all the following expressions are satisfied (see FIG. 80), i.e., are correct ("TRUE"):

$0+3\sigma<\delta P_{EXmaxi}$ $0+3\sigma<\delta P_{EXconsti}$ $0-3\sigma\leqq\delta\Gamma_i\leqq 0+3\sigma$ $0-3\sigma\leqq\delta\Sigma_i\leqq 0+3\sigma$ $0-3\sigma\leqq\delta\Phi_i\leqq 0+3\sigma$ $0-3\sigma\leqq\delta\Lambda_i\leqq 0+3\sigma$ $0-3\sigma\leqq\delta\Psi_i\leqq 0+3\sigma$ $0-3\sigma\leqq\delta(\Gamma-\Phi)_i\leqq 0+3\sigma$ The group of expressions employed in each of the above-described fault finding tests can provide a correct conclusion so long as a certain assumption is correct. This assumption is that the respective absolute values of the values other than zero indicated in the tables of FIGS. 79 and 80 are sufficiently greater than the values, 3σ, which are representative of the substantial upper and lower limits of the respective ranges within which the eight parameters indicated in the tables change on normal engines. In other words, the assumption is that the range within which each of the eight parameters changes on engines with faults does not overlap a corresponding range within which the each parameter changes on normal engines. In the present embodiment, in almost all cases, the respective absolute values of the values other than zero indicated in the tables of FIGS. 79 and 80 are greater than the values, 3σ. However, there are some exceptional cases. For example, the value of finite difference $\delta P_{EXconsti}$, indicated in the table of FIG. 80, corresponding to the compression-ring missing is the value, 1, that may be smaller than the value, 3σ, therefor. In those exceptional cases, if the above-indicated expression relating to the finite difference $\delta P_{EXconsti}$ is used for finding the compression-ring missing, the CPU may erroneously judge that the cylinder #i does not have the compression-ring missing, notwithstanding the presence of that fault. This problem is solved by not using, in those exceptional cases, the above-indicated expression relating to the finite difference $\delta P_{EXconsti}$. This applies to the other, seven parameters. Without taking the value of finite difference $\delta P_{EXconsti}$ into account, the CPU can accurately identify, based on the respective values of the other parameters indicated in the table of FIG. 80, the fault of compression-ring missing from the other faults or the normal assembled state of the engine 90. It is noted that there are some cases where it is redundant to use, for finding each fault, all of the corresponding, above-indicated expressions. For example, it is apparent from FIGS. 79 and 80 that the respective values of finite difference Sri corresponding to all the faults are equal to those of finite difference $\delta\Psi_i$. Therefore, it is possible to omit the step or steps-relating to either one of the two parameters.

Figure 81:
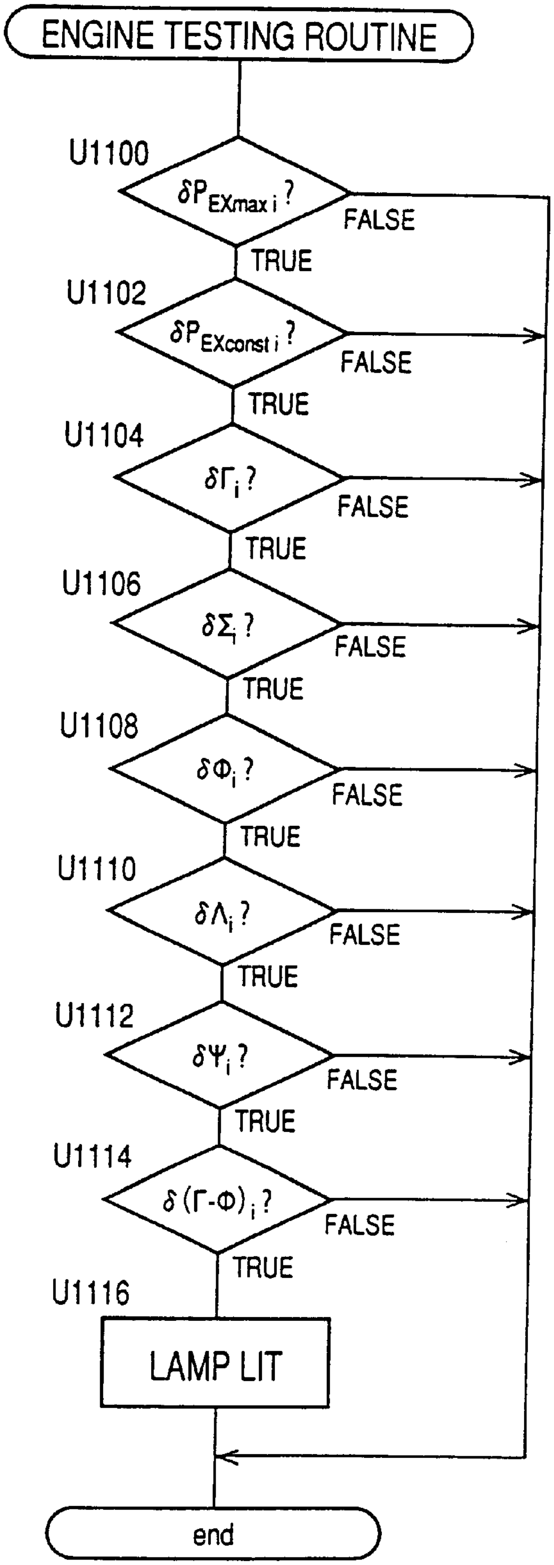
FIG. 81 is a flow chart representing an engine testing program which is pre-stored in a ROM of a fault finder of an engine testing apparatus which carries out the engine testing method as the seventh embodiment.

FIG. 81 is a flow chart representing an engine testing program which is pre-stored in the ROM of the fault finder 117 shown in FIG. 4 and is carried out by the CPU and the RAM of the finder 117. This program is carried out for performing the above-described seventh engine testing method in accordance with the present invention. According to this program, the presence or absence of each of the faults indicated in the tables of FIGS. 79 and 80 is identified by using the corresponding, above-indicated group of expressions. More specifically described, at Steps U1100, U1102, U1104, U1106, U1108, U1100, U1112, and U1114, the respective values of eight parameters $\delta P_{EXmaxi}$, $\delta P_{EXconsti}$, $\delta\Gamma_i$, $\delta\Sigma_i$, $\delta\Phi_i$, $\delta\Lambda_i$, $\delta(\Gamma-\Phi)$ are used, respectively, for judging, for identifying the presence or absence of each of the faults, whether the corresponding, above-indicated group of expressions are correct ("TRUE"). In the case where a certain group of expressions corresponding to a certain fault all provide the "TRUE" judgments at Steps U1100 to U1114, the CPU judges that the engine 90 has that fault. In this case, the control of the CPU goes to Step U1116 to command the display 118 to light the lamp corresponding to the fault thus identified or specified. Then, the CPU quits the present routine.

However, as described above, the CPU omits a certain step when the CPU tries to find a certain fault. For example, when the CPU tries to find the small exhaust-valve clearance, the CPU omits Step U1100 at which the value of finite difference $\delta P_{EXmaxi}$ is used.

On the other hand, if at least one of Steps U1100 to U1114 provides the "FALSE" judgment, the CPU directly quits the present routine without performing any additional operation.

The present routine is carried out, for each of the faults, by using the corresponding, above-indicated group of expressions. It is noted that as is apparent from FIG. 79, it is impossible to identify the one-tooth fast state of the left cam pulley 24 or the left driven gear 40 from the one-tooth slow state of the right cam pulley 26 or the right driven gear 42, or identify the one-tooth slow state of the left cam pulley 24 or the left driven gear 40 from the one-tooth fast state of the right cam pulley 26 or the right driven gear 42. Therefore, the CPU can only judge that the engine 90 has either one of the former two faults, or that the engine 90 has either one of the latter two faults.

The routine of FIG. 81 may be used for judging only whether the engine 90 is normal or not. In this case, the following group of expressions are employed:

$0-3\sigma \leqq \delta P_{EXmaxi} \leqq 0+3\sigma$ $0-3\sigma \leqq \delta_{EXconsti} \leqq 0+3\sigma$ $0-3\sigma \leqq \delta\Gamma_i \leqq 0+3\sigma$ $0-3\sigma \leqq \delta\Sigma_i \leqq 0+3\sigma$ $0-3\sigma \leqq \delta\Phi_i \leqq 0+3\sigma$ $0-3\sigma \leqq \delta\Lambda_i < 0+3\sigma$ $0-3\sigma \leqq \delta\Psi_i \leqq 0+3\sigma$ $0-3\sigma \leqq \delta(\Gamma-\Phi)_i \leqq 0+3\sigma$ In this case, Step U1116 is modified such that the CPU commands the display 118 to light the OK lamp 200 indicating that the engine 90 is normal.

It emerges from the foregoing description that the routine of FIG. 81 needs measuring the respective values of parameters $\delta P_{EXmaxi}$, $\delta P_{EXconsti}$, $\delta\Gamma_i$, $\delta\Sigma_i$, $\delta\Phi_i$, $\delta\Lambda_i$, $\delta\Psi_i$, $\delta(\Gamma-\Phi)$ from a plurality of normal engines and determining, based on the measured values, the respective standard deviations, $\sigma$, of those parameters. Those operations may be omitted by modifying the routine of FIG. 81 as described below.

First, when the cam-pulley test or the driven-gear test is carried out, the steps at which the values of parameters $\delta P_{EXmaxi}$, $\delta P_{EXconsti}$, $\delta\Lambda_i$ are used are omitted, that is, Steps U1100, U1102, U1110 of FIG. 81 are omitted. In other words, only the values of parameters $\delta\Gamma_i$, $\delta\Sigma_i$, $\delta\Phi_i$, $\delta\Psi_i$, $\delta(\Gamma-\Phi)$ are used. Those values are theoretically known without having to measure actually on an engine. For example, in the case where an engine has the one-tooth fast or slow state of the cam pulley 24, 26, the parameters $\delta\Gamma_i$, $\delta\Sigma_i$, $\delta\Phi_i$, $\delta\Psi_i$ change by +15 or −15. This is theoretically known. On the other hand, the values of parameters $\delta P_{EXmaxi}$, $\delta P_{EXconsti}$, $\delta\Lambda_i$ can be known by actual measurement from an assembled engine only. Therefore, those steps at which the values of parameters $\delta P_{EXmaxi}$, $\delta P_{EXconsti}$, $\delta\Lambda_i$ are used are omitted.

Next, when the small- or large-intake-valve-clearance test or the small-exhaust-valve-clearance test is carried out, the routine of FIG. 81 is modified so as to use the respective signs of the values of parameters $\delta\Gamma_i$, $\delta\Sigma_i$, $\delta\Phi_i$, $\delta\Lambda_i$, $\delta\Psi_i$, $\delta(\Gamma-\Phi)$. As far as the present embodiment concerned, the "signs" are defined as including a sign indicating values about zero, in addition to the positive and negative signs. For example, values about zero are defined as falling in the about-zero range of 0±2. Those values, ±2, are values which are empirically known, and are not values which are directly derived from the values measured from the individual engine 90 being tested. Different about-zero ranges may be used for the different parameters $\delta\Gamma_i$, $\delta\Sigma_i$, $\delta\Phi_i$, $\delta\Lambda_i$, $\delta\Psi_i$, $\delta(\Gamma-\Phi)$, respectively. Hence, values having the positive sign are defined as being not smaller than 2, and values having the negative sign are defined as being not greater than −2. The respective absolute values of the values indicated in the table of FIG. 80 cannot be known unless actual measurements are carried out on engines with faults. However, in many cases, the respective signs (i.e., positive, negative, or about zero) of values of parameters $\delta\Gamma_i$, $\delta\Sigma_i$, $\delta\Phi_i$, $\delta\Lambda_i$, $\delta\Psi_i$, $\delta(\Gamma-\Phi)$ can be theoretically known from information about the structure, etc. of the engine 90. In the table of FIG. 80, the respective signs (i.e., positive, negative, or about zero) of values of parameters $\delta\Gamma_i$, $\delta\Sigma_i$, $\delta\Phi_i$, $\delta\Lambda_i$, $\delta\Psi_i$, $\delta(\Gamma-\Phi)$, which are utilized for finding the above-indicated three faults, are indicated. In addition, the table of FIG. 80 indicates the sign (i.e., negative) of value of parameter $\delta P_{EXmaxi}$ which is utilized for finding the large exhaust-valve clearance, and the sign (i.e., positive) of value of parameter $\delta P_{EXmaxi}$ which is utilized for finding the compression-ring missing, as described later.

When the small-intake-valve-clearance test is carried out, Steps U1100 and U1102 of FIG. 81 are omitted like when the cam-pulley test or the driven-gear test is carried out. In addition, Steps U1104 to U1114 are modified so as to judge whether the following expressions are correct ("TRUE") or not ("FALSE"), respectively:

$\delta\Gamma_i \leqq 2$ (U1104)

$\delta\Sigma_i \sim 0$ (U1106)

$\delta\Phi_i \sim 0$ (U1108)

$\delta\Lambda_i \leqq 2$ (U1110)

$\delta\Psi_i \geqq 2$ (U1112)

$\delta(\Gamma-\Phi)_i \leqq -2$ (U1114)

In the above expressions, for example, $\delta\Gamma_i \geqq 2$ means that the value of finite difference $\delta\Gamma_i$ is greater than about zero (i.e., positive); $\delta\Sigma_i \sim 0$ means that the value of finite difference $\delta\Sigma_i$ is about zero; and $\delta(\Gamma-\Phi)_i \leqq -2$ means that the value of parameter $\delta(\Gamma-\Phi)_i$ is smaller than about zero (i.e., negative).

When the large-intake-valve-clearance test is carried out, Steps U1104 to U1114 are modified so as to judge whether the following expressions are correct ("TRUE") or not, respectively:

$\delta\Gamma_i \leqq -2$ (U1104)

$\delta\Sigma_i \sim 0$ (U1106)

$\delta\Phi_i \sim 0$ (U1108)

$\delta\Lambda_i \leqq -2$ (U1110)

$\delta\Psi_i \leqq -2$ (U1112)

$\delta(\Gamma-\Phi)_i \geqq 2$ (U1114)

When the small-exhaust-valve-clearance test is carried out, Steps U1104 to U1114 are modified so as to judge whether the following expressions are correct ("TRUE") or not, respectively:

$\delta\Gamma_i \sim 0$ (U1104)

$\delta\Sigma_o \leqq -2$ (U1106)

$\delta\Phi_i \geqq 2$ (U1108)

$\delta\Lambda_i \sim 0$ (U1110)

$\delta\Psi_i \sim 0$ (U1112)

$\delta(\Gamma-\Phi)_i \geqq 2$ (U1114)

When the large-exhaust-valve-clearance test or the compression-ring missing test is carried out, Step U1100 is not omitted. That is, only Step U1102 is omitted. More specifically described, when the large-exhaust-valve-clearance test is carried out, Steps U1100 and U1104 to U1114 are modified so as to judge whether the following expressions are correct ("TRUE") or not, respectively:

$\delta P_{EXmax} \leqq -2$ (U1100)

$\delta\Gamma_i \sim 0$ (U1104)

$\delta\Sigma_i \sim 0$ (U1106)

$\delta\Phi_i \sim 0$ (U1108)

$\delta\Lambda_i \sim 0$ (U1110)

$\delta\Psi_i \sim 0$ (U1112)

$\delta(\Gamma-\Phi)_i \sim 0$ (U1114)

When the compression-ring missing test is carried out, Steps U1100 and U1104 to U1114 are modified so as to judge whether the following expressions are correct ("TRUE") or not, respectively:

$\delta P_{EXmax} \geqq 2$ (U1100)

$\delta\Gamma_i \sim 0$ (U1104)

$\delta\Sigma_i \sim 0$ (U1106)

$\delta\Phi_i \sim 0$ (U1108)

$\delta\Lambda_i \sim 0$ (U1110)

$\delta\Psi_i \sim 0$ (U1112)

$\delta(\Gamma-\Phi)_i \sim 0$ (U1114)

If the routine of FIG. 81 is modified as indicated above, each of the faults can be identified without having to determine, in advance, the standard deviations, a, of parameters based on the values of parameters measured from normal engines.

As is apparent from the foregoing description, in the seventh engine testing method, each of the faults is identified by comparing the values obtained from one cylinder of each pair of successively ignited cylinders, with the values obtained from the other cylinder of the each pair. As far as the engine 90 having the left and right banks is concerned, it can be said that each fault is identified based on the comparison between the values obtained from one cylinder (variable 'i' is an odd number) of the left bank and with the values obtained from one cylinder (variable 'i' is an even number) of the right bank.

Even in the case where one or more different types of engines than the engine 90 are tested, the values of parameters $\delta\Gamma_i$, $\partial\Sigma_i$, $\delta\Phi_i$, $\delta\Lambda_i$, $\delta\Psi_i$, $\delta(\Gamma-\Phi)$ may have, for each of the faults, the same signs (i.e., positive, negative, or about zero) as indicated in the table of FIG. 80. In the latter case, the present method may be used for testing more than two types of engines.

In each of the sixth and seventh embodiments, the respective values of parameters $P_{EXmax}$, $\Delta\Gamma_i$, etc. obtained from one cylinder and the value or values calculated based on those respective values are compared with the respective values of parameters $P_{EXmax}$, $\Delta\Gamma_i$, etc. obtained from another cylinder and the value or values calculated based on those respective values. Therefore, it is not needed to determine the respective CS angles when the exhaust pressures $P_{EX}$ and the intake pressure $P_{IN}$ satisfy the predetermined conditions. Therefore, the CS sensor 114 shown in FIG. 4 may be omitted in actual engine tests. Thus, the testing apparatus shown in FIG. 4 can enjoy a simpler construction.

In each of the sixth and seventh embodiments, the intake pressure $P_{IN}$ is detected from the surge tank 96. However, an intake pressure $P_{IN}$ may be detected from each of the intake ports 92. In the latter case, the intake pressures $P_{IN}$ corresponding to all the cylinders #1 to #6 are obtained, and the assembling faults of the engine 90 are identified based on those intake pressures $P_{IN}$. In addition, in each of the sixth and seventh embodiments, the intake-valve side space is provided by the respective inner spaces of the surge tank 96, the intake manifolds 94, and the intake ports 92. However, six intake-valve side spaces may be provided by the respective inner spaces of the six intake ports 92. In the last case, those intake-valve side spaces are closed in addition to, or in place of, one or more exhaust-valve side spaces, while the sixth or seventh engine testing method is carried out.

In the case where six intake-valve side spaces are provided by the respective inner spaces of the six intake ports 92, the CPU can determine, from each of the six intake pressures $P_{IN}$, intake-pressure values corresponding to the exhaust-pressure maximal value $P_{EXmax}$, the exhaust-pressure constant value $P_{EXmax}$, etc., and determine angle differences corresponding to the exhaust-pressure decrease-start-angle relative difference $\Delta\Phi_i$, etc. Therefore, the CPU can identify each fault based on those intake-pressure values and those angle differences.

In each of the sixth and seventh embodiments, the V6 DOHC gasoline engines are tested. However, the present invention is applicable to the testing of various types of engines. For example, in the case where SOHC engines are tested, the testing steps for finding the fault with the driven gears 40, 42 are omitted. In addition, in the case where DOHC engines of the type wherein intake cam shafts (32, 34) are driven by not driven gears (40, 42) but different cam pulleys, testing steps for finding a fault with those different cam pulleys may be employed in place of the testing steps for finding the fault with the driven gears. Meanwhile, in each of the sixth and seventh embodiments, the engine test is carried out based on parameters (e.g., the exhaust-pressure maximal-value-angle relative difference $\Delta\Gamma$) derived from the characteristic parameters of the exhaust pressures $P_{EX}$ such as the exhaust-pressure maximal values $P_{EXmax}$, the exhaust-pressure maximal-value angles $\Theta_{EXmax}$, etc. However, the other parameters indicated in the table of FIG. 24 and/or the other characteristic parameters of the curves shown in the graphs of FIG. 8, etc. may be employed for the same purpose. For example, the maximum slope of the curve shown in FIG. 8, or the crank-shaft angle corresponding to the maximum slope, the length and/or position of the interval in which the rate of change of the curve is greater than a reference value, etc. may be taken into account for finding a fault or faults with an engine. The present invention may be also applicable to diesel engines.

In order to specify or identify, with higher reliability, each of a plurality of faults which simultaneously occur to a single engine, the engine testing apparatus can gather more information from the engine. For example, all possible combinations of presence or absence of predetermined faults are artificially created on an engine, and the testing apparatus gathers a group of respective values of predetermined parameters $P_{EXmax}$, $\Delta\Gamma_i$, $\Delta\Phi_i$, etc. in each of all the combinations of the predetermined faults created on the engine. Then, the testing apparatus obtains a group of respective values of the predetermined parameters $P_{EXmax}$, $\Theta_{EXmax}$, etc. from an engine being tested, compares the obtained group of values with each of the reference groups of values gathered in advance in all the fault combinations, and selects one of all the fault combinations which corresponds to the reference group most approximate to the obtained group, as the specified fault combination of the engine. In each of the sixth and seventh embodiments, the testing apparatus finds the one-tooth fast or slow state of the crank pulley 20, the cam pulley 24, 26, or the driven gear 40, 42. However, the testing apparatus may be adapted to find the two or more teeth fast or slow state of each pulley 20, 24, 26, 40, 42. In the last case, each parameter $P_{EXmax}$, $\Delta\Gamma_i$, $\Delta\Phi_i$, etc. may be divided into more ranges for finding a fault or faults with higher accuracy. In this case, slight differences of respective values of each parameter must be distinguished from each other. Since the engine testing apparatus employed in each of the sixth and seventh embodiments can quickly obtain a number of values of each parameter, it can find a fault or faults with an engine with high reliability by, e.g., statistically analyzing those values.

What is claimed is:

1. A method of testing an engine including a cylinder, a piston, a crank shaft, an intake valve and an exhaust valve, comprising the steps of:

rotating the crank shaft using an external power source and thereby reciprocating the piston in the cylinder while at least one of (i) an external intake-valve side space communicating with the intake valve and not supplied with pressurized air and depressurized air from outside the engine and (ii) an external exhaust-valve side space communicating with the exhaust valve and not supplied with pressurized air and depressurized air from outside the engine is isolated from an atmosphere, continuously measuring, while the crank shaft is rotated, a pressure in said at least one of the intake-valve side and exhaust-valve side spares that is isolated from the atmosphere, determining, based on the continuously measured pressure, at least one of (a) a pressure occurring to said at least one of the intake-valve side and exhaust-valve side spaces, when at least one of the corresponding intake and exhaust valves is closed, and (b) at least one of a starting and an ending timing of a closed state of at least one of the corresponding intake and exhaust valves, and evaluating a state of the engine based on the determined at least one of (a) the pressure in said at least one of the intake-valve side and exhaust-valve side spaces and (b) the at least one of the starting and ending timings of the closed state of the at least one of the corresponding intake and exhaust valves.

2. A method according to claim 1, wherein said at least one of the intake-valve and exhaust-valve side spaces comprises the exhaust-valve side space, and the evaluating step comprises evaluating the state of the engine based on the pressure in the exhaust-valve side space that is measured while the exhaust valve should have closed.

3. A method of testing an engine including a cylinder, a piston, a crank shaft, an intake valve and an exhaust valve, comprising the steps of:

rotating the crank shaft using an external power source and thereby reciprocating the piston in the cylinder while at least one of (i) an external intake-valve side space communicating with the intake valve and not supplied with pressurized air from outside the engine and (ii) an external exhaust-valve side space communicating with the exhaust valve and not supplied with pressurized air from outside the engine is isolated from an atmosphere, continuously measuring, while the crank shaft is rotated, a pressure in said at least one of the intake-valve side and exhaust-valve side shapes that is isolated from the atmosphere, determining, based on the continuously measured pressure, at least one of (a) a pressure occurring to said at least one of the intake-valve side and exhaust-valve side spaces, when at least one of the corresponding intake and exhaust valves is closed, and (b) at least one of a starting and an ending timing of a closed state of at least one of the corresponding intake and exhaust valves, and evaluating a state of the engine based on the determined at least one of (a) the pressure in said at least one of the intake-valve side and exhaust-valve side spaces and (b) the at least one of the starting and ending timings of the closed state of the at least one of the corresponding intake and exhaust valves, wherein said at least one of the intake-valve and exhaust-valve side spaces comprises the exhaust-valve side space, and the evaluating step comprises evaluating the state of the engine based on the pressure in the exhaust-valve side space that is measured while the exhaust valve should have closed, wherein the evaluating step comprises judging that the exhaust valve has closed incompletely, when the pressure in the exhaust-valve side space changes while the exhaust valve should have closed.

4. A method according to claim 3, wherein the judging step comprises judging that the exhaust valve has closed incompletely, when the pressure is higher than a first reference value.

5. A method of testing an engine including a cylinder, a piston, a crank shaft, an intake valve and an exhaust valve, comprising the steps of:

rotating the crank shaft using an external power source and thereby reciprocating the piston in the cylinder while at least one of (i) an external intake-valve side space communicating with the intake valve and not supplied with pressurized air from outside the engine and (ii) an external exhaust-valve side space communicating with the exhaust valve and not supplied with pressurized air from outside the engine is isolated from an atmosphere, continuously measuring, while the crank shaft is rotated, a pressure in said at least one of the intake-valve side and exhaust-valve side spaces that is isolated from the atmosphere, determining, based on the continuously measured pressure, at least one of (a) a pressure occurring to said at least one of the intake-valve side and exhaust-valve side spaces, when at least one of the corresponding intake and exhaust valves is closed, and (b) at least one of a starting and an ending timing of a closed state of at least one of the corresponding intake and exhaust valves and evaluating a state of the engine based on the determined at least one of (a) the pressure in said at least one of the intake-valve side and exhaust-valve side spaces and (b) the at least one of the starting and ending timings of the closed state of the at least one of the corresponding intake and exhaust valves, wherein said at least one of the intake-valve and exhaust-valve side spaces comprises the exhaust-valve side space, and the evaluating step comprises judging that the intake valve has closed incompletely, when the pressure in the exhaust-valve side space measured while the exhaust valve is open is lower than a second reference value.

6. A method of testing an engine including a cylinder, a piston, a crank shaft, an intake valve and an exhaust valve, comprising the steps of:

rotating the crank shaft using an external power source and thereby reciprocating the piston in the cylinder while at least one of (i) an external intake-valve side space communicating with the intake valve and not supplied with pressurized air from outside the engine and (ii) an external exhaust-valve side space communicating with the exhaust valve and not supplied with pressurized air from outside the engine is isolated from an atmosphere, continuously measuring, while the crank shaft is rotated, a pressure in said at least one of the intake-valve side and exhaust-valve side spaces that is isolated from the atmosphere, determining, based on the continuously measured pressure, at least one of (a) a pressure occurring to said at least one of the intake-valve side and exhaust-valve side spaces, when at least one of the corresponding intake and exhaust valves is closed, and (b) at least one of a starting and an ending timing of a closed state of at least one of the corresponding intake and exhaust valves, and evaluating a state of the engine based on the determined at least one of (a) the pressure in said at least one of the intake-vale side and exhaust-valve side spaces and (b) the at least one of the starting and ending timings of the closed state of the at least one of the corresponding intake and exhaust valves, wherein the evaluating step comprises a state-change-timing depending evaluating step for evaluating the state of the engine based on said at least one of the starting and ending timings of the closed state of said at least one of the intake and exhaust valves that corresponds to said at least one of the intake-valve and exhaust valve-side spaces that is isolated from the atmosphere, said at least one of the starting and ending timings of the closed state of said at least one valve comprising at least one of a first state-change timing when the pressure in said at least one space changes from a changing state to a constant state and a second state-change timing when the pressure in said at least one space changes from the constant state to the changing state.

7. A method according to claim 6, wherein the state-change-timing depending evaluating step comprises evaluating the state of the engine based on an interval between the first and second stale-change timings.

8. A method of testing an engine including a cylinder, a piston, a crank shaft, an intake valve and an exhaust valve, comprising the steps of:

rotating the crank shaft using an external power source and thereby reciprocating the piston in the cylinder while at least one of (i) an external intake-valve side space communicating with the intake valve and not supplied with pressurized air from outside the engine and (ii) an external exhaust-valve side space communicating with the exhaust valve and not supplied with pressurized air from outside the engine is isolated from an atmosphere, continuously measuring, while the crank shaft is rotated, a pressure in said at least one of the intake-valve side and exhaust-valve side spaces that is isolated from the atmosphere, determining, based on the continuously measured pressure, at least one of (a) a pressure occurring to said at least one of the intake-valve side and exhaust-valve side spaces, when at least one of the corresponding intake and exhaust valves is closed, and (b) at least one of a starting and an ending timing of a closed state of at least one of the corresponding intake and exhaust valves, and evaluating a state of the engine based on the determined at least one of (a) the pressure in said at least one of the intake-valve side and exhaust-valve side spaces and (b) the at least one of the starting and ending timings of the closed state of the at least one of the corresponding intake and exhaust valves, wherein the rotating step comprises an opposite-direction rotating step for rotating, using the external power source, the crank shaft of the engine in an opposite direction opposite to a normal direction in which the crank shaft is rotated when the engine is actually operated by firing.

9. A method according to claim 8, wherein the opposite-direction rotating step comprises rotating the crank shaft of the engine in the opposite direction while the intake-valve side space is isolated from the atmosphere.

10. A method according to claim 8, wherein the rotating step comprises a normal-direction rotating step for rotating, using the external power source, the crank shaft of the engine in a normal direction in which the crank shaft is rotated when the engine is actually operated by firing.

11. A method according to claim 10, wherein the normal-direction rotating step comprises rotating the crank shaft of the engine in the normal direction while the exhaust-valve side space is isolated from the atmosphere.

12. A method according to claim 1 further comprising the step of isolating, using a valve which is selectively opened and closed, said at least one of the intake-valve and exhaust-valve side spaces from the atmosphere.

13. A method of testing an engine including a cylinder, a piston, a crank shaft, an intake valve and an exhaust valve, comprising the steps of:

rotating the crank shaft using an external power source and thereby reciprocating the piston in the cylinder while at least one of (i) an external intake-valve side space communicating with the intake valve and not supplied with pressurized air from outside the engine and (ii) an external exhaust-valve side space communicating with the exhaust valve and not supplied with pressurized air from outside the engine is isolated from an atmosphere, continuously measuring, while the crank shaft is rotated, a pressure in said at least one of the intake-valve side and exhaust-valve side spaces that is isolated from the atmosphere, determining, based on the continuously measured pressure, (a) a pressure occurring to said at least one of the intake-valve side and exhaust-valve side spaces, when at least one of the corresponding intake and exhaust valves is closed, and (b) at least one of a starting and an ending timing of a closed state of at least one of the corresponding intake and exhaust valves, and evaluating a state of the engine based on (a) the determined pressure in said at least one of the intake-valve side and exhaust-valve side spaces and (b) the determined at least one of the starting and ending timings of the closed state of the at least one of the corresponding intake and exhaust valves.

* * * * *

UNITED STATES PATENT AND TRADEMARK OFFICE

CERTIFICATE OF CORRECTION

PATENT NO. : 6,711,944 B2 
DATED : March 30, 2004
INVENTOR(S) : Naoyuki Maruta et al.

It is certified that error appears in the above-identified patent and that said Letters Patent is hereby corrected as shown below:

<u>Column 99,</u>
Line 17, “spares” should read -- spaces --.
Line 54, “shapes” should read -- spaces --.

<u>Column 100,</u>
Line 39, “valves and” should read -- valves, and --.

<u>Column 101,</u>
Line 33, “stale-change” should read -- state-change --.

<u>Column 102,</u>
Line 24, “claim 1 further” should read -- claim 1, further --.

Signed and Sealed this

Thirteenth Day of July, 2004

JON W. DUDAS
*Acting Director of the United States Patent and Trademark Office*